(12) United States Patent
Watanabe et al.

(10) Patent No.: US 6,210,779 B1
(45) Date of Patent: Apr. 3, 2001

(54) MULTI-FUNCTIONAL MATERIAL WITH PHOTOCATALYTIC FUNCTIONS AND METHOD OF MANUFACTURING SAME

(75) Inventors: Toshiya Watanabe; Eiichi Kojima; Keiichiro Norimoto; Tamon Kimura; Mitsuyoshi Machida; Makoto Hayakawa; Atsushi Kitamura; Makoto Chikuni; Yoshimitsu Saeki; Tatsuhiko Kuga; Yasushi Nakashima, all of Fukuoka (JP)

(73) Assignee: Toto Ltd., Fukuoka (JP)

( * ) Notice: Subject to any disclaimer, the term of this patent is extended or adjusted under 35 U.S.C. 154(b) by 0 days.

(21) Appl. No.: 09/167,326

(22) Filed: Oct. 7, 1998

Related U.S. Application Data

(62) Division of application No. 08/501,110, filed on Oct. 6, 1995, now Pat. No. 5,853,866.

(30) Foreign Application Priority Data

| Dec. 10, 1993 | (JP) | 5-310165 |
| Dec. 14, 1993 | (JP) | 5-313061 |
| Dec. 14, 1993 | (JP) | 5-313062 |
| Dec. 24, 1993 | (JP) | 5-348073 |
| Jun. 24, 1994 | (JP) | 6-143473 |
| Sep. 22, 1994 | (JP) | 6-254242 |
| Sep. 29, 1994 | (JP) | 6-271912 |
| Sep. 30, 1994 | (JP) | 6-274165 |
| Oct. 11, 1994 | (JP) | 6-282382 |
| Oct. 24, 1994 | (JP) | 6-297760 |
| Nov. 4, 1994 | (JP) | 6-271499 |
| Nov. 4, 1994 | (JP) | 6-307173 |
| Nov. 9, 1994 | (JP) | 6-311398 |
| Nov. 11, 1994 | (JP) | 6-313967 |
| Dec. 14, 1994 | (JP) | 6-310896 |

(51) Int. Cl.$^7$ .............. B01J 35/02; B01J 21/06; C04B 41/85

(52) U.S. Cl. .............. 428/208; 156/309.6; 427/125; 427/126.5; 427/126.6; 427/214; 427/217; 428/312.8; 428/313.9; 428/317.1; 430/947; 502/439

(58) Field of Search .............. 156/309.6; 427/125, 427/126.5, 126.6, 214, 217; 428/208, 312.8, 313.9, 317.1; 430/947; 502/439

(56) References Cited

U.S. PATENT DOCUMENTS

| 5,137,607 | * | 8/1992 | Anderson et al. | 204/59 R |
| 5,183,656 | * | 2/1993 | Uesaka et al. | 424/76.1 |
| 5,244,811 | * | 9/1993 | Matthews | 436/146 |

(List continued on next page.)

FOREIGN PATENT DOCUMENTS

| 63-80833 | 4/1988 | (JP) . |
| 1288321 | 11/1989 | (JP) . |
| 2280817 | 11/1990 | (JP) . |

(List continued on next page.)

Primary Examiner—Blaine Copenheaver
(74) Attorney, Agent, or Firm—Carrier, Blackman & Associates, P.C.; Joseph P. Carrier; William D. Blackman

(57) ABSTRACT

Multi-functional materials which have a photocatalytic layer with a photocatalytic function disposed on the surface of a base through an amorphous binder layer 6 interposed therebetween. Photocatalytic particles of the photocatalytic layer are joined together by a surface energy or solid-state sintering. The photocatalytic layer may have a structure in which fine particles fill interstices defined between photocatalytic particles or a structure in which no fine particles fill interstices defined between photocatalytic particles. A metal such as Ag, Pt, or the like may be fixed or not fixed to surfaces of the photocatalytic particles. A lower layer of the photocatalytic layer is embedded in the binder layer such that an intermediate layer is formed between the binder layer and the photocatalytic layer, the intermediate layer including components of the binder and photocatalytic layers in varying concentrations therethrough.

19 Claims, 47 Drawing Sheets

U.S. PATENT DOCUMENTS 5,595,813 * 1/1997 Ogawa et al. ............... 428/212
5,853,866 * 12/1998 Watanabe et al. ........... 428/312.8
6,027,797 * 2/2000 Watanabe et al. ........... 428/312.8

FOREIGN PATENT DOCUMENTS

| 57394 | 2/1993 | (JP) . |
|---|---|---|
| 559562 | 3/1993 | (JP) . |
| 5201747 | 8/1993 | (JP) . |
| 5253544 | 10/1993 | (JP) . |
| 06278241 | 10/1994 | (JP) . |
| 06293519 | 10/1994 | (JP) . |

* cited by examiner

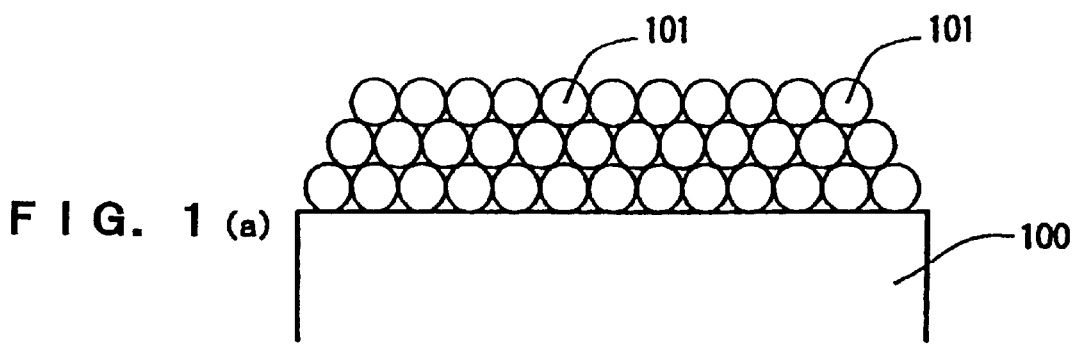
F I G. 1 (a)
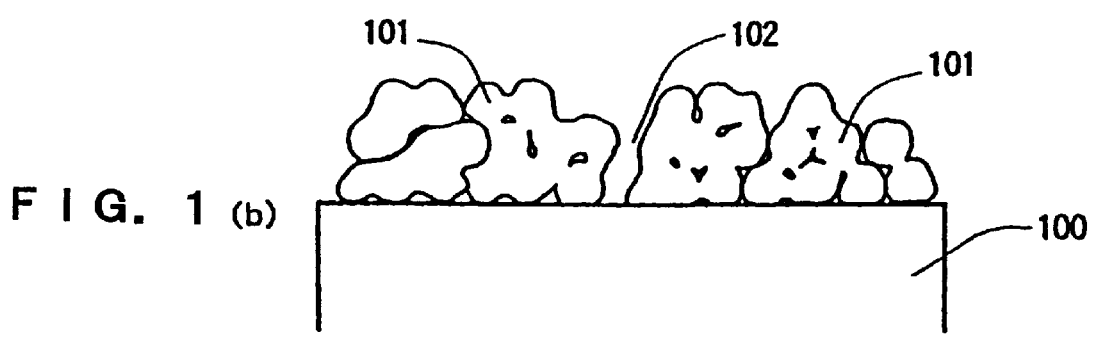
F I G. 1 (b)
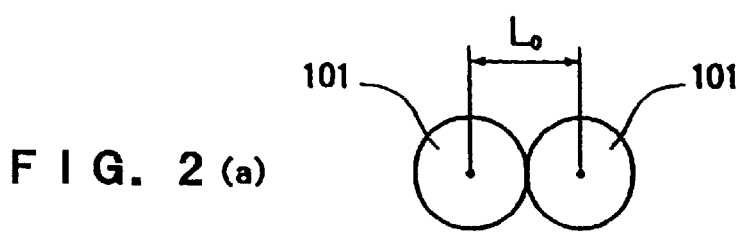
F I G. 2 (a)
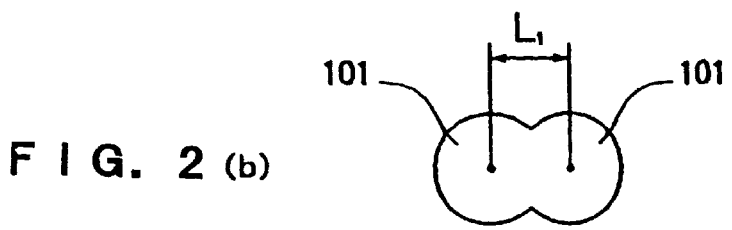
F I G. 2 (b)

F I G. 16 (a)
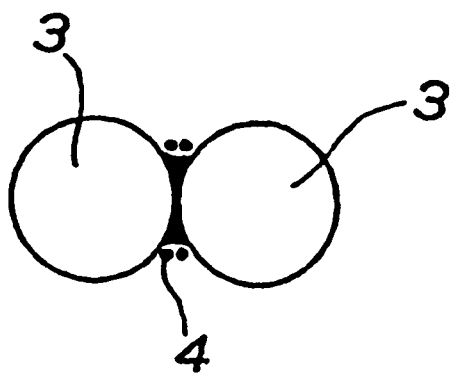
F I G. 16 (b)
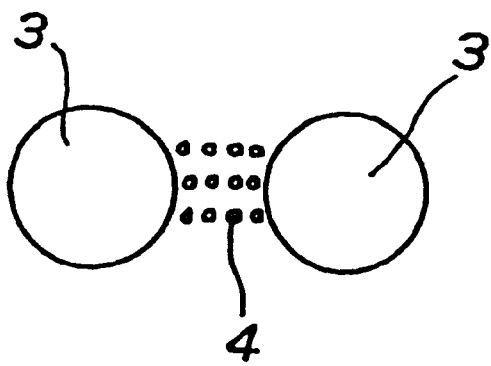

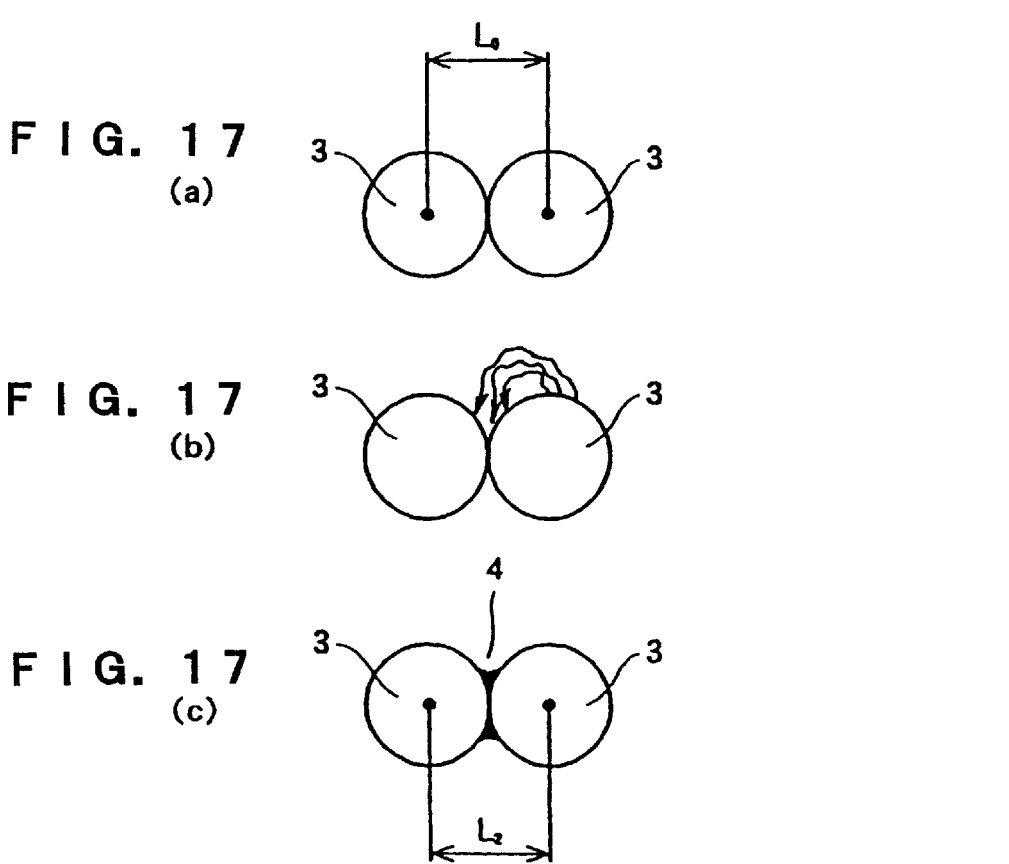
FIG. 17 (a)
FIG. 17 (b)
FIG. 17 (c)
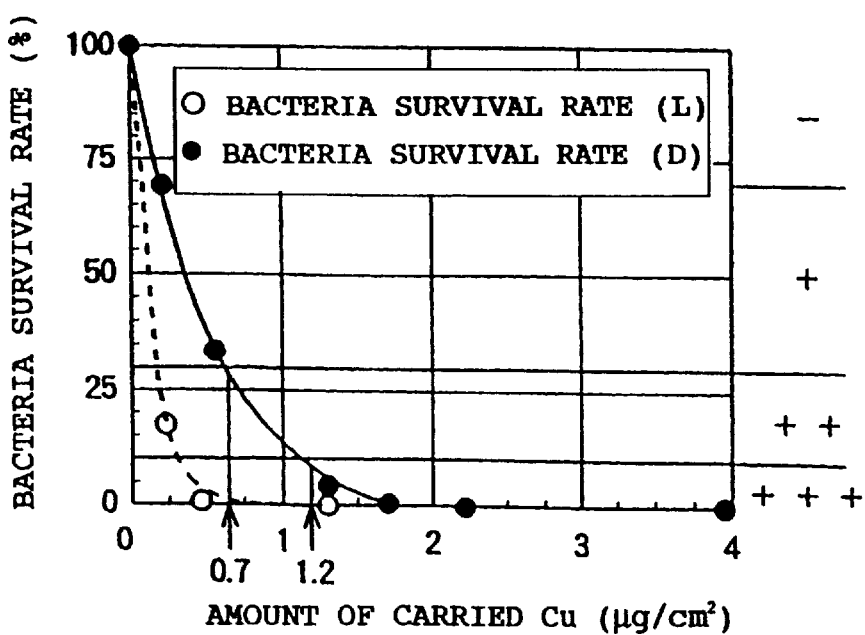
FIG. 18

FIG. 21
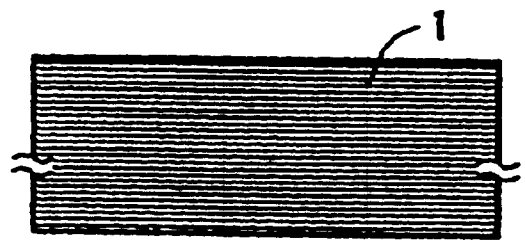
(a)
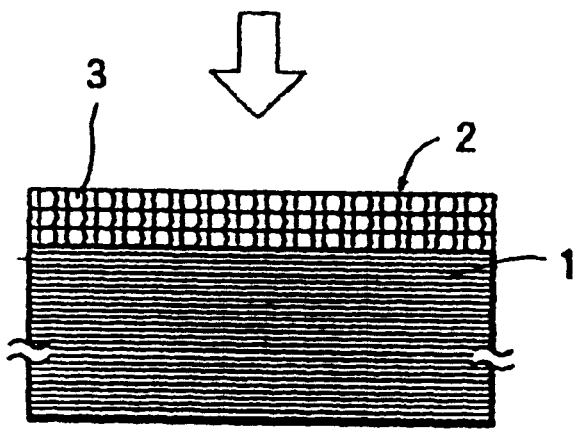
(b)
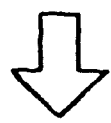
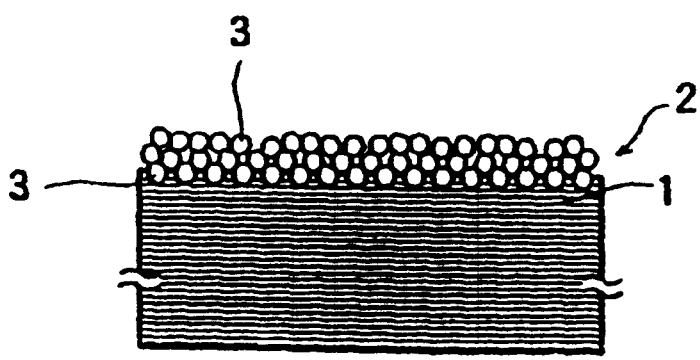
(c)

△ CRYSTAL DIAMETER: 0.1 μm
○ CRYSTAL DIAMETER: 0.02 μm
● CRYSTAL DIAMETER: 0.04 μm

FILM THICKNESS

○ $R_{30}$ FOR CRYSTAL DIAMETER: 0.1 μm (WITH NECKS)

● PEELING RESISTANCE FOR CRYSTAL DIAMETER: 0.1 μm (WITH NECKS)

△ $R_{30}$ FOR CRYSTAL DIAMETER: 0.04 μm (WITH NO NECKS OBSERVED)

▲ PEELING RESISTANCE FOR CRYSTAL DIAMETER: 0.04 μm (WITH NO NECKS OBSERVED)

F I G. 3 8
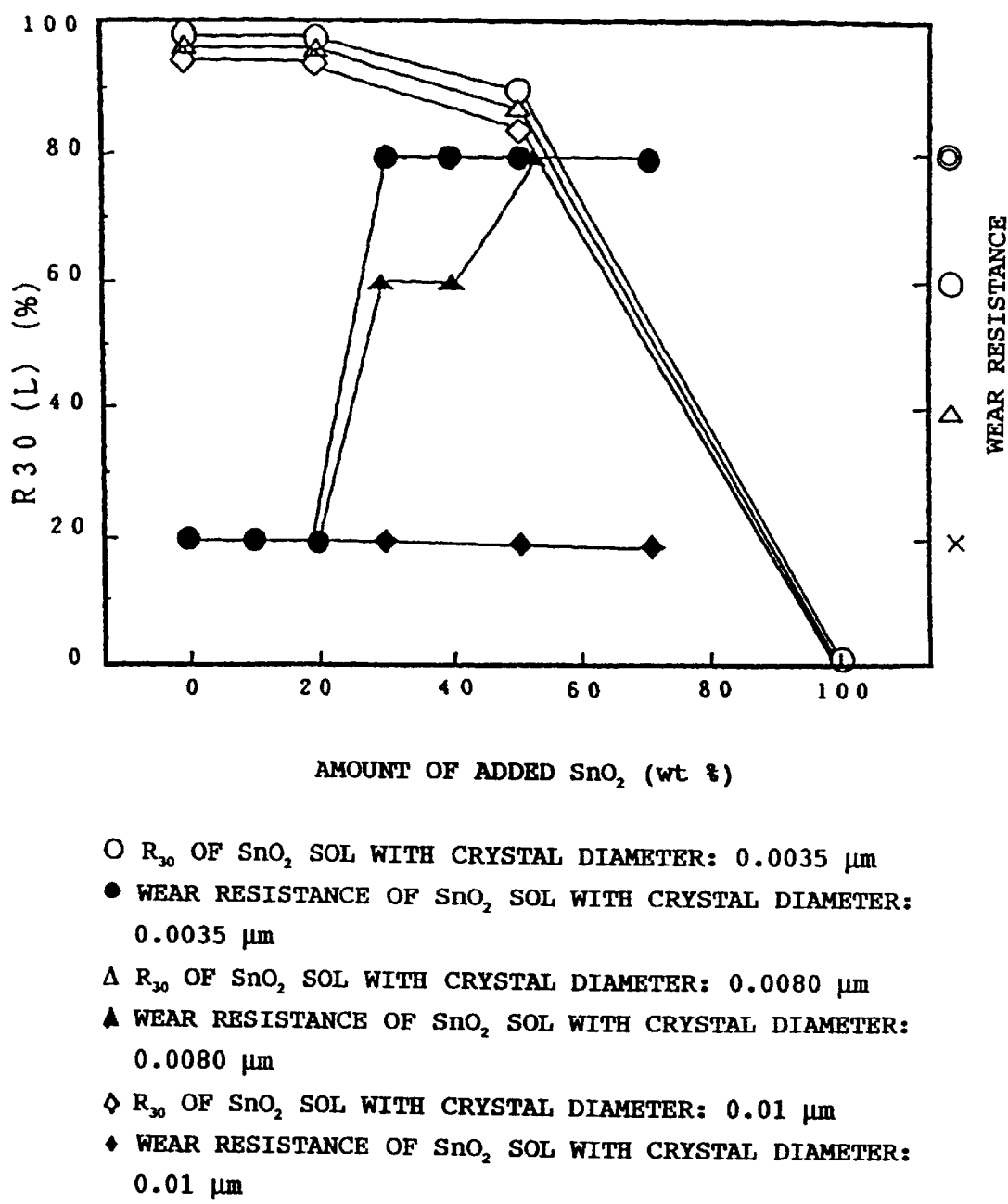
AMOUNT OF ADDED $SnO_2$ (wt %)
○ $R_{30}$ OF $SnO_2$ SOL WITH CRYSTAL DIAMETER: 0.0035 μm
● WEAR RESISTANCE OF $SnO_2$ SOL WITH CRYSTAL DIAMETER: 0.0035 μm
△ $R_{30}$ OF $SnO_2$ SOL WITH CRYSTAL DIAMETER: 0.0080 μm
▲ WEAR RESISTANCE OF $SnO_2$ SOL WITH CRYSTAL DIAMETER: 0.0080 μm
◇ $R_{30}$ OF $SnO_2$ SOL WITH CRYSTAL DIAMETER: 0.01 μm
◆ WEAR RESISTANCE OF $SnO_2$ SOL WITH CRYSTAL DIAMETER: 0.01 μm ● $SnO_2$ SOL WITH CRYSTAL DIAMETER: 0.0035 μm

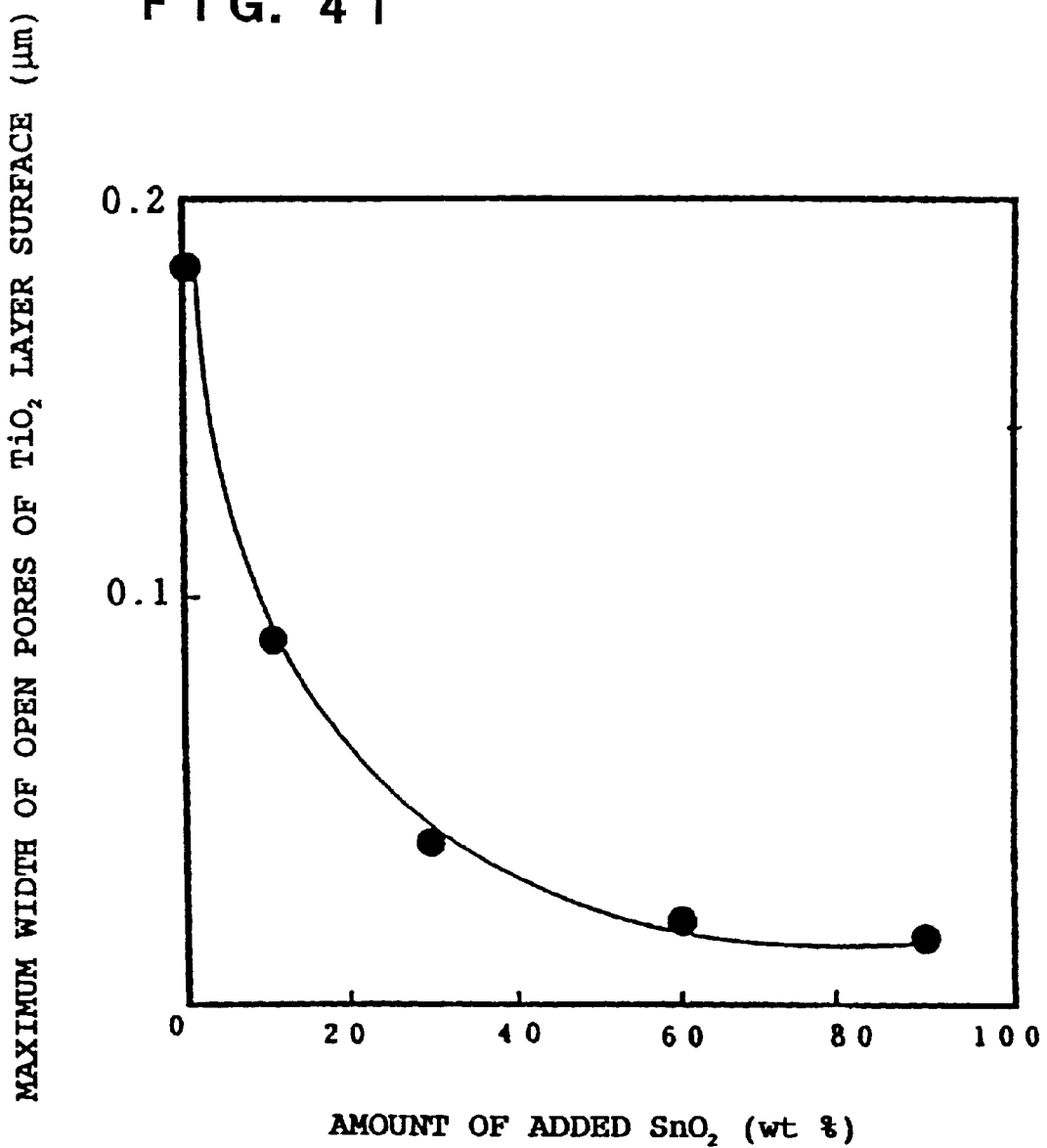
F I G. 4 1

AMOUNT OF ADDED $SnO_2$ (wt %)

○ $R_{30}$ (L) OF $SnO_2$ SOL WITH CRYSTAL DIAMETER: 0.0035 μm
● WEAR RESISTANCE OF $SnO_2$ SOL WITH CRYSTAL DIAMETER: 0.0035 μm
△ $R_{30}$ (L) OF $SnO_2$ SOL WITH CRYSTAL DIAMETER: 0.0080 μm
▲ WEAR RESISTANCE OF $SnO_2$ SOL WITH CRYSTAL DIAMETER: 0.0080 μm
◊ $R_{30}$ (L) OF $SnO_2$ SOL WITH CRYSTAL DIAMETER: 0.01 μm
♦ WEAR RESISTANCE OF $SnO_2$ SOL WITH CRYSTAL DIAMETER: 0.01 μm

● FILM THICKNESS: 0.8 μm
▲ FILM THICKNESS: 0.4 μm
▼ FILM THICKNESS: 0.2 μm (a)

(b)

F I G. 5 1
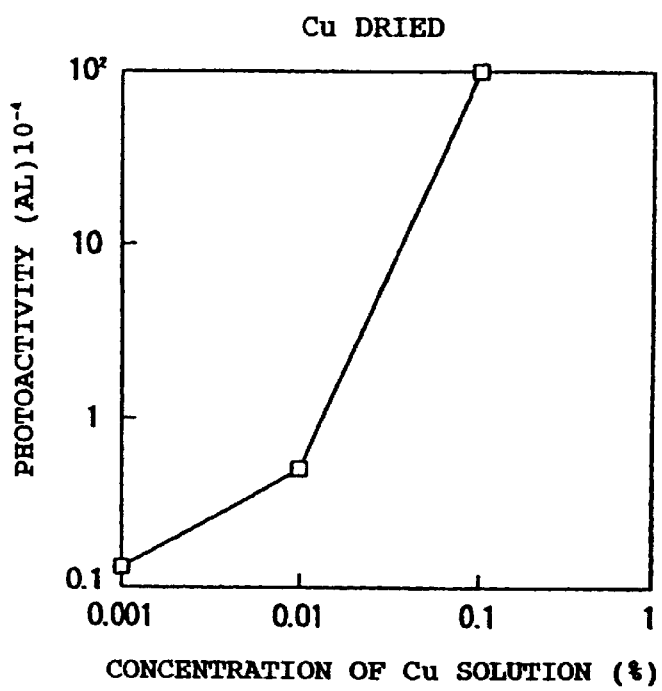
F I G. 5 2
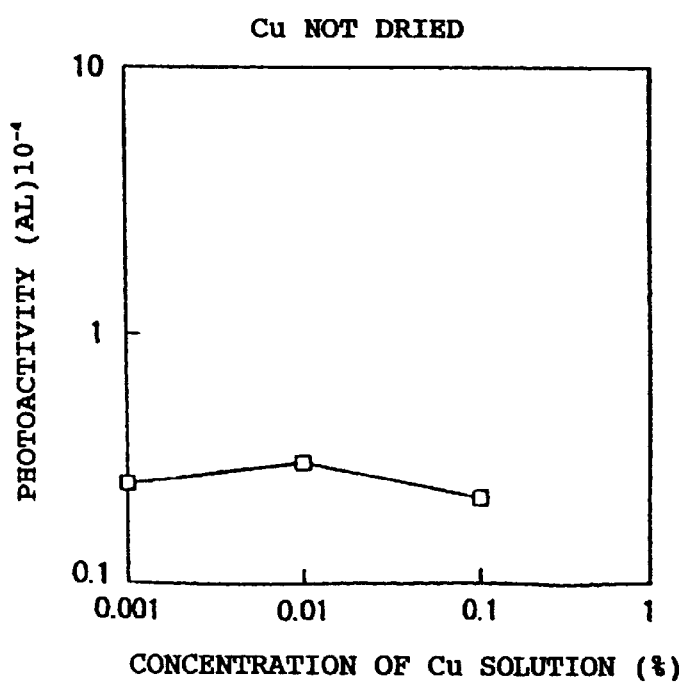

BEFORE AND AFTER DROPPING OF KI SOLUTION

-- ANATASE TYPE ACTIVITY LEVEL (CRYSTAL DIAMETER: 0.02 μm)
● RUTILE TYPE + Cu-CARRIED ACTIVITY LEVEL

MULTI-FUNCTIONAL MATERIAL WITH PHOTOCATALYTIC FUNCTIONS AND METHOD OF MANUFACTURING SAME

This application is a divisional of U.S. Ser. No. 08/501,110, filed Oct. 6, 1995, which is now U.S. Pat. No. 5,853,866.

TECHNICAL FIELD

The present invention relates to a multi-functional material capable of performing various functions including a deodorizing function, an antibacterial function, a bactericidal function, and a stain-resistant function, and a method of manufacturing such a multi-functional material.

BACKGROUND ART $TiO_2$, $V_2O_5$, $ZnO$, $WO_3$, etc. have heretofore been known as substances which, when irradiated by ultraviolet radiation, cause oxygen molecules to be adsorbed to or desorbed from an organic compound such as a smelly constituent for promoting decomposition (oxidation) of the organic compound. Since particles of $TiO_2$ whose crystallized form is anatase, in particular, are highly effective for use as a photocatalyst, it has been proposed to form a photocatalytic layer of $TiO_2$ particles on the surface of walls, tiles, glass (mirror), circulatory filter units, or sanitary ware.

Known processes of depositing such a photocatalytic layer of $TiO_2$ particles directly on the surface of a base of plastic, ceramic, or resin include the CVD process, the sputtering process, and the electron beam evaporation process.

However, the CVD process, the sputtering process, and the electron beam evaporation process require large-scale equipment, and result in a high manufacturing cost due to a poor yield.

According to other known processes of forming a photocatalytic layer, photocatalytic particles are kneaded with a binder and coated on the surface of a base by spray coating or dip coating, and thereafter heated (see Japanese laid-open patent publication No. 5-201747).

For photocatalytic particles such as $TiO_2$ particles to function effectively as a photocatalyst, it is necessary that the photocatalytic particles be irradiated with ultraviolet radiation and held in contact with a substance to be decomposed thereby such as a smelly gas or the like. Kneading photocatalytic particles with a binder and coating them on the surface of a base as disclosed in Japanese laid-open patent publication No. 5-201747 tends to embed many photocatalytic particles in the binder layer, so that no ultraviolet radiation will reach and no smelly gas or the like will contact those photocatalytic particles, which thus will fail to perform a sufficient photocatalytic function.

Another known process of forming a photocatalytic layer is an alkoxide process disclosed in Japanese laid-open utility model publication No. 5-7394. According to the disclosed process, a photocatalytic layer is formed by coating a base of glass with a titanium alkoxide, drying the coated titanium alkoxide, and thereafter firing the titanium alkoxide at 100° C. An organic material in water is decomposed when an ultraviolet radiation is applied to the photocatalytic layer.

The alkoxide process is excellent in that it can form a thin film at a relatively low temperature, and is effective where a substance such as Pyrex glass or quartz glass which is not softened at temperatures up to about 500° C. is used as the material of the base. If a substance such as soda glass having a low melting point is used as the material of a base, then the base is softened already at a temperature at which a thin film is formed, and a formed thin photocatalytic film is embedded in the base, with the result that no light will reach the photocatalytic layer, which will fail to perform photocatalytic functions.

According to Japanese laid-open patent publication No. 1-288321, a $TiO_2$ sol is sprayed over ceramic paper of a fibrous material and thereafter heated at a temperature ranging from 400 to 700° C., and thereafter an $SnO_2$ sol is sprayed and heated at a temperature ranging from 400 to 700° C., thus forming a photocatalytic film capable of oxidizing and decomposing aldehydes.

In the process disclosed in Japanese laid-open patent publication No. 1-288321, the entire surface of the film is covered with $SnO_2$ which is less active than $TiO_2$, and attempts to increase the strength of the film are liable to cause cracks. Specifically, as shown in FIG. 1(a) of the accompanying drawings, when a sol containing $TiO_2$ particles 101 is coated on the surface of a tile 100 and then heated (fired), a crack 102 develops as shown in FIG. 1(b) of the accompanying drawings. The crack is considered to occur because a phase transition to a rutile structure brings about a volume shrinkage (a density increase) and also because whereas the distance between $TiO_2$ particles 101 is $L_0$ as shown in FIG. 2(a) of the accompanying drawings before being fired, the distance is reduced to $L_1$ ($L_1 < L_0$) as shown in FIG. 2(b) of the accompanying drawings due to volumetric diffusion of the particles into each other after being fired into the rutile structure.

Japanese patent publication No. 4-46609 discloses a method of purifying an odor in the air in the passenger's compartment of a vehicle by decomposing or modifying a smelly substance contained in the odor. Specifically, light is applied to a solid semiconductor photocatalyst in which a metal or a metal oxide is carried by a semiconductor, and the air to be purified in the passenger compartment is brought into contact with the solid semiconductor photocatalyst for decomposing or modifying the smelly substance contained in the odor due to a photochemical reaction.

However, when a base with its surface coated with a photocatalyst is used in contaminated water or an outer wall, dirt tends to be deposited on the photocatalyst owing to high-molecular substances, dust particles, and bacteria that are contained in the atmospheric air or water. Depending on the type of the dirt, the photocatalytic function may be lowered by the deposited dirt.

One solution to the reduction in the photocatalytic function due to deposited dirt is disclosed in Japanese patent publication No. 6-7905. Japanese patent publication No. 6-7905 reveals a deodorizing apparatus comprising a photocatalytic layer of semiconductor, an ultraviolet lamp and a heater disposed in confronting relation to the photocatalytic layer, and an air blower. The photocatalytic layer or the heater, or the photocatalytic layer and the heater are moved for sequentially heating the photocatalytic layer in its entirety. When the photocatalytic layer is heated to a temperature close to 400° C., dirt of high-molecular substances, dust particles, and the like is removed, and the photocatalytic layer is regenerated.

The above arrangement of regenerating the photocatalytic layer is practically difficult to use on a member of an installation disposed inside a room. Therefore, a more radical solution is desired not to remove dirt deposited on the photocatalytic layer but to prevent dirt from being deposited on a photocatalytic layer or to prevent a photocatalytic layer from lowering its photocatalytic function even with dirt deposited thereon.

Japanese patent publication No. 6-7906 shows a process of applying light with high ultraviolet intensity to a photocatalyst to remove an odor in a home or an office. With this process of applying light with high ultraviolet intensity, however, the odor is decomposed at a different rate depending on the structure of the photocatalyst. Furthermore, though the base which carries the photocatalyst has sufficient mechanical strength if the base is porous and impregnated with the photocatalyst according to the process disclosed in the publication, no sufficient mechanical strength will be achieved if the base is made of a material which is not porous such as glazed tile or relatively dense ceramic.

$TiO_2$ is available in different crystallized forms including anatase, brucite, and rutile. The anatase structure is better in photoactivity than the other crystallized forms. It has been reported is the magazine "Surface", 1987, vol. 25 that the photoactivity of rutile $TiO_2$ is improved by carrying a metal such as Pt, Ag, or the like. However, rutile $TiO_2$ does not have sufficient odor removal rate, density and adhesiveness. If Ag or AgO is used as a metal to be added, then the resultant photocatalyst is not suitable for use on tiles and building materials because these metals are black.

A sol of titanium oxide produced by the hydrothermal method or the sulfuric acid method can easily be coagulated because it is composed of ultrafine particles. If the coagulated material is coated on the surface of a base, then it will cause gloss irregularities and cracks. For preventing a sol of titanium oxide from being coagulated, it has heretofore been customary to attach an organic dispersant such as of triethanolamine to the surface of the titanium oxide sol.

If a monodisperse titanium oxide sol with an organic dispersant such as of triethanolamine being attached to the surface of the titanium oxide sol is coated on a base such as a resin base of low heat resistance and then fired and secured at 300° C., then since the organic dispersant is firmly fixed to the active sites of the titanium oxide sol and is not sufficiently evaporated and decomposed in the firing step, the resultant material exhibits an insufficient photocatalytic action, and has an insufficient deodorizing and antibacterial capabilities.

Japanese laid-open patent publication No. 5-253544 discloses a process of kneading anatase titanium oxide with a binder, coating the mixture on the surface of a base, and heating the coated base. According to the disclosed process, a binder layer is formed on the surface of a plate member serving as a wall surface, a floor surface, or a ceiling surface of a dwelling space, and then a fine powder of photocatalyst made primarily of anatase titanium oxide is sprayed onto the surface of the binder layer such that the fine powder of photocatalyst is partly exposed from the binder layer. Thereafter, the binder layer is melted by being heated at a temperature of 300° C. or higher and lower than 900° C., after which the binder layer is cooled and solidified.

The photocatalytic material produced according to this method has a good deodorizing ability if heat-treated at a temperature of 300° C. or higher and lower than 900° C., but does not exhibit good deodorizing characteristics if heat treated at low temperatures lower than 300° C. Therefore, it has been difficult to add a good photocatalytic activity such as excellent deodorizing characteristics to a base of plastic which is not resistant to heat. The reasons for this are considered to be as follows: In order to coat photocatalytic particles uniformly on a base, it is necessary to produce, in a preceding step, a monodisperse system of such photocatalytic particles dispersed in the suspension with an organic dispersant added. At temperatures lower than 300° C., the added organic dispersant is not sufficiently decomposed and vaporized and remains in covering relation to active sites on the photocatalytic particles.

Therefore, it is an object of the present invention to provide a multi-functional material in which a photocatalytic layer is exposed from a base to exhibit a sufficient photocatalytic effect, and the base well retains the photocatalytic layer.

Another object of the present invention is to form a photocatalytic layer which is less peelable on a relatively dense base of glass, tile, metal, or plastic in comparison to conventional photocatalytic layers.

Still another object of the present invention is to form a photocatalytic layer on a base of relatively low melting point material, e.g., a base of soda glass which is relatively inexpensive and can easily be processed.

Yet still another object of the present invention is to provide a multi-functional material which is resistant to deposition of dirt thereon, has an antibacterial or deodorizing capability that is resistant to being lowered due to dirt, and has excellent mechanical strength.

A further object of the present invention is to provide a multi-functional material in which a photocatalytic layer made principally of anatase $TiO_2$ has an excellent peel strength.

A still further object of the present invention is to increase the photocatalytic activity of a photocatalytic layer which is made primarily of rutile $TiO_2$.

A yet still further object of the present invention is to increase the photocatalytic activity of a photocatalytic layer which is, made primarily of rutile $TiO_2$ and decolorize the photocatalytic layer for better appearance by having the photocatalytic layer carry Ag.

Still another object of the present invention is to provide a multi-functional material having a good photocatalytic function even if heat treated at low temperatures lower than 300° C.

DISCLOSURE OF THE INVENTION:

A multi-functional material according to the present invention comprises a photocatalytic layer formed on the surface of a base of ceramic such as tile, sanitary ware, or glass, or resin, metal, or wood directly or through a binder layer. The type of photocatalytic particles which make up the photocatalytic layer, the diameter of the photocatalytic particles, the interstices between the photocatalytic particles, the porosity of the photocatalytic layer, the relationship between the binder layer and the photocatalytic layer, particles that fill the interstices between the photocatalytic particles, and metal particles fixed to the surfaces of the photocatalytic particles are selected and arranged to allow the multi-functional material to have excellent photocatalytic effects, such as a deodorizing effect, of the photocatalytic layer, and also excellent antibacterial and wear-resistant capabilities.

BRIEF DESCRIPTION OF THE DRAWINGS

FIG. 1 (a) is a view showing a conventional $TiO_2$ sol before it is fired, FIG. 1(b) is a view showing the conventional $TiO_2$ sol after it is fired into a rutile structure;

FIG. 2(a) is a view showing conventional $TiO_2$ particles before they are fired, FIG. 2(b) is a view showing the conventional $TiO_2$ particles after they are fired;

FIGS. 16(a) and 16(b) are enlarged views of $TiO_2$ particles;

FIGS. 17(a) through 17(c) are views illustrative of a sintering mechanism for $TiO_2$ particles;

FIG. 18 is a graph showing the results of an antibacterial test;

FIG. 21 is a view illustrative of a method of manufacturing a multi-functional material having photocatalytic functions according to another embodiment of the present invention;

FIG. 38 is a graph showing the relationship between the amount of $SnO_2$ which was added, the deodorizing ability ($R_{30}$), and the wear resistance;

FIG. 41 is a graph showing the relationship between the amount of $SnO_2$ which was added and the maximum width of open pores at the surface of a $TiO_2$ layer;

FIG. 51 is a graph showing the relationship between the concentration of a Cu solution and the photoactivity in the case where the Cu solution was photo-reduced when it was dried;

FIG. 52 is a graph showing the relationship between the concentration of a Cu solution and the photoactivity in the case where the Cu solution was photo-reduced when it was not dried;

BEST MODE FOR CARRYING OUT THE INVENTION

The present invention will be described in greater detail with reference to the accompanying drawings.

FIGS. 3 through 14 show the structures of multifunctional materials having photocatalytic functions according to the present invention, as they are divided into different types. Any of the multi-functional materials having photocatalytic functions according to the present invention belongs to either one of these structures.

Figure 3:
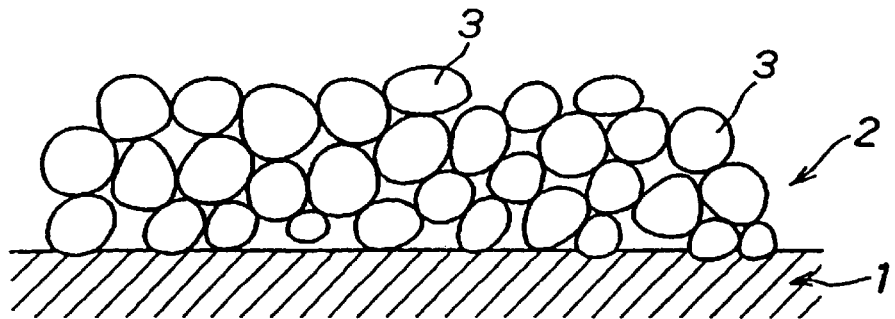
FIG. 3 is a view of a multi-functional material having photocatalytic functions according to the present invention, the view schematically showing photocatalytic particles of a photocatalytic layer which are joined by a potential energy.

A multi-functional material shown in FIG. 3 comprises a photocatalytic layer 2 having photocatalytic functions which is directly disposed on the surface of a base 1. The photocatalytic layer 2 is composed of fine photocatalytic particles 3 joined together by a potential energy such as a surface energy, a curved-surface energy, or the like.

Figure 4:
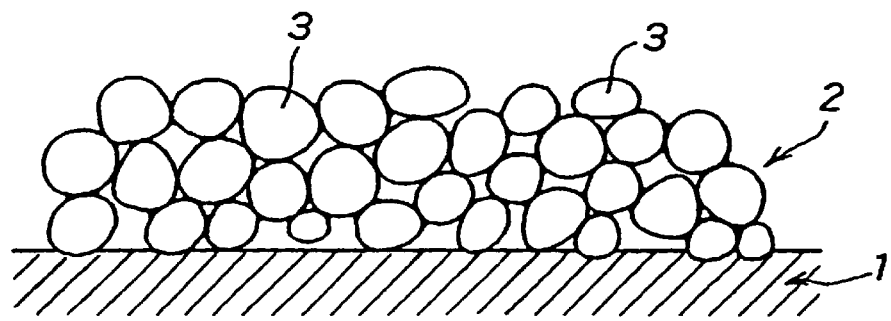
FIG. 4 is a view of a multi-functional material having photocatalytic functions according to the present invention, schematically showing photocatalytic particles of a photocatalytic layer which are joined by solid-state sintering.

A multi-functional material shown in FIG. 4 comprises a photocatalytic layer 2 having photocatalytic functions which is directly disposed on the surface of a base 1. The photocatalytic layer 2 is composed of photocatalytic particles 3 joined together by solid-state sintering.

Figure 5:
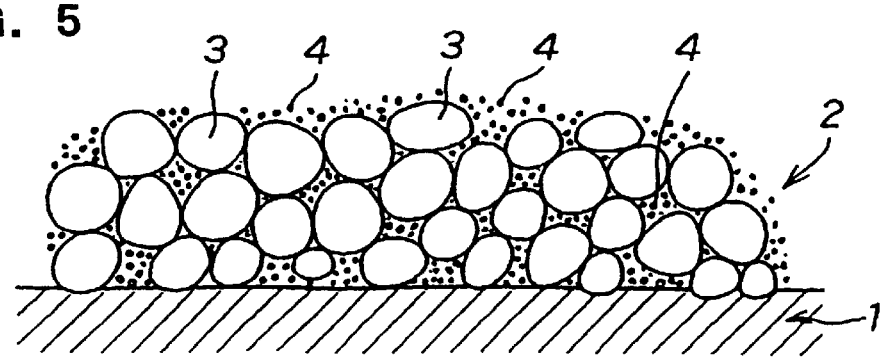
FIG. 5 is a view of a multi-functional material having photocatalytic functions according to the present invention, schematically showing the manner in which small particles are filled in interstices between photocatalytic particles of a photocatalytic layer.

A multi-functional material shown in FIG. 5 comprises a photocatalytic layer 2 having photocatalytic functions which is directly disposed on the surface of a base 1. The photocatalytic layer 2 is composed of photocatalytic particles 3 joined together by particles 4 that fill interstices between the photocatalytic particles 3 and are smaller than the interstices.

In FIG. 5, the particles 4 are shown as filling those interstices which are positioned inside the photocatalytic layer 2. However, the particles 4 may fill those interstices between the photocatalytic particles 3 in at least a surface layer. Specifically, since the bonding of the photocatalytic particles 3 in the surface layer is important for the mechanical strength of the photocatalytic layer 2 as external forces transmitted thereto are attenuated inside the photocatalytic layer 2, only the interstices between the photocatalytic particles 3 in the surface layer may be filled with the fine particles 4. In such a case, the photocatalytic particles 3 inside the photocatalytic layer 2 are joined together by a potential energy, and the photocatalytic particles 3 should preferably have an average diameter of 0.04 $\mu$m for the photocatalytic layer 2 to achieve a sufficient mechanical strength.

Figure 6:
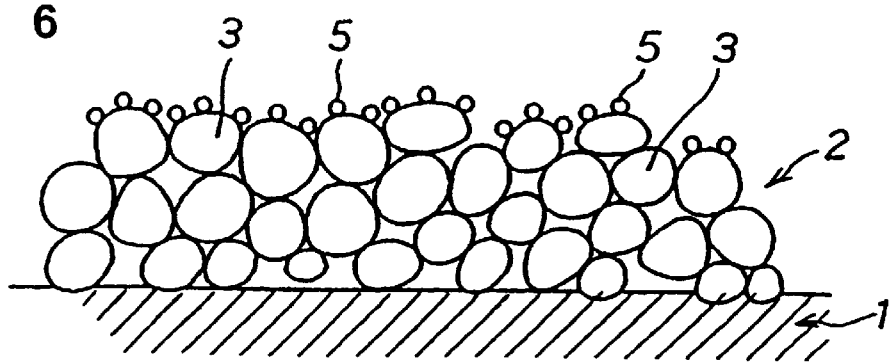
FIG. 6 is a view schematically showing the manner in which metal particles are fixed to the surfaces of photocatalytic particles of the multi-functional material shown in FIG. 3.

A multi-functional material shown in FIG. 6 comprises a photocatalytic layer 2 directly disposed on the surface of a base 1. The photocatalytic layer 2 is composed of photocatalytic particles 3 joined together by a potential energy, and electron-capturing particles 5 such as of Ag, Cu, $Cu_2O$, or the like fixed to the surfaces of the photocatalytic particles 3.

Figure 7:
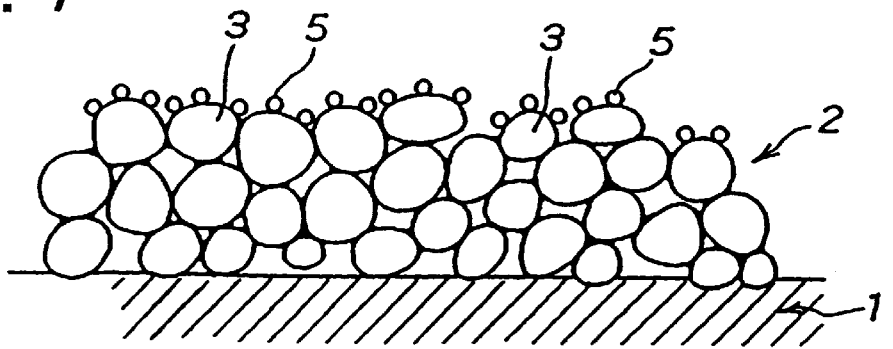
FIG. 7 is a view schematically showing the manner in which metal particles are fixed to the surfaces of photocatalytic particles of the multi-functional material shown in FIG. 4.

A multi-functional material shown in FIG. 7 comprises a photocatalytic layer 2 directly disposed on the surface of a base 1. The photocatalytic layer 2 is composed of photocatalytic particles 3 joined together by solid-state sintering, and metal particles 5 such as of Ag, Pt, or the like fixed to the surfaces of the photocatalytic particles 3.

Figure 8:
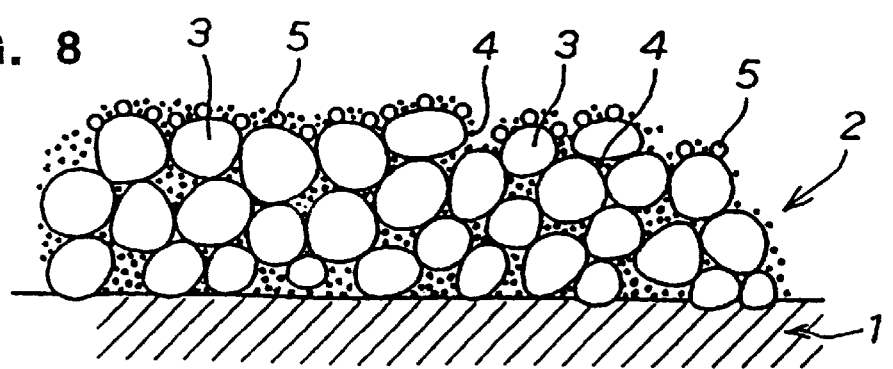
FIG. 8 is a view schematically showing the manner in which metal particles are fixed to the surfaces of photocatalytic particles of the multi-functional material shown in FIG. 5.

A multi-functional material shown in FIG. 8 comprises a photocatalytic layer 2 having photocatalytic functions which is directly disposed on the surface of a base 1. The photocatalytic layer 2 is composed of photocatalytic particles 3 joined together by particles 4 that fill interstices between the photocatalytic particles 3 and are smaller than the interstices, and metal particles 5 such as of Ag, Pt, or the like fixed to the surfaces of the photocatalytic particles 3.

Figure 9:
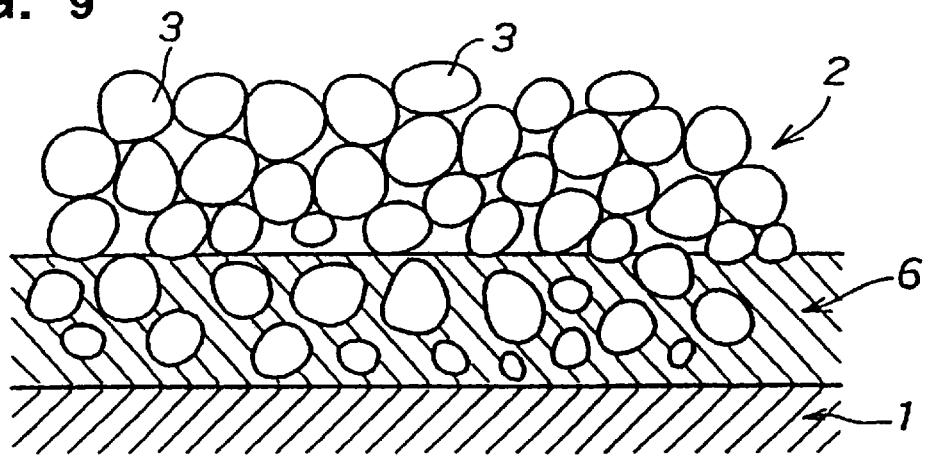
FIG. 9 is a view of a multi-functional material having photocatalytic functions according to the present invention, schematically showing the manner in which the photocatalytic layer is joined to a base through a binder layer and photocatalytic particles of a photocatalytic layer are joined by a potential energy.

A multi-functional material shown in FIG. 9 comprises a photocatalytic layer 2 having photocatalytic functions which is disposed on the surface of a base 1 through a binder layer 6. The photocatalytic layer 2 has a surface layer exposed to the exterior and a lower layer embedded in the binder layer 6, the surface layer being composed of fine photocatalytic particles 3 joined together by a potential energy.

Figure 10:
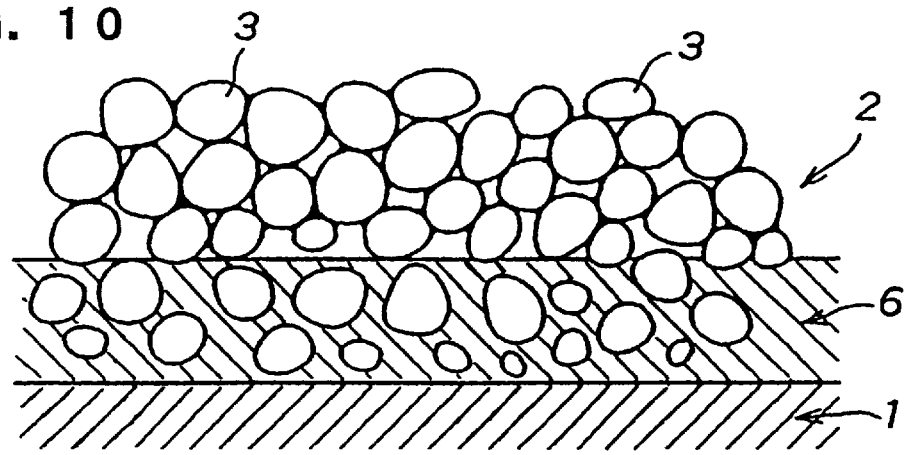
FIG. 10 is a view of a multi-functional material having photocatalytic functions according to the present invention, schematically showing the manner in which the photocatalytic layer is joined to a base through a binder layer and photocatalytic particles of a photocatalytic layer are joined by solid-state sintering.

A multi-functional material shown in FIG. 10 comprises a photocatalytic layer 2 disposed on the surface of a base 1 through a binder layer 6. The photocatalytic layer 2 has a surface layer composed of photocatalytic particles 3 joined together by solid-state sintering.

Figure 11:
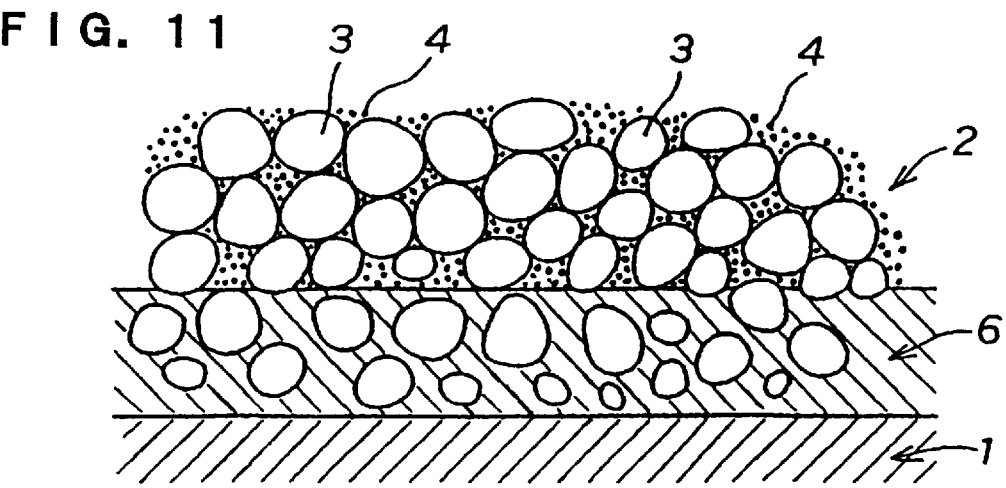
FIG. 11 is a view of a multi-functional material having photocatalytic functions according to the present invention, schematically showing the manner in which the photocatalytic layer is joined to a base through a binder layer and small particles are filled in interstices between photocatalytic particles of a photocatalytic layer.

A multi-functional material shown in FIG. 11 comprises a photocatalytic layer 2 disposed on the surface of a base 1 through a binder layer 6. The photocatalytic layer 2 is composed of photocatalytic particles 3 joined together by particles 4 that fill interstices between the photocatalytic particles 3 and smaller than the interstices.

Figure 12:
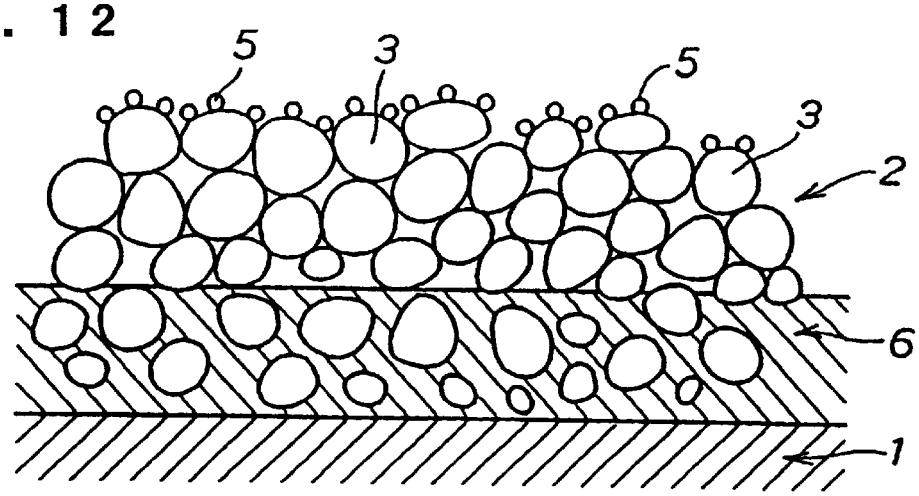
FIG. 12 is a view schematically showing the manner in which metal particles are fixed to the surfaces of photocatalytic particles of the multi-functional material shown in FIG. 9.

A multi-functional material shown in FIG. 12 comprises a photocatalytic layer 2 disposed on the surface of a base 1 through a binder layer 6. The photocatalytic layer 2 is composed of photocatalytic particles 3 joined together by a potential energy, and electron-capturing particles 5 such as of Ag, Cu, $Cu_2O$, or the like fixed to the surfaces of the photocatalytic particles 3.

Figure 13:
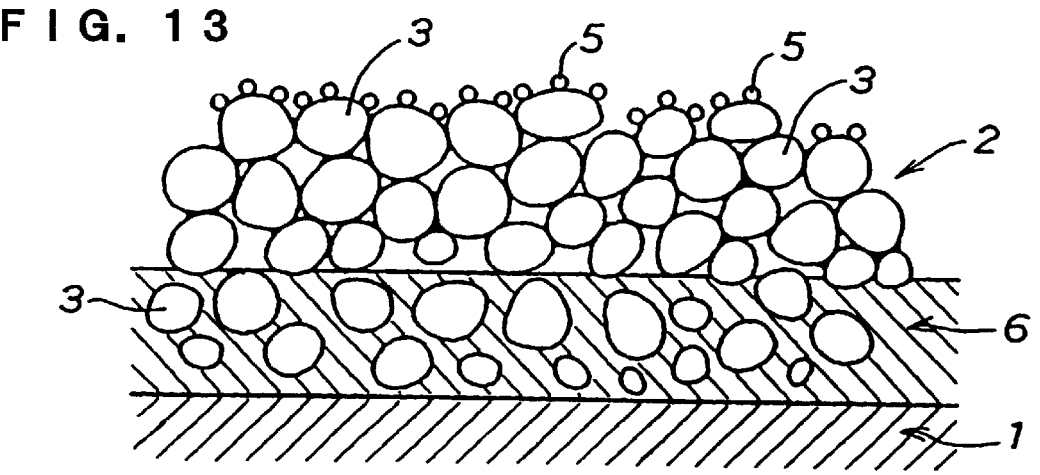
FIG. 13 is a view schematically showing the manner in which metal particles are fixed to the surfaces of photocatalytic particles of the multi-functional material shown in FIG. 10.

A multi-functional material shown in FIG. 13 comprises a photocatalytic layer 2 disposed on the surface of a base 1 through a binder layer 6. The photocatalytic layer 2 is composed of photocatalytic particles 3 joined together by solid-state sintering, and electron-capturing particles 5 such as of Ag, Cu, $Cu_2O$, or the like fixed to the surfaces of the photocatalytic particles 3.

Figure 14:
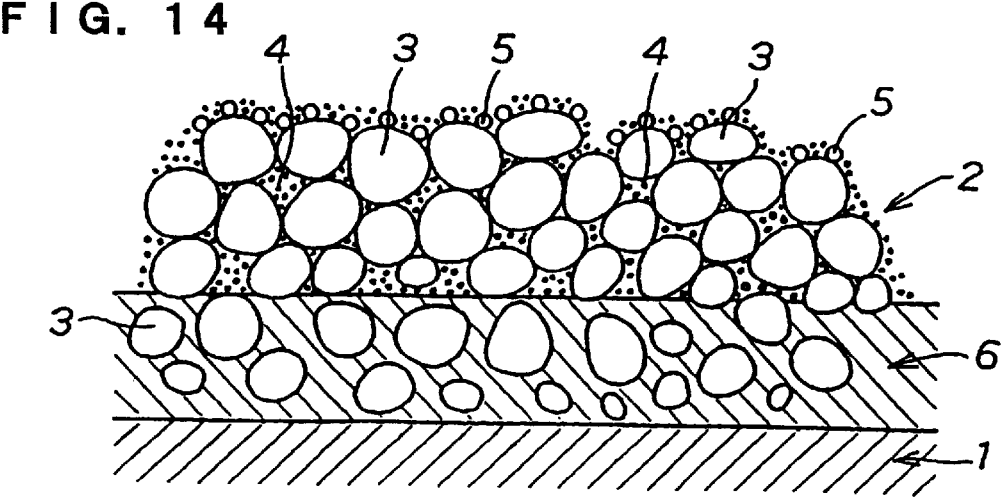
FIG. 14 is a view schematically showing the manner in which metal particles are fixed to the surfaces of photocatalytic particles of the multi-functional material shown in FIG. 11.

A multi-functional material shown in FIG. 14 comprises a photocatalytic layer 2 disposed on the surface of a base 1 through a binder layer 6. The photocatalytic layer 2 is composed of photocatalytic particles 3 joined together by particles 4 that fill interstices between the photocatalytic particles 3 and smaller than the interstices, and metal particles 5 such as of Ag, Pt, or the like fixed to the surfaces of the photocatalytic particles 3.

The base 1 in each of the above multi-functional materials may be made of ceramic such as tile, sanitary ware, or glass, or resin, metal, wood, or a compound of some of these materials.

The photocatalytic particles 3 are semiconductor particles having a sufficient band gap to perform photocatalytic functions including an antibacterial function, a deodorizing function, etc. According to one theory, photocatalytic particles are antibacterial because bacteria are electrocuted when a voltage higher than a certain voltage is applied. Generally, however, photocatalytic particles are antibacterial due to active oxygen produced when irradiated with light for the same reason that photocatalytic particles are deodorizing. For producing active oxygen, it is necessary that one conduction band of a semiconductor as it is represented by a band model be positioned higher than a hydrogen generating potential and an upper end of a valence band be positioned lower than an oxygen generating potential. Semiconductors which satisfy such requirements include $TiO_2$, $SrTiO_3$, ZnO, SiC, gallium phosphide, CdS, CdSe, $MoS_3$, etc. Since the position of the conduction band moves upwardly when converted into fine particles, fine particles of $SnO_2$, $WO_3$, $Fe_2O_3$, $Bi_2O_3$, etc. which have a diameter ranging from 1 to 10 nm are possibly capable of generating active oxygen. Particularly preferable among these materials is anatase $TiO_2$ because it can be processed into fine particles that are chemically stable and highly active which can be produced inexpensively.

The electron-capturing particles are those particles which capture electrons when electrons and holes are produced upon exposure of the photocatalytic particles to light and prevent the electrons from being re-combined with the holes. Materials of the electron-capturing particles include Ag, Cu, Pt, Pd. Ni, Co, Fe, $Cu_2O$, etc.

The binder layer 6 is made of a thermoplastic material such as glaze, inorganic glass, thermoplastic resin, solder, or the like. With the binder layer 6 being made of a thermoplastic material, a photocatalyst can be coated on the binder layer at normal temperature br a simple and inexpensive process such as spray coating or the like, and the base 1, the binder layer 6, and the photocatalytic layer 2 can be joined strongly simply by heating, resulting in an advantage with respect to the manufacturing cost.

A multi-functional material having photocatalytic functions according to the present invention is composed of a photocatalytic layer composed of photocatalytic particles which is laminated to or partly embedded in a sheet-like binder layer made of a thermoplastic material. If such a sheet-like multi-functional material is applied to an existing tile, sanitary ware, a building material, or the like and thereafter heated, then the existing tile or the like is given added functions including a deodorizing function, a stain-resistant function, an antibacterial function, a bactericidal function, and a mildew-resistant function.

The average diameter of the photocatalytic particles 3 of the photocatalytic layer 2 should preferably be smaller than 0.3 $\mu$m for increasing the specific surface area for higher photocatalytic activity.

The thickness of the photocatalytic layer 2 should preferably be in the range from 0.1 $\mu$m to 0.9 $\mu$m. If the thickness of the photocatalytic layer 2 were smaller than 0.1 $\mu$m, then photocatalytic particles would be embedded in localized areas of the binder layer 6, creating regions on the surface of the multi-functional material which would fail to exhibit photocatalytic activity. Since bacteria would tend to be trapped by those regions, the antibacterial capability of the multi-functional material would be lowered. If the thickness of the photocatalytic layer 2 were greater than 0.9 $\mu$m, then it would suffer large thickness variations, making it difficult for stains deposited oil samples to be detached. The thickness of the photocatalytic layer 2 extends from the outermost surface of the thin photocatalytic film to the portion thereof that is embedded in the lower layer of glaze, and is measured by conducting an elementary analysis with EBMA (electron-beam microanalyzer) and determining the distance to the outermost surface from an uppermost portion of a region where major constituent elements of the glaze layer that have increased are substantially constant.

A design effect can be achieved by varying the thickness of the photocatalytic layer 2. Specifically, if the thickness of the photocatalytic layer 2 is equal to or higher than 0.2 μm, but smaller than 0.4 μm, then the photocatalytic layer 2 is given a rainbow-like pattern due to light interference on thicker portions of the photocatalytic layer 2. For producing an appearance composed of only the color of the base, the pattern thereof, or a combination thereof, thicker portions of the photocatalytic layer 2 whose thickness is equal to or higher than 0.1 μm, but smaller than 0.2 μm, or equal to or higher than 0.4 μm, but smaller than 1 μm, may be formed in regions except for regions where the above light interference is caused. Such an arrangement is applicable to a wide range of applications including tiles, basins, bathtubs, closet bowls, urinals, sinks, cooking tables, etc.

If the photocatalytic particles 3 only are joined together, then only a potential energy (adsorption) between them or sintering is available to join them together. If the photocatalytic particles are to be sintered, they have to be fired at a considerably high temperature. If the photocatalytic particles are to be adsorbed to each other, they will not be joined sufficiently and the active sites thereof will be consumed by the adsorption unless the specific surface area of the photocatalytic particles are substantially large and the filling capability thereof is high. Therefore, there are limitations on the process of manufacturing a multi-functional material having sufficient catalytic activity and wear-resistance.

If particles of greater size than the interstices between the photocatalytic particles 3 were employed in an attempt to increase the bonding between the photocatalytic particles 3, no sufficient bonding forces would be available, and the photocatalytic particles exposed on the surface of the multi-functional material would be covered. The surface of the multi-functional material would have areas where no catalytic activity would be exhibited, and bacteria would be trapped, with the result that the antibacterial function of the multi-functional material would be greatly reduced.

An interstice between photocatalytic particles represents both a neck between photocatalytic particles 3 as shown in FIG. 16(a) and a pore between photocatalytic particles 3 as shown in FIG. 16(b). Particles 4 having a diameter smaller than such an interstice between photocatalytic particles are particles smaller than either the neck between photocatalytic particles or the pore between photocatalytic particles, whichever is greater. The particles 4 are particularly effective in joining the photocatalytic particles to each other in the structure shown in FIG. 16(b).

The small particles 4 that fill the interstices between the photocatalytic particles 3 are basically not limited to any material, but should be of materials of high adsorbing power. If the small particles 4 were made of a material having extremely small adsorbing forces, then they would not serve the purpose of joining photocatalytic particles. If the small particles 4 were made of a material having extremely large adsorbing forces, then they would be more likely to cover active sites on the surfaces of photocatalytic particles than to enter the interstices between photocatalytic particles. In view of this, the particles 4 that fill the interstices between the photocatalytic particles 3 should preferably be made of any of metals including Sn, Ti, Ag, Cu, Zn, Fe, Pt, Co, Pd, Ni, or the like or their oxides. However, zeolite, active carbon, clay, or the like which has heretofore been used as an adsorption carrier is not preferable as the material of the particles 4. Of the above metals and oxides, tin oxide is preferable in that it has adequate adsorbing power. Since metals or oxides of Ag, Cu, or the like have their own antibacterial and deodorizing capabilities other than their capacity to join photocatalytic particles, they are preferable for use in assisting the action of a photocatalyst in the absence of light irradiation in applications where their antibacterial and deodorizing capabilities are required. Consequently, the metal particles 5 may be used as the small particles 4 that fill the interstices between the photocatalytic particles 3.

The particles 4 that fill the interstices between the photocatalytic particles 3 should preferably have an average diameter which is ⅕ or less of the average diameter of the photocatalytic particles 3.

According to the presently available fabrication process, the particles 4 that fill the interstices between the photocatalytic particles 3 not only enter the interstices between the photocatalytic particles 3, but also are attached to the photocatalytic particles 3 to some extent. If the diameter of the particles that fill the interstices were in excess of ⅘ of the average diameter of the photocatalytic particles, then it would be more likely for the particles 4 to be attached to the surfaces of the photocatalytic particles than to enter the interstices between the photocatalytic particles, resulting in a reduction in the bonding strength of the photocatalytic particles 3. If the particles that fill the interstices were greater in diameter than the photocatalytic particles, then they would partly cover the photocatalytic particles, creating regions on the surface of the multi-functional material which would fail to exhibit photocatalytic activity. Since bacteria would tend to be trapped by those regions, the antibacterial capability of the multi-functional material would be lowered.

The average diameter of the particles 4 that fill the interstices between the photocatalytic particles 3 should preferably be less than 0.01 μm for increasing their specific surface area to produce adequate adsorbing forces.

The amount of the particles 4 that fill the interstices between the photocatalytic particles 3 with respect to the total amount of the photocatalytic particles 3 and the filling particles 4 should preferably be of a molar ratio ranging from 10% to 60%. When a photocatalytic layer is fixed to a base through a binder layer by heating the photocatalytic layer in a temperature range which is low enough not to sinter photocatalytic particles, if the amount of particles that fill interstices were too small, then the photocatalytic particles would not be firmly joined together, and if the amount of particles that fill interstices were too large, then the amount of particles covering the photocatalytic particles would be increased, creating regions on the surface of the multi-functional material which would fail to exhibit photocatalytic activity. Since bacteria would tend to be trapped by those regions, the antibacterial capability of the multi-functional material would be lowered. Therefore, the molar ratio in the range from 10% to 60% is preferable.

The material of the particles 4 that fill the interstices between the photocatalytic particles 3 should preferably be of a type having a vapor pressure that is higher than the vapor pressure of the material of the photocatalytic particles 3, so that the particles 4 the fill the interstices between the photocatalytic particles 3 will be agglomerated at the necks between the photocatalytic particles 3. This is because it is better for the particles 4 to be sintered rather than being filled only for joining the photocatalytic particles 3 more firmly thereby to increase the peel strength of the photocatalytic layer. If such a material having a high vapor pressure is selected as the material of the particles 4 that fill the interstices, then it will also serve as a sintering additive to lower the sintering temperature.

Materials having a high vapor pressure include tin oxide, bismuth oxide, zinc oxide, or the like, but tin oxide is preferable from the standpoint of safety.

The layer containing the particles 4 that fill the interstices between the photocatalytic particles 3 should preferably have a thickness of 0.1 µm or greater. If the thickness of this layer were smaller than 0.1 µm, then the photocatalytic particles (or particles that fill the interstices depending on the manufacturing process) would be embedded in localized areas of the binder layer 6, creating regions on the surface of the multi-functional material which would fail to exhibit photocatalytic activity. Since bacteria would tend to be trapped by those regions, the antibacterial capability of the multi-functional material would be lowered. The thickness of the layer containing the particles 4 that fill the interstices between the photocatalytic particles 3 extends from the outermost surface to a portion embedded in a lower layer of the binder, the thickness covering averaged surface irregularities.

Figure 15:
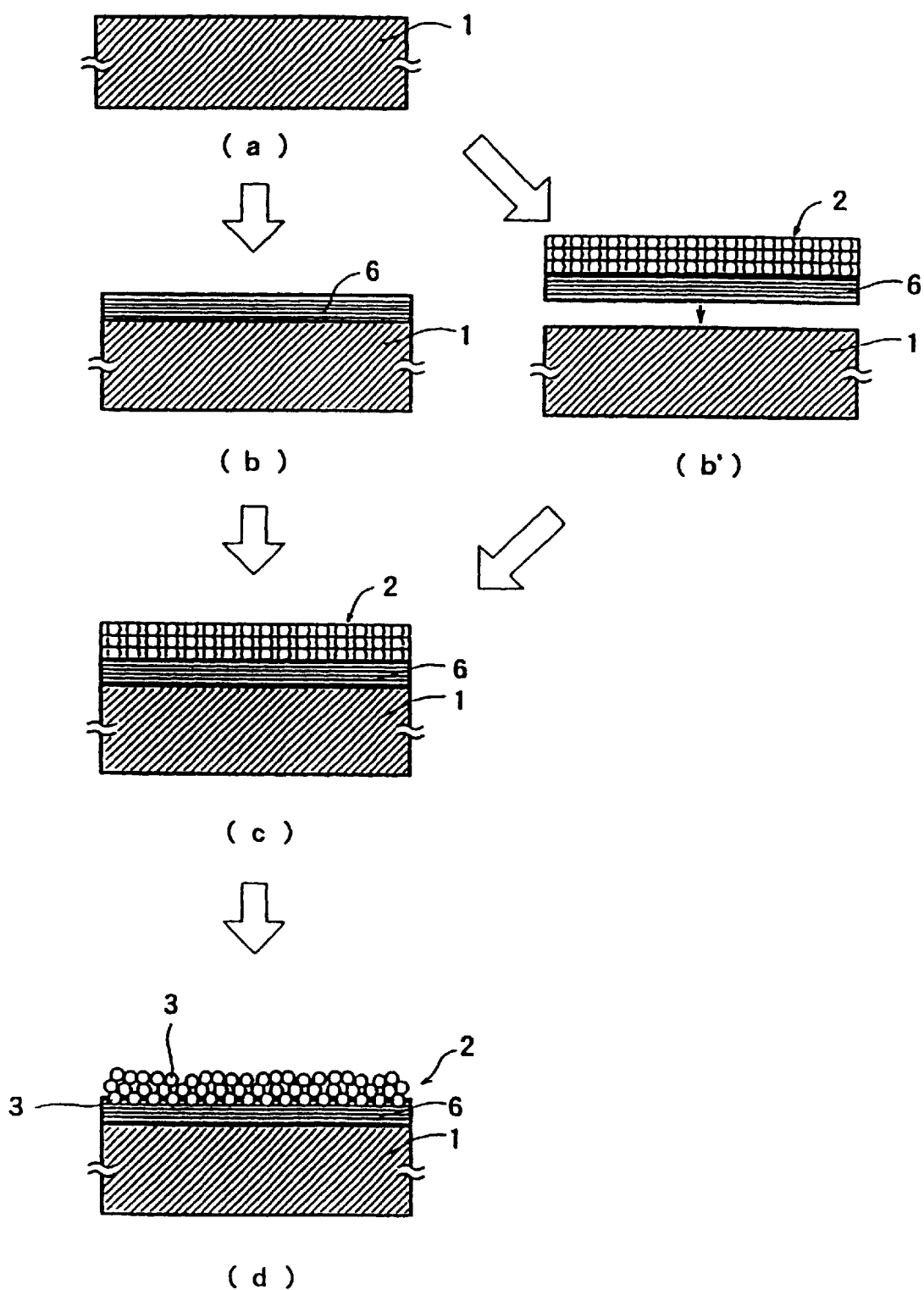
FIGS. 15(a)–15(d) are collectively a view illustrative of a method of manufacturing a multi-functional material having photocatalytic functions according to the present invention.

FIG. 15 is illustrative of a method of manufacturing a multi-functional material having photocatalytic functions according to the present invention. According to the present invention, a base 1 is prepared as shown in FIG. 15(a), and then a binder layer 6 is formed on the surface of the base 1 as shown in FIG. 15(b). The binder layer 6 is made of a material whose softening temperature is lower than the softening temperature of the base 1. For Inventive Example, if the base 1 is a tile, an enameled member, or a pottery product, then the binder layer 6 may comprise a glazed layer or a printed layer thereon.

Then, as shown in FIG. 15(c), a photocatalytic layer 2 composed of photocatalytic particles such as $TiO_2$ particles or the like is formed on the binder layer 6. At this time, the photocatalytic layer 2 may be placed on the binder layer 6 with bonding forces just enough to keep the photocatalytic layer 2 on the binder layer 6 in a subsequent sintering step.

Alternatively, before the binder layer 6 is formed on the surface of the base 1, a photocatalytic layer 2 may be formed on the binder layer 6 as shown in FIG. 15(b'), and then the binder layer 6 may be placed on the base 1.

Thereafter, the assembly is heated at an atmospheric temperature which is higher than the softening temperature of the binder layer 6 by a temperature higher than 20° C. but lower than 320° C. and which is lower than the softening temperature of the base 1. Now, as shown in FIG. 15(d) or FIGS. 9 through 14, a lower layer of the photocatalytic layer 2 close to the binder layer 6 is partly settled into the binder layer 6 and embedded in and firmly held by the binder layer 6 when the binder layer 6 is solidified. Some of those photocatalytic particles 3 of the photocatalytic layer 2 which constitute a surface layer exposed to the ambient air are joined to each other as shown in FIG. 16(a) by a potential energy, intermolecular forces, or sintering, and the other of those photocatalytic particles 3 remain separate from each other as shown in FIG. 16(b). Therefore, the surfaces of the photocatalytic particles are exposed to the exterior substantially at the surface layer.

The temperature at which the assembly is heated is higher than the softening temperature of the binder layer 6 by a temperature higher than 20° C. but lower than 320° C. because if lower than 20° C., then it takes time for the binder layer to be softened and the photocatalytic particles 3 would not sufficiently be retained, and if higher than 320° C., then the binder layer would quickly be melted, allowing the photocatalytic particles 3 to be embedded in the binder layer, producing surface irregularities, and giving rise to breaks and pinholes. Preferably the temperature at which the assembly is heated should be higher than the softening temperature of the binder layer 6 by a temperature which is at least 40° C. but at most 300° C.

If it is assumed that the specific gravity of the photocatalytic particles 3 is represented by δt and the specific gravity of the binder layer 6 by δb, then these specific gravities should fall in the range of $0 \leq \delta t - \delta b \leq 3.0$, preferably $0.5 \leq \delta t - \delta b \leq 2.0$. If the difference between the specific gravities of the photocatalytic particles 3 and the binder layer 6 were too small, then when the binder layer 6 is melted, the speed of vertical travel of the photocatalytic particles 3 in the binder layer 6 would be low, allowing the photocatalytic particles 3 to be peeled off easily after sintering. If the difference between the specific gravities of the photocatalytic particles 3 and the binder layer 6 were too large, the speed of vertical travel of the photocatalytic particles 3 in the binder layer 6 would be high, allowing most of the photocatalytic particles 3 to be embedded in the binder layer 6. If such a condition were localized, then bacteria would be trapped at the bottom of the localized area, and the antibacterial capability would be lowered.

In cases which require the specific gravities to be in the range of $\delta t - \delta b > 3.0$, a second binder layer which meets the requirement: $0 \leq \delta t - \delta b \leq 3.0$ may be interposed between the binder layer 6 and the photocatalytic particles 3.

If $\delta t - \delta b \leq 0$, then the specific gravity difference $\delta t - \delta b$ may be increased by pressing the assembly when it is heated. Therefore, the same advantages as those when the range of $0 \leq \delta t - \delta b \leq 3.0$ is met are obtained by a HIP process or a hot pressing process.

The interstices between the photocatalytic particles which make up a portion exposed from the binder layer 6, specifically the neck-between the photocatalytic particles shown in FIG. 16(a) or the pore between the photocatalytic particles shown in FIG. 16(b), may be filled with particles 4, which are made of any of metals including Sn, Ti, Ag, Cu, Zn, Fe, Pt, Co, Pd, Ni, or the like or their oxides, having a diameter smaller than the interstices to join the photocatalytic particles to each other.

In another method of manufacturing a multi-functional material having photocatalytic functions according to the present invention, a binder layer 6 made of a thermoplastic material is formed on a base 1 of ceramic, resin, metal, or the like, and then a mixture in the form of a sol or precursor composed of photocatalytic particles 3 and particles 4 smaller in diameter than the photocatalytic particles 3 is coated on the binder layer 6, thus producing a photocatalytic layer 2. Thereafter, the binder layer 6 is softened to allow a lower layer of the photocatalytic layer 2 to be partly embedded in the binder layer 6, and is then solidified.

The above method is simple to carry out, and can easily control the mixture ratio of the photocatalytic particles 3 and the particles 4 which fill the interstices therebetween because the photocatalytic layer 2 is formed by coating a mixture in the form of a sol or precursor composed of particles 4 for filling interstices and photocatalytic particles 3.

In still another method of manufacturing a multi-functional material having photocatalytic functions according to the present invention, a mixture in the form of a sol or precursor composed of photocatalytic particles 3 and particles 4 smaller in diameter than the photocatalytic particles 3 is coated on a sheet-like binder layer 6 made of a thermoplastic material, thus producing a photocatalytic layer 2. Then, the binder layer 6 with the photocatalytic layer 2 formed thereon is placed or bonded to a base 1 of ceramic, resin, metal, or the like. Thereafter, the binder layer 6 is softened to allow a lower layer of the photocatalytic layer 2 to be partly embedded in the binder layer 6, and is then solidified.

In yet still another method of manufacturing a multi-functional material having photocatalytic functions according to the present invention, a binder layer 6 made of a thermoplastic material is formed on a base 1 of ceramic, resin, metal, or the like, and then a photocatalytic layer 2 composed of photocatalytic particles 3 is formed on the binder layer 6. Thereafter, the binder layer 6 is softened to allow a lower layer of the photocatalytic layer 2 to be partly embedded in the binder layer 6, and is then solidified. Furthermore, a solution containing small particles is coated on the photocatalytic layer 2, and then the assembly is heated to fix small particles 4 to the photocatalytic particles 3.

The above method is relatively easy to carry out if the particles that fill the interstices are made of an oxide, and allows many particles to be attached to fill the interstices if the photocatalytic layer is relatively porous.

In a further method of manufacturing a multi-functional material having photocatalytic functions according to the present invention, a photocatalytic layer 2 composed of photocatalytic particles 3 is formed on a sheet-like binder layer 6 made of a thermoplastic material, and then the sheet-like binder layer 6 with the photocatalytic layer 2 formed thereon is placed on or bonded to a base 1 of ceramic, resin, metal, or the like. Thereafter, the binder layer 6 is softened to allow a lower layer of the photocatalytic layer 2 to be partly embedded in the binder layer 6, and is then solidified. Furthermore, a solution containing metal particles 4 is coated on the photocatalytic layer 2, and then the assembly is heated to fix small particles to the photocatalytic particles 3.

In a still further method of manufacturing a multi-functional material having photocatalytic functions according to the present invention, a binder layer 6 made of a thermoplastic material is formed on a base 1 of ceramic, resin, metal, or the like. Then, a photocatalytic layer 2 composed of photocatalytic particles 3 is formed on the binder layer 6. Thereafter, the binder layer 6 is softened to allow a lower layer of the photocatalytic layer 2 to be partly embedded in the binder layer 6, and is then solidified. Furthermore, a solution containing ions of small metal particles 4 is coated on the photocatalytic layer 2, and then irradiated with light including ultraviolet rays to reduce the metal ions, thereby fixing the metal particles 4 to the photocatalytic particles 3.

The above method is relatively easy to carry out if the particles that fill the interstices are made of metal, and can fix the metal particles in a highly short period of time, i.e., in several minutes. A lamp for applying ultraviolet rays may be an ultraviolet lamp, a BLB lamp, a xenon lamp, a mercury lamp, or a fluorescent lamp.

In a yet still further method of manufacturing a multi-functional material having photocatalytic functions according to the present invention, a photocatalytic layer 2 composed of photocatalytic particles 3 is formed on a sheet-like binder layer 6 made of a thermoplastic material, and then the sheet-like binder layer 6 with the photocatalytic layer 2 formed thereon is placed on or bonded to a base 1 of ceramic, resin, metal, or the like. Thereafter, the binder layer 6 is softened to allow a lower layer of the photocatalytic layer 2 to be partly embedded in the binder layer 6, and is then solidified. Furthermore, a solution containing ions of small metal particles 4 is coated on the photocatalytic layer 2, and then irradiated with light including ultraviolet rays to reduce the metal ions, thereby fixing the metal particles 4 to the photocatalytic particles 3.

In another method of manufacturing a multi-functional material having photocatalytic functions according to the present invention, a binder layer 6 made of a thermoplastic material is formed on a base 1 of ceramic, resin, metal, or the like. Then, a photocatalytic layer 2 composed of photocatalytic particles 3 is formed on the binder layer 6. Thereafter, a solution containing ions of small metal particles 4 is coated on the photocatalytic layer 2, and then irradiated with light including ultraviolet rays to reduce the metal ions, thereby fixing the metal particles 4 to the photocatalytic particles 3. Furthermore, the binder layer 6 is softened to allow a lower layer of the photocatalytic layer 2 to be partly embedded in the binder layer 6, and is then solidified.

The above method offers a higher productivity because its heating step is carried out only once.

In still another method of manufacturing a multi-functional material having photocatalytic functions according to the present invention, a photocatalytic layer 2 composed of photocatalytic particles 3 is formed on a sheet-like binder layer 6 made of a thermoplastic material, then a solution containing ions of small metal particles 4 is coated on the photocatalytic layer 2, and irradiated with light including ultraviolet rays to reduce the metal ions, thereby fixing the metal particles 4 to the photocatalytic particles 3. Furthermore, the sheet-like binder layer 6 with the photocatalytic layer 2 formed thereon is placed on or bonded to a base 1 of ceramic, resin, metal, or the like. Thereafter, the binder layer 6 is softened to allow a lower layer of the photocatalytic layer 2 to be partly embedded in the binder layer 6, and is then solidified.

The photocatalytic particles 3 may be made of ZnO, and the metal particles 4 that fill the interstices between the photocatalytic particles 3 may be made of Ag or $Ag_2O$. The particles of Ag or $Ag_2O$ are effective not only to strengthen the coupling between the photocatalytic particles 3 of ZnO, but also to promote the photocatalytic effect of ZnO and to perform antibacterial and deodorizing functions. ZnO selected as a photocatalytic material can eliminate coloring by Ag ions, thus increasing a design effect produced by the color of the base, the pattern thereof, or a combination thereof.

Alternatively, a solution containing salts which will form an insoluble colorless or white salt with ions of metal that fill the interstices between the photocatalytic particles may be held in contact with the photocatalytic layer, and thereafter irradiated with light including ultraviolet rays.

With the above process, it is possible to eliminate coloring by the particles that fill the interstices, without resorting to a combination of ZnO and Ag or $Ag_2O$, thereby increasing a design effect produced by the color of the base, the pattern thereof, or a combination thereof.

The photocatalytic particles 3 may be made of $TiO_2$, and the heat-treatment temperature at which the binder layer 6 is softened may be in the range of from 800° C. to 1000° C. At a temperature of 800° C. or higher, the bonding strength of the TiO$_2$ particles is increased because necks are produced between the TiO$_2$ particles in an initial sintering phase. At a temperature in excess of 1000° C., however, the sintering process would enter an intermediate sintering phase, and the photocatalytic layer would tend to crack as it would suffer an undue volume shrinkage owing to solid-state sintering of TiO$_2$.

Alternatively, the photocatalytic particles 3 may be made of TiO$_2$, the particles 4 that fill the interstices between the photocatalytic particles 3 may be made of Ag, and the solution containing salts which will form an insoluble colorless or white salt with Ag ions may be an aqueous solution of a halide such as Kl, KCl, FeCl$_3$, or the like. Since Ag forms an insoluble colorless or white salt such as AgI, AgCl, or the like with an alkali halide, a design effect produced by the color of the base, the pattern thereof, or a combination thereof can be increased.

If a dispersing step is included prior to the step of coating photocatalytic particles on a binder layer, then a dispersant for dispersing a sol or precursor which will become photocatalytic particles in the dispersing step should preferably be composed of only a component which will be vaporized at a temperature lower than the heat-treatment temperature at which the binder layer will be softened.

Heretofore, no deodorizing capability has been available at a temperature lower than 320° C. because a dispersant attached to the surfaces of TiO$_2$ particles in the dispersing step is not sufficiently vaporized and evaporated, and hence the surfaces of TiO$_2$ particles have not sufficiently been exposed on the outermost surface of the base, resulting in an insufficient photocatalytic function. The dispersant according to the invention, which will be vaporized at a temperature lower than the heat-treatment temperature, should preferably be an organic dispersant or a dispersant of phosphoric acid whose molecular weight is ten thousand or less.

(Inventive Example 1)

After a binder layer composed of SiO$_2$-Al$_2$O$_3$-Na/K$_2$O frit was formed on the surface of a base in the form of a square pottery tile with each side 150 mm long by spray coating and then dried, an aqueous solution of 15% of TiO$_2$ sol was coated on the binder layer by spray coating, forming a TiO$_2$ layer having a thickness of 0.8 μm. Then, the base with the binder layer and the TiO$_2$ layer formed thereon was heated at different atmospheric temperatures for respective specimens by a roller-hearth kiln, and thereafter cooled and solidified into a multi-functional material.

The aqueous solution of 15% of TiO$_2$ sol was produced by hydrolyzing TiCl, for Inventive Example, in an autoclave under a hydrothermal condition ranging from 100 to 200° C. to produce anatase TiO$_2$ having a crystal diameter ranging from 0.007 to 0.2 μm, and dispersing several to several tens % of the anatase TiO$_2$ in a sol state in an acidic aqueous solution such as of nitric acid, hydrochloric acid or the like, or a basic aqueous solution such as of ammonia or the like. To increase the dispersibility of the anatase TiO$_2$, there was added 0.5% or less of a surface treating agent of an organic acid salt such as triethanolamine or trimethylolamine, pentaerythritol, trimethylolpropane, or the like. The particle diameters of the TiO$_2$ sol were calculated based on image processing on SEM observations, and the crystal diameter was calculated from the integration width of powder X-ray diffraction.

While spray coating was employed to coat the aqueous solution, it may be coated by dip coating or spin coating.

The produced multi-functional material was evaluated for antibacterial and wear-resistant capabilities.

With respect to the antibacterial capability, the multi-functional material was tested for its antibacterial ability against *escherichia coli*, strain: W3110. Specifically, 0.15 ml (1~5×10$^4$ CFU) of the bacterial solution was dropped onto the outermost surface of the multi-functional material which had been sterilized with 70% ethanol, and a glass sheet (10×10 cm) was placed in intimate contact with the outermost surface of the base, thus preparing a specimen. After the specimen was irradiated with light from a white-light lamp with 3500 luxes for 30 minutes, the bacterial solution on the irradiated specimen and the bacterial solution on a specimen kept under a shielded condition were wiped with a sterile gauze, and collected in 10 ml of physiological saline. The survival rates of the bacteria were determined as indications for evaluation.

The multi-functional material was tested for its wear resistance by rubbing it with a plastic eraser, and any change in the appearance thereof was compared and evaluated.

Changes in the antibacterial and wear-resistant capabilities of specimens of the multi-functional material whose base was a pottery tile and binder was SiO$_2$-Al$_2$O$_3$-Na/K$_2$O frit as the firing temperature varied are given in Table 1 below.

TABLE 1

| Base = pottery tile, binder = SiO$_2$—Al$_2$O$_3$—Na/K$_2$O frit, photocatalyst = TiO$_2$ | | | | | |
|---|---|---|---|---|---|
| | No. | | | | |
| | 1 | 2 | 3 | 4 | 5 |
| Firing temperature (° C.) | 700 | 780 | 880 | 980 | 1000 |
| Difference with softening temperature (° C.) | 20 | 100 | 200 | 300 | 320 |
| Antibacterial capability | ++ | +++ | +++ | − | − |
| Wear resistance | Δ | ◯ | ⊙ | ⊙ | ⊙ |

+++: Survival rate of *escherichia coli*: less than 10%
++: Survival rate of *escherichia coli*: 10% or more and less than 30%
+: Survival rate of *escherichia coli*: 30% or more and less than 70%
−: Survival rate of *escherichia coli*: 70% or more
⊙: Not varied after 40 reciprocating rubbing movements against the specimens.
◯: Damage was caused and the photocatalytic layer (TiO$_2$ layer) was peeled off by 10~40 rubbing movements against the specimens.
Δ: Damage was caused and the photocatalytic layer (TiO$_2$ layer) was peeled off by 5~10 rubbing movements against the specimens.
x: Damage was caused and the photocatalytic layer (TiO$_2$ layer) was peeled off by 5 rubbing movements or less against the specimens.

The SiO$_2$-Al$_2$O$_3$-Na/K$_2$O frit used as the binder had a specific gravity of 2.4, a coated film thickness of 200 μm, and a softening temperature of 680° C. The TiO$_2$ in Table 1 had an anatase structure and a specific gravity of 3.9 for the specimens Nos. 1~3, and a rutile structure and a specific gravity of 4.2 for the specimens Nos. 4 and 5.

In Table 1, since the firing temperature of the specimen No. 1 was only 20° C. higher than the softening temperature of the binder, so that the viscosity of the binder was not made sufficiently low, the anatase TiO$_2$ particles which made up the lowermost layer of the photocatalytic layer were not sufficiently embedded in the binder layer. As a result, the photocatalytic layer was damaged and peeled off by 5~10 rubbing movements against the specimens in the wear resistance test. With respect to the antibacterial capability, since the photocatalytic layer was made of anatase TiO$_2$ which is of good photocatalytic activity and the organic component of the TiO$_2$ sol was decomposed and vaporized based on TG-DTA observations at a temperature of 300° C. or higher, the dispersant such as a surface-treating agent or the like attached to the surface of the TiO$_2$ layer was considered to be vaporized. As the firing temperature was 700° C., which is much higher than the vaporizing temperature, the antibacterial capability had an excellent value of ++.

The durability of each of the specimens Nos. 3~5, which had a firing temperature ranging from 800° C. to 1000° C., was excellent as no change was caused by 40 rubbing movements or more against the specimens. This appears to result from the generation of necks between $TiO_2$ particles on the surface in an initial sintering phase. When heated at 1100° C., the $TiO_2$ layer of the surface of a multi-functional material that was cooled, solidified, and taken out of the roller-hearth kiln was cracked. Judging from TMA measurements of the $TiO_2$ test piece, the crack is considered to be caused by an intermediate sintering phase which brought about a prominent volume shrinkage of the $TiO_2$ particles.

The antibacterial capability of the specimens Nos. 4 and 5 had a poor value of −. Two factors appear to be responsible for the poor antibacterial capability. One factor is that the $TiO_2$ particles went through a phase transition to the rutile structure, and the other is that the sintering temperature was higher than the softening temperature of the binder by 300° C. or more and the viscosity of the binder was so low that the $TiO_2$ particles of the photocatalytic layer were embedded in the binder layer. The fact that the $TiO_2$ particles went through a phase transition to the rutile structure should not be considered to be the only cause of the poor antibacterial capability because the rutile $TiO_2$ structure has a certain degree of photocatalytic activity though it is lower than the anatase $TiO_2$ structure. For the Inventive Example, a specimen which was prepared by coating a $TiO_2$ sol directly on a porous alumina base by spray coating, firing the assembly at 950° C., and then cooling and solidifying the assembly had an antibacterial capability of +. Therefore, the poor antibacterial capability of the specimens Nos. 4 and 5 was also caused by the fact that the sintering temperature was higher than the softening temperature of the binder by 300° C. or more and the viscosity of the binder was so low that the $TiO_2$ particles of the photocatalytic layer were embedded in the binder layer.

An analysis of the elements Ti and Si (which are primary components of the photocatalytic layer and the binder) by EBMA in the cross section of the specimens indicated that a layer composed of a mixture of Ti and Si was observed, confirming that photocatalytic particles of $TiO_2$ were embedded.

Above Inventive Example 1, i.e., the multi-functional material comprising a photocatalyst of $TiO_2$ and a binder layer of $SiO_2$-$Al_2O_3$-Na/$K_2O$ frit, confirmed the following facts:

1. When a multi-functional material was manufactured under the condition of a firing temperature which was higher than the softening temperature of the binder by 20° C. or higher but not higher than 300° C., the multi-functional material had good antibacterial and wear-resistant capabilities. The reason for this appears to be that the viscosity of the binder was adjusted in the above temperature range to allow $TiO_2$ particles to be adequately embedded in the binder layer.
2. With the multi-functional material manufactured as described above in 1., $TiO_2$ particles were confirmed as being embedded in the binder layer.
3. When the firing temperature ranges from 800° C. to 1000° C., the wear resistance of any specimens was not changed and remained excellent even after 40 rubbing movements or more against the specimens. This appears to result from the strong bonding of $TiO_2$ particles due to the generation of necks between the $TiO_2$ particles.

(Inventive Example 2)

After a binder layer composed of $SiO_2$-$Al_2O_3$-PbO frit was formed on the surface of an alumina base (alumina purity: 96%) having a size of 100×100×5 mm by spray coating and then dried, an aqueous solution of 15% of $TiO_2$ sol (which was the same as that in Inventive Example 1) was coated on the binder layer by spray coating, forming a $TiO_2$ layer having a thickness of 0.8 μm. Then, the base with the binder layer and the $TiO_2$ layer formed thereon was heated at different atmospheric temperatures for respective specimens by a roller-hearth kiln, and thereafter cooled and solidified into a multi-functional material.

Changes in the antibacterial and wear-resistant capabilities of specimens of the multi-functional material whose base was alumina and binder was $SiO_2$-$Al_2O_3$-PbO frit as the firing temperature varied are given in Table 2 below.

TABLE 2

Base = alumina plate (100 × 100 × 5 mm),
binder = $SiO_2$—$Al_2O_3$—PbO frit,
photocatalyst = $TiO_2$

| | No. | | | | |
|---|---|---|---|---|---|
| | 6 | 7 | 8 | 9 | 10 |
| Firing temperature (° C.) | 560 | 580 | 740 | 840 | 860 |
| Difference with softening temperature (° C.) | 20 | 40 | 200 | 300 | 320 |
| Antibacterial capability | ++ | +++ | +++ | ++ | + |
| Wear resistance | Δ | ○ | ○ | ◉ | ◉ |

The $SiO_2$-$Al_2O_3$-Pbo frit used as the binder had a softening temperature of 540° C., a specific gravity of 3.8, and a coated film thickness of 150 μm. The crystalline structure of $TiO_2$ of all the specimens was an anatase structure.

In the wear resistance test shown in Table 2, the specimen No. 6 was damaged and the photocatalytic layer was peeled off by 10 rubbing movements or less against the specimen. The specimens Nos. 7 and 8 were not damaged by 10 rubbing movements or more against the specimens, and the specimens Nos. 9 and 10 were not damaged by 40 rubbing movements or more against the specimens.

The specimens Nos. 9 and 10 were not damaged by 40 rubbing movements or more against the specimens because necks were developed between $TiO_2$ particles, firmly joining them, since the firing temperature was higher than 800° C.

The specimen No. 6 was damaged and the photocatalytic layer was peeled off by 10 rubbing movements or less against the specimen because the firing temperature was only 20° C. higher than the softening temperature of the binder, so that the viscosity of the binder was not made sufficiently low, and hence the anatase $TiO_2$ particles which made up the lowermost layer of the photocatalytic layer were not sufficiently embedded in the binder layer.

The specimens Nos. 7 and 8 were not damaged by 10 rubbing movements or more against the specimens because though the firing temperature was not high enough to generate necks, the difference between the firing temperature and the softening temperature of the binder adjusted the viscosity of the binder to a value which allowed $TiO_2$ particles to be adequately embedded in the binder layer.

In the antibacterial test shown in Table 2, each of the specimens Nos. 6–9 had a good antibacterial value of +++ or ++, but the specimen No. 10 had an antibacterial value of +. This is because the sintering temperature was 320° C. higher than the softening temperature of the binder and the viscosity of the binder was so low that the $TiO_2$ particles of the photocatalytic layer were embedded in the binder layer.

(Inventive Example 3)

$SiO_2$-$Al_2O_3$-BaO frit was melted, cooled, and then solidified in a mold, and shaped into a glass sheet having a size of 100×100×1 mm, and an aqueous solution of 15% of $TiO_2$ sol (which was the same as that in Inventive Example 1) was coated on the glass sheet by spray coating, forming a $TiO_2$ layer having a thickness of 0.8 μm. Thereafter, the glass sheet was placed on an alumina base having a size of 100×100×5 mm, and heated and fired at different atmospheric temperatures for respective specimens by a siliconite furnace, after which it was cooled and solidified into a multi-functional material.

Changes in the antibacterial and wear-resistant capabilities of specimens of the above multi-functional material as the firing temperature varied are given in Table 3 below.

TABLE 3

Base = alumina plate (100 × 100 × 5 mm),
binder = $SiO_2$—$Al_2O_3$—BaO sheet,
photocatalyst = $TiO_2$

| | No. | | | |
|---|---|---|---|---|
| | 11 | 12 | 13 | 14 |
| Firing temperature (° C.) | 640 | 740 | 840 | 940 |
| Difference with softening temperature (° C.) | 20 | 120 | 220 | 320 |
| Antibacterial capability | ++ | +++ | +++ | – |
| wear resistance | Δ | ○ | ⊙ | ⊙ |

The $SiO_2$-$Al_2O_3$-Bao frit used as the binder had a softening temperature of 620° C., and a specific gravity of 2.8. The crystalline structure of $TiO_2$ on the multi-functional material was an anatase structure for the specimens Nos. 11~13, and a rutile structure for the specimen No. 14.

In the wear resistance test shown in Table 3, the specimen No. 11 was damaged and the photocatalytic layer was peeled off by 10 rubbing movements or less against the specimen. The specimen No. 12 was not damaged by 10 rubbing movements or more against the specimen, and the specimens Nos. 13 and 14 were not damaged by 40 rubbing movements or more against the specimens.

The specimens Nos. 13 and 14 were not damaged by 40 rubbing movements or more against the specimens because necks were developed between $TiO_2$ particles, firmly joining them, since the firing temperature was higher than 800° C.

The specimen No. 11 was damaged and the photocatalytic layer was peeled off by 10 rubbing movements or less against the specimen because the firing temperature was only 20° C. higher than the softening temperature of the binder, so that the viscosity of the binder was not made sufficiently low, and hence the anatase $TiO_2$ particles which made up the lowermost layer of the photocatalytic layer were not sufficiently embedded in the binder layer.

The specimen No. 12 was not damaged by 10 rubbing movements or more against the specimens because though the firing temperature was net high enough to generate necks, the difference between the firing temperature and the softening temperature of the binder adjusted the viscosity of the binder to a value which allowed $TiO_2$ particles to be adequately embedded in the binder layer.

In the antibacterial test shown in Table 3, each of the specimens Nos. 11~13 had a good antibacterial value of +++ or ++, but the specimen No. 14 had an antibacterial value of –. This is because the $TiO_2$ particles are of a rutile structure and the sintering temperature was 320° C. higher than the softening temperature of the binder and the viscosity of the binder was so low that the $TiO_2$ particles of the photocatalytic layer were embedded in the binder layer.

As described above, a process of producing a multi-functional material by coating $TiO_2$ particles on a binder, then applying them to a base, and firing the assembly, is as effective and advantageous as the process of producing a multi-functional material by coating a binder on the surface of a base and then coating $TiO_2$ particles.

(Inventive Example 4)

After a binder of acrylic resin was coated on the surface of a base of polyimide having a size of 100×100×5 mm, an aqueous solution of 15% of $TiO_2$ sol was coated on the binder spray coating, forming a $TiO_2$ layer having a thickness of 0.8 μm. Thereafter, the base with the binder layer and the $TiO_2$ layer formed thereon was fired at 150° C. by a nichrome furnace, thereby manufacturing a multi-functional material.

Changes in the antibacterial and wear-resistant capabilities of specimens of the above multi-functional material as the firing temperature varied are given in Table 4 below.

TABLE 4

Base = polyimide, binder = acrylic resin,
photocatalyst = $TiO_2$, firing temperature: 150° C.

| | No. | |
|---|---|---|
| | 15 | 16 |
| Antibacterial capability | – | ++ |
| Wear resistance | ○ | ○ |

For the specimens in Table 4, the aqueous solution of 15% of $TiO_2$ sol was adjusted as follows:

No. 15: The aqueous solution of 15% of $TiO_2$ sol which was the same as that in Inventive Example 1 was used.

No. 16: After an aqueous solution of TiCl was hydrolyzed at 110~150° C. in an autoclave, the product was adjusted to a pH of 0.8 by nitric acid, and dispersed without a surface modifier, after which agglomerates were removed. The aqueous solution was spray-coated immediately after agglomerates were removed.

The $TiO_2$ had a specific gravity of 3.9 and an anatase structure. The acrylic resin had a specific gravity of 0.9 and was rendered viscous at 70° C., which is equivalent to the softening temperature of glass.

With respect to the wear resistance, the specimens Nos. 15 and 16 were not damaged by 10 rubbing movements or more against the specimens under any conditions thereof. This appears to result from the fact that the difference between the firing temperature and the softening temperature of the binder adjusted the viscosity of the binder to a value which allowed $TiO_2$ particles to be adequately embedded in the binder layer.

In the antibacterial test, the specimen No. 15 had an antibacterial value of –, but the specimen No. 16 had a good antibacterial value of ++. Therefore, it was found out that a multi-functional material can be manufactured which have an antibacterial capability even at temperatures lower than 300° C. The difference between the antibacterial capabilities of the specimens Nos. 15 and 16 is considered to depend on whether there is an organic component covering $TiO_2$ or not because a component is decomposed and vaporized from the $TiO_2$ sol of the specimen No. 15 at 200~350° C., but no such component is decomposed and vaporized from the $TiO_2$ sol of the specimen No. 16 based on DTA-TG observations.

The difference between the specific gravities of the anatase structure of $TiO_2$ and the acrylic resin is 3. It was confirmed that with such a specific gravity difference, the $TiO_2$ particles making up the photocatalytic layer were not embedded in the binder layer and exhibited a good antibacterial capability.

(Inventive Example 5)

After a binder layer composed of frit, which had different specific gravities for respective specimens, was formed on the surface of an alumina base having a size of 100×100×5 mm by spray coating and then dried, an aqueous solution of 15% of $TiO_2$ sol was coated on the binder layer by spray coating, forming a $TiO_2$ layer having a thickness of 0.8 μm. Then, the base with the binder layer and the $TiO_2$ layer formed thereon was heated and fired at an atmospheric temperature of 750° C. by a roller-hearth kiln, and thereafter cooled and solidified into a multi-functional material.

Changes in the antibacterial and wear-resistant capabilities of specimens of the above multi-functional material as the firing temperature varied are given in Table 5 below.

TABLE 5

Base = alumina plate (100 × 100 × 5 mm), photocatalyst = $TiO_2$

| | No. | | | |
|---|---|---|---|---|
| | 17 | 18 | 19 | 20 |
| Type of binder | $SiO_2$—$Al_2O_3$—PbO | | $SiO_2$—$Al_2O_3$—PbO | |
| Specific gravity of binder | 5.3 | 3.8 | 2.8 | 2.4 |
| specific gravity of $TiO_2$ | 3.9 | 3.9 | 3.9 | 3.9 |
| Softening temperature (° C.) of frit | 480 | 540 | 620 | 680 |
| Firing temperature (° C.) | 750 | 750 | 750 | 750 |
| Antibacterial capability | ++ | +++ | +++ | +++ |
| Wear resistance | x | ○ | ○ | ○ |

In the antibacterial test, each of the specimens Nos. 17~20 had a good antibacterial value of ++. This is considered to result from the fact that the firing temperature of each of the specimens Nos. 17~20 was higher than the softening temperature of the binder by 30° C. or more or 300° C. or less, and the difference between the firing temperature and the softening temperature of the binder adjusted the viscosity of the binder to a value which allowed $TiO_2$ particles to be adequately embedded in the binder layer.

With respect to the wear resistance, the photocatalytic layer of the specimen No. 17 was damaged and peeled off by 5 rubbing movements or less against the specimen, but the specimens Nos. 18~20 were not damaged by 10 rubbing movements or more against the specimens.

The reason for this appears to be that unlike the other specimens, the specific gravity of the binder of the specimen No. 17 was greater than that of $TiO_2$, and as a result, the anatase $TiO_2$ particles making up the lowermost layer of the photocatalytic layer were not sufficiently embedded in the binder layer.

Therefore, it was found out that the wear resistance of the multi-functional material is affected by the specific gravities of the $TiO_2$ and the binder layer, and is lowered if the specific gravity of the binder is greater than the specific gravity of the $TiO_2$.

(Inventive Example 6)

After a binder layer composed of $SiO_2$-$Al_2O_3$-BaO frit (softening temperature: 620° C.) was formed on the surface of a base in the form of a square pottery tile with each side 150 mm long, an aqueous solution composed of a stirred mixture of a $TiO_2$ sol and an $SnO_2$ sol was coated on the binder layer by spray coating. Thereafter, the assembly was fired at 750° C. and cooled and solidified into a multi-functional material.

The concentration of the $TiO_2$ sol was in the range of from 4 to 6 wt %, and the $TiO_2$ sol was adjusted to a pH of 11 by an aqueous solution of $NH_3$. The crystal diameter of the $TiO_2$ particles was 0.01 μm, and the crystal diameter of the $SnO_2$ particles was 0.0035 μm.

The results of antibacterial and wear-resistant capability tests which were conducted on the multi-functional material as the amount of $SnO_2$ (molar ratio) with respect to the total amount of $TiO_2$ and $SnO_2$ varied are given in Table 6 below.

TABLE 6

Base = pottery tile, binder = $SiO_2$—$Al_2O_3$—BaO frit, photocatalyst = $TiO_2$, Interstitial particles = $SnO_2$ (0.0035 μm)

| | No. | | | | |
|---|---|---|---|---|---|
| | 21 | 22 | 23 | 24 | 25 |
| Amount of $SnO_2$ (mol %) | 0 | 10 | 20 | 60 | 100 |
| Antibacterial capability | +++ | +++ | +++ | ++ | – |
| Wear resistance | ○ | ⊙ | ⊙ | ⊙ | ⊙ |

The wear resistance increases as the amount of $SnO_2$ increased. When 10% or more of $SnO_2$ was added, the specimens were not damaged and changed by 40 rubbing movements or more against the specimens.

When the added amount of $SnO_2$ was up to 20%, the antibacterial value was +++ as was the case with no $SnO_2$ added. When the added amount of $SnO_2$ was 60%, the antibacterial value was ++. When more $SnO_2$ was added, the probability that $SnO_2$ covered the $TiO_2$ particles on the surface of the base increased, resulting in a reduction in the antibacterial capability. When the added amount of $SnO_2$ was 100%, the antibacterial value was –.

Therefore, the multi-functional material can have excellent antibacterial and wear-resistant capabilities if the added amount of $SnO_2$ in terms of a molar ratio was 10% or more or 60% or less, preferably, 10% or more or 20% or less of the total amount of $TiO_2$ and $SnO_2$.

As the amount of $SnO_2$ increases, the wear resistance of the multi-functional material increases by the mechanism described below. Since $SnO_2$ has a vapor pressure higher than that of $TiO_2$ at temperatures higher than 600° C., the distance between two $TiO_2$ particles is $L_0$ before sintering as shown in FIG. 17(a). The vapor pressure is higher at the surfaces of the $TiO_2$ particles which have a positive curvature, and lower at surfaces having a negative curvature, i.e., the surface of a neck where two $TiO_2$ particles abut against each other. As a result, as shown in FIG. 17(b), $SnO_2$ having a vapor pressure higher than that of $TiO_2$ enters the neck, and is condensed as shown in FIG. 17(c). The assembly is thus sintered by a vaporization—condensation mechanism.

When the assembly is sintered by a vaporization—condensation mechanism, the distance $L_2$ between the $TiO_2$ particles after being sintered is substantially the same as the distance $L_0$ before sintering, and hence no crack is developed.

As described above, if a composite material including a $TiO_2$ particle layer retained on the surface of a base by a binder with $SnO_2$ particles filling interstices between $TiO_2$ particles exposed on the outermost surface is produced by being fired at a temperature of 600° C. or higher, then the composite material has increased wear resistance as necks between the $TiO_2$ particles are joined without developing cracks.

(Comparative Example 7)

As with Inventive Example 6, a binder layer composed of $SiO_2$-$Al_2O_3$-BaO frit (softening temperature: 620° C.) was formed on the surface of a base in the form of a square pottery tile with each side 150 mm long, and then an aqueous solution composed of a stirred mixture of a $TiO_2$ sol and an $SnO_2$ sol was coated on the binder layer by spray coating. Thereafter, the assembly was fired at 750° C. and cooled and solidified into a multi-functional material.

The concentration of the $TiO_2$ sol was in the range of from 4 to 6 wt%, and the $TiO_2$ sol was adjusted to a pH of 11 by an aqueous solution of $NH_3$. The crystal diameter of the $TiO_2$ particles was 0.01 μm as with Inventive Example 6, but the crystal diameter of the $SnO_2$ particles was 0.008 μm, slightly greater than that in Inventive Example 6.

The results of antibacterial and wear-resistant capability tests which were conducted on the multi-functional material thus produced are given in Table 7 below.

TABLE 7

Base = pottery tile, binder = $SiO_2$—$Al_2O_3$—BaO frit, photocatalyst = $TiO_2$, Interstitial particles = $SnO_2$ (0.0080 μm), Heated at 750° C.

| | No. | | | | |
|---|---|---|---|---|---|
| | 26 | 27 | 28 | 29 | 30 |
| Amount of $SnO_2$ (mol %) | 0 | 10 | 20 | 60 | 100 |
| Antibacterial capability | +++ | +++ | +++ | ++ | – |
| Wear resistance | ○ | ○ | ○ | ⊙ | ⊙ |

The effect which the $SnO_2$ particles having a diameter of 0.0038 μm had on the wear resistance was smaller than the $SnO_2$ particles having a diameter of 0.0035 μm. When 60% or more (molar ratio) of $SnO_2$ with respect to the total of $TiO_2$ and $SnO_2$ was added, the specimens were not damaged and changed by 40 rubbing movements or more against the specimens.

With respect to the antibacterial capability, when the added amount of $SnO_2$ was up to 20%, the antibacterial value was +++ as was the case with no $SnO_2$ added. When the added amount of $SnO_2$ was 60%, the antibacterial value was ++. When more $SnO_2$ was added, the probability that $SnO_2$ covered the $TiO_2$ particles on the surface of the base increased, resulting in a reduction in the antibacterial capability. When the addled amount of $SnO_2$ was 100%, the antibacterial value was –.

Therefore, when $TiO_2$ particles having a diameter of 0.01 μm are employed, it is difficult to produce a multi-functional material which is excellent in both antibacterial and wear-resistant capabilities by adding $SnO_2$ particles having a diameter of 0.0035 μm. The reason for this appears to be that the vapor pressure of $SnO_2$ particles decreases as the particle diameter increases, and whereas $SnO_2$ particles having a diameter of 0.0035 μm that remain unvaporized exist in the interstices between $TiO_2$ particles and are effective in increasing the bonding strength, $SnO_2$ particles having a diameter of 0.008 μm do not enter the interstices between $TiO_2$ particles, but are highly probably present on the $TiO_2$ particles because the $SnO_2$ particles are greater in size than the interstices between $TiO_2$ particles.

Consequently, the size of $SnO_2$ particles to fill the interstices between $TiO_2$ particles should preferably be ⅘ or less of the size of the $TiO_2$ particles.

(Inventive Example 8)

A binder layer composed of $SiO_2$-$Al_2O_3$-BaO frit (softening temperature: 620° C.) was formed on the surface of a base in the form of a square pottery tile with each side 150 mm long, and then an aqueous solution of $TiO_2$ sol was coated on the binder layer by spray coating. Thereafter, the assembly was fired at 750° C. and cooled and solidified into a composite material. An aqueous solution of $SnO_2$ sol was coated on the composite material, and the assembly was then heated at 110° C., thereby producing a multi-functional material. The aqueous solution of $TiO_2$ sol was the same as that used in Inventive Example 6, and the aqueous solution of $SnO_2$ sol contained $SnO_2$ particles having a diameter of 0.0035 μm.

The results of antibacterial and wear-resistant capability tests which were conducted on the multi-functional material thus produced are given in Table 8 below. 750° C./110° C.

TABLE 8

Base = pottery tile, binder = $SiO_2$—$Al_2O_3$—BaO frit, photocatalyst = $TiO_2$, Interstitial particles = $SnO_2$ (0.0035 μm), Heated at 750° C./110° C.

| | No. | | | | |
|---|---|---|---|---|---|
| | 31 | 32 | 33 | 34 | 35 |
| Amount of $SnO_2$ (mol %) | 0 | 10 | 20 | 60 | 100 |
| Antibacterial capability | +++ | +++ | +++ | ++ | – |
| Wear resistance | ○ | ○ | ⊙ | ⊙ | ⊙ |

The wear resistance increased as the added amount of $SnO_2$ increased. When 20% or more (molar ratio) of $SnO_2$ was added, the specimens were not damaged and changed by 40 rubbing movements or more against the specimens.

With respect to the antibacterial capability, when the added amount of $SnO_2$ was up to 20%, the antibacterial value was +++ as was the case with no $SnO_2$ added. When the added amount of $SnO_2$ was 60%, the antibacterial value was ++. When more $SnO_2$ was added, the probability that $SnO_2$ covered the $TiO_2$ particles on the surface of the base increased, resulting in a reduction in the antibacterial capability. When the added amount of $SnO_2$ was 100%, the antibacterial value was –.

Since the $SnO_2$ sol was heated at a low temperature of 110° C., the assembly was not sintered according to the vaporization—condensation mechanism described above in Inventive Example 6. Nevertheless, the wear resistance increased because the bonding between $TiO_2$ particles was strengthened by $SnO_2$ particles, which had a diameter smaller than the $TiO_2$ particles, i.e., had a greater specific surface area and a higher adsorbing power, filled the interstices between the $TiO_2$ particles.

(Inventive Example 9)

A binder layer composed of $SiO_2$-$Al_2O_3$-BaO frit (softening temperature: 620° C.) was formed on the surface of a base in the form of a square pottery tile with each side 150 mm long, and then an aqueous solution of TiO$_2$ sol was coated on the binder layer by spray coating. Thereafter, the assembly was fired at 750° C. and cooled and solidified into a composite material. An aqueous solution of copper acetate was coated on the composite material and then dried, after which the assembly was irradiated with light containing ultraviolet rays to fix copper ions to a photocatalytic layer while reducing the copper ions, thereby producing a multi-functional material. The assembly was irradiated with light by a mercury lamp.

The size of the particles of Cu fixed to the photocatalytic layer was about 0.004 μm on the average.

The results of antibacterial and wear-resistant capability tests which were conducted on the multi-functional material thus produced are given in Table 9 below.

TABLE 9

Base = pottery tile, binder = SiO$_2$—Al$_2$O$_3$—BaO frit, photocatalyst = TiO$_2$, Interstitial particles = Cu (0.004 μm), Heated at 750° C./photoreduced

| | No. | | | | |
|---|---|---|---|---|---|
| | 36 | 37 | 38 | 39 | 40 |
| Amount of Cu (mol %) | 0 | 10 | 20 | 60 | 100 |
| Antibacterial capability | +++ | +++ | +++ | +++ | +++ |
| Wear resistance | ○ | ○ | ◉ | ◉ | ◉ |

The wear resistance increased as the added amount of Cu increased. When 20% or more (molar ratio) of Cu was added, the specimens were not damaged and changed by 40 rubbing movements or more against the specimens.

With respect to the antibacterial capability, when the added amount of Cu was up to 20%, the antibacterial value was +++ as was the case with no Cu added. Since Cu has an antibacterial capability itself, no reduction in the antibacterial capability was appreciated when Cu was added in a large amount.

However, it can be considered that if the added amount of Cu is small, then the photocatalytic action of the TiO$_2$ particle layer is prevalent, and if the added amount of Cu is large, then the action of Cu is prevalent. If only the action of Cu is relied upon, then its service life appears to be shorter than if no photocatalyst were present because Cu is gradually eluted when used in a liquid. Since Cu added in a large amount results in an increased cost, it appears meaningless to unduly increase the added amount of Cu.

Inventive Example 9 confirmed that not only particles of an oxide such as SnO$_2$, but also particles of a metal such as Cu can be used as particles to fill the interstices in the TiO$_2$ particle layer.

(Inventive Example 10)

A binder layer composed of SiO$_2$-Al$_2$O$_3$-BaO frit (softening temperature: 620° C.) was formed on the surface of a base in the form of a square pottery tile with each side 150 mm long, and then an aqueous solution of TiO$_2$ sol was coated on the binder layer by spray coating. Thereafter, the assembly was fired at 950° C. and cooled and solidified into a composite material. An aqueous solution of copper acetate was coated on the composite material, after which the assembly was irradiated with light containing ultraviolet rays to fix copper ions to a photocatalytic layer while reducing the copper ions, thereby producing EL multi-functional material.

The assembly was irradiated with light for several minutes by a BLB lamp. The TiO$_2$ structure underwent a phase transition from an anatase structure to a rutile structure in the heat treatment. The film thickness of TiO$_2$ was adjusted to 0.4 μm upon spray coating.

Antibacterial and wear-resistant capability tests were conducted on the multi-functional material thus manufactured. The wear resistance of the multi-functional material was good in the temperature range even if no Cu was added. When Cu was added, the specimens were not damaged and changed by 40 rubbing movements or more against the specimens as was the case with no Cu added.

The results of the antibacterial test are shown in FIG. 18. When no Cu was added, the antibacterial capability had a poor value of + because the TiO$_2$ was of the rutile structure. As Cu was added, the antibacterial capability increased. Irrespective of whether irradiated with the BLB lamp or not, the antibacterial activity had a value of ++ if the carried amount of Cu was 0.7 μg/cm$^2$ or greater, and a value of +++ if the carried amount of Cu was 1.2 μg/cm$^2$ or greater.

It can be seen from the foregoing that for producing a multi-functional material which is excellent in both antibacterial and wear-resistant capabilities, the carried amount of Cu should be 0.7 μg/cm$^2$ or greater, and more preferably 1.2 μg/cm$^2$ or greater.

Figure 19:
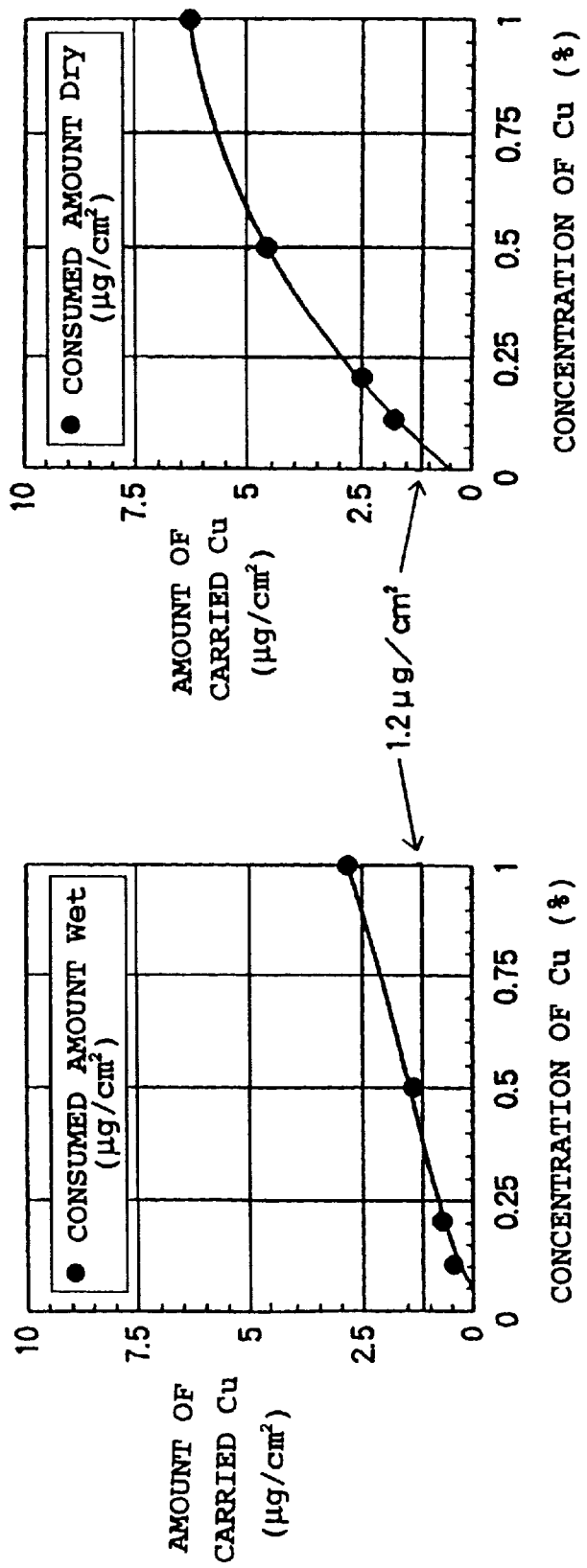
FIG. 19 is a set of graphs showing the results of tests with respect to the amounts of Cu which was carried when a drying step was included before being irradiated by a BLB lamp and when no drying step was included before being irradiated by a BLB lamp.

The carried amount of Cu is greatly increased if a drying step is included after the aqueous solution of copper acetate is coated and before the assembly is irradiated with the BLB lamp. The relationship is shown in FIG. 19. This is because the concentration of metal ions when they are photoreduced is made higher by being dried.

Figure 20:
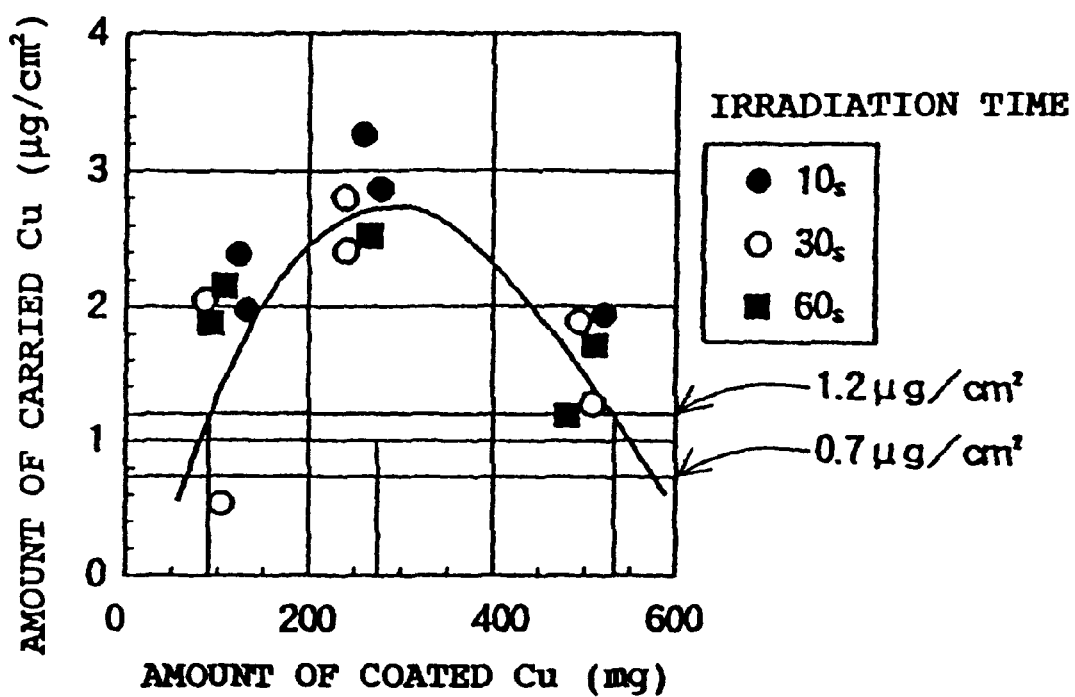
FIG. 20 is a graph showing the relationship between the amount of Cu that was carried and the amount of Cu that was coated.

The carried amount of Cu is maximized when the coated amount, of Cu is optimized, as shown in FIG. 20 which illustrates the use of copper acetate containing 1 wt % of Cu. In order to make the carried amount of Cu equal to 0.7 μg/cm$^2$ or greater in FIG. 20, the coated amount of Cu may be equal to or greater than 0.2 mg/cm$^2$ or equal to or smaller than 2.7 mg/cm$^2$. In order to make the carried amount of Cu equal to 1.2 μg/cm$^2$ or greater in FIG. 20, the coated amount of Cu may be equal to or greater than 0.3 mg/cm$^2$ or equal to or smaller than 2.4 mg/cm$^2$.

(Inventive Example 11)

A binder layer composed of SiO$_2$-Al$_2$O$_3$-BaO frit (softening temperature: 680° C.) was formed on the surface of a base in the form of a. square pottery tile with each side 150 mm long, and then an aqueous solution of TiO$_2$ sol was coated on the binder layer by spray coating. Thereafter, the assembly was fired at 950° C. and cooled and solidified into a composite material. An aqueous solution of silver nitrate was coated on the composite material and dried, after which the assembly was irradiated with light containing ultraviolet rays to fix silver ions to a photocatalytic layer while reducing the silver ions, thereby producing a multi-functional material.

The assembly was irradiated with light for several minutes by a BLB lamp. The TiO$_2$ structure underwent a phase transition from an anatase structure to a rutile structure in the heat treatment. The film-thickness of TiO$_2$ was adjusted to 0.4 μm upon spray coating.

Antibacterial and wear-resistant capability tests were conducted on the multi-functional material thus manufactured. The wear resistance of the multi-functional material was good in the temperature range even if no Ag was added. When Ag was added, the specimens were not damaged and changed by 40 rubbing movements or more against the specimens as was the case with no Ag added.

Figure 69:
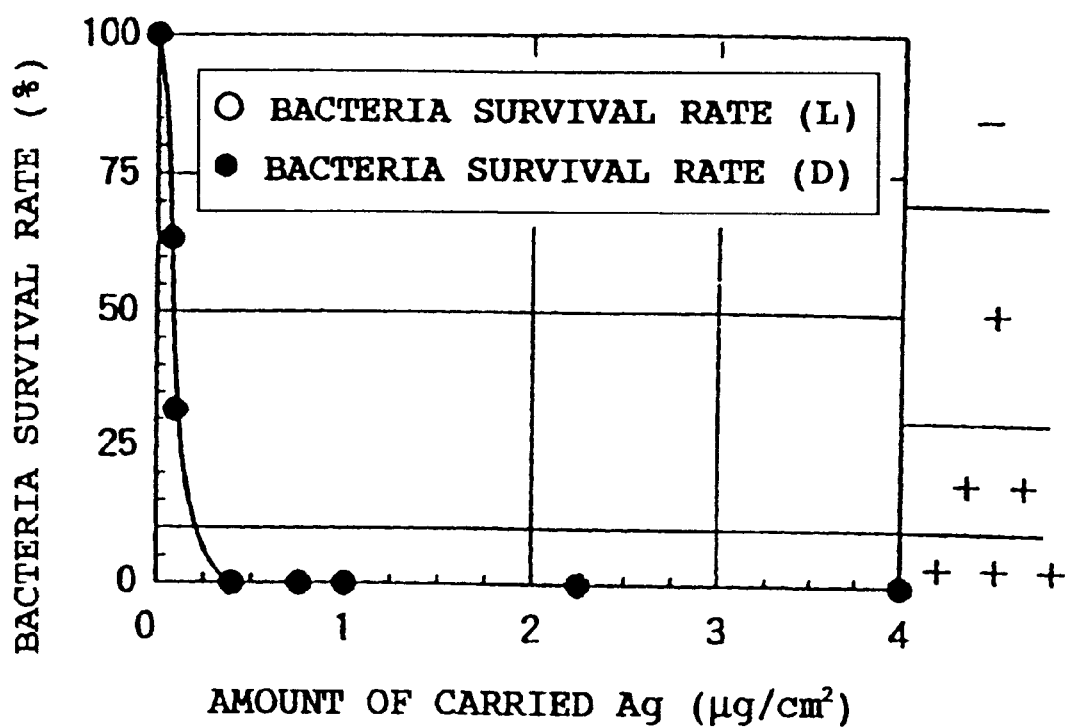
FIG. 69 is a graph showing the relationship between the amount of silver that was carried and the bacteria survival ratio.

The results of the antibacterial test are shown in FIG. 69. When no Ag was added, the antibacterial capability had a poor value of + because the $TiO_2$ was of the rutile structure. As Ag was added, the antibacterial capability increased. Irrespective of whether irradiated. with the BLB lamp or not, the antibacterial activity had a value of ++ if the carried amount of Ag was 0.05 $\mu g/cm^2$ or greater, and a value of +++ if the carried amount of Ag was 0.1 $\mu g/cm^2$ or greater.

For producing a multi-functional material which is excellent in both antibacterial and wear-resistant capabilities, therefore, the carried amount of Ag should be 0.05 $\mu g/cm^2$ or greater, and more preferably 0.1 $\mu g/cm^2$ or greater.

If the carried amount of Ag is large, the multi-functional material is colored with brown or black, resulting in an unsightly appearance. However, the multi-functional material is not colored if the carried amount of Ag is 1 $\mu g/cm^2$ or smaller.

It can be understood from the foregoing that the carried amount of Ag should be equal to or greater than 0.05 $\mu g/cm^2$ or equal to or smaller than 1 $\mu g/cm^2$, and more preferably equal to or greater than 0.1 $\mu g/cm^2$ or equal to and smaller than 1 $\mu g/cm^2$.

(Inventive Example 12)

A binder layer composed of $SiO_2$-$Al_2O_3$-BaO frit (softening temperature: 680° C.) was formed on the surface of a base in the form of a square pottery tile with each side 150 mm long, and then an aqueous solution of $TiO_2$ sol was coated on the binder layer by spray coating. Thereafter, the assembly was fired at 950° C. and cooled and solidified into a composite material. An aqueous solution of silver nitrate was coated on the composite material and dried, after which the assembly was irradiated with light containing ultraviolet rays to fix silver ions to a photocatalytic layer while reducing the silver ions, thereby producing a multi-functional material.

The assembly was irradiated with light for several minutes by a BLB lamp. The $TiO_2$ structure underwent a phase transition from an anatase structure to a rutile structure in the heat treatment.

Antibacterial and wear-resistant capability tests were conducted on the multi-functional material thus manufactured while changing the film thickness of $TiO_2$ to various values.

The wear resistance of the multi-functional material was good in the $TiO_2$ film thickness range of 2 $\mu m$ or below which was tested. No specimens were damaged and changed by 40 rubbing movements or more against the specimens.

The antibacterial capability had a value of ++ when the film thickness was 0.1 $\mu m$ or more, and a value of +++ when the film thickness was 0.2 $\mu m$ or more. Therefore, the film thickness of $TiO_2$ should be 0.1 $\mu m$ or more, and more preferably be 0.2 $\mu m$ or more.

(Inventive Example 13)

A binder layer composed of $SiO_2$-$Al_2O_3$-BaO frit (softening temperature: 620° C.) was formed on the surface of a base in the form of a square pottery tile with each side 150 mm long, and then an aqueous solution of zinc chloride or $TiO_2$ sol was coated on the binder layer by spray coating and dried. Thereafter, an aqueous solution of silver nitrate was coated on the assembly, and then irradiated with light containing ultraviolet rays to fix silver ions to a photocatalytic layer while reducing the silver ions. Thereafter, the assembly was fired at a temperature in the range of from 900° C. to 1000° C., and cooled and solidified into a multi-functional material.

The assembly was irradiated with light for several minutes by a BLB lamp. The $TiO_2$ structure underwent a phase transition from an anatase structure to a rutile structure in the heat treatment. Inasmuch as the fixed Ag on the surface changed from brownish black to white in the heat treatment, the Ag was considered to change into silver oxide during firing. However, inasmuch as the Ag was attached and fixed discretely, substantially no growth of Ag particles was observed before and after the firing step.

Antibacterial and wear-resistant capability tests were conducted on the multi-functional material thus manufactured. The wear resistance of the multi-functional material was good in the temperature range even if no Ag was added. When Ag was added, the specimens were not damaged and changed by 40 rubbing movements or more against the specimens as was the case with no Ag added.

The results of the antibacterial test are shown in FIG. 69. When no Ag was added, the antibacterial capability had a poor value of + because the $TiO_2$ was of the rutile structure. As Ag was added, the antibacterial capability increased.

(Inventive Example 14)

A binder layer composed of $SiO_2$-$Al_2O_3$-BaO frit (softening temperature: 620° C.) was formed on the surface of a base in the form of a square pottery tile with each side 150 mm long, and then the assembly was fired at a temperature in the range of from 900° C. to 1000° C., and cooled and solidified into a compound material. An aqueous solution of silver nitrate was coated on the composite material, and thereafter irradiated with light containing ultraviolet rays to fix silver ions to a photocatalytic layer while reducing the silver ions. An aqueous solution of 0.1 mol/l of KI was coated on the surface of the composite material at a rate of 0.1 $cc/cm^2$, and then irradiated with light containing ultraviolet rays for 5 seconds, thereby producing a multi-functional material. At this time, the carried amount of Ag was 2 $\mu m/cm^2$.

Since the aqueous solution of 0.1 mol/l of KI was coated on the surface of the composite material at a rate of 0.1 $cc/cm^2$, and then irradiated with light containing ultraviolet rays for 5 seconds, the multi-functional material which was brownish black was discolored into white, and hence had an improved appearance.

(Inventive Example 15)

A binder layer composed of $SiO_2$-$Al_2O_3$-BaO frit (softening temperature: 620° C.) was formed on the surface of a base in the form of a square pottery tile with each side 150 mm long, and then an aqueous solution of $TiO_2$ sol was coated on the binder layer by spray coating. Thereafter, the assembly was fired at 820° C., and cooled and solidified into a multi-functional material. The multi-functional material was obliquely placed, and irradiated with light containing ultraviolet rays. During this time, bathtub water collected in a public bath was continuously dropped onto the multi-functional material while the bathtub water was being circulated, and the bathtub water was observed for changes. For comparison, bathtub water was also dropped onto a base free of a photocatalytic layer. Observations after 14 days indicated that no special difference as to turbidity was appreciated, but a difference as to sewage-like odor was appreciated, between the bathtub water dropped onto the multi-functional material and the bathtub water dropped onto the base free of a photocatalytic layer. Specifically, a considerably strong sewage-like odor was appreciated from the bathtub water dropped onto the base free of a photocatalytic layer, and slime and organic deposits were observed on the base free of a photocatalytic layer. However, neither sewage-like odor nor slime and organic deposits were appreciated from the bathtub water dropped onto the multi-functional material and on the multi-functional material. It can be seen from the above simulating experiments that the multi-functional material can be used as the material of artificial stones for use with circulating-water falls and fountains in parks, department stores, and other facilities.

As described above, photocatalytic particles are fixed to a base through a binder layer made of a material having a softening temperature lower than that of the base, and photocatalytic particles making up a surface layer of a photocatalytic layer are not embedded in the binder layer. Therefore, the photocatalytic particles of the surface layer have surfaces exposed for sufficiently performing their photocatalytic effect. Those photocatalytic particles which make up a lower layer of the photocatalytic layer are partly embedded in the binder layer, so that the photocatalytic layer is retained under increased retentive forces against peel-off.

FIG. 21 is illustrative of a method of manufacturing a multi-functional material having photocatalytic functions according to another embodiment of the present invention. According to this embodiment, a base 1 of a thermoplastic material such as inorganic glass, thermoplastic resin, or the like is used, and a photocatalytic layer 2 is formed directly on the surface of the thermoplastic base 1.

Specifically, as shown in FIG. 21(a), a thermoplastic base 1 is prepared, and then, as shown in FIG. 21(b), a photocatalytic layer 2 composed of photocatalytic particles such as $TiO_2$ particles or the like is formed on the surface of the thermoplastic base 1. Thereafter, the assembly is heated to allow a lower layer of the photocatalytic layer 2, closer to the thermoplastic base 1, to be settled into the thermoplastic base 1 and embedded therein, as shown in FIG. 21(c), whereupon the lower layer of the photocatalytic layer 2 is firmly retained in place. Photocatalytic particles 3 of the photocatalytic layer 2, which make up a surface layer that contacts the atmosphere, are joined together by a potential energy, intermolecular forces, or sintering.

Preferred conditions relative to this embodiment are the same as those of the preceding embodiment. Specific Inventive Examples will be described below.

(Inventive Example 16)

An aqueous solution of 15% of $TiO_2$ sol was coated on the surface of a square glass base of $SiO_2$-$Al_2O_3$-$Na/K_2O$ with each side 150 mm long by spray coating, forming a $TiO_2$ layer having a thickness of 0.8 µm. Then, the glass base with the $TiO_2$ layer formed thereon was placed in a ceramic mold with good mold releasability, and heated at different atmospheric temperatures for respective specimens by a roller-hearth kiln, and thereafter cooled and solidified into a multi-functional material.

The aqueous solution of 15% of $TiO_2$ sol was produced by hydrolyzing $TiCl_4$, for Inventive Example, in an autoclave under a hydrothermal condition ranging from 100 to 200° C. to produce anatase $TiO_2$ having a crystal diameter ranging from 0.007 to 0.2 µm, and dispersing several to several tens % of the anatase $TiO_2$ in a sol state in an acid aqueous solution such as of nitric acid, hydrochloric acid or the like, or a basic aqueous solution such as of ammonia or the like. To increase the dispersibility of the anatase $TiO_2$, there was added 0.5% or less of a surface treating agent of an organic acid salt such as triethanolamine or trimethylolamine, pentaerythritol, trimethylolpropane, or the like. The particle diameters of the $TiO_2$ sol were calculated based on image processing on SEM observations, and the crystal diameter was calculated from the integration width of powder X-ray diffraction.

While the spray coating was employed to coat the aqueous solution, it may be coated by dip coating or spin coating.

The produced multi-functional material was evaluated for antibacterial and wear-resistant capabilities.

With respect to the antibacterial capability, the multi-functional material was tested for its antibacterial ability against *escherichia coli*, strain: W3110. Specifically, 0.15 ml ($1-5 \times 10^4$ CFU) of the bacterial solution was dropped onto the outermost surface of the multi-functional material which had been sterilized with 70% ethanol, and a glass sheet (10×10 cm) was placed in intimate contact with the outermost surface of the base, thus preparing a specimen. After the specimen was irradiated with light from a white-light lamp with 3500 luxes for 30 minutes, the bacterial solution on the irradiated specimen and the bacterial solution on a specimen kept under a shielded condition were wiped with a sterile gauze, and collected in 10 ml of physiological saline. The survival rates of the bacteria were determined as indications for evaluation.

The multi-functional material was tested for its wear resistance by rubbing it with a plastic eraser, and any change in the appearance thereof was compared and evaluated.

Changes in the antibacterial and wear-resistant capabilities of specimens of the multi-functional material whose glass base was composed of $SiO_2$-$Al_2O_3$-$Na/K_2O$ as the firing temperature varied are given in Table 10 below.

TABLE 10

Base = glass of $SiO_2$—$Al_2O_3$—$Na/K_2O$, photocatalyst = $TiO_2$

| | No. | | | | |
|---|---|---|---|---|---|
| | 1 | 2 | 3 | 4 | 5 |
| Firing temperature (° C.) | 700 | 780 | 880 | 980 | 100 |
| Difference with softening temperature (° C.) | 20 | 100 | 200 | 300 | 320 |
| Antibacterial capability | ++ | +++ | +++ | − | − |
| Wear resistance | Δ | ○ | ⊙ | ⊙ | ⊙ |

+++: Survival rate of *escherichia coli*: less than 10%
++: Survival rate of *escherichia coli*: 10% or more and less than 30%
+: Survival rate of *escherichia coli*: 30% or more and less than 70%
−: Survival rate of *escherichia coli*: 70% or more
⊙: Not varied after 40 reciprocating rubbing movements against the specimens.
○: Damage was caused and the photocatalytic layer ($TiO_2$ layer) was peeled off by 10~40 rubbing movements against the specimens.
Δ: Damage was caused and the photocatalytic layer ($TiO_2$ layer) was peeled off by 5~10 rubbing movements against the specimens.
x: Damage was caused and the photocatalytic layer ($TiO_2$ layer) was peeled off by 5 rubbing movements or less against the specimens.

The glass base of $SiO_2$-$Al_2O_3$-$Na/K_2O$ had a specific gravity of 2.4 and a softening temperature of 680° C. The $TiO_2$ in Table 10 had an anatase structure and a specific gravity of 3.9 for the specimens Nos. 1~3, and a rutile structure and a specific gravity of 4.2 for the specimens Nos. 4 and 5.

In Table 10, since the firing temperature of the specimen No. 1 was only 20° C. higher than the softening temperature of the glass base, so that the viscosity of the glass base was not made sufficiently low, the anatase $TiO_2$ particles which made up the lowermost layer of the photocatalytic layer were not sufficiently embedded in the glass base. As a result, the photocatalytic layer was damaged and peeled off by 5~10 rubbing movements against the specimens in the wear resistance test. With respect to the antibacterial capability, since the photocatalytic layer was made of anatase $TiO_2$ which is of good photocatalytic activity and the organic component of the $TiO_2$ sol was decomposed and vaporized based on TG-DTA observations at a temperature of 300° C. or higher, the dispersant such as a surface-treating agent or the like attached to the surface of the $TiO_2$ layer was considered to be vaporized. As the firinc temperature was 700° C. much higher than the vaporizing temperature, the antibacterial capability had an excellent value of ++.

The durability of each of the specimens Nos. 3~5, which had a firing temperature ranging from 800° C. to 1000° C., was excellent as no change was caused by 40 rubbing movements or more against the specimens. This appears to result from the generation of necks between $TiO_2$ particles on the surface in an initial sintering phase. When heated at 1100° C., the $TiO_2$ layer of the surface of a multi-functional material that was cooled, solidified, and taken out of the roller-hearth kiln was cracked. Judging from TMA measurements of the $TiO_2$ test piece, the crack is considered to be caused by an intermediate sintering phase which brought about a prominent volume shrinkage of the $TiO_2$ particles.

The antibacterial capability of the specimens Nos. 4 and 5 had a poor value of –. Two factors appear to be responsible for the poor antibacterial capability. One factor is that the $TiO_2$ particles went through a phase transition to the rutile structure, and the other is that the sintering temperature was higher than the softening temperature of the glass base by 300° C. or more and the viscosity of the glass base was so low that the $TiO_2$ particles of the photocatalytic layer were embedded in the glass base layer. The fact that the $TiO_2$ particles went through a phase transition to the rutile structure should not be considered to be the only cause of the poor antibacterial capability because the rutile $TiO_2$ structure has a certain degree of photocatalytic activity though it is lower than the anatase $TiO_2$ structure. For an Inventive Example, a specimen which was prepared by coating a $TiO_2$ sol directly on a porous alumina base by spray coating, firing the assembly at 950° C., and then cooling and solidifying the assembly had an antibacterial capability of +. Therefore, the poor antibacterial capability of the specimens Nos. 1 and 5 was also caused by the fact that the sintering temperature was higher than the softening temperature of the glass base by 300° C. or more and the viscosity of the glass base was so low that the $TiO_2$ particles of the photocatalytic layer were embedded in the glass base layer.

An analysis of the elements Ti and Si (which are primary components of the glass base) by EBMA in the cross section of the specimens indicated that a layer composed of a mixture of Ti and Si was observed, confirming that photocatalytic particles of $TiO_2$ were embedded.

Above Inventive Example 16, i.e., the multi-functional material comprising a photocatalyst of $TiO_2$ and a glass base of $SiO_2$-$Al_2O_3$-Na/$K_2O$, confirmed the following facts:

1. When a multi-functional material was manufactured under the condition of a firing temperature which was higher than the softening temperature of the glass base by 20° C. or higher but not higher than 300° C., the multi-functional material had good antibacterial and wear-resistant capabilities. The reason for this appears to be that the viscosity of the glass base was adjusted in the above temperature range to allow $TiO_2$. particles to be adequately embedded in the glass base layer.
2. With the multi-functional material manufactured as described above in 1., $TiO_2$ particles were confirmed as being embedded in the glass base.
3. When the firing temperature ranges from 800° C. to 1000° C., the wear resistance of any specimens was not changed and remained excellent: even after 40 rubbing movements or more against the specimens. This appears to result from the strong bonding of $TiO_2$ particles due to the generation of necks between the $TiO_2$ particles.

(Inventive Example 17)

An aqueous solution of 15 t of $TiO_2$ sol (which was the same as that in Inventive Example 16) was coated on a glass base composed of $SiO_2$-$Al_2O_3$-PbO and having a size of 100×100×5 mm by spray coating, forming a $TiO_2$ layer having a thickness of 0.8 μm. Then, the glass base with the $TiO_2$ layer formed thereon was placed in a ceramic mold with good mold releasability, and heated at different atmospheric temperatures for respective specimens by a roller-hearth kiln, and thereafter cooled and solidified into a multi-functional material.

Changes in the antibacterial and wear-resistant capabilities of specimens of the multi-functional material whose glass base was composed of $SiO_2$-$Al_2O_3$-PbO as the firing temperature varied are given in Table 11 below.

TABLE 11

Base = $SiO_2$—$Al_2O_3$—PbO glass, photocatalyst = $TiO_2$

|  | No. | | | | |
| --- | --- | --- | --- | --- | --- |
|  | 6 | 7 | 8 | 9 | 10 |
| Firing temperature (° C.) | 560 | 580 | 740 | 840 | 860 |
| Difference with softening temperature (° C.) | 20 | 40 | 200 | 300 | 320 |
| Antibacterial capability | ++ | +++ | +++ | ++ | + |
| Wear resistance | Δ | ◯ | ◯ | ⊙ | ⊙ |

The glass base of $SiO_2$-$Al_2O_3$-PbO had a softening temperature of 540° C. and a specific gravity of 3.8. The crystalline structure of $TiO_2$ of all the specimens was an anatase structure.

In the wear resistance test shown in Table 11, the specimen No. 6 was damaged and the photocatalytic layer was peeled off by 10 rubbing movements or less against the specimen. The specimens Nos. 7 and 8 were not damaged by 10 rubbing movements or more against the specimens, and the specimens Nos. 9 and 10 were not damaged by 40 rubbing movements or more against the specimens.

The specimens Nos. 9 and 10 were not damaged by 40 rubbing movements or more against the specimens because necks were developed between $TiO_2$ particles, firmly joining them, since the firing temperature was higher than 800° C.

The specimen No. 6 was damaged and the photocatalytic layer was peeled off by 10 rubbing movements or less against the specimen because the firing temperature was only 20° C. higher than the softening temperature of the glass base, so that the viscosity of the glass base was not made sufficiently low, and hence the anatase $TiO_2$ particles which made up the lowermost layer of the photocatalytic layer were not sufficiently embedded in the glass base.

The specimens Nos. 7 and 8 were not damaged by 10 rubbing movements or more against the specimens because though the firing temperature was not high enough to generate necks, the difference between the firing temperature and the softening temperature of the glass base adjusted the viscosity of the glass base to a value which allowed $TiO_2$ particles to be adequately embedded in the glass base.

In the antibacterial test shown in Table 11, each of the specimens Nos. 6~9 had a good antibacterial value of +++ or ++, but the specimen No. 10 had an antibacterial value of +. This is because the sintering temperature was 320° C. higher than the softening temperature of the glass base and the viscosity of the glass base was so low that the $TiO_2$ particles of the photocatalytic layer were embedded in the glass base.

(Inventive Example 18)

An aqueous solution of 15% of $TiO_2$ sol (which was the same as that in Inventive Example 16) was coated on a glass base composed of $SiO_2$-$Al_2O_3$-BaO and having a size of 100×100×5 mm by spray coating, forming a $TiO_2$ layer having a thickness of 0.8 μm. Then, the glass base with the $TiO_2$ layer formed thereon was placed in a ceramic mold with good mold releasability, and heated at different atmospheric temperatures for respective specimens by a siliconite kiln, and thereafter cooled and solidified into a multi-functional material.

Changes in the antibacterial and wear-resistant capabilities of specimens of the above multi-functional material as the firing temperature varied are given in Table 12 below.

TABLE 12

Base = $SiO_2$—$Al_2O_3$—BaO glass, photocatalyst = $TiO_2$

| | No. | | | |
|---|---|---|---|---|
| | 11 | 12 | 13 | 14 |
| Firing temperature (° C.) | 640 | 740 | 840 | 940 |
| Difference with softening temperature (° C.) | 20 | 120 | 220 | 320 |
| Antibacterial capability | ++ | +++ | +++ | − |
| Wear resistance | Δ | ○ | ⊙ | ⊙ |

The glass base of $SiO_2$-$Al_2O_3$-BaO had a softening temperature of 620° C. and a specific gravity of 2.8. The crystalline structure of $TiO_2$ on the multi-functional material was an anatase structure for the specimens Nos. 11~13, and a rutile structure for the specimen No. 14.

In the wear resistance test shown in Table 12, the specimen No. 11 was damaged and the photocatalytic layer was peeled off by 10 rubbing movements or less against the specimen. The specimen No. 12 was not damaged by 10 rubbing movements or more against the specimen, and the specimens Nos. 13 and 14 were not damaged by 40 rubbing movements or more against the specimens.

The specimens Nos. 13 and 14 were not damaged by 40 rubbing movements or more against the specimens because necks were developed between $TiO_2$ particles, firmly joining them, since the firing temperature was higher than 800° C.

The specimen No. 11 was damaged and the photocatalytic layer was peeled off by 10 rubbing movements or less against the specimen because the firing temperature was only 20° C. higher than the softening temperature of the glass base, so that the viscosity of the glass base was not made sufficiently low, and hence the anatase $TiO_2$ particles which made up the lowermost layer of the photocatalytic layer were not sufficiently embedded in the glass base.

The specimen No, 12 was not damaged by 10 rubbing movements or more against the specimens because though the firing temperature was not high enough to generate necks, the difference between the firing temperature and the softening temperature of the glass base adjusted the viscosity of the glass base to a value which allowed $TiO_2$ particles to be adequately embedded in the glass base.

In the antibacterial test shown in Table 12, each of the specimens Nos. 11~13 had a good antibacterial value of +++ or ++, but, the specimen No. 14 had an antibacterial value of −. This is because the $TiO_2$ particles are of a rutile structure and the sintering temperature was 320° C. higher than the softening temperature of the glass base and the viscosity of the glass base was so low that the $TiO_2$ particles of the photocatalytic layer were embedded in the glass base.

(Inventive Example 19)

An aqueous solution of 15% of $TiO_2$ sol was coated on a glass base having a size of 100×100×5 mm, which had different specific gravities for respective specimens, by spray coating, forming a $TiO_2$ layer having a thickness of 0.8 μm. Then, the glass base with the $TiO_2$ layer formed thereon was placed in a ceramic mold with good mold releasability, and heated at 750° C. by a roller-hearth kiln, and thereafter cooled and solidified into a multi-functional glass.

Changes in the antibacterial and wear-resistant capabilities of specimens of the above multi-functional glass as the specific gravity of the glass base varied are given in Table 13 below.

TABLE 13

Photocatalyst = $TiO_2$

| | No. | | | |
|---|---|---|---|---|
| | 15 | 16 | 17 | 18 |
| Type of glass base | $SiO_2$—$Al_2O_3$—PbO | | $SiO_2$—$Al_2O_3$—PbO | |
| Specific gravity of glass base | 5.3 | 3.8 | 2.8 | 2.4 |
| Specific gravity of $TiO_2$ | 3.9 | 3.9 | 3.9 | 3.9 |
| Softening temperature (° C.) of glass base | 480 | 540 | 620 | 680 |
| Firing temperature (° C.) | 750 | 750 | 750 | 750 |
| Antibacterial capability | ++ | +++ | +++ | +++ |
| Wear resistance | x | ○ | ○ | ○ |

In the antibacterial test, each of the specimens Nos. 15~18 had a good antibacterial value of +++. This is considered to result from the fact that the firing temperature of each of the specimens Nos. 17~20 was higher than the softening temperature of the glass base by 30° C. or more or 300° C. or less, and the difference between the firing temperature and the softening temperature of the glass base adjusted the viscosity of the glass base to a value which allowed $TiO_2$ particles to be adequately embedded in the glass base.

With respect to the wear resistance, the photocatalytic layer of the specimen No. 15 was damaged and peeled off by 5 rubbing movements or less against the specimen, but the specimens Nos. 16~18 were not damaged by 10 rubbing movements or more against the specimens.

The reason for this appears to be that unlike the other specimens, the specific gravity of the glass base of the specimen No. 15 was greater than that of $TiO_2$, and as a result, the anatase $TiO_2$ particles making up the lowermost layer of the photocatalytic layer were not sufficiently embedded in the glass base.

Therefore, it was found out that the wear resistance of the multi-functional glass is affected by the specific gravities of the $TiO_2$ and the glass base, and is lowered if the specific gravity of the glass base is greater than the specific gravity of the $TiO_2$.

(Inventive Example 20)

After an aqueous solution composed of a stirred mixture of a $TiO_2$ sol and an $SnO_2$ sol was coated on the surface of a square glass base composed of $SiO_2$-$Al_2O_3$-BaO (softening temperature: 620° C.) with each side 150 mm long by spray coating. Thereafter, the assembly was fired at 750° C. and cooled and solidified into a multi-functional glass.

The concentration of the $TiO_2$ sol was in the range of from 4 to 6 wt %, and the $TiO_2$ sol was adjusted to a pH of 11 by an aqueous solution of $NH_3$. The crystal diameter of the $TiO_2$ particles was 0.01 μm and the crystal diameter of the $SnO_2$ particles was 0.0035 μm.

The results of antibacterial and wear-resistant capability tests which were conducted on the multi-functional glass as the amount of $SnO_2$ (molar ratio) with respect to the total amount of $TiO_2$ and $SnO_2$ varied are given in Table 14 below.

TABLE 14

Base = $SiO_2$—$Al_2O_3$—BaO glass, photocatalyst = $TiO_2$, Interstitial particles = $SnO_2$ (0.0035 μm)

| | No. | | | | |
|---|---|---|---|---|---|
| | 19 | 20 | 21 | 22 | 23 |
| Amount of $SnO_2$ (mol %) | 0 | 10 | 20 | 60 | 100 |
| Antibacterial capability | +++ | +++ | +++ | ++ | – |
| Wear resistance | ○ | ⊙ | ⊙ | ⊙ | ⊙ |

The wear resistance increased as the amount of $SnO_2$ increased. When 10% or more of $SnO_2$ was added, the specimens were not damaged and changed by 40 rubbing movements or more against the specimens.

When the added amount of $SnO_2$ was up to 20%, the antibacterial value was +++ as was the case with no $SnO_2$ added. When the added amount of $SnO_2$ was 60%, the antibacterial value was ++. When more $SnO_2$ was added, the probability that $SnO_2$ covered the $TiO_2$ particles on the surface of the glass base increased, resulting in a reduction in the antibacterial capability. When the added amount of $SnO_2$ was 100%, the antibacterial value was –.

Therefore, the multi-functional glass can have excellent antibacterial and wear-resistant capabilities if the added amount of $SnO_2$ in terms of a molar ratio was 10% or more or 60% or less, preferably, 10% or more or 20% or less of the total amount of $TiO_2$ and $SnO_2$.

As the amount of $SnO_2$ increases, the wear resistance of the multi-functional glass increases by the mechanism described above with reference to FIGS. 17(a) through 17(c).

As described above, if a composite material including a $TiO_2$ particle layer retained on the surface of a base by a glass base with $SnO_2$ particles filling interstices between $TiO_2$ particles exposed on the outermost surface is produced by being fired at a temperature of 600° C. or higher, then the composite material has increased wear resistance as necks between the $TiO_2$ particles are joined without developing cracks.

(Comparative Example 21)

As with Inventive Example 20, an aqueous solution composed of a stirred mixture of a $TiO_2$ sol and an $SnO_2$ sol was coated on the surface of a square glass base of $SiO_2$-$Al_2O_3$-BaO (softening temperature: 620° C.) with each side 150 mm long by spray coating. Thereafter, the assembly was fired at 750° C. and cooled and solidified into a multi-functional glass.

The concentration of the $TiO_2$ sol was in the range of from 4 to 6 wt %, and the $TiO_2$ sol was adjusted to a pH of 11 by an aqueous solution of NH3. The crystal diameter of the $TiO_2$ particles was 0.01 μm as with Inventive Example 5, but the crystal diameter of the $SnO_2$ particles was 0.008 μm, slightly greater than that in Inventive Example 20.

The results of antibacterial and wear-resistant capability tests which were conducted on the multi-functional glass thus produced are given in Table 15 below.

TABLE 15

Base = $SiO_2$—$Al_2O_3$—BaO glass, photocatalyst = $TiO_2$, Interstitial particles = $SnO_2$ (0.0080 μm). Heated at 750° C.

| | No. | | | | |
|---|---|---|---|---|---|
| | 24 | 25 | 26 | 27 | 28 |
| Amount of $SnO_2$ (mol %) | 0 | 10 | 20 | 60 | 100 |
| Antibacterial capability | +++ | +++ | +++ | ++ | – |
| Wear resistance | ○ | ○ | ○ | ⊙ | ⊙ |

The effect which the $SnO_2$ particles having a diameter of 0.008 μm had on the wear resistance was smaller than the $SnO_2$ particles having a diameter of 0.0035 μm. When 60% or more (molar ratio) of $SnO_2$ with respect to the total of $TiO_2$ and $SnO_2$ was added, the specimens were not damaged and changed by 40 rubbing movements or more against the specimens.

With respect to the antibacterial capability, when the added amount of $SnO_2$ was up to 20%, the antibacterial value was +++ as was the case with no $SnO_2$ added. When the added amount of $SnO_2$ was 60%, the antibacterial value was ++. When more $SnO_2$ was added, the probability that $SnO_2$ covered the $TiO_2$ particles on the surface of the glass base increased, resulting in a reduction in the antibacterial capability. When the added amount of $SnO_2$ was 100%, the antibacterial value was Therefore, when $TiO_2$ particles having a diameter of 0.01 μm are employed, it is difficult to produce a multi-functional glass which is excellent in both antibacterial and wear-resistant capabilities by adding $SnO_2$ particles having a diameter of 0.0035 μm. The reason for this appears to be that the vapor pressure of $SnO_2$ particles decreases as the particle diameter increases, and whereas $SnO_2$ particles having a diameter of 0.0035 μm that remain unvaporized exist in the interstices between $TiO_2$ particles and are effective in increasing the bonding strength, $SnO_2$ particles having a diameter of 0.008 μm do not enter the interstices between $TiO_2$ particles, but are highly probably present on the $TiO_2$ particles because the $SnO_2$ particles are greater than the interstices between $TiO_2$ particles.

Consequently, the size of $SnO_2$ particles to fill the interstices between $TiO_2$ particles should preferably be ⅘ or less of the size of the $TiO_2$ particles.

(Inventive Example 22)

An aqueous solution of $TiO_2$ sol was coated on the surface of a square glass base of $SiO_2$-$Al_2O_3$-BaO (softening temperature: 620° C.) with each side 150 mm long by spray coating. Thereafter, the assembly was fired at 750° C. and cooled and solidified into a composite material. An aqueous solution of $SnO_2$ sol was coated on the composite material, and the assembly was then heated at 110° C., thereby producing a multi-functional glass. The aqueous solution of $TiO_2$ sol was the same as that used in Inventive Example 20, and the aqueous solution of $SnO_2$ sol contained $SnO_2$ particles having a diameter of 0.0035 μm.

The results of antibacterial and wear-resistant capability tests which were conducted on the multi-functional glass thus produced are given in Table 16 below.

TABLE 16

Base = $SiO_2$—$Al_2O_3$—BaO glass, photocatalyst = $TiO_2$,
Interstitial particles = $SnO_2$ (0.0035 μm), Heated at 750° C./110° C.

| | No. | | | | |
|---|---|---|---|---|---|
| | 29 | 30 | 31 | 32 | 33 |
| Amount of $SnO_2$ (mol %) | 0 | 10 | 20 | 60 | 100 |
| Antibacterial capability | +++ | +++ | +++ | ++ | − |
| Wear resistance | ○ | ○ | ⊙ | ⊙ | ⊙ |

The wear resistance increased as the added amount of $SnO_2$ increased. When 20% or more (molar ratio) of $SnO_2$ was added, the specimens were not damaged and changed by 40 rubbing movements or more against the specimens.

With respect to the antibacterial capability, when the added amount of $SnO_2$ was up to 20%, the antibacterial value was +++ as was the case with no $SnO_2$ added. When the added amount of $SnO_2$ was 60%, the antibacterial value was ++. When more $SnO_2$ was added, the probability that $SnO_2$ covered the $TiO_2$ particles on the surface of the glass base increased, resulting in a reduction in the antibacterial capability. When the added amount of $SnO_2$ was 100%, the antibacterial value was −.

Since the $SnO_2$ sol was heated at a low temperature of 110° C., the assembly was not sintered according to the vaporization—condensation mechanism described above in Inventive Example 6. Nevertheless, the wear resistance increased because the bonding between $TiO_2$ particles was strengthened by $SnO_2$ particles, which had a diameter smaller than the $TiO_2$ particles, i.e., had a greater specific surface area and a higher adsorbing power, filled the interstices between the $TiO_2$ particles.

(Inventive Example 23)

An aqueous solution of $TiO_2$ sol was coated on the surface of a square glass base of $SiO_2$-$Al_2O_3$-BaO (softening temperature: 620° C.) with each side 150 mm long by spray coating. Thereafter, the assembly was fired at 750° C. and cooled and solidified into a composite material. An aqueous solution of copper acetate was coated on the composite material and then dried, after which the assembly was irradiated with light containing ultraviolet rays to fix copper ions to a photocatalytic layer while reducing the copper ions, thereby producing a multi-functional glass. The assembly was irradiated with light by a mercury lamp.

The size of the particles of Cu fixed to the photocatalytic layer was about 0.004 μm on the average.

The results of antibacterial and wear-resistant capability tests which were conducted on the multi-functional glass thus produced are given in Table 17 below.

TABLE 17

Base = $SiO_2$—$Al_2O_3$—BaO glass, photocatalyst = $TiO_2$, Interstitial
particles = Cu (0.004 μm), Heated at 750° C./photoreduced

| | No. | | | | |
|---|---|---|---|---|---|
| | 34 | 35 | 36 | 37 | 38 |
| Amount of Cu (mol %) | 0 | 10 | 20 | 60 | 100 |
| Antibacterial capability | +++ | +++ | +++ | +++ | +++ |
| Wear resistance | ○ | ○ | ⊙ | ⊙ | ⊙ |

The wear resistance increased as the added amount of Cu increased. When 20% or more (molar ratio) of Cu was added, the specimens were not: damaged and changed by 40 rubbing movements or more against the specimens.

With respect to the antibacterial capability, when the added amount of Cu was up to 20%, the antibacterial value was +++ as was the case with no Cu added. Since Cu has an antibacterial capability itself, no reduction in the antibacterial capability was appreciated when Cu was added in a large amount.

However, it can be considered that if the added amount of Cu is small, then the photocatalytic action of the $TiO_2$ particle layer is prevalent, and if the added amount of Cu is large, then the action of Cu is prevalent. If only the action of Cu is relied upon, then its service life appears to be shorter than if no photocatalyst were present because Cu is gradually eluted when used in a liquid. Since Cu added in a large amount results in an increased cost, it appears meaningless to unduly increase the added amount of Cu.

Inventive Example 23 confirmed that not only particles of an oxide such as $SnO_2$, but also particles of a metal such as Cu can be used as particles to fill the interstices in the $TiO_2$ particle layer.

(Inventive Example 24)

An aqueous solution of $TiO_2$ sol was coated on the surface of a square glass base of $SiO_2$-$Al_2O_3$-BaO (softening temperature: 620° C.) with each side 150 mm long by spray coating. Thereafter, the assembly was fired at 950° C. and cooled and solidified into a composite material. An aqueous solution of copper acetate was coated on the composite material, after which the assembly was irradiated with light containing ultraviolet rays to fix copper ions to a photocatalytic layer while reducing the copper ions, thereby producing a multi-functional glass.

The assembly was irradiated with light for several minutes by a BLB lamp. The $TiO_2$ structure underwent a phase transition from an anatase structure to a rutile structure in the heat treatment. The film, thickness of $TiO_2$ was adjusted to 0.4 μm upon spray coating.

Antibacterial and wear-resistant capability tests were conducted on the multi-functional glass thus manufactured. The wear resistance of the multi-functional material was good in the temperature range even if no Cu was added. When Cu was added, the specimens were not damaged and changed by 40 rubbing movements or more against the specimens as was the case with no Cu added.

Figure 22:
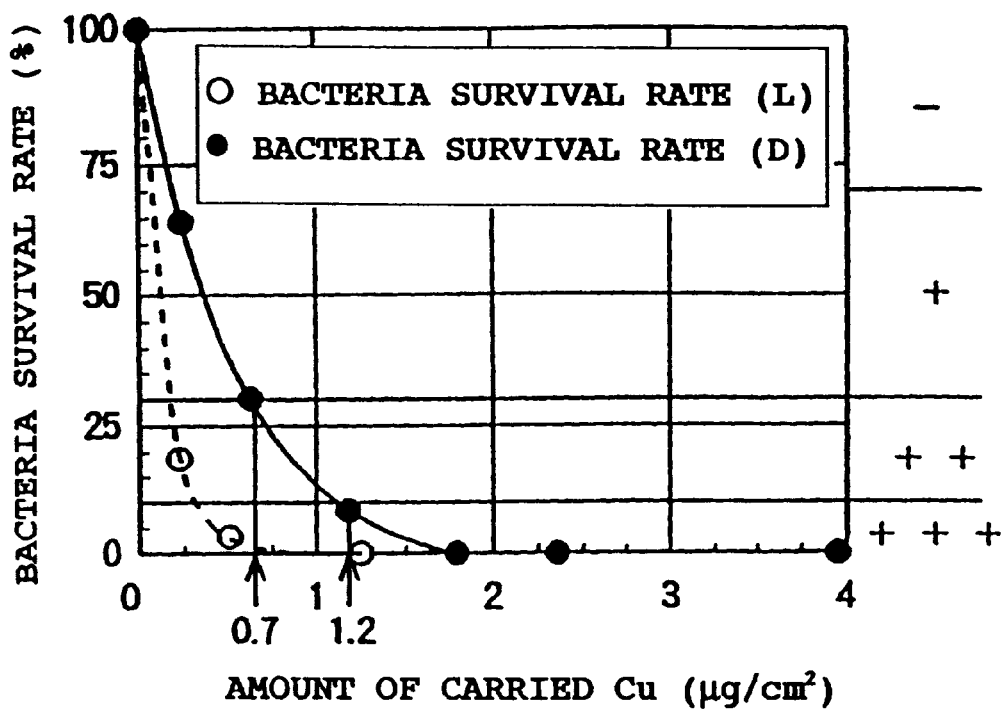
FIG. 22 is a graph showing the results of an antibacterial test.

The results of the antibacterial test are shown in FIG. 22. When no Cu was added, the antibacterial capability had a poor value of + because the $TiO_2$ was of the rutile structure. As Cu was added, the antibacterial capability increased. Irrespective of whether irradiated with the BLB lamp or not, the antibacterial activity had a value of ++ if the carried amount of Cu was 0.7 μg/cm² or greater, and a value of +++ if the carried amount of Cu was 1.2 μg/cm² or greater.

It can be seen from the foregoing that for producing a multi-functional glass which is excellent in both antibacterial and wear-resistant capabilities, the carried amount of Cu should be 0.7 μg/cm² or greater, and more preferably 1.2 μg/cm² or greater.

Figure 23:
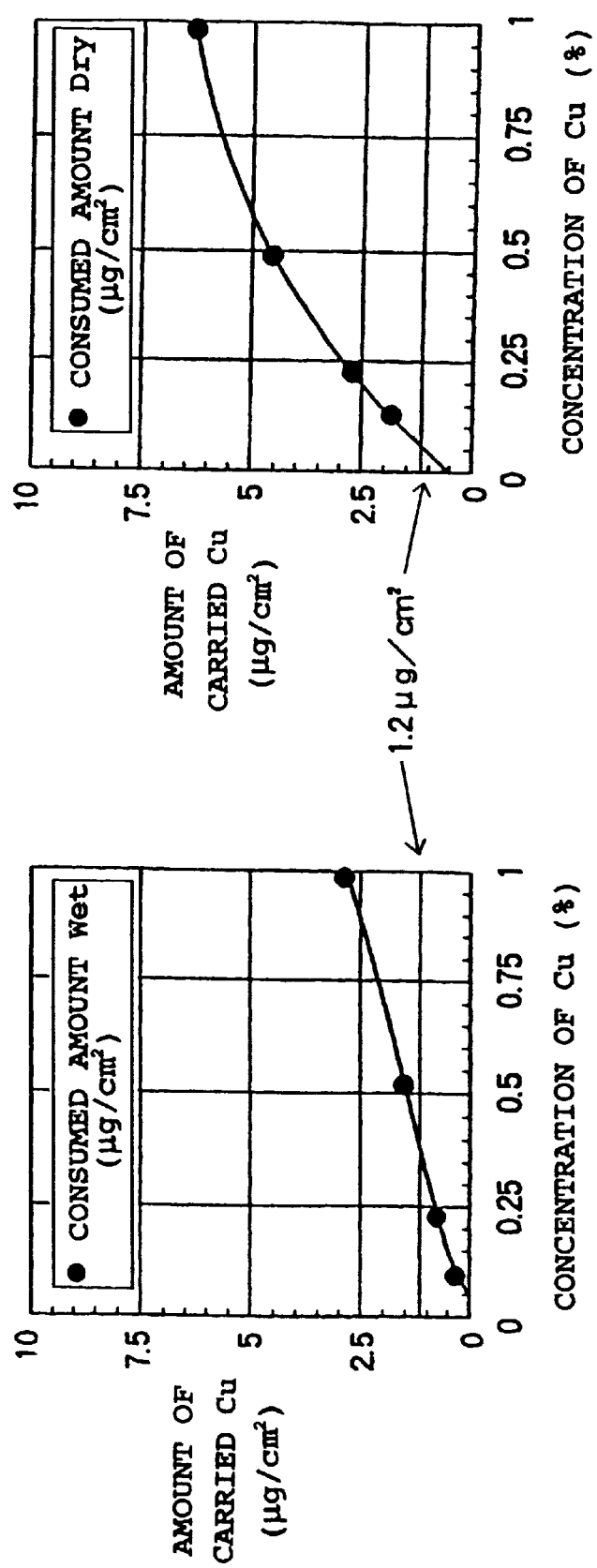
FIG. 23 is a set of graphs showing the results of tests with respect to the amounts of Cu which was carried when a drying step was included before being irradiated by a BLB lamp and when no drying step was included before being irradiated by a BLB lamp.

The carried amount of Cu is greatly increased if a drying step is included after the aqueous solution of copper acetate is coated and before the assembly is irradiated with the BLB lamp. The relationship is shown in FIG. 23. This is because the concentration of metal ions when they are photoreduced is made higher by being dried.

Figure 24:
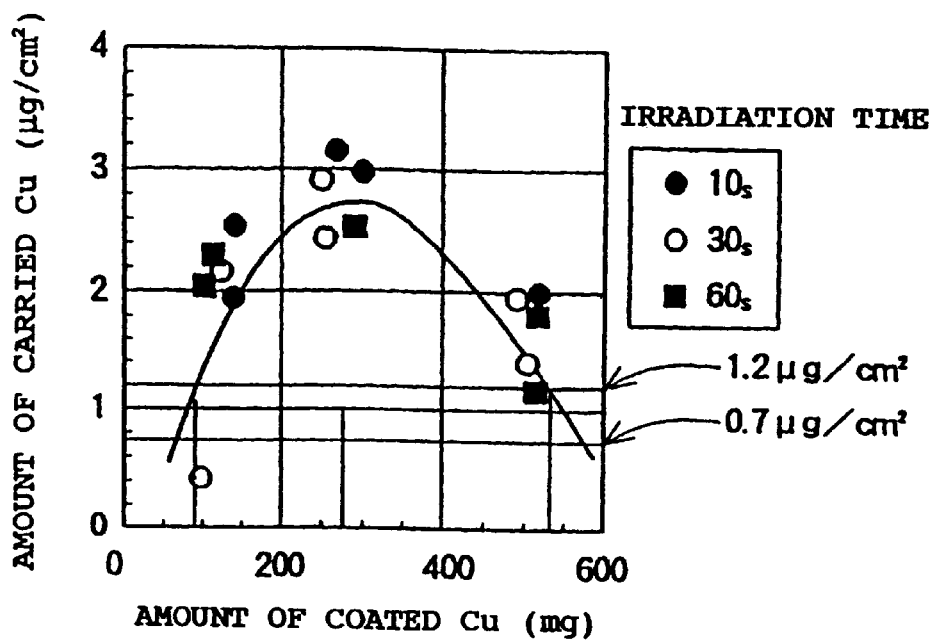
FIG. 24 is a graph showing the relationship between the amount of Cu that was carried and the amount of Cu that was coated.

The carried amount of Cu is maximized when the coated amount of Cu is optimized, as shown in FIG. 24 which illustrates the use of copper acetate containing 1 wt % of Cu.

In order to make the carried amount of Cu equal to 0.7 $\mu g/cm^2$ or greater in FIG. 24, the coated amount of Cu may be equal to or greater than 0.2 $mg/cm^2$ or equal to or smaller than 2.7 $mg/cm^2$. In order to make the carried amount of Cu equal to 1.2 $\mu g/cm^2$ or greater in FIG. 24, the coated amount of Cu may be equal to or greater than 0.3 $mg/cm^2$ or equal to or smaller than 2.4 $mg/cm^2$.

(Inventive Example 25)

An aqueous solution of $TiO_2$ sol was coated on the surface of a square glass base of $SiO_2$-$Al_2O_3$-BaO (softening temperature: 680° C.) with each side 150 mm long by spray coating. Thereafter, the assembly was fired at 950° C. and cooled and solidified into a composite material. An aqueous solution of silver nitrate was coated on the composite material and dried, after which the assembly was irradiated with light containing ultraviolet rays to fix silver ions to a photocatalytic layer while reducing the silver ions, thereby producing a multi-functional glass.

The assembly was irradiated with light for several minutes by, a BLB lamp. The $TiO_2$ structure underwent a phase transition from an anatase structure to a rutile structure in the heat treatment. The film thickness of $TiO_2$ was adjusted to 0.4 $\mu m$ upon spray coating.

Antibacterial and wear-resistant capability tests were conducted on the multi-functional glass thus manufactured. The wear resistance of the multi-functional material was good in the temperature range even if no Ag was added. When Ag was added, the specimens were not damaged and changed by 40 rubbing movements or more against the specimens as was the case with no Ag added.

Figure 25:
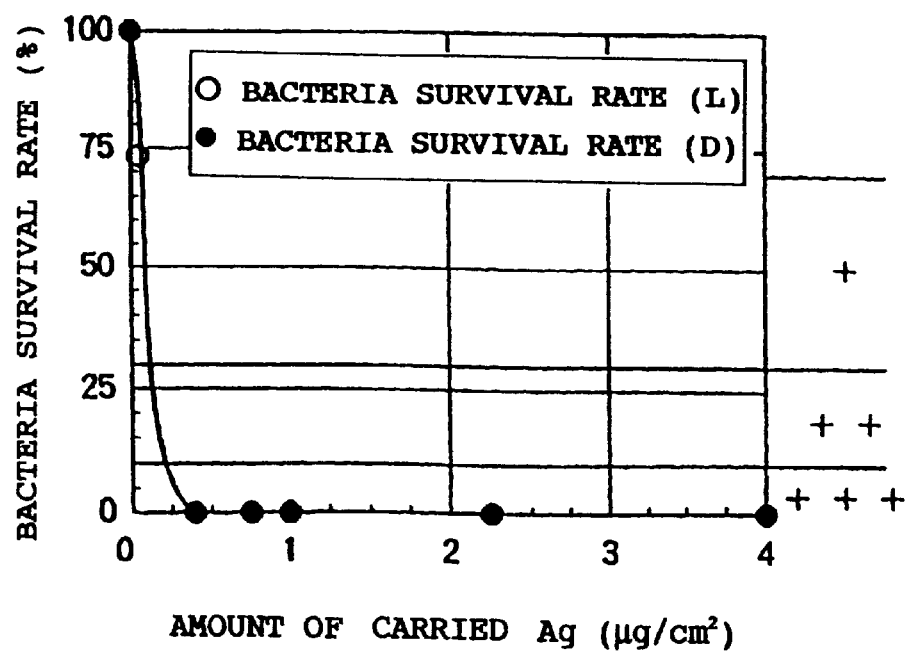
FIG. 25 is a graph showing the relationship between the amount of Ag that was carried and the bacteria survival ratio.

The results of the antibacterial test are shown in FIG. 25. When no Ag was added, the antibacterial capability had a poor value of + because the $TiO_2$ was of the rutile structure. As Ag was added, the antibacterial capability increased. Irrespective of whether irradiated with the BLB lamp or not, the antibacterial activity had a value of ++ if the carried amount of Ag was 0.05 $\mu g/cm^2$ or greater, and a value of +++ if the carried amount of Ag was 0.1 $\mu g/cm^2$ or greater.

For producing a multi-functional glass which is excellent in both antibacterial and wear-resistant capabilities, therefore, the carried amount of Ag should be 0.05 $\mu g/cm^2$ or greater, and more preferably 0.1 $\mu g/cm^2$ or greater.

If the carried amount of Ag is large, the multi-functional material is colored with brown or black, resulting in an unsightly appearance. However, the multi-functional material is not colored if the carried amount of Ag is 1 $\mu g/cm^2$ or smaller.

It can be understood from the foregoing that the carried amount of Ag should be equal to or greater than 0.05 $\mu g/cm^2$ or equal to or smaller than 1 $\mu g/cm^2$, and more preferably equal to or greater than 0.1 $\mu g/cm^2$ or equal to and smaller than 1 $\mu g/cm^2$.

(Inventive Example 26)

An aqueous solution of $TiO_2$ sol was coated on the surface of a square glass base of $SiO_2$-$Al_2O_3$-BaO (softening temperature: 680° C.) with each side 150 mm long by spray coating. Thereafter, the assembly was fired at 950° C. and cooled and solidified into a composite material. An aqueous solution of silver nitrate was coated on the composite material and dried, after which the assembly was irradiated with light containing ultraviolet rays to fix silver ions to a photocatalytic layer while reducing the silver ions, thereby producing a multi-functional glass.

The assembly was irradiated with light for several minutes by a BLB lamp. The $TiO_2$ structure underwent a phase transition from an anatase structure to a rutile structure in the heat treatment.

Antibacterial and wear-resistant capability tests were conducted on the multi-functional glass thus manufactured while changing the film thickness of $TiO_2$ to various values.

The wear resistance of the multi-functional material was good in the $TiO_2$ film thickness range of 2 $\mu m$ or below which was tested. No specimens were damaged and changed by 40 rubbing movements or more against the specimens.

The antibacterial capability had a value of ++ when the film thickness was 0.1 $\mu m$ or more, and a value of +++ when the film thickness was 0.2 $\mu m$ or more. Therefore, the film thickness of $TiO_2$ should be 0.1 $\mu m$ or more, and more preferably be 0.2 $\mu m$ or more.

As described above, photocatalytic particles are fixed to a thermoplastic base, and photocatalytic particles making up a surface layer of a photocatalytic layer are not embedded in the binder layer. Therefore, the photocatalytic particles of the surface layer have surfaces exposed for sufficiently performing their photocatalytic effect. Those photocatalytic particles which make up a lower layer of the photocatalytic layer are partly embedded in the thermoplastic base, so that the photocatalytic layer is retained under increased retentive forces against peel-off.

Figure 26:
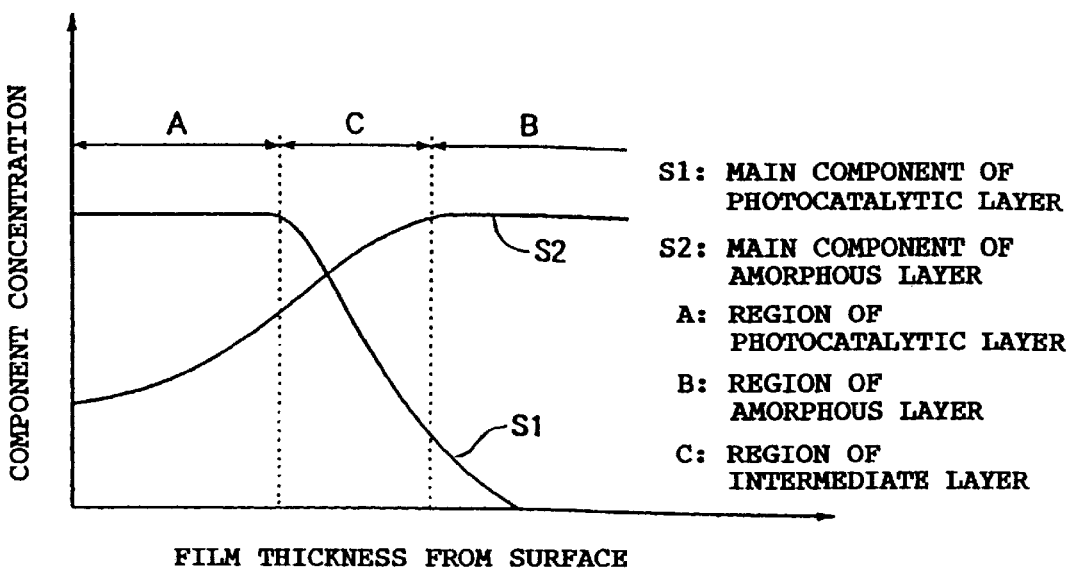
FIG. 26 is a diagram showing a conceptual basic profile of a section of a multi-functional material as it is observed by EBMA (electron-beam microanalyzer)
Figure 27:
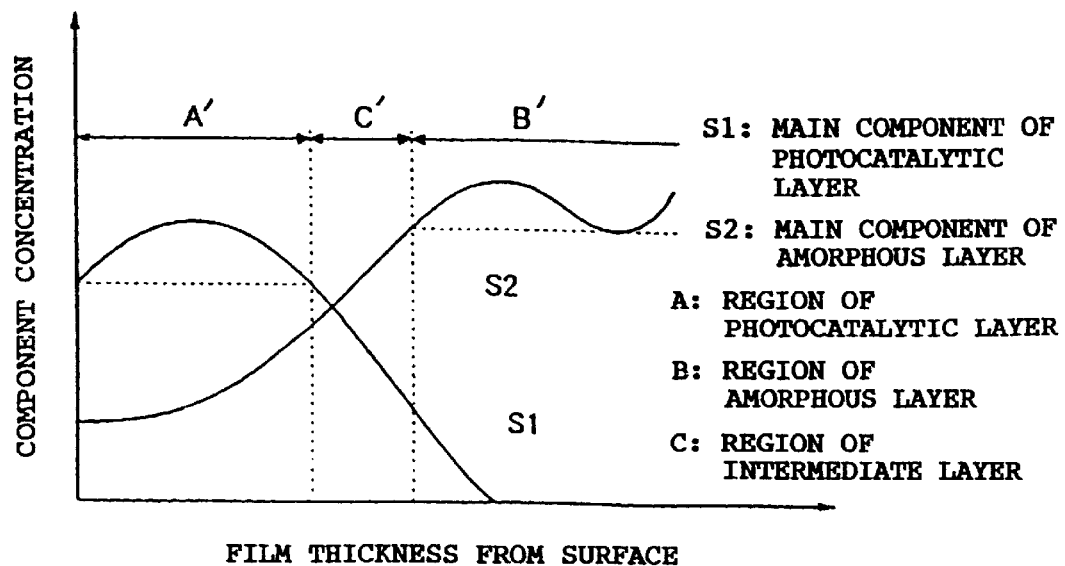
FIG. 27 is a diagram showing an actual basic profile of a section of a multi-functional material as it is observed by EBMA (electron-beam microanalyzer)

FIGS. 26 and 27 show basic profiles of a section of a multi-functional material as it is observed by EPMA (electron-prove microanalyzer). As can be understood from FIGS. 26 and 27, the concentration of the component of the photocatalytic layer 2 remains substantially constant in a region (region A') from the surface exposed to the atmosphere, and then the component of the photocatalytic layer 2 is reduced. The component of the amorphous layer (binder layer) is not present or little on the surface, and its concentration increases into the multi-functional material and becomes substantially constant in a region (region B or B') when a certain film thickness is reached. The region A is defined as the photocatalytic layer, the region B as the amorphous layer, and an intermediate region C. as an intermediate layer. The basic profile shown in FIG. 26 is of a conceptual nature for illustration. Actually, as shown in FIG. 27, the basic profile tends to have changes caused by manufacturing steps in the concentrations which have been described as constant as shown in FIG. 26. In the actual basic profile shown in FIG. 27, portions where the concentrations of regions (regions A', B') corresponding to the constant regions in FIG. 26 reach minimum values are regarded as boundaries between regions A', C' and regions B', C'.

The thickness of the photocatalytic layer is the thickness of the region A or the region A', and the thickness of the intermediate layer is the thickness of the region C. or the region C'.

The thickness of the intermediate layer can be varied by controlling the speed at which and the time in which photocatalytic particles can move into the amorphous layer that is being softened. The speed can be controlled based on the difference between specific gravities of the photocatalytic particles and the amorphous layer, the firing temperature, the atmospheric pressure, etc., and the time can be controlled by varying the retention time at the temperature at which the amorphous material is softened.

The adhesiveness between the layers can be increased if the thickness of the intermediate layer is ⅓ or more of the thickness of the photocatalytic layer.

Specific examples will be described below.

(Inventive Example 27)

After an amorphous layer composed of $SiO_2$-$Al_2O_3$-Na/$K_2O$ was formed on the surface of a square alumina base with each side 10 cm long by spray coating and then dried and fired, an aqueous solution of $TiO_2$ sol having an average particle diameter of 0.01 μm was coated on the amorphous layer by spray coating and fired at 850° C. while varying retention times, forming anatase $TiO_2$ layers having respective thicknesses of 0.2 μm, 0.5 μm, 1 μm. Then, an aqueous solution of copper acetate was coated on the anatase $TiO_2$ layers by spray coating, and thereafter photoreduced by a light source comprising a 20 W BLB lamp for 30 seconds, thus producing specimens. The light source was spaced from the specimens by a distance of 10 cm. An elementary analysis (Ti, Si) was conducted on sections of the produced specimens with EPMA to measure their film thicknesses and evaluate their antibacterial and wear-resistant capabilities.

The antibacterial capability of the specimens was tested using *escherichia coli*, strain: W3110. Specifically, 0.15 ml (1~5×10$^4$ CFU) of the bacterial solution was dropped onto the outermost surface of the multi-functional material which had been sterilized with 70% ethanol, and a glass sheet (100×100 mm) was placed in intimate contact with the outermost surface of the base, thus preparing a specimen. After the specimen was irradiated with light from a white-light lamp with 3500 luxes for 30 minutes, the bacterial solution on the irradiated specimen was wiped with a sterile gauze, and collected in 10 ml of physiological saline. The survival rates of the bacteria were determined as indications for evaluation. The evaluation indications are the same as those shown in Table 1.

The results of the evaluation are shown in Table 18 below. All the specimens had an antibacterial value of +++ and a good wear-resistant value of ⊙ or ○. Those specimens in which the ratio of the thickness of the intermediate layer to the thickness of the photocatalytic layer is ⅓ or greater all had a wear-resistant value of ⊙.

TABLE 18

| $TiO_2$ film thickness (μm) | Intermediate layer thickness (μm) | Retention time (hours) | Intermediate layer/ $TiO_2$ film thickness | Anti-bacterial value | Peeling resistance |
|---|---|---|---|---|---|
| 1 | 0.42 | 16 | 0.42 | +++ | ⊙ |
| 1 | 0.33 | 2 | 0.33 | +++ | ⊙ |
| 1 | 0.30 | 1 | 0.30 | +++ | ○ |
| 0.5 | 0.17 | 2 | 0.34 | +++ | ⊙ |
| 0.5 | 0.13 | 1 | 0.26 | +++ | ○ |
| 0.2 | 0.08 | 2 | 0.40 | +++ | ⊙ |
| 0.2 | 0.05 | 1 | 0.25 | +++ | ○ |
| 1 | 0 | | 0 | +++ | Δ |

(Comparative Example 28)

A dispersion in ammonia of $TiO_2$ sol having an average diameter of 0.01 μm was coated on a square alumina base with each side 10 cm long by spray coating and then fired at 850° C., forming a thin anatase $TiO_2$ film having a film thickness of 1 μm. Then, an aqueous solution of copper acetate was coated on the thin anatase $TiO_2$ film by spray coating, and thereafter photoreduced by a light source comprising a 20 W BLB lamp for 30 seconds, thus producing a specimen. The light source was spaced from the specimen by a distance of 10 cm. The specimen was evaluated for its antibacterial and wear-resistant capabilities.

The specimen had a good antibacterial value of +++ and but an insufficient wear-resistant value of Δ.

As described above, in a multi-functional material having photocatalytic functions, which is composed of a photocatalytic layer supported on the surface of a base through an amorphous layer, the photocatalytic layer having an upper layer exposed to ambient air and being composed of photocatalytic particles joined together, the photocatalytic layer and the base can be held in greater intimate contact with each other for resistance against peeling by an intermediate layer disposed between the amorphous layer and the photocatalytic layer with the concentrations of the components of the amorphous layer and the photocatalytic layer varying continuously in the intermediate layer. The adhesiveness between the layers can be increased if the thickness of the intermediate layer is ⅓ or more of the thickness of the photocatalytic layer.

The formation of the photocatalytic layer 2 by sintering will be described below. FIG. 1(*a*) shows conventional $TiO_2$ particles before they are fired, and FIG. 1(*b*) shows the conventional $TiO_2$ particles after they are fired. When a sol containing $TiO_2$ particles is coated on the surface of a base 1 as shown in FIG. 1(*a*), and the assembly is heated (sintered) for increasing the film strength, a crack 2*a* is liable to develop as shown in FIG. 1(*b*).

The reasons for the development of the crack are that a phase transition to a rutile structure causes a volume shrinkage (a density increase), and whereas the distance between $TiO_2$ particles 101 is $L_0$ as shown in FIG. 2(*a*) before being fired, the distance is reduced to $L_1$ ($L_1 < L_0$) as shown in FIG. 2(*b*) due to volumetric diffusion of the particles into each other after being fired into the rutile structure.

According to the present invention, $SnO_2$ is condensed on necks between $TiO_2$ particles 3 that are joined by sintering, thickening the necks thereby to strengthen the bonding between the $TiO_2$ particles 3 and accordingly increase the film thickness.

To form the above photocatalytic layer 2, an $SnO_2$ sol is mixed with a $TiO_2$ sol, and the mixture is stirred and then coated on the base 1, after which the assembly is heated (sintered) in a predetermined temperature range.

The concentration of the $TiO_2$ sol is in the range of from 4 to 6 wt %, and the $TiO_2$ sol is adjusted to a pH of 11 by an aqueous solution of $NH_3$. The concentration of the $SnO_2$ sol is about 10 wt %, and the $SnO_2$ sol is adjusted to a pH of 11 by an aqueous solution of $NH_3$. The $SnO_2$ particles have an average primary particle diameter of 0.0035 μm, which is a crystal size (primary particle) determined from the half-width of diffraction lines of XRD (X-ray diffraction).

Since $SnO_2$ has a vapor pressure higher than that of $TiO_2$, the distance between the $TiO_2$ particles 3 is $L_0$ before sintering as shown in FIG. 17(*a*). The vapor pressure is higher at the surfaces of the $TiO_2$ particles 3 which have a positive curvature, and lower at surfaces having a negative curvature, i.e., the surface of a neck where the $TiO_2$ particles 3 abut against each other. As a result, as shown in FIG. 17(*b*), $SnO_2$ having a vapor pressure higher than that of $TiO_2$ enters the neck, and is condensed as shown in FIG. 17(*c*). The assembly is thus sintered by a vaporization—condensation mechanism.

When the assembly is sintered by a vaporization—condensation mechanism, the distance $L_2$ between the $TiO_2$ particles after being sintered is substantially the same as the distance $L_0$ before sintering, and hence no crack is developed.

Figure 28:
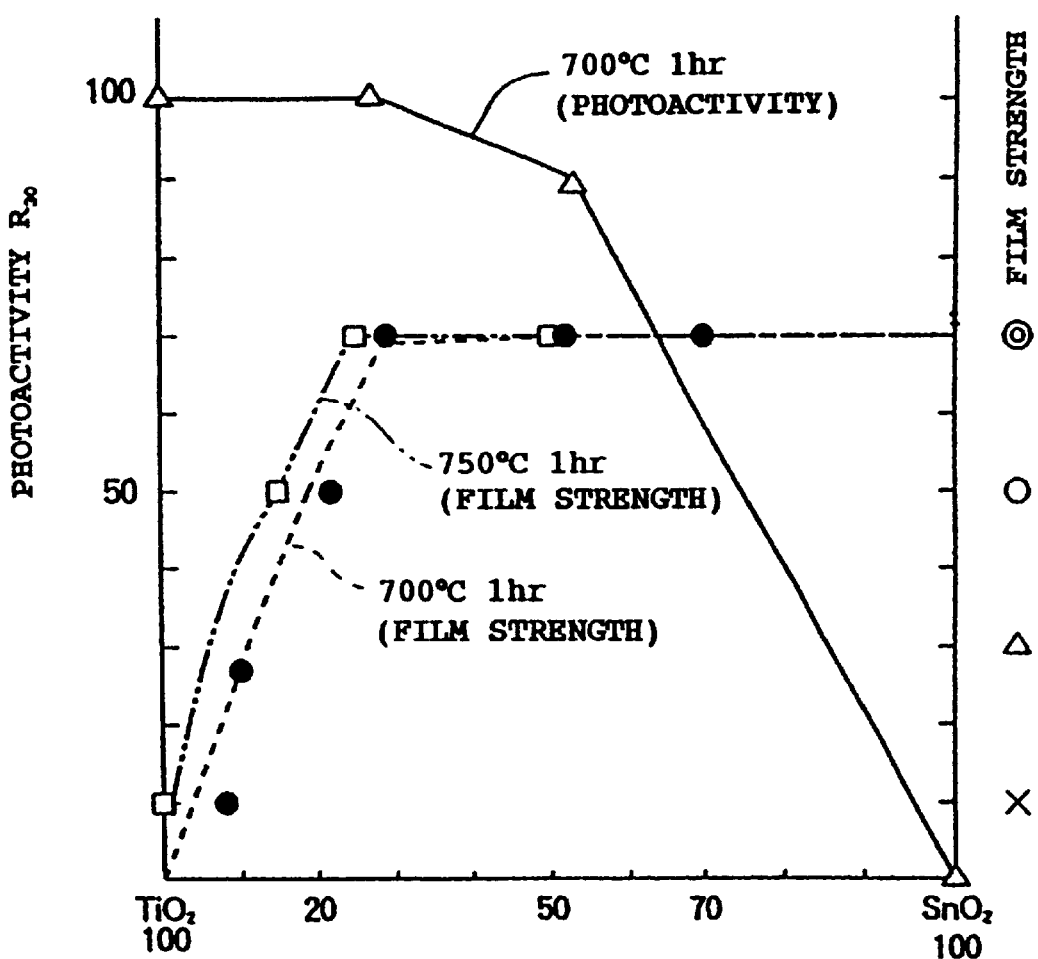
FIG. 28 is a graph showing the relationship between the composition of $TiO_2$ and $SnO_2$, the strength of a film, and the photoactivity.

In order to keep the distance between the $TiO_2$ particles substantially unchanged after being sintered and also to cause the photocatalytic layer to have a photoactivity ($R_{30}$) of 50% or more, it is necessary that the proportion (internal ratio) of $SnO_2$ with respect to $TiO_2$ be in the range of from 20 to 70% as shown in FIG. 28.

The proportions represent respective weight ratios of solid materials contained in the respective sols. The photoactivity was evaluated based on the decomposition of methyl mercaptan, using the removal ratio ($R_{30}$) 30 minutes after being irradiated with light as an indication. Specifically, a square tile coated with a photocatalytic layer, with each side 150 mm long, was placed in a glass container of 11 liters at a distance of 8 cm from a light source (4 W BLB fluorescent lamp), and a methyl mercaptan gas was introduced into the glass container until it reaches a concentration of 3 to 5 ppm in the glass container. After no adsorption in the dark was confirmed, the fluorescent lamp was turned on, and the concentration was measured for changes with time by gas chromatography. The removal ratio ($R_{30}$) is expressed by:

$$R_{30}=(x_0-x_{30})/x_0\times100\%$$

where $x_0$ is the initial concentration [ppm] and $X_{30}$ the concentration [ppm] 30 minutes later.

The film strength was evaluated by rubbing the specimens with a plastic eraser and comparing changes in the appearance of the specimens. Evaluation indications are the same as the evaluation indications in Table 1.

Figure 29:
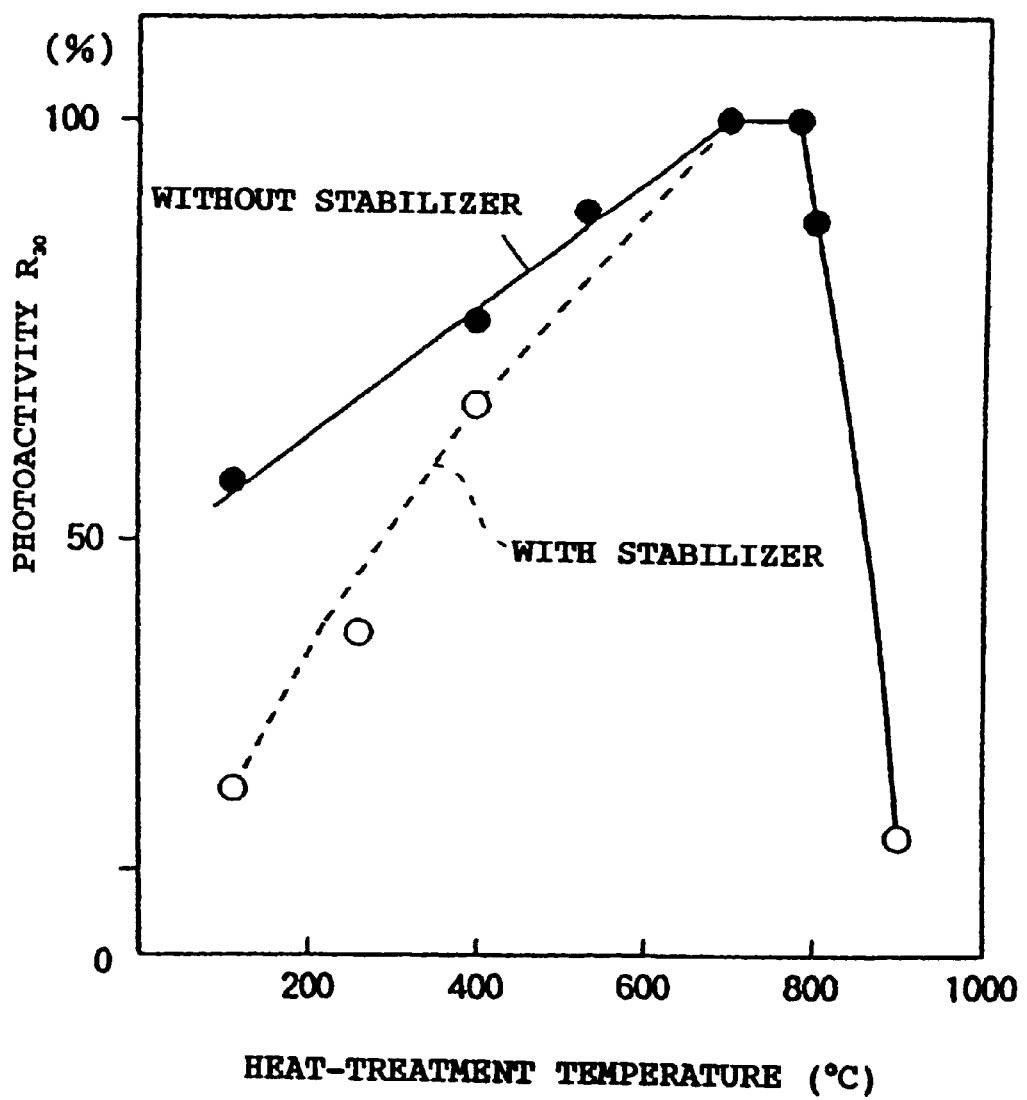
FIG. 29 is a graph showing the relationship between the heat-treatment temperature and the photoactivity.

FIG. 29 is a graph showing the relationship between the heat-treatment temperature and the photoactivity. When an organic stabilizer is added, the photoactivity is lowered. Irrespective of whether an organic stabilizer is added or not, the temperature for heat treatment ranges from 300 to 850° C. If the temperature were lower than 300° C., then photoactivity would be difficult to develop, and if the temperature exceeded 850° C., the structure of $TiO_2$ would change from an anatase structure to a rutile structure.

As described above, when a sol containing titanium oxide particles and a substance whose vapor pressure is higher than that of titanium oxide is coated on a tile or the like and sintered, a film is formed on the tile by a vaporization—condensation mechanism. Therefore, the distance between the titanium oxide particles remains substantially the same after being sintered, making the film resistant to cracks. Since $SnO_2$ or the like is condensed on necks between titanium oxide particles, the peel strength of the film is increased.

When the added amount of $SnO_2$ or the like (in terms of its internal ratio with respect to $TiO_2$ is in the range of from 20 to 70%, both the film strength and the photoactivity are satisfied. A sufficient level of photoactivity can be achieved when the assembly is heated in a temperature range from 300 to 850° C.

The process of measuring $R_{30}$ by gas chromatography requires an expensive measuring apparatus and is of poor efficiency as only one sample can be measured by one measuring apparatus.

Though it is known that photoactivity can be increased by having $TiO_2$ carry a metal such as Pt or the like, it is difficult to determine the net photoactivity of a thin photocatalytic film of such a structure because of the adsorption of a gas by the metal.

After tiles have been installed on a wall surface, the photoactivity of thin photocatalytic films on the tiles cannot be measured by gas chromatography.

One process of estimating the photoactivity by other than gas chromatography is to check the survival rate of bacteria which will be killed by a photocatalyst, after being irradiated with light. However, the process is more cumbersome to carry out than gas chromatography, and makes it difficult to determine the net photoactivity because bacteria can be killed by the antibacterial power of a metal itself which is carried by a thin photocatalytic film. For these reasons, one of the following processes of measuring the photoactivity of a thin photocatalytic film may be employed.

According to a first process, an aqueous solution of alkali halide such as potassium iodide, potassium chloride, or the like is dropped onto the surface of a thin photocatalytic film composed primarily of $TiO_2$ which is formed on the surface of a base, and then the dropped aqueous solution of alkali halide is irradiated with ultraviolet rays for a given period of time. The magnitude of the photoactivity of the thin photocatalytic film is determined based on the difference between the pH of the aqueous solution of alkali halide before it is irradiated and the pH of the aqueous solution of alkali halide after it is irradiated.

According to a second process, a mixture of an aqueous solution of alkali halide such as potassium iodide, potassium chloride, or the like and a pH indicator is dropped onto the surface of a thin photocatalytic film composed primarily of $TiO_2$ which is formed on the surface of a base, and then the dropped mixture is irradiated with ultraviolet rays for a given period of time. The magnitude of the photoactivity of the thin photocatalytic film is determined based on a change in the color of the mixture.

According to a third process, a photoactivity measuring film is held in intimate contact with the surface of a thin photocatalytic film composed primarily of $TiO_2$ which is formed on the surface of a base, and then the photoactivity measuring film is irradiated with ultraviolet rays for a given period of time. The magnitude of the photoactivity of the thin photocatalytic film is determined based on a change in the color of the photoactivity measuring film.

Figure 30:
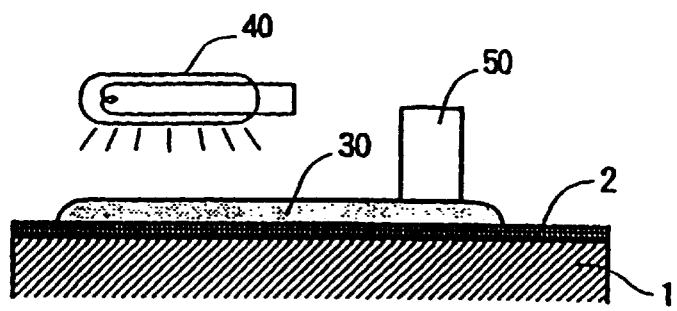
FIG. 30 is a view illustrative of a process of measuring the activity of a thin photocatalytic film.

FIG. 30 shows first and second processes of measuring the photoactivity. A photocatalytic layer 2 composed primarily of $TiO_2$ is formed on the surface of a base 1. It is possible to employ a process of measuring the photoactivity of a thin photocatalytic film such as the photocatalytic layer.

To check whether the photocatalytic layer 2 has photoactivity or not, an aqueous solution 30 of alkali halide such as potassium iodide, potassium chloride, or the like is dropped onto the surface of the photocatalytic layer 2, and then the dropped aqueous solution 30 of alkali halide is irradiated with ultraviolet rays for a given period of time by an ultraviolet lamp 40. The magnitude of the photoactivity of the photocatalytic layer 2 is determined based on the difference between the pH of the aqueous solution of alkali halide before it is irradiated and the pH of the aqueous solution of alkali halide after it is irradiated.

Figure 33:
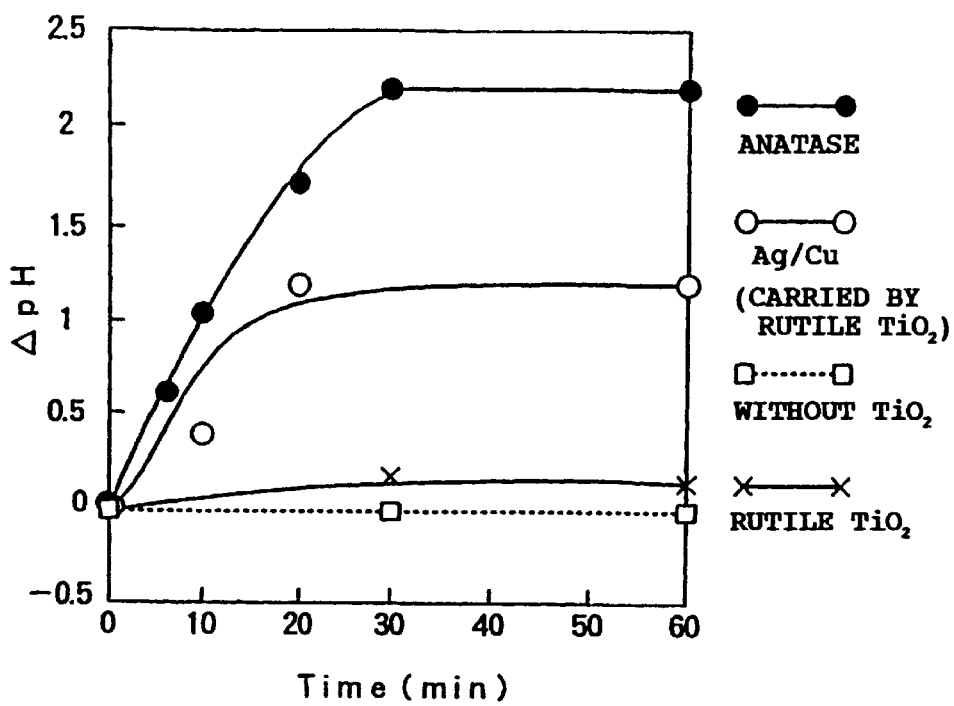
FIG. 33 is a graph showing the relationship between the time of ultraviolet irradiation and the pH change.

FIG. 33 is a graph showing the relationship between the time of ultraviolet irradiation and the pH change. The test was conducted under the conditions that the dropped aqueous solution 30 of alkali halide had a concentration of 0.1 mol/l, the ultraviolet lamp 40 was a 20 W BLB fluorescent lamp, the photocatalytic layer 2 and the ultraviolet lamp 40 were spaced from each other by a distance of 20 cm, and the aqueous solution 30 of alkali halide was irradiated for 60 minutes.

It can be seen from FIG. 33 that irrespective of whether the photocatalytic layer 2 is of an anatase structure, a metal-carrying structure, or a rutile structure, the pH of the aqueous solution 30 of alkali halide increases until the time of ultraviolet irradiation reaches 30 minutes.

The pH of the aqueous solution 30 of alkali halide increases upon being irradiated with ultraviolet rays because the following oxidizing and reducing reactions occur at the same time, with OH⁻ (hydroxide ions) produced by the reducing reaction.

Oxidizing reaction: $2I^- + 2H^+ = I_2 + H_2$

Reducing reaction: $O_2 + 2H_2O + 4e^- = 4OH^-$

Therefore, if the pH of the aqueous solution 30 of alkali halide increases upon being irradiated with ultraviolet rays, then the photocatalytic layer 2 can be said to have photoactivity.

Figure 34:
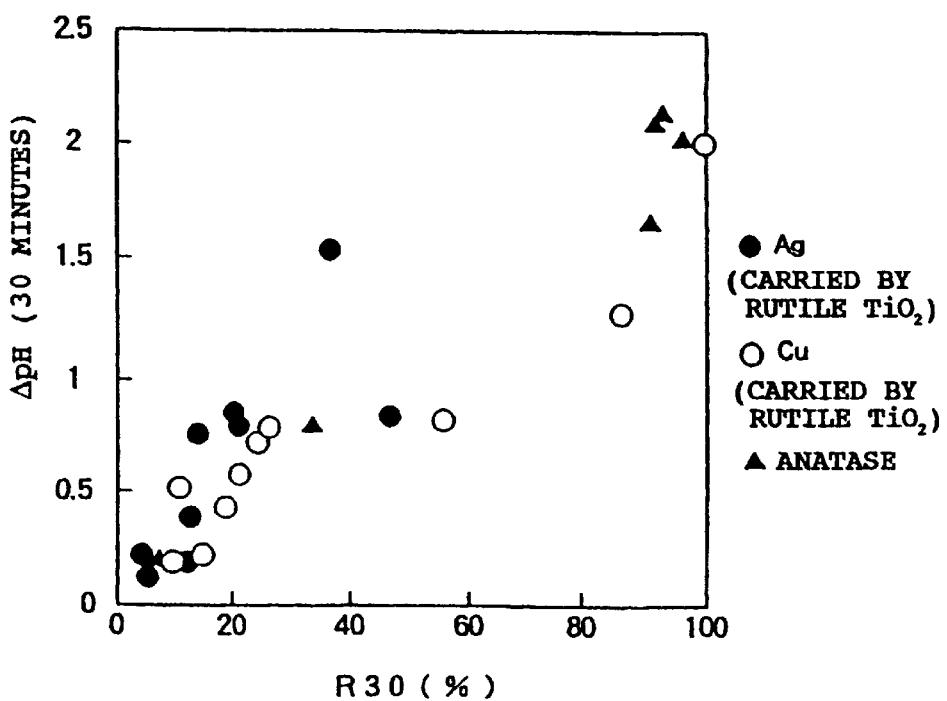
FIG. 34 is a graph showing the relationship between $R_{30}$ and the pH change.

FIG. 34 is a graph showing the relationship between $R_{30}$ and the pH change. $R_{30}$ represents the proportion (%) of a gas such as methyl mercaptan or the like which is reduced 30 minutes after being irradiated with ultraviolet rays. It can be understood from FIG. 34 that $R_{30}$ and the pH change have a positive correlation to each other. Therefore, any change in pH serves as an indication as to whether there is photoactivity or not.

In the above first process, a change in pH is measured by a pH meter or a pH measuring sheet 50. In the second process, the mixture of the aqueous solution 30 of alkali halide such as potassium iodide, potassium chloride, or the like and the pH indicator is dropped onto the surface of the photocatalytic layer 2, and then the dropped mixture is irradiated with ultraviolet rays for a given period of time. The magnitude of the photoactivity of the photocatalytic layer 2 is determined based on a change in the color of the mixture.

The pH indicator may suitably be methyl red because the pH cf the aqueous solution 30 of alkali halide before being irradiated with ultraviolet rays is about 4.5 and the pH of the aqueous solution 30 of alkali halide after being irradiated with ultraviolet rays is in the range of from 5.5 to 6.5.

According to the first and second processes, the aqueous solution 30 of alkali halide or the mixture of the aqueous solution 30 of alkali halide and the pH indicator is dropped onto the surface of the photocatalytic layer 2. However, the dropped liquid may spread in different patterns on different bases, and the reactive area may differ from base to base.

Figure 31:
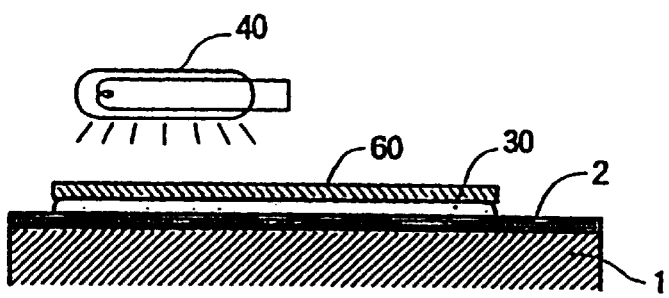
FIG. 31 is a view illustrative of a process of measuring the activity of a thin photocatalytic film.

Such a drawback can be eliminated by a process shown in FIG. 31. According to this process, after an aqueous solution 30 of alkali halide is dropped onto the surface of a photocatalytic layer 2, the aqueous solution 30 of alkali halide is pressed to a certain thickness and prevented from being dried by a transparent sheet 60 such as a glass sheet or the like.

A liquid such as the aqueous solution 30 of alkali halide is used on the condition that the surface of the base 1 lies horizontal, and cannot be used to determine the photoactivity of a thin photocatalytic film formed on a vertical surface such as an existing wall surface or a ceiling surface.

Figure 32:
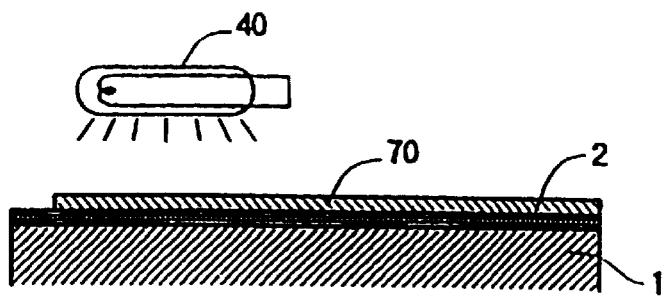
FIG. 32 is a view illustrative of a process of measuring the activity of a thin photocatalytic film.

A process shown in FIG. 32 serves to eliminate such a shortcoming. According to this process, an activity measuring film 70 is held in intimate contact with the surface of a photocatalytic layer 2 formed on the surface of a base 1, and then irradiated with ultraviolet rays. The magnitude of the photoactivity of the photocatalytic layer 2 is determined based on a change in the color of the photoactivity measuring film 70.

The photoactivity measuring film 70 may be prepared by drying a mixture of an organic binder, an aqueous solution of alkali halide such as potassium iodide, potassium chloride, or the like, and a pH indicator, and shaping the dried mixture into a film.

The porosity of the photocatalytic layer 2 will be considered below. The porosity represents the ratio of open pores, and should be 10% or greater and less than 40%, and preferably 10 or greater and 30% or smaller.

The crystal diameter of the photocatalytic particles should be less than 0.1 μm, and preferably 0.04 μm or less. The film thickness of the photocatalytic layer may be 0.1 μm because the smaller the crystal diameter, the larger the effective area for reaction per unit volume. When necks are produced by firing photocatalytic particles by way of solid-state sintering for increased layer strength, the crystal diameter increases to 0.1 μm or greater, resulting in a reduction in the effective area for reaction per unit volume. Therefore, the film thickness should be 0.5 μm or greater, and preferably 0.6 μm or greater.

Particles having a crystal diameter of less than 0.01 μm, preferably 0.008 μm or less, may be added between the photocatalytic particles of a photocatalytic layer formed on the surface of a base. The added particles are effective in filling the interstices between the photocatalytic particles, thus increasing the particle packing ratio and the surface smoothness for an increased film thickness against shearing stresses. The increased surface smoothness makes the surface resistant to stains. Though the increased surface smoothness results in a reduction in the porosity, since the pores to be filled are large enough to accommodate particles whose crystal diameter is less than 0.01 μm, preferably 0.008 μm or less, the pores are large compared with the size (several Å) of the particles of a gas, and do not affect the deodorizing capability.

The particles whose crystal diameter is of less than 0.01 μm, preferably 0.008 μm or less may be basically of any of various types. However, since they may possibly cover surfaces of photocatalytic particles as well as fill the interstices therebetween, the particles should preferably be of an oxide semiconductor such as $TiO_2$, $SnO_2$, $ZnO$, $SrTiO_3$, $Fe_2O_3$, $Bi_2O_3$, $WO_3$, or the like which will not impair the photocatalytic activity, or a metal such as Ag, Cu, or the like. The particles whose crystal diameter is less than 0.01 μm, preferably 0.008 μm or less may be added in any of various processes. For example, such ultrafine particles may be produced by a hydrothermal process or the like and dispersed into a solution, generating a sol, and the sol may be coated on a photocatalytic layer by spray coating and heated at a temperature that is low enough not to cause grain growth, evaporating an organic dispersing agent. Alternatively, an alkoxide or an organic metallic salt may be coated on a photocatalytic layer, and heated to evaporate a diluent, an organic component, etc.

Further alternatively, metal particles smaller than pores in a photocatalytic layer formed on the surface of a base may be fixed in the photocatalytic layer. The metal particles thus fixed in the photocatalytic layer have an electron-capturing effect to increase the photocatalytic activity for a greater deodorizing capability than if only the photocatalytic layer is present.

The metal particles may be of any metal insofar as they can capture electrons. For example, the metal particles may be made of Cu, Ag, Pt, or the like.

The metal particles are required to have an average particle diameter smaller than the average diameter of the pores in the photocatalytic layer. The average diameter of the pores in the surface of the photocatalytic layer is required to be smaller than the diameter of photocatalytic particles because the average diameter of the pores is substantially equal to the diameter of photocatalytic particles in specimens whose porosity is 10% or greater and less than 40%, as observed by an electron microscope. Preferably, the average diameter of the pores should be smaller than the diameter of photocatalytic particles of a starting material. Since the starting material of a photocatalytic layer is generally of a particle diameter of 0.05 μm or less, the average diameter of the pores should be 0.05 μm or less.

INVENTIVE EXAMPLE 28

A colloidal suspension in ammonia of $TiO_2$ sol having a crystal diameter of 0.01 μm was coated, in different amounts for respective specimens, on a square tile base with each side 15 cm long by spray coating and then fired at a temperature of 700° C. or higher and 900° C. or lower, forming a photocatalytic layer. The produced specimens were evaluated for crystal diameters of anatase $TiO_2$ particles, porosities on the layer surfaces, and deodorizing, wear-resistant, and peeling-resistant capabilities.

The deodorizing capability was evaluated by measuring $R_{30}$ (L) which represents a removal ratio after being irradiated with light. Specifically, a specimen surface coated with a thin photocatalytic film is placed in a glass container of 11 liters at a distance of 8 cm from a light source (4 W BLB fluorescent lamp), and a methyl mercaptan gas is introduced into the glass container until it reaches an initial concentration of 3 to 5 ppm in the glass container. Changes in the concentration are measured when the specimen is irradiated with light from the light source for 30 minutes.

The wear resistance was evaluated by rubbing the specimens with a plastic eraser and comparing changes in the appearance of the specimens. Evaluation indications are the same as the evaluation indications described above, and indicated below.

⊙: Not varied after 40 reciprocating rubbing movements against the specimens.

○: Damage was caused and the photocatalytic layer ($TiO_2$ film) was peeled off by 10 or more and less than 40 rubbing movements against the specimens.

Δ: A Damage was caused and the photocatalytic layer ($TiO_2$ film) was peeled off by 5 or more and less than 10 rubbing movements against the specimens.

x: Damage was caused and the photocatalytic layer ($TiO_2$ film) was peeled off by less than 5 rubbing movements or less against the specimens.

The peeling-resistant capability test is a test conducted under conditions stricter than those of the wear-resistant capability test, and uses a typewriter eraser (LION TYPE-WRITER ERASER 502) which applies greater shearing forces, rather than a plastic eraser. Specifically, the surface of a specimen is rubbed 20 times under equal forces by a typewriter eraser, and its damaged or scratched condition and a standard sample are visually compared with each other. Evaluation indications are given below.

⊙: Not changed at all.

○: A slight change is confirmed depending on the intensity of light applied to the specimen.

Δ: A slight change is confirmed.

x: A change is confirmed at sight.

Figure 35:
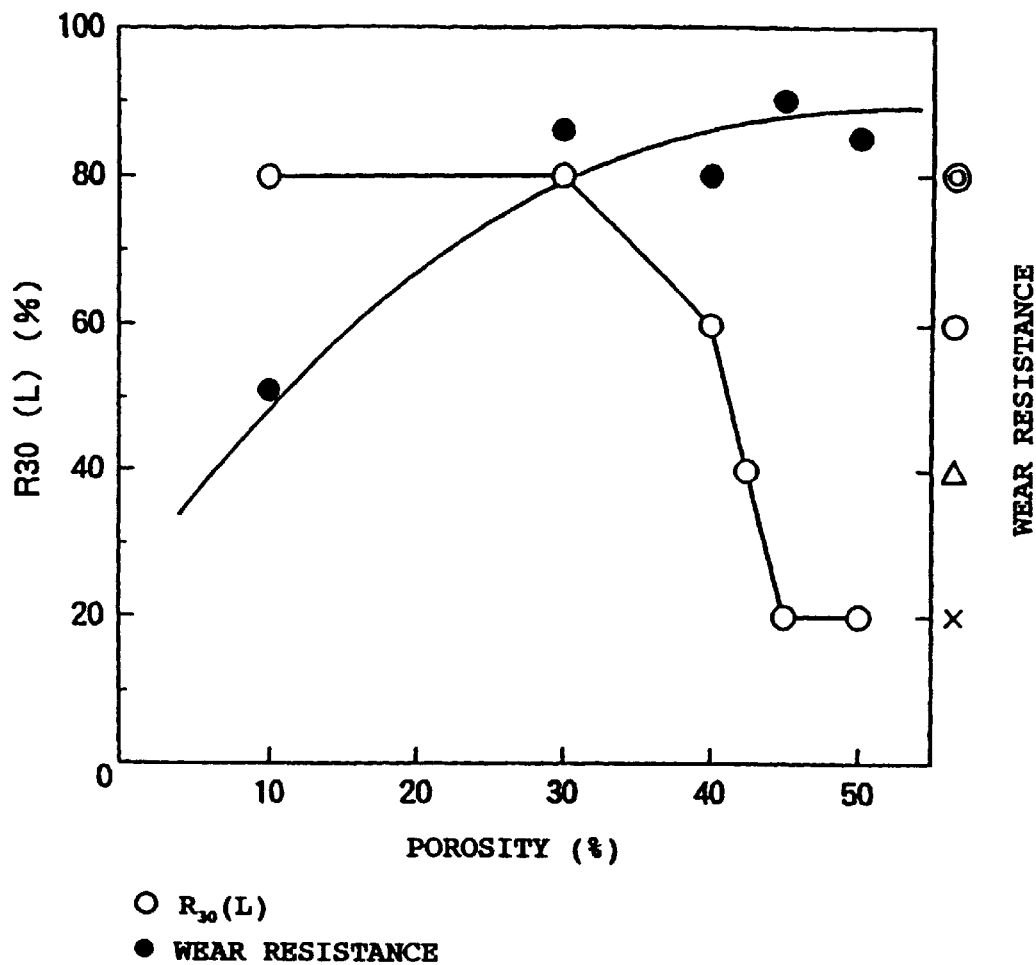
FIG. 35 is a graph showing the relationship between the porosity, the deodorizing ability ($R_{30}$), and the wear resistance.
Figure 36:
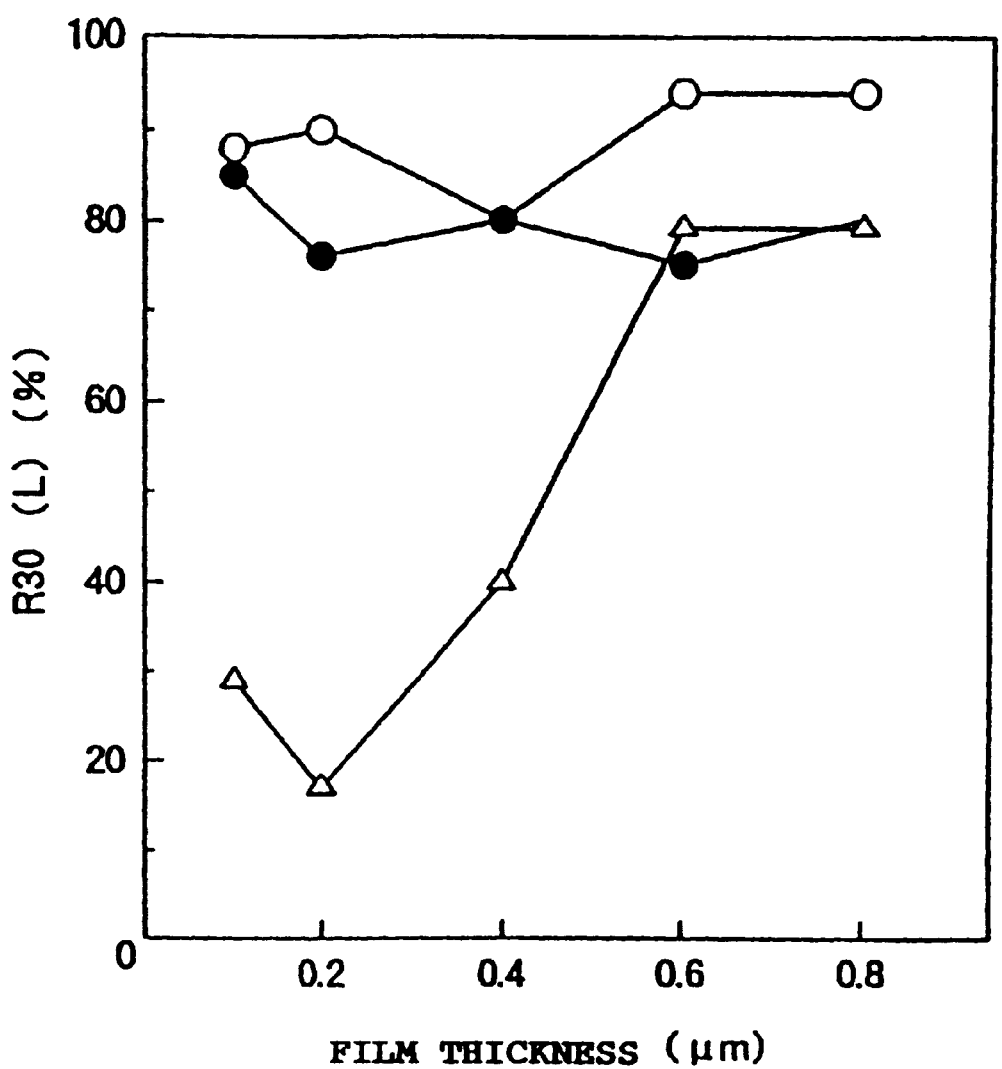
FIG. 36 is a graph showing the relationship between the film thickness and the deodorizing ability ($R_{30}$)
Figure 37:
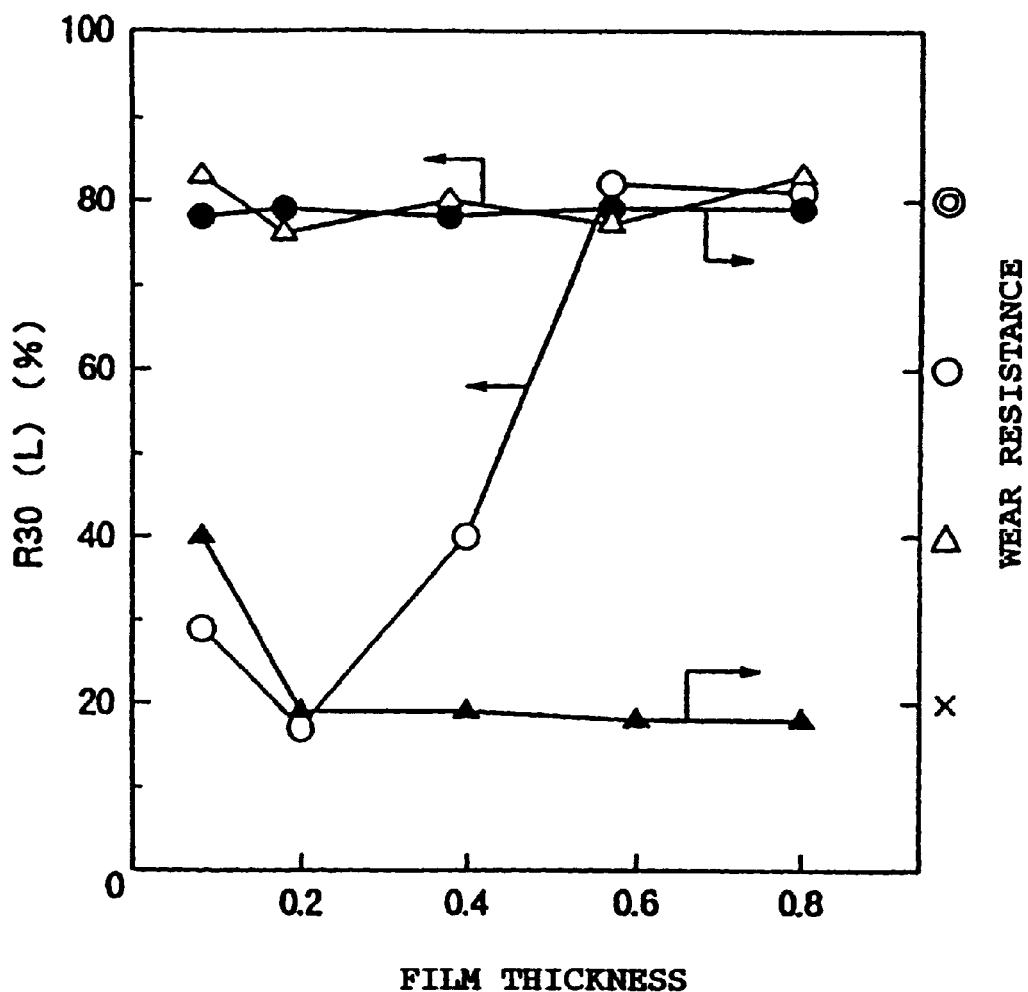
FIG. 37 is a graph showing the relationship between the film thickness, the deodorizing ability ($R_{30}$), and the peeling resistance.

The results are shown in FIGS. 35 through 37.

FIG. 35 shows the relationship between the porosity, the deodorizing ability, and the wear resistance at the time the thickness of a thin photocatalytic film is 0.8 μm. The deodorizing ability increased with the porosity, and exceeds 50% when the porosity was 10%, and reached 80% or more when the porosity was 30%. Conversely, the wear-resistant capability had a value of ⊙ when the porosity was up to 30%, a value of ○ when the porosity was 40%, and a value of Δ or x when the porosity exceeded 40%. It can be seen from the above results that in order to produce a material which has both deodorizing and wear-resistant capabilities, it is necessary for a thin photocatalytic film to have a porosity of 10% or more and less than 40%, preferably 10% or more and 30% or less.

FIG. 36 shows the deodorizing ability as it depends on the film thickness when the crystal diameter of photocatalytic particles making up a thin photocatalytic film whose porosity ranges from 20 to 30% is varied. When the crystal diameter was 0.1 μm, the deodorizing capability $R_{30}$ (L) depended on the film thickness, and was lowered as the thickness of the thin photocatalytic film was reduced. When the film thickness was 0.04 μm or less, no dependency on the film thickness was seen. The deodorizing capability was good when the film thickness was 0.1 μm. It can be understood from the above results that if the crystal diameter of photocatalytic particles is less than 0.1 μm, preferably 0.04 μm or less, then a good deodorizing capability can be maintained even when the thickness of the thin photocatalytic film is reduced to about 0.1 μm.

FIG. 37 shows the deodorizing and peeling-resistant capabilities as they depend on the film thickness when the crystal diameter and joined state of photocatalytic particles making up a thin photocatalytic film whose porosity ranges from 20 to 30% are varied. When a required mechanical strength increased to the level of the peeling-resistant capability test, the wear-resistant capability of specimens with no necks had a value of Δ or x. In order to produce a mechanically sufficient neck joint with solid-state sintering of photocatalytic particles, the growth of photocatalytic particles to a size of 0.04 μm is not sufficient, but the growth of photocatalytic particles to a size of 0.1 μm is necessary. When photocatalytic particles are grown to a size of 0.1 μm, however, the deodorizing capability becomes dependent on the film thickness, and increases as the film thickness increases. Specifically, when the film thickness was 0.5 μm, the deodorizing capability $R_{30}$ (L) exceeded 50%, and when the film thickness was 0.8 μm, the deodorizing capability $R_{30}$ (L) reached 80% or more. It can be seen from the above results that the strength of the thin photocatalytic film can sufficiently be increased when necks are produced between photocatalytic particles by solid-state sintering and the photocatalytic particles are grown until their crystal diameter reaches 0.1 μm or greater. Since the effective volume for reaction per unit volume is reduced when the crystal diameter increases to 0.1 μm or greater, the film thickness should be 0.5 μm or greater, or preferably 0.6 μm or greater.

INVENTIVE EXAMPLE 29

A colloidal suspension in ammonia of $TiO_2$ sol having a crystal diameter of 0.01 μm was coated on a square tile base with each side 15 cm long by spray coating and then fired at 750° C., forming a thin photocatalytic film. At this time, the thin $TiO_2$ film had a porosity of 45%, and the $TiO_2$ particles had a crystal diameter of 0.02 μm. $SnO_2$ sols having different crystal diameters were coated on thin photocatalytic films, and dried at 110° C., producing specimens. The produced specimens were evaluated for deodorizing and wear-resistant capabilities.

The deodorizing and wear-resistant capabilities are shown in FIG. 38. The deodorizing capability remained substantially unchanged and hence was good when the crystal diameter of the $SnO_2$ sol varied from 0.0035 μm to 0.01 μm. The wear-resistant capability differed depending on the crystal diameter of the $SnO_2$ sol when 30 weight % or more of $SnO_2$ sol was added. Specifically, when $SnO_2$ particles having a crystal diameter of 0.008 μm or less were added, the wear-resistant capability increased from a value of ⊙ to a value of ○, and when $SnO_2$ particles having a crystal diameter of 0.01 μm were added, they had no effect on the wear-resistant capability.

It can be understood from the above results that the wear-resistant capability increases when particles having a crystal diameter of 0.01 μm, preferably of 0.008 μm or less are introduced between photocatalytic particles.

INVENTIVE EXAMPLE 30

A colloidal suspension in ammonia of $TiO_2$ sol having a crystal diameter of 0.01 μm was coated on a square tile base with each side 15 cm long by spray coating and then fired at 850° C., forming a thin photocatalytic film. Then, an aqueous solution of copper acetate was coated on the thin photocatalytic film by spray coating, and thereafter photoreduced by a light source comprising a 20 W BLB lamp for 10 seconds, thus producing specimens. The light source was spaced from the specimens by a distance of 10 cm. The carried amount of copper was 2 μg/cm$^2$, and the diameters of particles of copper ranged from several to 10 nm. The crystal diameter of photocatalytic particles was 0.1 μm. The produced specimens were evaluated for deodorizing and wear-resistant capabilities.

The deodorizing capability $R_{30}$ (L) was 89%, and the wear-resistant capability had a value of ⊙. Comparison with the graph shown in FIG. 36 indicates that the deodorizing capability $R_{30}$ (L) increased from 18% to 89% by carrying copper.

It can be seen from the above results that a material which has both deodorizing and wear-resistant capabilities can be produced when a thin photocatalytic film having a porosity of 10% or more and less than 40%, preferably 10% or more and 30% or less is formed on the surface of a base.

Embodiments in which particles smaller than interstices in a photocatalytic layer are filled in those interstices will be described below. The term "interstices" used therein indicates both interstices between spaced particles and recesses in necks between particles.

A dense photocatalytic layer is better with respect to film strength and resistance to stains. However, since the temperature at which such a dense photocatalytic layer may be produced is generally high, imposing limitations on materials available for bases, the porosity of the photocatalytic layer may be 10% or greater before particles are filled in interstices at a subsequent step. Because a photocatalytic film whose porosity is 10% or greater has an excellent deodorizing capability, it is possible to produce a multifunctional material which has both deodorizing and wear-resistant capabilities by adjusting the amount of particles to fill interstices.

Particles that are smaller than interstices and to be filled in interstices should preferably be made of an inorganic amorphous material, and more preferably made of an oxide semiconductor such as $TiO_2$, $SnO_2$, ZnO, $SrTiO_3$, $Fe_2O_3$, $Bi_2O_3$, or $WO_3$.

The particles smaller than interstices may basically be smaller than the average diameter of pares that are generated. When interstices are reduced and particles attached to the surface of particles having a photocatalytic function are reduced, the smoothness of the surface of the photocatalytic layer is increased, and any defects of the surface thereof are reduced. Consequently, the particles smaller than the interstices should have diameters of less than 0.01 μm, preferably of 0.008 μm or smaller. If a thin $TiO_2$ film is of an anatase structure and fixed to a base by being heated at 850° C. or lower, then the diameter of the particles may be smaller than the diameter of $TiO_2$ particles because the average diameter of the pores and the diameter of $TiO_2$ particles are essentially equal to each other as observed by an electron microscope. Inasmuch as a starting material of thin $TiO_2$ film having a photocatalytic activity had particle diameters of 0.05 μm or smaller, the diameter of the particles may be 0.05 μm or smaller.

The photocatalytic layer is made more resistant to stains if the porosity of the photocatalytic layer in which interstices are filled with particles and which has a photocatalytic function is less than 20%. Furthermore, the maximum width of open pores of the photocatalytic layer should preferably be 0.04 μm or smaller.

The porosity represents the ratio of open pores, and the maximum width of open pores represents the maximum distance across an interstice between two adjacent particles of those particles which make up the surface of the base and has a photocatalytic function (an average value +3× a standard deviation).

If the photocatalytic layer which has a photocatalytic function has a porosity of about 10% before particles are filled in interstices, then the porosity will be reduced below 10%. Since the pores to be filled are large enough to accommodate particles whose crystal diameter is less than 0.01 μm, the pores are large compared with the size (several Å) of the particles of a gas, and do not affect the deodorizing capability, thereby maintaining the same deodorizing characteristics as those of a produced thin $TiO_2$ film whose porosity is 10% or greater.

In the case where a photocatalytic layer having a photocatalytic function is composed primarily of crystalline photocatalytic particles, scums will not be deposited on the photocatalytic layer in the same manner as they are deposited, can be wiped off relatively easily. If the photocatalytic layer is used in water, algae will not easily be grown on the photocatalytic layer.

The crystalline photocatalytic particles are photocatalytic particles which are crystallized to the extent that when the photocatalytic particles which are removed from a member are subjected to powdery X-ray diffraction under the conditions of 50 kV–300 mA, a maximum peak of crystal (e.g., 2θ=25.3° for anatase $TiO_2$ particles and 2θ=27.4° for rutile $TiO_2$ particles) is detected.

The particles are filled in the interstices by coating, drying, and heating a metal alkoxide, an organic metallic salt, a sulfate, or the like. For example if a metal alkoxide is used, a solution of a mixture containing a metal alkoxide, a diluent, and hydrochloric acid is dried on the outermost surface of a photocatalytic layer, and thereafter dried with heat. The diluent preferably comprises ethanol, propanol, methanol, or the like but is not limited to these materials. However, the diluent should contain as little water as possible. If water were contained in the diluent, The hydrolysis of the metal alkoxide would be violently accelerated, causing cracks in the photocatalytic layer. The hydrochloric acid is added in order to prevent the photocatalytic layer from cracking when dried or heated. The metal alkoxide is usually coated by flow coating, but may be coated by any of the other coating processes. The flow coating process should preferably be carried out in dry air. If the metal alkoxide where coated in ordinary air (atmospheric air), then the hydrolysis of the metal alkoxide would be accelerated by the humidity of the air, making it difficult to control the film thickness. The metal alkoxide may be coated once or several times depending on the ability of the photocatalytic layer to be filled. When the coated photocatalytic layer is left to stand in dry air for several minutes, a film is produced in which particles are filled in interstices in the photocatalytic layer.

If the photocatalytic layer to be coated with filling particles is of the same material as the filling particles, then a film having excellent mechanical strength is produced because of the same coefficient of thermal expansion.

A specific example in which a Ti alkoxide is used to fill interstices will be described below. When the Ti alkoxide is coated on the surface of a photocatalytic layer and then dried with heat, the amount of Ti alkoxide coated in one coating cycle was 10 $\mu$m/cm$^2$ or greater and 100 $\mu$m/cm$^2$ or smaller in terms of the amount of Ti. If the amount of Ti alkoxide coated in one coating cycle were too small, then the process would not be efficient because the number of coating cycles would have to be increased. If the amount of Ti alkoxide coated in one cycle were too large, the thickness of a film produced in one coating cycle would be so large that it would crack when dried or heated.

In the drying step, the coated Ti alkoxide was heated at a temperature of 400° C. or higher or 800° C. or lower. If the temperature were lower than 400° C., then amorphous $TiO_2$ would not be crystallized into anatase $TiO_2$. If the temperature were higher than 800° C., then rapid grain growth would occur, resulting in a reduction in photoactivity.

The amount of hydrochloric acid with respect to the Ti alkoxide in the coating solution was 1 weight % or higher or 10 weight % or lower. If the proportion of hydrochloric acid were smaller than 1 weight %, then the filled particles would not be sufficiently effective to prevent cracking. If the proportion of hydrochloric acid were greater than 10 weight %, then too much water would be introduced as the hydrochloric acid is normally in the form of an aqueous solution of 36% of hydrochloric acid, the hydrolysis would be accelerated excessively, causing cracking. If the amount of hydrochloric acid is large, then the diluent should also be added in a large amount because the diluent suppresses the hydrolysis. The ratio of the hydrochloric acid (exclusively of water) to the diluent should be in the range of from about 1:100 to 1:1000.

After a photocatalytic layer having a photocatalytic function has been formed and a layer has been formed in which particles smaller than interstices produced in the surface of the photocatalytic layer are filled in those interstices, at least one metal of Cu, Ag, Zn, Fe, Co, Ni, Pd, and Pt may be fixed to the latter layer. Since the metal occupies sites of high adsorptivity of the photocatalytic layer, an alkaline metal, calcium, etc. in dust are prevented from being attached to those sites, and hence the photocatalytic layer is prevented from being stained due to deposit of bacteria. If the metal of Cu, Ag, or Zn is fixed to the layer, then since it has an antibacterial capability itself, the photocatalytic layer is prevented more effectively from being stained due to a deposit of bacteria. In addition, the metal has an electron-capturing effect which improves the photoactivity of the photocatalytic layer.

Particles of the metal to be fixed to the layer should be large enough to occupy sites of high adsorptivity of the photocatalytic layer and small enough to keep high activity. From these standpoints, the particle of the metal to be fixed to the layer should preferably have a diameter ranging from several nm to 10 nm.

The metal may be fixed to the layer by any of various processes including photoreduction, heat treatment, sputtering, CVD, etc. Of these processes photoreduction is the most preferable because it can fix the metal firmly through a relatively simple procedure without the need for large scale facilities. In the process of photoreduction, an aqueous solution containing ions of at least one metal of Ag, Cu, Zn, Fe, Co, Ni, Pd, and Pt is coated on a layer, and then irradiated with light containing ions of at least one metal of Ag, Cu, Zn, Fe, Co, Ni, Pd, and Pt may be an aqueous solution of copper acetate, silver nitrate, copper carbonate, copper sulfate, cuprous chloride, cupric chloride, chloroplatinic acid, palladium chloride, nickel chloride, zinc nitrate, cobalt chloride, ferrous chloride, or ferric chloride. Basically, the aqueous solution may be coated in any of various processes, but the spray coating or dip coating process is easy to carry out. Comparison of the spray coating process is preferable to the dip coating process because it uses smaller amount of solution, can coat the solution to a uniform thickness, can easily control the film thickness, and can be performed so as not to coat the reverse side. The light source for radiating light containing ultraviolet rays may be any light source which is capable of radiating light containing ultraviolet rays, and may specifically be an ultraviolet lamp, a BLB lamp, a xenon lamp, a mercury lamp, or a fluorescent lamp. It is preferable to position the specimen such that the light containing ultraviolet rays will perpendicularly be applied to the surface to be irradiated because the irradiation efficiency is the greatest. The light containing ultraviolet rays should preferably be applied for a period of time ranging from about 10 seconds to about 10 minutes. If the period of time for which light containing ultraviolet rays is applied were too short, then the metal would not sufficiently be attached to sites of high adsorptivity of the photocatalytic layer, allowing an alkaline metal, calcium, etc. in dust to be attached to those sites, so that the photocatalytic layer would lose its photocatalytic activity. If the period of time for which light containing ultraviolet rays is applied were too long, then the metal would excessively be attached to sites of high adorptivity of the photocatalytic layer, preventing sufficient light from reaching the photocatalytic layer, so that the photocatalytic activity would be lowered. The specimen should be spaced from the light source by a distance ranging from 1 cm to 30 cm. If the distance between the specimen and the light source were too small, then light would not be applied with uniform illuminance to the entire surface of the specimen, and the metal would irregularly be attached to the sites of high adsorptivity of the photocatalytic layer. If the distance between the specimen and the light source were too large, then since the illuminance of the applied light is in inverse proportion to the square of the distance, the metal would not firmly be attached to the sites of high adsorptivity of the photocatalytic layer.

Examples in which particles smaller than interstices in a photocatalytic layer are filled in those interstices will be described below.

INVENTIVE EXAMPLE 31

A colloidal suspension in ammonia of $TiO_2$ sol having a crystal diameter of 0.01 $\mu$m was coated on a square tile base with each side 15 cm long by spray coating and then firing at 750° C., forming an anatase $TiO_2$ film. At this time, the thin $TiO_2$ film has a porosity of 45%, and the $TiO_2$ particles had a crystal diameter of 0.02 $\mu$m. $SnO_2$ sols having different crystal diameters were coated on a thin $TiO_2$ films, and dried at 110° C., producing specimens. The produced specimens were evaluated for deodorizing and wear-resistance capabilities, and resistant against stains.

The deodorizing capability was evaluated by measuring $R_{30}$ (L).

The wear resistance was evaluated by rubbing the specimens with a plastic eraser and comparing the changes in the appearance of the specimens. Evaluation indications are given below.

⊙: Not varied after 40 reciprocating rubbing movements against the specimens.

○: Damage was caused and the TiO$_2$ layer was peeled off by 10 or more and less than 40 rubbing movements against the specimen.

Δ: Damage was caused and the TiO$_2$ layer was peeled off by 5 or more or less than 10 rubbing movements against the specimen.

x: Damage was caused and the TiO$_2$ layer was peeled off by less than 5 rubbing movements against the specimens.

The resistance against stains was evaluated by drawing a thick line on the surface of the base with a black marking ink, drying the ink, thereafter wiping off the ink with ethanol, and checking the surface for remaining stains.

Evaluation indications are given below.

⊙: Traces were completely removed.

○: Slight traces remained.

Δ: Grayish blue traces remained.

x: Black traces remained.

The results are shown in FIGS. 39 through 45.

Figure 39:
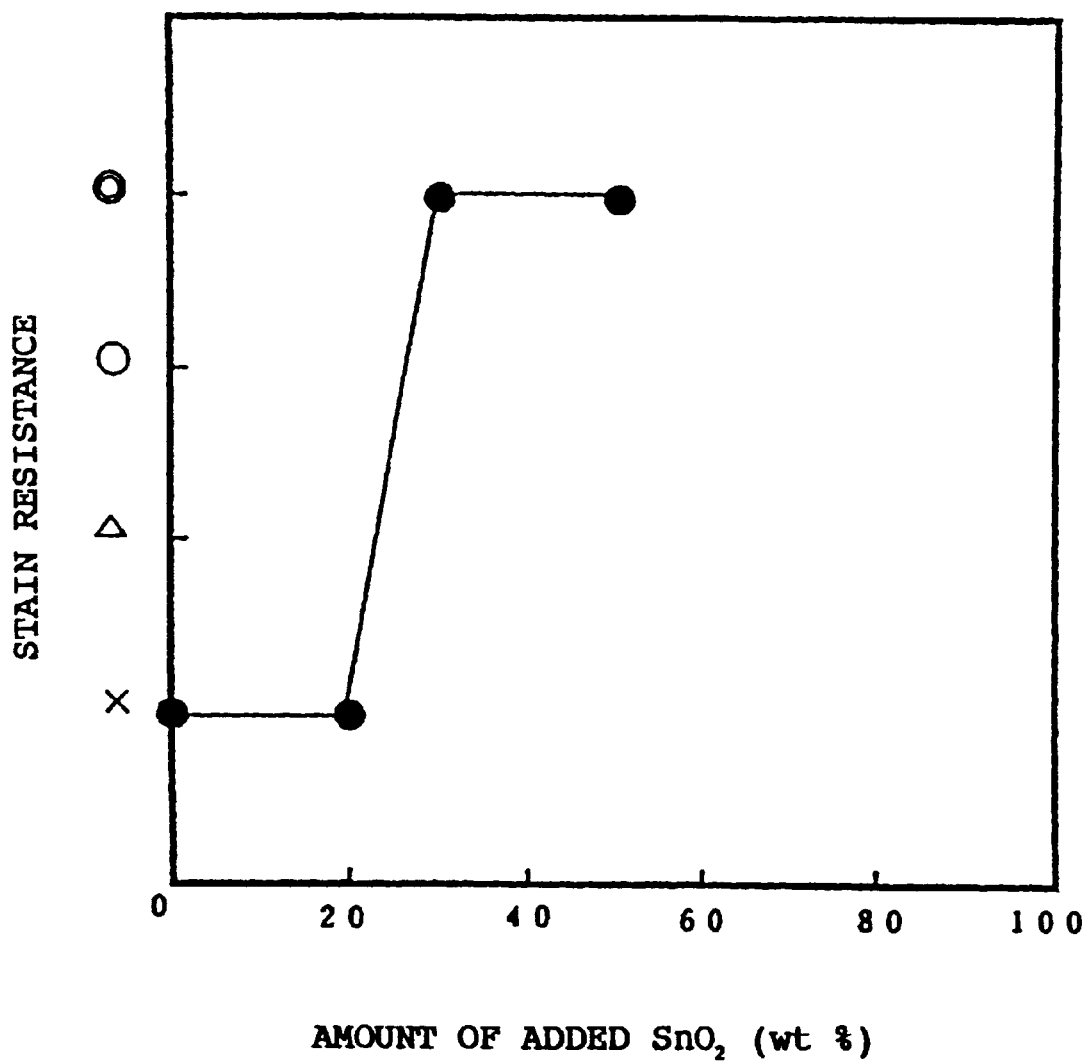
FIG. 39 is a graph showing the relationship between the amount of $SnO_2$ which was added and the difficulty with which dirt is deposited.
Figure 40:
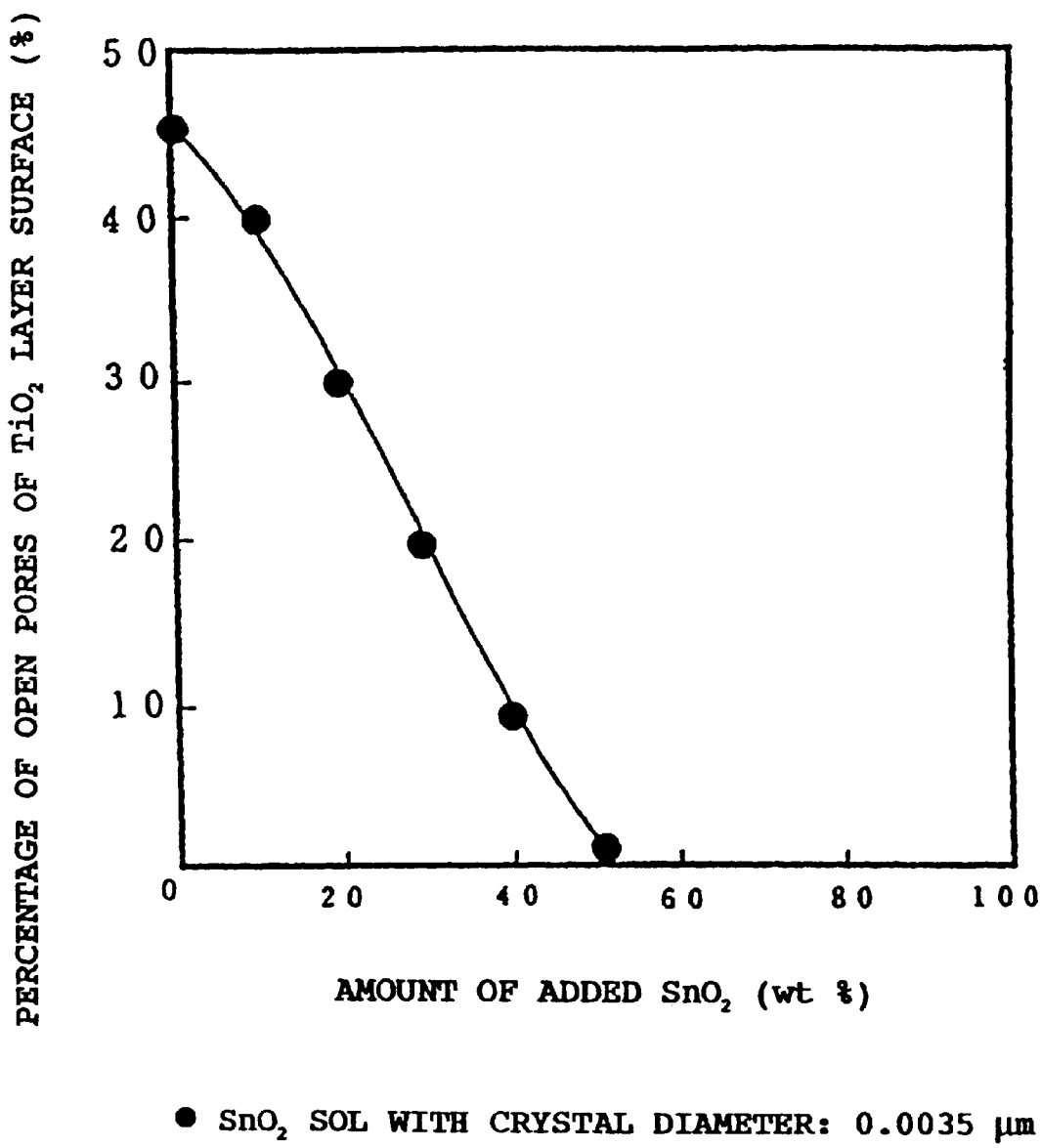
FIG. 40 is a graph showing the relationship between the amount of $SnO_2$ which was added and the percentage of open pores at the surface of a $TiO_2$ layer.

FIG. 39 shows the resistance to stains with respect to the added amount of SnO$_2$. The added amount of SnO$_2$ is expressed as the ratio of the weight of SnO$_2$ to the sum of the weight of TiO$_2$ and the weight of SnO$_2$. When 30% or more of SnO$_2$ is added, the resistance to stains was greatly increased. There appear to be three reasons for this. First, the addition of 30% or more of SnO$_2$ reduced the porosity to less than 20% (FIG. 40). Secondly, the addition of SnO$_2$ reduced pores which have large diameters. FIG. 41 shows the maximum width of open pores with respect to the added amount of SnO$_2$. A study of FIG. 41 indicates that the maximum width of the open pores has a considerably small value of 0.04 μm when the added amount of SnO$_2$ was 30% or greater. Thirdly, the addition of SnO$_2$ improved the surface roughness.

Figure 42:
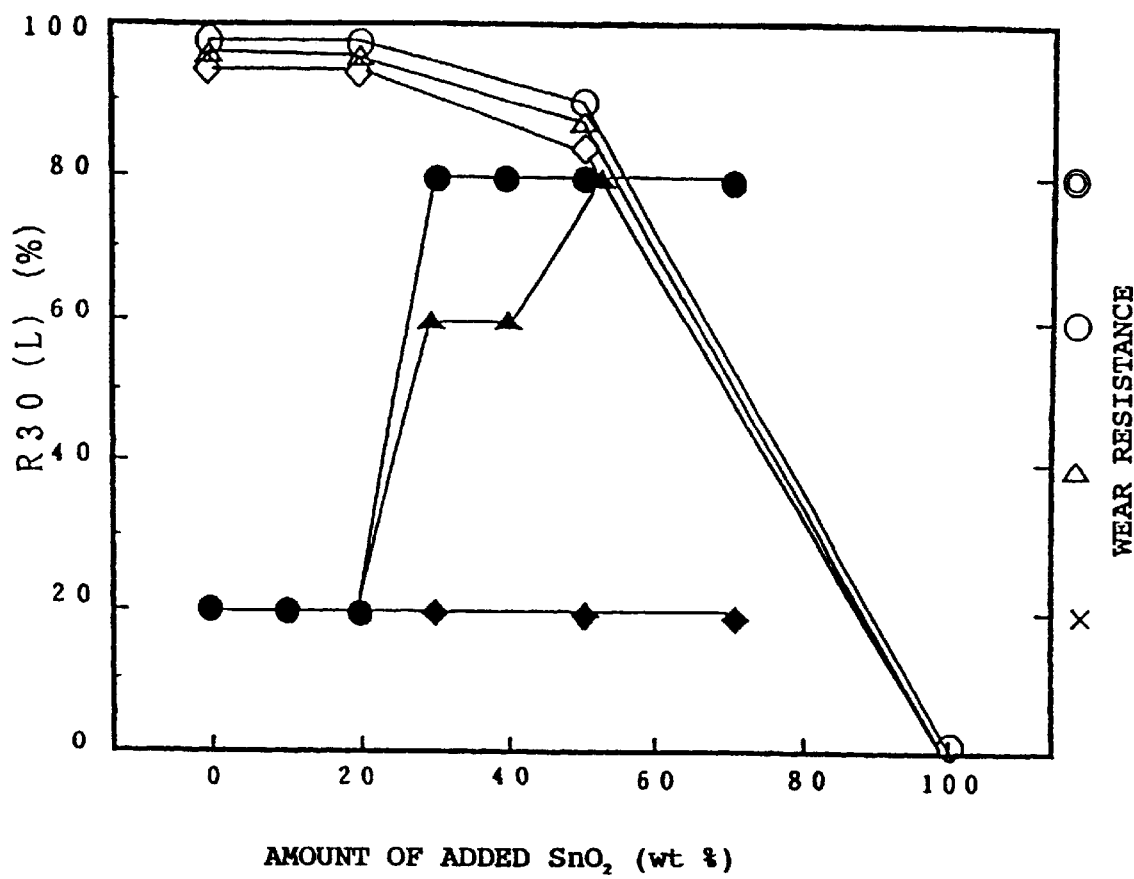
FIG. 42 is a graph showing the relationship between the amount of $SnO_2$ which was added, the deodorizing ability $R_{30}$ (L), and the peeling or wear resistance.
Figure 43:
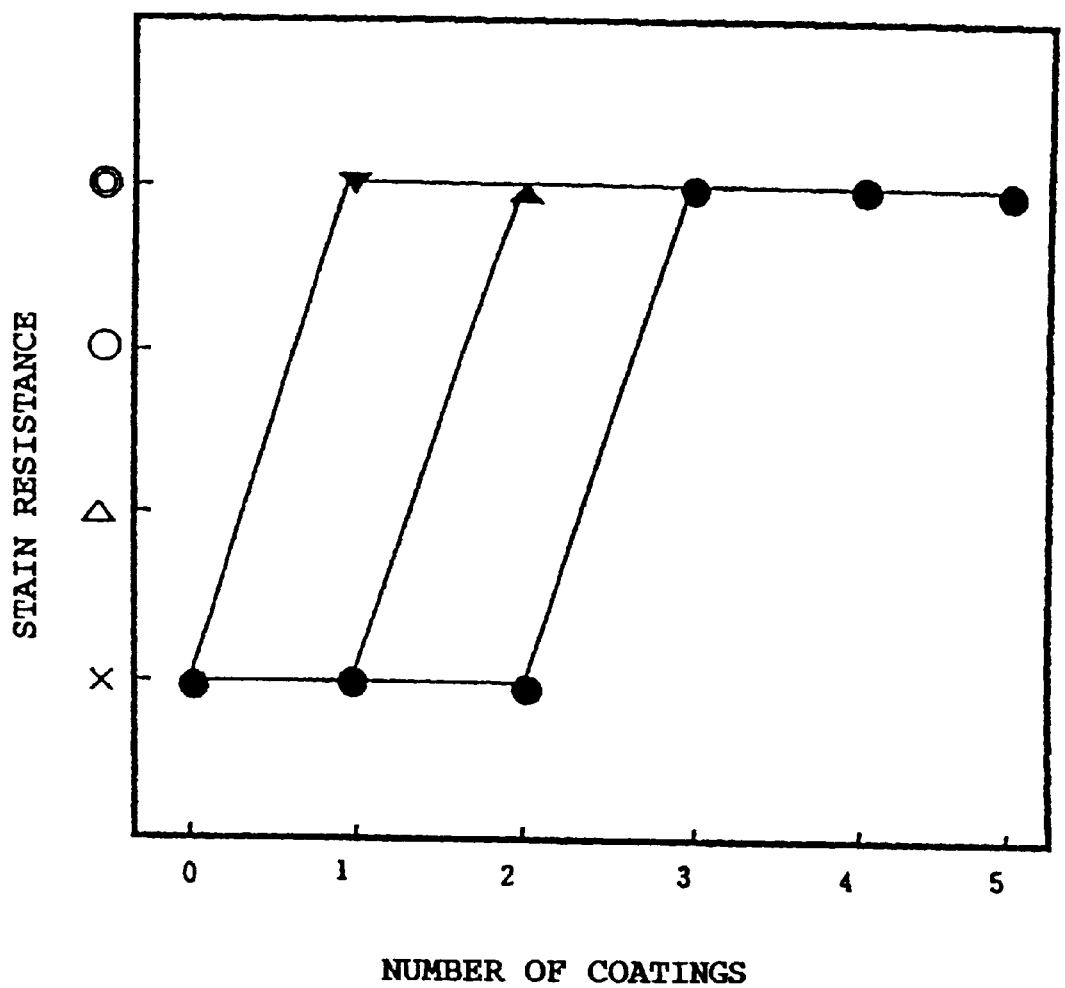
FIG. 43 is a graph showing the relationship between the number of coatings and the difficulty with which dirt is deposited.
Figure 44:
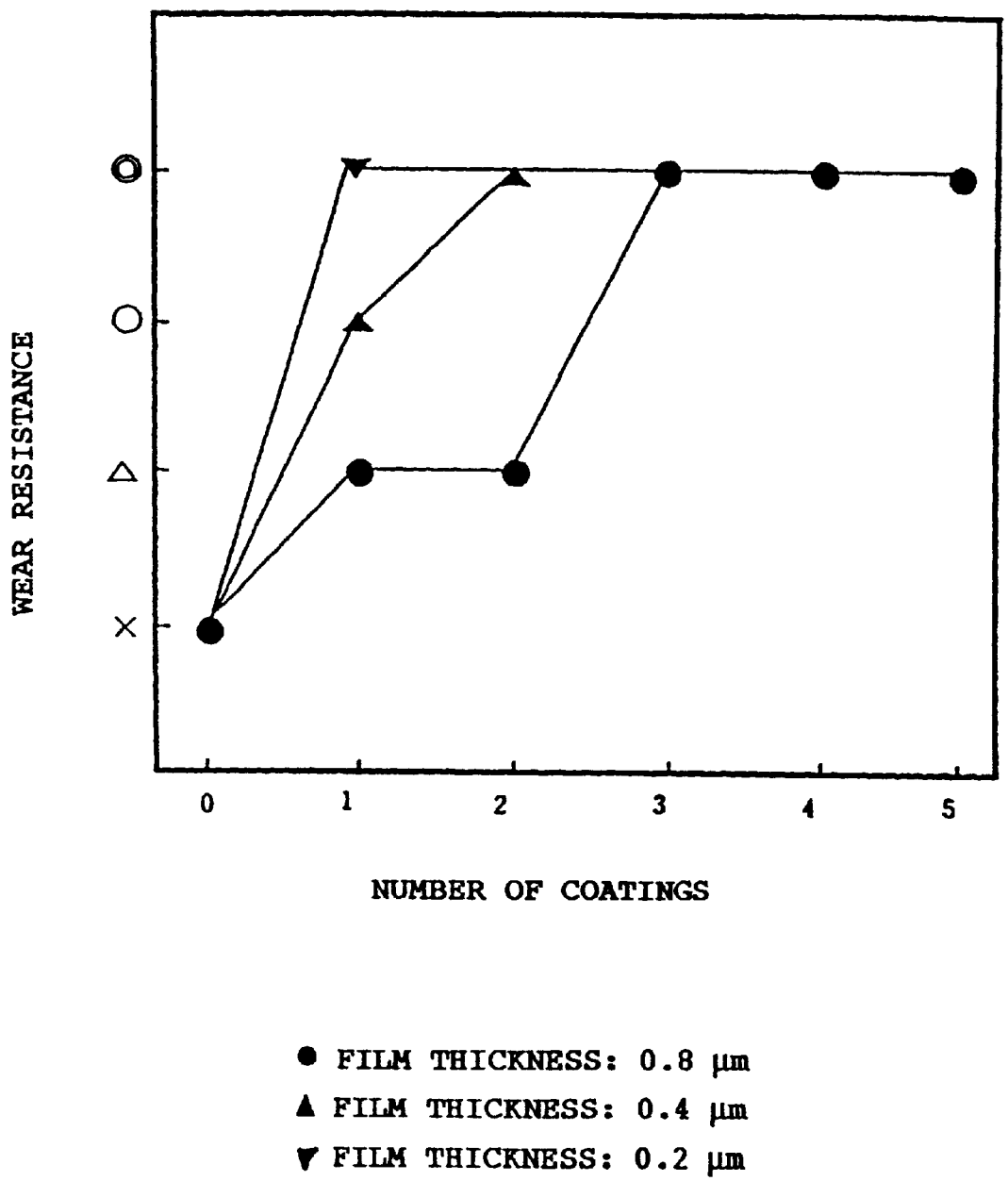
FIG. 44 is a graph showing the relationship between the number of coatings and the wear resistance.

FIG. 42 shows the deodorizing and wear-resistant capabilities with respect to the added amount of SnO$_2$.

The deodorizing capability remained substantially unchanged and hence was good when the crystal diameter of the SnO$_2$ sol varied from 0.0035 μm to 0.01 μm. When the amount of SnO$_2$ was 50% or less R$_{30}$ had a good value of 80% or more. Comparison with the relationship between the added amount of SnO$_2$ and the porosity shown in FIG. 40 indicates that when the added amount of SnO$_2$ was 40% or more or 50% or less, the porosity was less than 10%, the deodorizing capability was good. This tendency differs from the relationship between the porosity and the deodorizing capability (FIG. 35) in the case where particles to fill interstices were not added. The reason for this is considered to be as follows: In this example, the porosity reduced less than 10%, but pores as large as 0.02 μm still remain as shown in FIG. 41, and the crystal diameter of particles that fill interstices is 0.0035 μm, which is large compared with the size (several Å) of the particles of a gas. Therefore, gas passages are not closed under the present conditions free of grain growth.

The wear-resistant capability differed with the crystal diameter of the SnO$_2$ when the added amount of SnO$_2$ was 30% or more. Specifically, when SnO$_2$ particles having a crystal diameter of 0.008 μm or less were added, the wear-resistant capability decreased from a value of ⊙ to a value of ○, and when SnO$_2$ particles having a crystal diameter of 0.01 μm were added, they had no effect on the wear-resistant capability.

The above experiment revealed the following advantages:

(1) When a TiO$_2$ film is formed on a base and particles (SnO$_2$ sol) smaller than interstices produced in the surface of the thin film are introduced into the interstices, the TiO$_2$ film is made resistant to stains.

(2) If the added amount of SnO$_2$ is 30 weight % or greater with respect to the total weight of TiO$_2$ and SnO$_2$, then the wear resistance is increased.

(3) If the added amount of SnO$_2$ is 50 weight % or smaller with respect to the total weight of TiO$_2$ and SnO$_2$, then the deodorizing capability is maintained at a good level.

(4) The TiO$_2$ film is made resistant to stains when the porosity is less than 20% and the maximum width of open pores is 0.04 μm or smaller.

INVENTIVE EXAMPLE 32

A urinal with a strainer whose side, facing away from exposure to light, was coated with an anatase TiO$_2$ film was installed and tested for actual use for two weeks. Then, the strainer and an ordinary strainer which was not coated with an anatase TiO$_2$ film were compared with each other. Yellow stains caused by bacteria and urinary calculi were found to be deposited on both the strainers. The yellow stains oil the ordinary strainer could not be removed when it was simply rubbed. However, when the strainer with the anatase TiO$_2$ film formed on its side was rubbed, the yellow stains were rendered almost invisible.

Inasmuch as no light was applied to the side of the strainer, it is believed that the stain resistance was achieved not by the photocatalytic effect of the anatase TiO$_2$ film, but by the formation on the strainer surface of the crystalline anatase TiO$_2$ film that is resistant to strong attachment of stains thereto.

INVENTIVE EXAMPLE 33

A SiO$_2$—Al$_2$O$_3$—Na/K$_2$O frit was coated on the surface of a square pottery tile with each side 15 cm long, and then a colloidal suspension in ammonia of TiO$_2$ sol having a crystal diameter of 0.01 μm was coated on the surface of the frit coating by spray coating. Then, the assembly was fired at 750° C. for two hours, producing three thin TiO$_2$ films having respective film thicknesses of 0.2 μm, 0.4 μm, and 0.8 μm. At this time, the thin TiO$_2$ film had a porosity of 45%, and the TiO$_2$ particles had a crystal diameter of 0.02 μm. The specimens which were cooled were coated with a mixture of titanate tetraethoxide, 36% hydrochloric acid, and ethanol at a weight ratio of 10:1:400 by flow coating with dry air used as a carrier, and then dried. The coated amount of TiO$_2$ ranged from 40 to 50 μg/cm$^2$. Thereafter, the specimens were fired at 500° C. for 10 minutes. The step of coating the Ti alkoxide was repeated one to five times. The produced specimens were evaluated for deodorizing, antibacterial, wear-resistant, and stain-resistant capabilities.

With respect to the antibacterial capability, the specimens were tested for their antibacterial ability against escherichia coli, strain: W3110. Specifically, 0.15 ml (1~50000 CFU) of the bacterial solution was dropped onto the outermost surface of the multi-functional material which had been sterilized with 70% ethanol, and a glass sheet (100×100 mm) was placed in intimate contact with the outermost surface of the base, thus preparing a specimen. After the specimen was irradiated with light from a white-light lamp with 3500 luxes for 30 minutes, the bacterial solution on the irradiated specimen was wiped with a sterile gauze, and collected in 10 ml of physiological saline. The survival rates of the bacteria were determined. Evaluation indications +++, ++, +, – are the same as those described above.

Under any of the above conditions, the deodorizing capability in terms of $R_{30}$ (L) was 80% or more, and the antibacterial capability had a value of +++.

Figure 45:
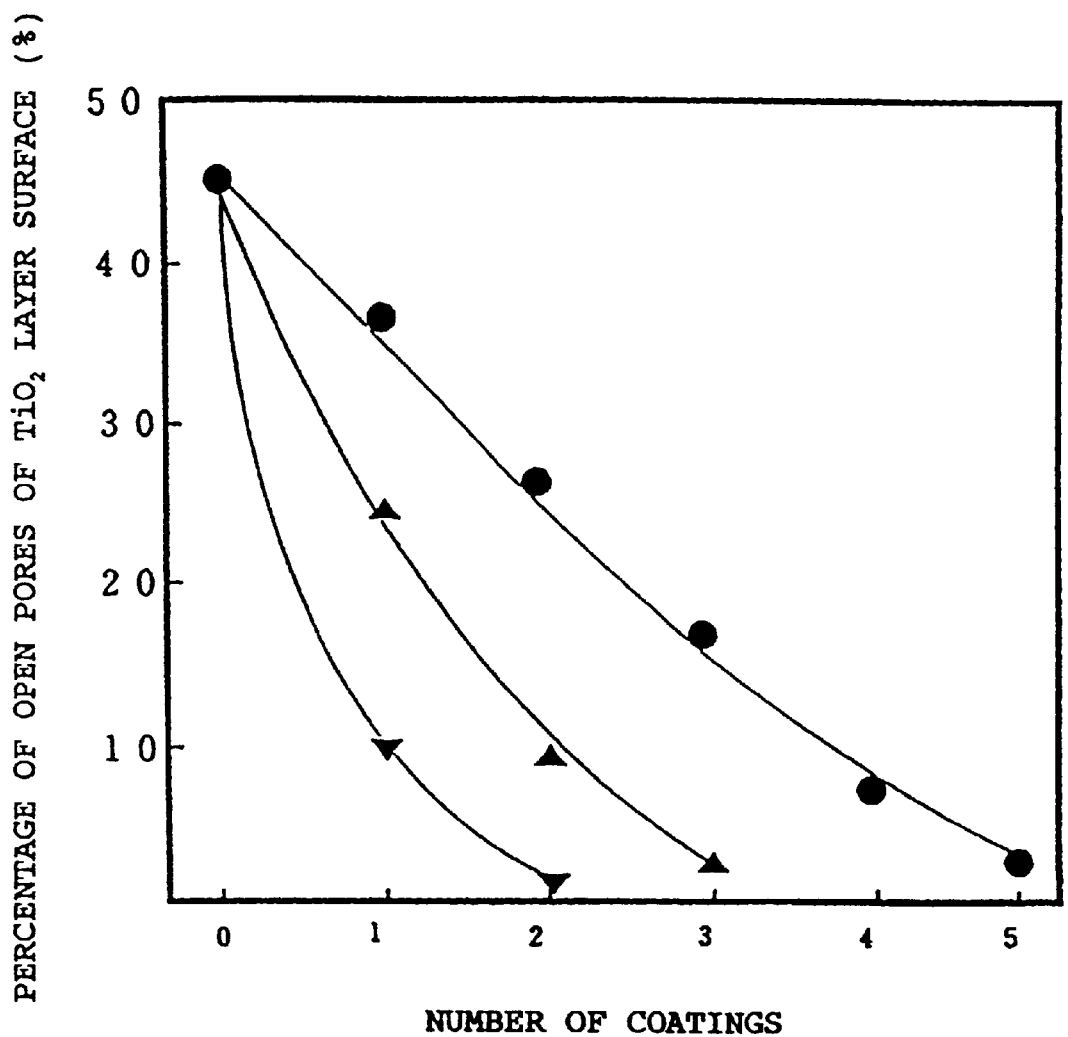
FIG. 45 is a graph showing the relationship between the number of coatings and the percentage of open pores at the surface of a $TiO_2$ layer.

The resistance to stains (FIG. 43) and the wear-resistant capability (FIG. 44) depended on the number of times that the Ti alkoxide was coated and the film thickness of the $TiO_2$ film. The resistance to stains and the wear-resistant capability increased as the number of times that the Ti alkoxide was coated increased. As the film thickness of the $TiO_2$ film decreased, the resistance to stains and the wear-resistant capability increased for a given small number of times that the Ti alkoxide was coated. One of the reasons for this is that the porosity of the outermost surface of the $TiO_2$ layer was reduced by the coating of the Ti alkoxide. FIG. 45 shows the relationship between the porosity of the outermost surface of the $TiO_2$ layer, the number of times that the Ti alkoxide is coated, and the film thickness of the $TiO_2$ film. The porosity of the outermost surface of the $TiO_2$ layer is reduced as the number of times that the Ti alkoxide is coated increases, and is also reduced as the film thickness of the $TiO_2$ film is reduced, with the same number of times that the Ti alkoxide is coated. This relationship corresponds well to the relationship between the number of times that the Ti alkoxide is coated and the film thickness of the $TiO_2$ film, and the resistance to stains and the wear resistance. Particularly, the resistance to stains of either of the specimens had a value of ⊙ when the porosity was less than 20% as with Inventive Example 31.

INVENTIVE EXAMPLE 34

A $SiO_2$—$Al_2O_3$—$Na/K_2O$ frit was coated on the surface of a square pottery tile with each side 15 cm long, and then a colloidal suspension in ammonia of $TiO_2$ sol having a crystal diameter of 0.01 μm was coated on the surface of the frit coating by spray coating. Then, the assembly was fired at 750° C. for two hours. At this time, the thin $TiO_2$ film had a film thickness of 0.4 μm and a porosity of 45%, and the $TiO_2$ particles had a crystal diameter of 0.02 μm. The specimen which was cooled was coated with a mixture of titanate tetraethoxide, 36% hydrochloric acid, and ethanol at a weight ratio of 10:1:400 by flow coating with dry air used as a carrier, and then dried. The coated amount of $TiO_2$ ranged from 40 to 50 μg/cm². Thereafter, the specimen was fired at 500° C. for 10 minutes. The step of coating the Ti alkoxide was repeated three times. Subsequently, an aqueous solution of 1 weight % of silver nitrate was coated on the specimen, and photoreduced by a light source comprising a 20 W BLB lamp for 30 seconds, thus producing a specimen. The light source was spaced from the specimen by a distance of 10 cm. The amount of silver carried on the surface of the specimen was 0.7 μg/cm², and the particles of silver had an average diameter of about 40 nm. The produced specimen was evaluated for its antibacterial capability and an antibacterial capability after use over a long period of time.

For the antibacterial capability after use over a long period of time, the specimen was tested as follows: The surface of the produced specimen was well cleaned with ethanol or the like and dried at 50° C. Then, bathtub water collected in a public bath was put in a sterile beaker, and the specimen was immersed in the bathtub water and left therein for one month. Thereafter, the specimen was removed from the bathtub water and cleaned by ethanol or the like, and then the outermost surface of the multi-functional material was sterilized by 70% ethanol. Then, 0.15 ml (1~50000 CFU) of a bacterial solution of escherichia coli, strain: W3110 was put on a glass sheet (100×100 mm), which was placed in intimate contact with the outermost surface of the base, thus preparing a specimen. After the specimen was irradiated with light from a white-light lamp with 3500 luxes for 30 minutes, the bacterial solution on the irradiated specimen was wiped with a sterile gauze, and collected in 10 ml of physiological saline. The survival rate of the bacteria was determined as an indication for evaluation. Evaluation indications used are the same as those in the antibacterial capability test in Inventive Example 33.

For comparison, the specimens in Inventive Example 33 were also tested.

As a result, the initial antibacterial capabilities of the specimen in Inventive Example 34 and those in Inventive Example 33 had a value of +++. However, the antibacterial capabilities of the specimen in Inventive Example 34 and those in Inventive Example 33 after one month differed from each other. Specifically, the antibacterial capabilities of the specimens in Inventive Example 33 were reduced to a value of +, but the antibacterial capability of the specimen in Inventive Example 34 had the same value of +++ as the initial antibacterial capability thereof. This is because silver occupies sites of high adsorptivity of the surface of the $TiO_2$ layer, thereby preventing dust from being attached to those sites of high adsorptivity during usage.

It can be understood from the above results that since a photocatalytic layer having a photocatalytic function is formed on the surface of a base and particles smaller than interstices produced in the surface of the photocatalytic layer are filled in those interstices, the amount and size of the interstices present in the surface of the photocatalytic layer are smaller than in the conventional thin photocatalytic film, and the surface smoothness is improved, so that the film thickness is increased while at the same time the deodorizing and antibacterial capabilities are maintained, and the photocatalytic layer is made resistant to attachment of high-polymer molecules, dust, bacterial, etc. which make up stain components.

Use of a material having a low melting point, such as soda glass, as the material of a base will be described below. Conventionally, if a thin photocatalytic film is formed on the surface of a base having a low melting point, then the base is softened already at a temperature at which the thin photocatalytic film is formed, and the formed thin photocatalytic film is embedded in the base, with the result that no light will reach the photocatalytic layer, which will fail to perform photocatalytic functions.

To avoid the above shortcoming, photocatalytic particles are fixed to a base through a layer such as an $SiO_2$ coat or the like which has a melting point higher than the base. Specific examples will be described below.

INVENTIVE EXAMPLE 35

Before a titanium oxide was coated on a sheet of soda glass, the surface of the sheet of soda glass was coated with silica.

The surface of a square sheet of soda glass with each side 10 cm long was coated with silica as follows: First, tetraethoxysilane, 36% hydrochloric acid, pure water, and ethanol were mixed at a weight ratio of 6:2:6:86. Since heat was generated when they were mixed together, the mixture was left to stand for one hour. Then, the mixture was coated on the sheet of soda glass by flow coating.

Then, a coating solution was prepared by mixing titanate tetraethoxide and ethanol at a weight ratio of 1:9 and adding 10 weight % of 36% hydrochloric acid with respect to the titanate tetraethoxide to the mixture. The amount of 36% hydrochloric acid to be added should be in the range of from 1 weight % to 30 weight %, preferably from 5 weight % to 20 weight %, with respect to the titanate tetraethoxide. The addition of the appropriate amount of hydrochloric acid is effective to prevent the assembly from being cracked when it is subsequently dried and fired. If the added amount of hydrochloric acid were too small, then the assembly is not sufficiently prevented from being cracked, and if the added amount of hydrochloric acid were too large, then since the amount of water contained in the hydrochloric acid reagent would be increased, the hydrolysis of the titanate tetraethoxide would be accelerated, making it difficult to produce a uniform coating.

Then, the coating solution was coated on the surface of the soda glass base in dry air by flow coating. The term "dry air" used herein does not denote air which does not contain air at all, but denotes air which contains low moisture compared with ordinary air. If the coating solution were coated on the surface of the soda glass base in ordinary air, but not in dry air, then the hydrolysis of the titanate tetraethoxide would be accelerated by water in the air, and the amount of the solution coated in one coating cycle would be so large that the assembly would tend to be cracked when it is subsequently dried and fired. The accelerated hydrolysis would make it hard to control the amount of the solution coated. To prevent cracking, the amount of titanium oxide carried in one cycle should preferably be 100 $\mu$g/cm$^2$ or less. In this example, the amount of carried titanium oxide was 45 $\mu$g/cm$^2$.

Thereafter, a film of titanium oxide was formed by drying the assembly in dry air for 1~10 minutes. The titanium oxide was formed in the process so far according to the following principles: A starting material is titanate tetraethoxide which is one type of titanium alkoxide. (Use of other titanium alkoxide produces the same result in principle.) The titanate tetraethoxide causes a hydrolytic reaction with water in dry air upon flow coating, generating a titanium hydroxide. Furthermore, when dried, a dehydrating and condensing reaction occurs, producing amorphous titanium oxide on the base. Particles of titanium oxide produced at this time have diameters ranging from about 3 to 150 nm, and are highly pure. Therefore, the titanium oxide thus produced can be sintered at a temperature lower than titanium oxides produced by other manufacturing processes.

The composite material thus produced by the above process is fired at a temperature ranging from 300° C. to 500° C., producing a multi-functional material. If necessary, the steps from the coating of titanate tetraethoxide to the firing of the composite material are repeated to obtain a thick coating of titanium oxide.

Specimens produced according to the above process were evaluated for deodorizing, wear-resistant, and antibacterial capabilities. The results of the evaluation are given in Table 19 below.

TABLE 19

| Firing temp (° C.) | Wear resistance | $R_{30}$ (L) | $R_{30}$ (D) | Antibacterial ability (L) | Antibacterial ability (D) |
|---|---|---|---|---|---|
| 300 | ⊙ | 0% | 0% | — | — |
| 400 | ⊙ | 60% | 0% | + | — |
| 500 | ⊙ | 60% | 3% | + | — |

The deodorizing capability was evaluated by placing a specimen in a cylindrical container having a diameter of 26 cm and a height of 21 cm and in which an initial concentration of methyl mercaptan was adjusted to 2 ppm, and measuring a rate ($R_{30}$ (L)) at which the methyl mercaptan was removed 30 minutes after being irradiated by a 4 W BLB fluorescent lamp 8 cm spaced from the specimen and a rate ($R_{30}$ (D)) at which the methyl mercaptan was removed 30 minutes after being shielded from light.

The wear resistance was evaluated by rubbing the specimen with a plastic eraser, and comparing any change in the appearance thereof. Evaluation indications ⊙, ○, Δ, x used were the same as those described above.

The antibacterial capability was tested using escherichia coli, strain: W3110. Specifically, 0.15 ml (1~50000 CFU) of the bacterial solution was dropped onto the outermost surface of the multi-functional material which had been sterilized with 70% ethanol, and a glass sheet (100×100 mm) was placed in intimate contact with the outermost surface of the base, thus preparing a specimen. After the specimen was irradiated with light from a white-light lamp with 5200 luxes for 30 minutes, the bacterial solution on the irradiated specimen and the bacterial solution on a specimen kept under a shielded condition were wiped with a sterile gauze, and collected in 10 ml of physiological saline. The survival rates of the bacteria were determined as indications for evaluation. Evaluation indications +++, ++, +, used were the same as those described above.

At a firing temperature of 300° C., the rubbing test indicated a good result of ⊙, but $R_{30}$ (L) was 0%. This is considered to be because the amorphous titanium oxide was not crystallized into an anatase structure.

At a firing temperature of 400° C. at which an anatase structure can be confirmed by X-rays in a synthesis test, the rubbing test indicated a good result of ⊙, $R_{30}$ (L) increased to 60%, and the antibacterial capability had a value of +. At a firing temperature of 500° C., the rubbing test indicated a good result of ⊙, and $R_{30}$ (L) increased to 60%.

When the temperature increased, the base of soda glass was deformed at 550° C., and no multi-functional material was manufactured.

INVENTIVE EXAMPLE 36

In order to improve the photocatalytic characteristics of the specimens obtained in Inventive Example 35, metal particles were carried. The photocatalyst carries out an oxidizing reaction and a reducing reaction at the same time. If the reducing reaction were not in progress, no electrons would be consumed, and particles would be charged and the oxidizing reaction would not be in progress either. This appears to be responsible for the fact that $R_{30}$ (L) stopped at 60% in Inventive Example 35. To avoid this, metal particles may be carried on particles of titanium oxide to release electrons for thereby preventing the particles from being charged.

Metal particles were carried by the following process: A solution of metallic salt was coated on a photocatalyst by flow coating, and irradiated for one minute by a 20 W BLB fluorescent lamp at a distance of 20 cm. The solution of metallic salt comprised an ethanol solution of 1 wt % of copper acetate if copper was to be carried, and a mixture of water and ethanol containing 1 wt % of silver nitrate at 1:1 if silver was to be carried. After being irradiated, the assembly was cleaned and dried. The solution containing ethanol was used rather than an aqueous solution of metallic salt because the solution of metallic salt has good wettability with respect to the specimen.

The specimen thus produced was evaluated for deodorizing, wear-resistant, and antibacterial capabilities.

The results of the evaluation are given in Table 20. Only the specimen fired at 500° C. was used for evaluation.

TABLE 20

| Firing temp (° C.) | Wear resistance | $R_{30}$ (L) | $R_{30}$ (D) | Anti-bacterial ability (L) | Anti-bacterial ability (D) |
|---|---|---|---|---|---|
| 500 | ☉ | 98% | 98% | +++ | +++ |

The rubbing test indicated a good result of ☉, $R_{30}$ (L) greatly increased to 98%, and the antibacterial capability had a value of +++.

COMPARATIVE EXAMPLE 37

The same specimens as those of Inventive Example 35 except that no silica coating was applied were used. Specifically, a titanium oxide was coated on a square sheet of soda glass with each side 10 cm long. The evaluated results of deodorizing, wear-resistant, and antibacterial capabilities of the specimens are given in Table 21.

TABLE 21

| Firing temp (° C.) | Wear resistance | $R_{30}$ (L) | $R_{30}$ (D) | Anti-bacterial ability (L) | Anti-bacterial ability (D) |
|---|---|---|---|---|---|
| 300 | ☉ | 0% | 0% | − | − |
| 400 | ☉ | 0% | 0% | − | − |
| 500 | ☉ | 0% | 0% | − | − |

It can be seen from Table 21 that the rubbing test indicated a good result of ☉ at the temperatures of 300° C., 400° C., 500° C., but $R_{30}$ (L) was 0% even when the process from the coating of titanate tetraethoxide to the firing of the assembly was repeated 10 times. The antibacterial capability of each specimen had a value of −.

$R_{30}$ (L) was poor at 300° C. because the amorphous titanium oxide was not crystallized into an anatase structure.

At 400° C. and 500° C., the amorphous titanium oxide was already crystallized into an anatase structure, and the poor value of $R_{30}$ (L) cannot be explained by the amorphous titanium oxide, but appears to be caused by the fact that since the base of soda glass was softened, the film of titanium oxide was embedded therein.

Consequently, it is possible to manufacture a multifunctional material which has deodorizing and antibacterial capabilities, of a base having a relatively low melting point by placing a layer of a high melting point between the base and a photocatalytic layer.

Embodiments which are suitable for applying a photocatalytic effect to the surface of a base of plastic that is poor in heat resistance will be described below.

A base may principally be made of plastic that is poor in heat resistance, pottery, ceramic, metal, glass, a composite material thereof, or the like.

The base may be of any of various shapes, e.g., a simple shape such as a spherical shape, a solid cylindrical shape, a hollow cylindrical shape, or a planar shape such as of a tile, a wall member, a floor member, or the like, or a complex shape such as of a sanitary ware, a basin, a sink, a closet bowl seat, or the like. The surface of the base may be porous or dense.

The binder may be of a thermoplastic material such as inorganic glass, thermoplastic resin, solder, or the like, or a thermosetting material such as fluoroplastic, siloxane resin, silicone resin, or the like. However, the binder should preferably be made of a material that is resistant to photodegradation because it will subsequently be irradiated with light containing ultraviolet rays. Since the material according to the present invention is highly effective particularly when it can be heated only at 300° C. or lower, the thermoplastic material should preferably be able to be softened at 300° C. or lower, and the thermosetting material should preferably be able to be set at 300° C. or lower. Materials which can meet the above requirements are thermoplastic materials including boric acid glass, solder, and acrylic resin, and thermosetting materials including fluoroplastic, siloxane resin, and silicone resin.

The binder layer may be coated on the base by spray coating, roll coating, dip coating, or the like if the binder layer is made of a thermoplastic material. Any of these processes or other processes may be employed. The binder components may not necessarily be in conformity with the binder composition at the time the material according to the present invention is completed. For example, if the binder is made of inorganic glass, it may be coated with a suspension of inorganic glass in a frit, mass, or powdery phase, or a mixed solution of a salt containing a metal component which is a constituent of the final material. If the binder is made of a resin, it may be coated with a solution of the resin or other materials.

Before photocatalytic particles are coated on a binder layer, the coated binder layer may be dried to evaporate water or the like. To dry the coated binder layer, it may be left to stand at room temperature, or the binder layer and the base may be heated together.

Before photocatalytic particles are coated on a binder layer, the coated binder layer may be heated at a temperature which is lower than the softening temperature of the base and at which the binder layer changes to a binder composition at the time the final material is completed and also at which the binder layer is softened. With this process, since the binder layer has been smoothened when photocatalytic particles are to be coated on a binder layer, sufficient effects can be achieved even if photocatalytic particles are coated in a small amount.

If the binder is made of a thermosetting material, then a diluent and thereafter a hardener may be added to the thermosetting material, and the mixture may be coated on the surface of the base.

The viscosity of the binder should be increased to a value of 105 poise or more and less than 1075 poise. With the viscosity of the binder increased to a value of 105 poise or more, coated photocatalytic particles are embedded such that they are not fully embedded in the binder layer. With the viscosity of the binder increased to a value of less than 1075 poise, at least a lowermost layer of the photocatalytic layer is partly embedded in a lower layer of the binder.

The photocatalytic particles are coated on the surface of the binder layer basically by coating a starting material that has suitably been processed on the binder layer.

The starting material should preferably be a suspension of a sol of a photocatalytic material or a suspension of fine particles of a photocatalytic material. At any rate, it is necessary that a surface-treating agent such as a dispersant or the like be added to prevent coagulation of the photocatalytic material in the suspension. The photocatalytic particles may be coated on the binder layer by spray coating, roll coating, dip coating, or the like. Any of these processes or other processes may be employed.

The photocatalytic layer should preferably be embedded in the binder layer to a depth which is ¼ or more of the thickness of the photocatalytic layer from the standpoint of the strength with which the photocatalytic layer is joined to the base. The thickness of the photocatalytic layer is determined by conducting an elementary analysis with EBMA of components of photocatalytic particles along a section of the photocatalytic layer, and covers an upper layer where the amounts of elements of the components of the photocatalytic layer are substantially constant and an embedded region between a depth at which the amounts of elements of the components of the photocatalytic layer begin to decrease and a depth at which the amounts of elements of the components of the binder layer begin to be constant.

The surface-treating agent applied to the photocatalyst is primarily made of a component added to disperse the sol of the starting material of the photocatalytic particles. Specifically, the surface-treating agent may be made of pentaerythritol, trimethylolpropane, triethanolamine, trimethylolamine, silicone resin, alkylchlorosilane, or the like.

A light source of light having a wavelength of 390 nm or shorter and an illuminance of 1.7 mW/cm$^2$ may comprise a BLB fluorescent lamp, an ultraviolet lamp, a bactericidal lamp, a xenon lamp, or a mercury lamp. The reason why the light has to have a wavelength of 390 nm or shorter and an illuminance of 1.7 mW/cm$^2$ is that since the dispersant such as of silicone resin has certain resistance to photodegradation, the dispersant would not be decomposed unless the ultraviolet rays had the above intensity. The shorter the ultraviolet rays, the faster the dispersant is decomposed. However, because the binder may possibly be decomposed depending on its type and the ultraviolet rays are harmful to human bodies, the wavelength of the ultraviolet rays should be 250 nm or greater. The illuminance of 3 mW/cm$^2$ or less is sufficient because the rate of decomposition increases as the illuminance increases to about 3 mW/cm$^2$, but any further increase in the illuminance would not contribute much to an increase in the rate of decomposition.

Figure 46:
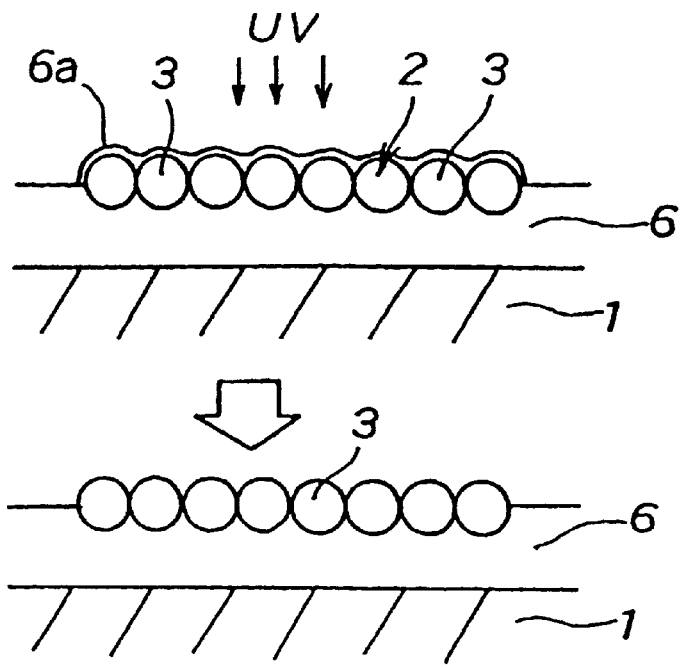
FIG. 46 is a view showing the manner in which ultraviolet radiation is applied to preferentially decompose and vaporize a thermosetting resin on photocatalytic particles to expose the photocatalytic particles to the atmosphere.

The above process is schematically shown in FIG. 46. A photocatalytic layer 2 is disposed on a base 1 through a binder layer 6 with a lower layer of the photocatalytic layer 2 being partly embedded in the binder layer 6. The layer 6 is composed of a surface-treating agent for obstructing a photocatalytic activity. UV light contains light having a wavelength of 390 nm or shorter and an illuminance of 1.7 mW/ cm$^2$.

Figure 47:
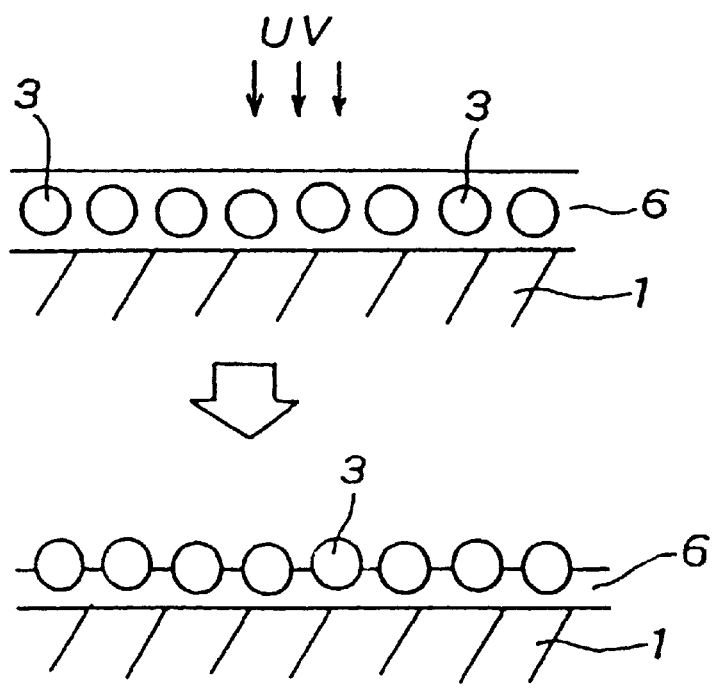
FIG. 47 is a view similar to FIG. 46, showing another embodiment.

A process of forming a layer composed mainly of photocatalytic particles 3 and a thermosetting resin 6 on the surface of a base 1 and irradiating the assembly with ultraviolet rays to expose a photocatalytic layer will be described below with reference to FIG. 47. According to this process, the photocatalytic particles 3 are firmly fixed to the base 1, and when the assembly is irradiated with light having a wavelength of 390 nm or shorter and an illuminance of 1.7 mW/cm$^2$, the irradiated portions of the surfaces of the photocatalytic particles are subjected to a photocatalytic reaction to decompose and vaporize the surface-treating agent and the thermosetting resin preferentially in a direction toward the light source. Since the photocatalytic particles are exposed to the ambient air, they can provide a sufficient photocatalytic activity.

The layer composed mainly of photocatalytic particles and a thermosetting resin is formed by adding a thermosetting resin, a diluent, and a hardener, in the order named, to a well dispersed suspension of a photocatalytic sol, coating the mixture to the surface of a base, and heating the assembly.

The photocatalytic sol in the suspension should have a crystal diameter of 0.05 µm or smaller, more preferably 0.01 µm or smaller because the photocatalytic activity is higher as the crystal diameter is smaller. The photocatalytic sol in the suspension should also be as monodisperse as possible because the photocatalytic particles can be coated more uniformly as the photocatalytic sol is dispersed better.

The thermosetting resin should preferably be resistant to photodegradation caused by white light and ordinary fluorescent lamp light because it is highly durable in use. The thermosetting resin should preferably be siloxane resin or fluoroplastic.

The diluent is added in order to lower the viscosity of the mixture of a photocatalytic sol and a thermosetting resin for thereby facilitating the coating of the mixture on the surface of the base. Basically, the diluent may be of any material insofar as it can serve the above purpose. For example, the diluent may comprise water, ethanol, propanol, or the like.

The mixture may be coated on the base by spray coating, roll coating, dip coating, spin coating, or the like. Any of these processes or other processes may be employed.

The heat treatment may generally be carried out by, but not limited to, an electric furnace, a gas-fired kiln, a vacuum furnace, a pressure furnace, or the like.

Figure 48:
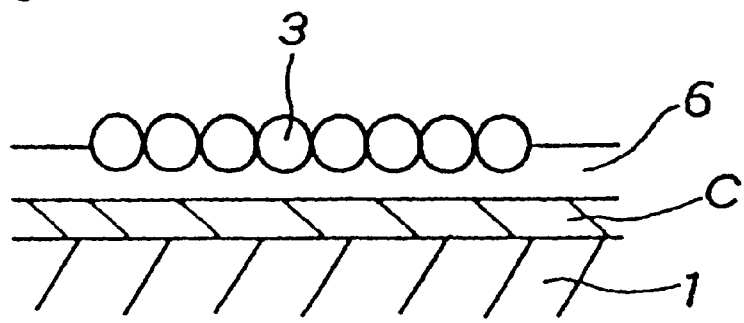
FIG. 48 is a view similar to FIG. 46, showing still another embodiment.

The layer composed mainly of photocatalytic particles and a thermosetting resin may be formed on the surface of the base with a thermosetting resin layer or photosetting resin layer (intermediate layer: C) interposed therebetween, as shown in FIG. 48.

With this arrangement, the photocatalytic layer can be uniformly formed with ease because the thermosetting resin layer or photosetting resin layer disposed intermediate between the base and the photocatalytic layer produces a smooth surface before the photocatalytic layer is formed even if the base has surface irregularities. Furthermore, inasmuch as the thermosetting resin layer or photosetting resin layer disposed intermediate between the base and the photocatalytic layer allows the photocatalytic layer to be joined sufficiently to the base, the layer composed mainly of the photocatalytic particles and the thermosetting resin can be thinned and the photocatalytic particles can be concentrated in the vicinity of the surface of the base even if the base has surface irregularities. Therefore, the subsequent step of irradiating the assembly with light having a wavelength of 390 nm or shorter and an illuminance of 1.7 mW/cm$^2$ can be carried out in a shorter period of time. Since the layer composed mainly of the photocatalytic particles and the thermosetting resin is present on the upper surface, ultraviolet rays having a sufficient intensity to decompose and vaporize the layer in a subsequent step and usage do not reach the intermediate thermosetting resin layer or photosetting resin layer, the thermosetting resin of this layer may be selected as desired, e.g., may be inexpensive epoxy resin to reduce the cost of the material. Alternatively, the thermosetting resin may comprise a colored resin for a better design.

The thermosetting resin layer disposed intermediate between the base and the photocatalytic layer is formed, for example, by adding a diluent and then a hardener to the thermosetting material, coating the mixture on the surface of the base, and solidifying the coated mixture by heating or leaving it to stand. If the layer disposed intermediate between the base and the photocatalytic layer is a photosetting resin layer, then the coated mixture is irradiated with light containing ultraviolet rays, rather than being heated. The diluent is added in order to lower the viscosity of the mixture for thereby facilitating the coating of the mixture on the surface of the base. Basically, the diluent may be of any material insofar as it can serve the above purpose. For example, the diluent may comprise water, ethanol, propanol, or the like.

Figure 49:
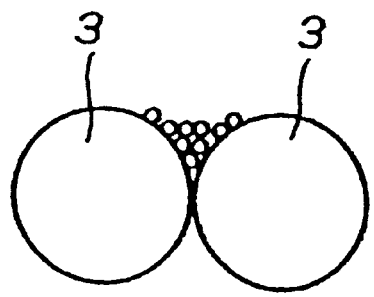
FIGS. 49(a) and 49(b) are a set of views showing the manner in which small particles are filled in the interstices between photocatalytic particles.
Figure 49:
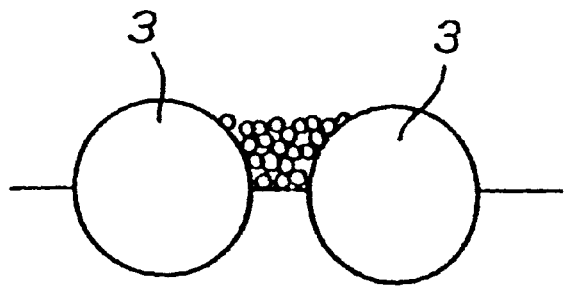

Then, as shown in FIGS. 49(a) and 49(b), interstices in the photocatalytic layer thus exposed on the surface of the base according to the above process are preferably filled with particles (interstitial particles : 4) smaller than the interstices for increased wear resistance.

The size of the particles smaller than the interstices may basically be smaller than the average of pore diameters of surface irregularities that are produced. The particles smaller than the interstices should be added in an amount large enough to cause open pores on the surface to have a porosity of less than 20% because it will make the surface resistant to stains.

Specific examples will be described below.

INVENTIVE EXAMPLE 38

The surface of a square alumina base each side 10 cm long was coated with a mixture prepared by successively adding 10 weight % of siloxane resin, a diluent, and a hardener, in the order named, to a titanium oxide sol (dispersed by an amine-base disperant) having an average particle diameter of 0.01 μm, and then fired at 150° C. into comparative specimens. These specimens were irradiated by various light sources for a predetermined period of time, producing respective specimens. The specimens were then evaluated for a deodorizing capability $R_{30}$ (L) upon irradiation.

To evaluate each specimen, the specimen was placed in a glass container of 11 liters at a distance of 8 cm from a light source (4 W BLB fluorescent lamp), and a methyl mercaptan gas was introduced into the glass container until it reaches a concentration of 3 ppm in the glass container. The deodorizing capability $R_{30}$ (L) upon irradiation represents a rate of change of the concentration of the methyl mercaptan gas 30 minutes after being irradiated.

The results of the evaluation are given in Table 22 below.

TABLE 22

| Light source | Ultraviolet intensity (W/cm$^2$) | Irradiated time (day) | $R_{30}$ (L) (%) |
|---|---|---|---|
| None | — | — | 30 |
| BLB | 0.3 | 7 | 32 |
| BLB | 1.69 | 5 | 52 |
| Ultraviolet lamp | 2.0 | 3 | 74 |
| Ultraviolet lamp | 3.0 | 1 | 82 |

When the ultraviolet intensity was 1.69 mW/cm$^2$ or higher, the deodorizing capability had a good value in excess of 50%, and when the ultraviolet intensity was 2 mW/cm$^2$ or higher, the deodorizing capability had a good value in excess of 70%. The deodorizing capability had a good value when the ultraviolet intensity was 1.69 mW/cm$^2$ or higher because the irradiated portions of the surfaces of the photocatalytic particles are subjected to a photocatalytic reaction to decompose and vaporize the surface-treating agent and the thermosetting resin preferentially in a direction toward the light source, with the result that the photocatalytic particles are exposed to the ambient air.

INVENTIVE EXAMPLE 39

The surface of a square alumina base each side 10 cm long was coated with a solution of a siloxane to which a diluent and a hardener were added. After the coated alumina base was dried at room temperature for about 6 hours, it was coated with a mixture prepared by successively adding 10 weight % of siloxane resin, a diluent, and a hardener, in the order named, to a titanium oxide sol (dispersed by an amine-base disperant) having an average particle diameter of 0.01 μm, and then fired at 150° C. into comparative specimens. These specimens were irradiated by various light sources for a predetermined period of time, producing respective specimens. The specimens were then evaluated for a deodorizing capability $R_{30}$ (L) upon irradiation.

The results of the evaluation are given in Table 23 below.

TABLE 23

| Light source | Ultraviolet intensity (W/cm$^2$) | Irradiated time (day) | $R_{30}$ (L) (%) |
|---|---|---|---|
| None | — | — | 30 |
| BLB | 0.3 | 7 | 38 |
| BLB | 1.69 | 5 | 61 |
| Ultraviolet lamp | 2.0 | 3 | 82 |
| Ultraviolet lamp | 3.0 | 1 | 84 |

When the ultraviolet intensity was 1.69 mW/cm$^2$ or higher, the deodorizing capability had a good value in excess of 60%, and when the ultraviolet Intensity was 2 mW/cm$^2$ or higher, the deodorizing capability had a good value in excess of 80%. The deodorizing capability had a good value when the ultraviolet intensity was 1.69 mW/cm$^2$ or higher because the irradiated portions of the surfaces of the photocatalytic particles are subjected to a photocatalytic reaction to decompose and vaporize the surface-treating agent preferentially on the irradiated portions of the surfaces of the photocatalytic particles which were not decomposed and vaporized by heat treatment, with the result that the photocatalytic particles are exposed to the ambient air.

INVENTIVE EXAMPLE 40

The surface of a square alumina base each side 10 cm long was coated with a solution of a siloxane to which a diluent and a hardener were added. After the coated alumina base was dried at room temperature for about 6 hours, it was coated with a mixture prepared by successively adding 10 weight % of siloxane resin, a diluent, and a hardener, in the order named, to a sol of titanium oxide (dispersed by an amine-base disperant) having an average particle diameter of 0.01 μm, and then fired at 150° C. At this stage, interstices between the particles on the surface had a size in the range of from 0.1 to 0.2 μm on the average. Thereafter, the assembly was irradiated with light having an ultraviolet intensity of 2 mW/cm$^2$ from an ultraviolet lamp for three days. After it was confirmed that $R_{30}$ (L) exceeded 80%, when 70weight % of a sol of tin oxide having an average particle diameter of 0.0035 μm was coated on the surface, and dried at 110° C. into a specimen. $R_{30}$ (L) of the specimen had a good value of 81%. The specimen was subjected to a rubbing test with a plastic eraser. In the rubbing test, a specimen with no tin oxide added was damaged and the titanium oxide was peeled off in less than 5 rubbing movements against the specimen, and the specimen with tin oxide added remained unchanged in 10 or more rubbing movements against the specimen. It was therefore confirmed that the wear resistance can be increased by filling interstices in the surface with particles smaller than the interstices.

Consequently, it can be seen that there can be produced a material having a good photocatalytic activity even if the material has a photocatalytic layer processed at a low temperature lower than 300° C.

A process of producing a multi-functional material having a sufficient photocatalytic activity by firing it at a low temperature lower than 300° C., with a means different from, but for the same purpose as, exposure to ultraviolet rays, will be described below.

According to this process, before a dispersant and a surface-treating agent such as a surface-active agent or the like are added to a sol of titanium oxide prepared by the hydrothermal method or the sulfuric acid method, fine metal particles are fixed to the surface of the sol of titanium oxide.

The fine metal particles are those metal particles which, if carried by titanium oxide, are capable of capturing electrons when light is applied to the titanium oxide and electrons and holes are generated. Specifically, the fine metal particles are fine metal particles of Ag, Cu, Pt, Pd, Ni, Fe, Co, or the like.

Photoreduction is a simple method of fixing the fine metal particles to the surface of the sol of titanium oxide. The sol of titanium oxide should preferably, but not necessarily, be prepared by the hydrothermal method or the sulfuric acid method. The sulfuric acid method is a method by which titanium oxide is synthesized according to the following process:

First, ilumenite is reacted with sulfuric acid to convert Ti and Fe into a water-soluble sulfate, which is extracted with water to prepare a sulfate solution mainly composed of Ti and Fe. Then, an insoluble suspended material such as of $SiO_2$ or the like is removed from the sulfate solution. Thereafter, the sulfate solution is cooled to 10° C. to 15° C., separating out iron sulfate, and then titanyl sulfate in the solution is hydrolyzed to generate titanium hydroxide. The generated titanium hydroxide is crystallized into a sol of titanium oxide by the hydrothermal process at a high temperature under a high pressure in water (generally under a saturated vapor pressure at a temperature of 110° C. or higher and lower than 200° C.) with a pressure device such as an autoclave or the like.

The hydrothermal process is a process of hydrolyzing a titanium source such as titanium tetrachloride, titanium sulfate, or the like into a sol of titanium oxide at a high temperature under a high pressure in water (generally under a saturated vapor pressure at a temperature of 110° C. or higher and lower than 200° C.) with a pressure device such as an autoclave or the like. A specific process of fixing fine metal particles to the surface of the sol of titanium oxide by way of photoreduction will be described below.

First, the suspension of a sol of titanium oxide prepared by the hydrothermal method or the sulfuric acid method is rendered acid or alkaline because the titanium oxide has an isoelectric point of pH 6.5 and can easily be coagulated. It is preferable to use ammonia to make the suspension alkaline because an alkaline metal such as Na, K, or the like can easily be attached firmly to titanium oxide, and if such an alkaline metal occupies active sites of titanium oxide at first, then it prevents Ag, Cu, Pt, Pd, Ni, Fe, Co, or the like from being attached to those active sites of titanium oxide.

Then, a solution of metallic salt having substantially the same pH as the suspension of the sol of titanium oxide is mixed with the suspension of the sol of titanium oxide, and the mixture is irradiated with light containing ultraviolet rays for thereby fixing the metal. If necessary, excessive metal is settled in the solution and then removed from the solution. The solution of metallic salt comprises a solution of a solvent and a salt including a metal which, if carried by titanium oxide, is capable of capturing electrons when light is applied to the titanium oxide and electrons and holes are generated. Specifically, the solution of metallic salt comprises a solution of a solvent and a salt including Ag, Cu, Pt, Pd, Ni, Fe, Co, or the like. The salt including Ag, Cu, Pt, Pd, Ni, Fe, Co, or the like may be silver nitrate, copper acetate, copper carbonate, copper sulfate, cuprous chloride, cupric chloride, chloroplatinic acid, palladium chloride, nickel chloride, cobalt chloride, ferrous chloride, or ferric chloride. The solvent may be water, ethanol, propanol, or the like, but should be of the same type as the suspension of the sol of titanium oxide. To the solvent, there is added, if necessary, a pH adjuster which may be of nitric acid, sulfuric acid, hydrochloric acid, or the like for making the solvent acid, or ammonia for making the solvent alkaline.

The mixture should be irradiated with light containing ultraviolet rays under the following conditions: The light source may be anything which can apply light containing ultraviolet rays, and may specifically be an ultraviolet lamp, a BLB lamp, a xenon lamp, a mercury lamp, or a fluorescent lamp. The light containing ultraviolet rays may basically be applied in any way, but should be applied from above the container because ultraviolet rays will not be absorbed by the container.

The distance between the light source and the container should be in the range of from several cm to several tens cm. If the container were too close to the light source, the upper surface of the specimen solution would be dried by the heat emitted by the light source, and if the container were too far away from the light source, the illuminance would be lowered. The time for which the light containing ultraviolet rays is applied depends on the illuminance of the light source. However, the metal is firmly attached to the photocatalytic particles when light containing ultraviolet rays is applied for a period of time ranging from several seconds to several tens of minutes.

Thereafter, a thin film produced by coating and heating the sol of titanium oxide which carries the metal is formed on the surface of a base, thereby producing a multi-functional material having photocatalytic functions.

The sol of titanium oxide is usually, but not necessarily, heated by sintering in the atmosphere using an electric furnace, a gas-fired kiln, or the like, or according to the hydrothermal process using an autoclave or the like.

Particles of titanium oxide in the film of titanium oxide should preferably be of an average diameter of 1 $\mu$m or less. If the average diameter were greater than 1 $\mu$m, then the specific surface area would be reduced, lowering the catalytic activity.

A material having a photocatalytic action is produced by forming a thin film, which is prepared by coating and heating a sol, on the surface of a base through a binder. With the binder interposed between the thin film and the base, the intimate adhesion between the thin film and the base is improved.

A process of producing such a material having a photocatalytic action differs depending on whether the binder comprises a thermoplastic binder or a thermosetting binder. Embodiments of respective processes will be described below. However, insofar as the above arrangement is satisfied, the material having a photocatalytic action may be produced by any of other processes. The thermoplastic binder may comprise a thermoplastic binder such as acrylic resin, inorganic glass such as glaze, or solder. The thermosetting binder may comprise fluoroplastic, epoxy resin, siloxane resin, or the like.

If a thermoplastic binder is employed, then the material having a photocatalytic action is produced as follows: First, a thermoplastic binder is coated on the surface of a base. Then, a sol of titanium oxide carrying metal particles is coated on the thermoplastic binder, and heated at a temperature lower than the heat-resistant temperature of the base, but higher than the softening point of the thermoplastic binder. When the sol of titanium oxide is thus heated, a lower layer of the titanium oxide layer which carries metal particles is partly embedded in the binder layer, thereby firmly joining the base and the thin film of titanium oxide which carries metal particles.

If a thermosetting binder is employed, then the material having a photocatalytic action is produced as follows: First, a mixture prepared by successively adding a diluent and a hardener to the thermosetting binder is coated on a base, and set by heat or the like. Then, a mixture prepared by successively adding a thermosetting resin, a diluent, and a hardener to a sol of titanium oxide carrying metal particles is coated on the set mixture on the base, and set by heat or the like.

A photosetting resin may be used instead of the thermosetting resin.

Before a dispersant and a surface-treating agent such as a surface-active agent or the like are added to a sol of titanium oxide prepared by the hydrothermal method or the sulfuric acid method, metal particles such as of Ag, Cu, Pt, Pd, Ni, Fe, Co, or the like are fixed to the surface of the $TiO_2$ sol, thereby covering active sites of the sol of titanium oxide with the metal particles such as of Ag, Cu, Pt, Pd, Ni, Fe, Co, or the like. Therefore, when a dispersant and a surface-treating agent such as a surface-active agent or the like are added, they are prevented from being adsorbed to the active sites of the sol of titanium oxide, thus preventing the sol of titanium oxide from losing its activity. Consequently, the dispersant and the surface-treating agent such as a surface-active agent or the like are effective to stably disperse the photocatalytic sol, forming a uniform film on the surface of the base. At the same time, even if the assembly is fired at a low temperature of less than 300° C., the photocatalytic action is prevented from suffering a reduction which would otherwise result from attachment of the dispersant and the surface-treating agent such as a surface-active agent or the like to active sites of the photocatalytic particle layer on the surface of the base. The metal particles such as of Ag, Cu, Pt, Pd, Ni, Fe, Co, or the like which occupy the active sites of the sol of titanium oxide have an electron-capturing effect to increase the photocatalytic activity.

Specific examples will be described below.

INVENTIVE EXAMPLE 41

A liquid substance produced by adding water to titanium tetrachloride in a cold bath was processed at 140° C. in an autoclave according to the hydrothermal process, producing a sol of anatase titanium oxide. The produced sol of anatase titanium oxide was dispersed in nitric acid. The dispersion had a pH of 0.8. To the dispersion, there was added an aqueous solution of 3 to 5 wt % of copper sulfate whose pH had been adjusted to about 0.8 by nitric acid. The solution was irradiated with light containing ultraviolet rays from above the container for 15 minutes by a light source comprising a 4 W BLB lamp which was spaced about 10 cm from the solution. A dispersant of organic acetate was added to the solution, stabilizing the sol. The sol was coated on a square tile base with each side 15 cm long and then heated into a specimen. The produced specimen was measured for a deodorizing capability $R_{30}$ (L) and an antibacterial capability upon irradiation.

To evaluate the specimen, the specimen was placed in a glass container of 11 liters at a distance of 8 cm from a light source (4W BLB fluorescent lamp), and a methyl mercaptan gas was introduced into the glass container until it reached a concentration of 3 ppm in the glass container. The deodorizing capability $R_{30}$ (L) upon irradiation represents a rate of change of the concentration of the methyl mercaptan gas 30 minutes after being irradiated.

With respect to the antibacterial capability, the specimen was tested for its antibacterial ability against escherichia coli, strain: W3110. Specifically, 0.15 ml (10000 ~50000 CFU) of the bacterial solution was dropped onto the outermost surface of the specimen which had been sterilized with 70% ethanol, and a glass sheet (100×100 mm) was placed in intimate contact with the outermost surface of the base, thus preparing a specimen. After the specimen was irradiated with light from a white-light lamp with 3500 luxes for 30 minutes, the bacterial solution on the irradiated specimen was wiped with a sterile gauze, and collected in 10 ml of physiological saline. The survival rates of the bacteria were determined. Evaluation indications +++, ++, +, − are the same as those described above.

The deodorizing capability in terms of $R_{30}$ (L) had a good value of 85%, and the antibacterial capability had a good value of +++.

COMPARATIVE EXAMPLE 42

A liquid substance produced by adding water to titanium tetrachloride in a cold bath was processed at 140° C. in an autoclave according to the hydrothermal process, producing a sol of anatase titanium oxide. The produced sol of anatase titanium oxide was dispersed in nitric acid. The dispersion had a pH of 0.8. To the dispersion, there was added a dispersant of organic acetate, stabilizing the sol. The sol was coated on a square tile base with each side 15 cm long and then heated into a specimen. The produced specimen was measured for a deodorizing capability $R_{30}$ (L) and an antibacterial capability upon irradiation.

The deodorizing capability in terms of $R_{30}$ (L) had an insufficient value of 5%, and the antibacterial capability had an insufficient value of −.

INVENTIVE EXAMPLE 43

A liquid substance produced by adding water to titanium tetrachloride in a cold bath was processed at 140° C. in an autoclave according to the hydrothermal process, producing a sol of anatase titanium oxide. The produced sol of anatase titanium oxide was dispersed in nitric acid. The dispersion had a pH of 0.8. To the dispersion, there was added an aqueous solution of 3 to 5 wt % of copper sulfate whose pH had been adjusted to about 0.8 by nitric acid. The solution was irradiated with light containing ultraviolet rays from above the container for 15 minutes by a light source comprising a 4 W BLB lamp which was spaced about 10 cm from the solution. A dispersant of organic acetate was added to the solution, stabilizing the sol. A mixed solution prepared by successively adding a diluent of propanol and a hardener to siloxane resin was coated on the surface of a square alumina base with each side 10 cm long, and dried at 100° C. The assembly was then coated with a mixed solution prepared by successively adding 20 weight % of siloxane resin with respect to the amount of titanium oxide, propanol, and a hardener to the sol produced in the manner described above, and fired at 150° C., producing a specimen. The produced specimen was measured for a deodorizing capability $R_{30}$ (L) upon irradiation.

The deodorizing capability in terms of $R_{30}$ (L) had a good value of 80%.

COMPARATIVE EXAMPLE 44

A liquid substance produced by adding water to titanium tetrachloride in a cold bath was processed at 140° C. in an autoclave according to the hydrothermal process, producing a sol of anatase titanium oxide. The produced sol of anatase titanium oxide was dispersed in nitric acid. The dispersion had a pH of 0.8. To the dispersion, there was added a dispersant of organic acetate, stabilizing the sol. A mixed solution prepared by successively adding a diluent of propanol and a hardener to siloxane resin was coated on the surface of a square alumina base with each side 10 cm long, and dried at 100° C. The assembly was then coated with a mixed solution prepared by successively adding 20 weight % of siloxane resin with respect to the amount of titanium oxide, propanol, and a hardener to the sol produced in the manner described above, and fired at 150° C., producing a specimen. The produced specimen was measured for a deodorizing capability $R_{30}$ (L) upon irradiation. The deodorizing capability in terms of $R_{30}$ (L) had an insufficient value of 22%.

It can be seen from the above examples that before a dispersant and a surface-treating agent such as a surface-active agent or the like are added to a sol of titanium oxide prepared by the hydrothermal method or the sulfuric acid method, metal particles of Ag, Cu, Pt, Pd, Ni, Fe, Co, or the like are fixed to the surface of the sol of titanium oxide, so that a material having a sufficient photocatalytic action can be formed by being fired at a low temperature of less than 300° C. on a base which is not resistant to heat, e.g., a plastic base.

While the above embodiments have been described primarily with respect to anatase $TiO_2$, embodiments with respect to rutile $TiO_2$ will be described below.

Figure 50:
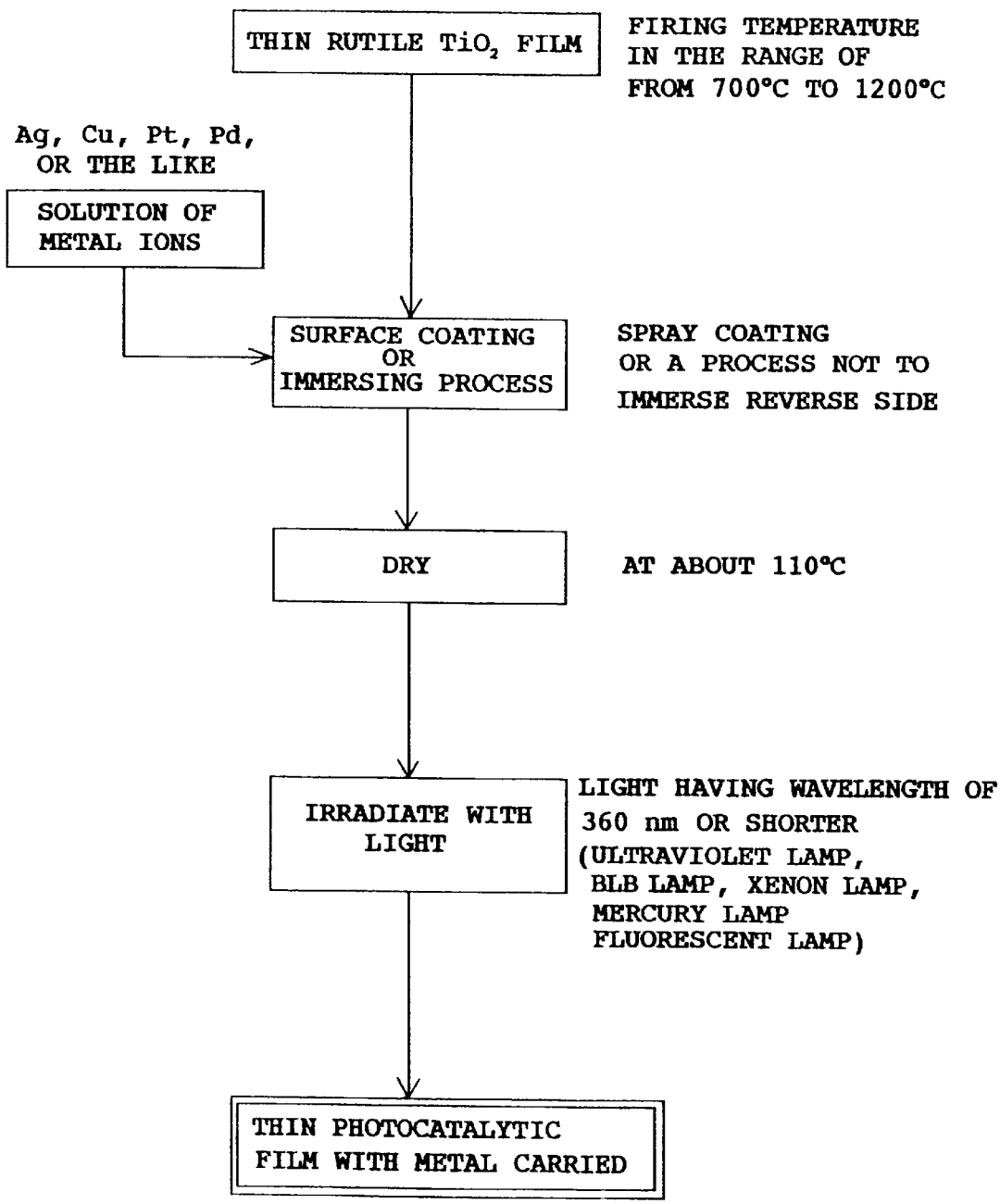
FIG. 50 is a block diagram showing a process of manufacturing a multi-functional material made of rutile $TiO_2$.

FIG. 50 is a block diagram of a process of a multifunctional material composed of rutile $TiO_2$. According to the present invention, a thin rutile $TiO_2$ film is formed on the surface of a base such as a tile or the like by coating a $TiO_2$ sol, a Ti alkoxide, a sulfate of Ti, a chloride solution of Ti, or the like on the base and thereafter heating the coated layer.

If a $TiO_2$ sol is employed, then since $TiO_2$ has an isoelectric point of pH 6.5 and hence is substantially neutral, it can easily be coated uniformly on the base in the form of an aqueous solution in which it is dispersed by an acid or alkali. If the base is of metal, then an alkaline dispersion is preferable from the standpoint of erosion resistance. The acid may be a sulfuric acid, a hydrochloric acid, an acetic acid, a phosphoric acid, an organic acid, or the like. The alkali may be ammonia, a hydroxide including an alkaline metal, or the like, but should preferably be ammonia as it will not produce a metal contaminant after being heated. To the dispersion, there may be added a dispersant of organic acid or phosphoric acid, a surface-treating agent, and a surface-active agent. Since smaller particle diameters allow an initial sintering phase to occur at a lower temperature, producing a thin photocatalytic film having an excellent peel strength at a low temperature, the average particle diameter of the $TiO_2$ sol should be 0.05 μm or smaller, and preferably 0.01 μm or smaller.

The $TiO_2$ sol, the Ti alkoxide, the sulfate of Ti, the chloride solution of Ti, or the like should preferably be coated on the base by spray coating, dip coating, roll coating, or spin coating as these processes require no special equipment and can form coatings inexpensively as compared with CVD, electron beam evaporation, sputtering, or the like.

The heat treatment may be carried out as firing in the atmosphere using an electric furnace, a gas-fired kiln, or the like, or as a hydrothermal process using an autoclave or the like.

A solution of at least one of Cu, Ag, Fe, Co, Pt, Ni, Pd, and $Cu_2O$, i.e., an aqueous solution containing metal ions, is prepared, and coated on a thin rutile $TiO_2$ film. The aqueous solution of metal salt may be coated by a process which prevents the aqueous solution of metal salt from being applied to the reverse side of the base. The solvent of the aqueous solution of metal salt may be water, ethanol, or the like. If water is used as the solvent, it is effective to add a sacrificial oxidizing agent of alcohol, unsaturated hydrocarbon, or the like. The solvent of ethanol is preferable because it does not produce rust on a base of metal, increases a drying rate, and is less harmful than other solvents of ether, acetone, methanol, etc.

In order to increase the carrying efficiency, the aqueous solution of metal salt is dried at a temperature ranging from room temperature to 110° C., and the metal salt is irradiated with light containing light having a wavelength of 390 nm or shorter to reduce metal ions for thereby separating out and fixing the metal to the thin rutile $TiO_2$ film. A lamp for applying light may comprise an ultraviolet lamp, a BLB (black light blue) lamp, a xenon lamp, a mercury lamp, or a fluorescent lamp. The light should be perpendicularly applied to the surface to be irradiated for increasing the irradiation efficiency.

Specific examples will be described below.

INVENTIVE EXAMPLE 45

A dispersion in ammonia of $TiO_2$ sol having an average diameter of 0.01 μm was coated on a square alumina base with each side 10 cm long by spray coating and then fired at 900° C., forming a thin rutile $TiO_2$ film. Then, an aqueous solution of copper acetate was coated on the thin rutile $TiO_2$ film by spray coating, and thereafter photoreduced by a light source comprising a 20 W BLB lamp for 10 seconds, thus producing a specimen. The light source was spaced from the specimen by a distance of 10 cm. The specimen was evaluated for photoactivity A(L).

The photoactivity A(L) is represented by the absolute value of a gradient of a linearly approximated reaction curve plotted with respect to a gas concentration indicated on the Y-axis and a reaction time indicated on the X-axis. The concentration Xt at a time t is expressed by:

$$Xt = X_O \cdot 10^{-A(L)t} \qquad (1)$$

The photoactivity A(L) can be determined by passing a certain gas to be decomposed over a thin photocatalytic film irradiated with light containing ultraviolet rays and observing a reduction in the concentration of the gas upon elapse of the time t. In this experiment, methyl mercaptan, which is an odorous component, was used as a gas to be decomposed, the specimen was placed in a cylindrical container having a diameter of 26 cm and a height of 21 cm and in which an initial concentration of methyl mercaptan was adjusted to 2 ppm, and a time-dependent change of the concentration of methyl mercaptan was observed when the specimen was irradiated with light from a 4 W BLB fluorescent lamp which was 8 cm spaced from the specimen.

The results of the experiment are shown in FIGS. 51 and 52. Each of FIGS. 51 and 52 is a graph showing the relationship between the concentration of Cu in the solution and the photoactivity A(L). FIG. 51 illustrates the relationship at the time the aqueous solution of copper acetate was photoreduced after the aqueous solution of copper acetate was sprayed and dried, and FIG. 52 illustrates the relationship at the time the aqueous solution of copper acetate was photoreduced after the aqueous solution of copper acetate was sprayed but not dried.

When the aqueous solution of copper acetate was photoreduced after the aqueous solution of copper acetate was sprayed but not dried, as shown in FIG. 52, the photoactivity A(L) was about $3 \times 10^{-5}$ and remained unchanged and saturated even if the concentration of Cu in the solution increased from 0.001 weight % to 0.1 weight %.

When the aqueous solution of copper acetate was photoreduced after the aqueous solution of copper acetate was sprayed and dried, as shown in FIG. 51, the photoactivity A(L) was about $2 \times 10^{-5}$, which is substantially the same value as when the aqueous solution of copper acetate was not dried, at the time the concentration of Cu in the solution was 0.001 weight %, but sharply increased to about $2 \times 10^{-2}$ at the time the concentration of Cu in the solution increased to 0.1 weight %.

INVENTIVE EXAMPLE 46

A thin rutile $TiO_2$ film was formed on a floor tile and a wall tile in the same manner as with Inventive Example 45, and Cu was fixed by photoreduction to the thin rutile $TiO_2$ film after an aqueous solution of copper acetate was coated and dried. The relationship between the concentration of the metal component in the solution and the odor removal rate $R_{30}$ is shown in FIGS. 53 and 54.

Figure 53:
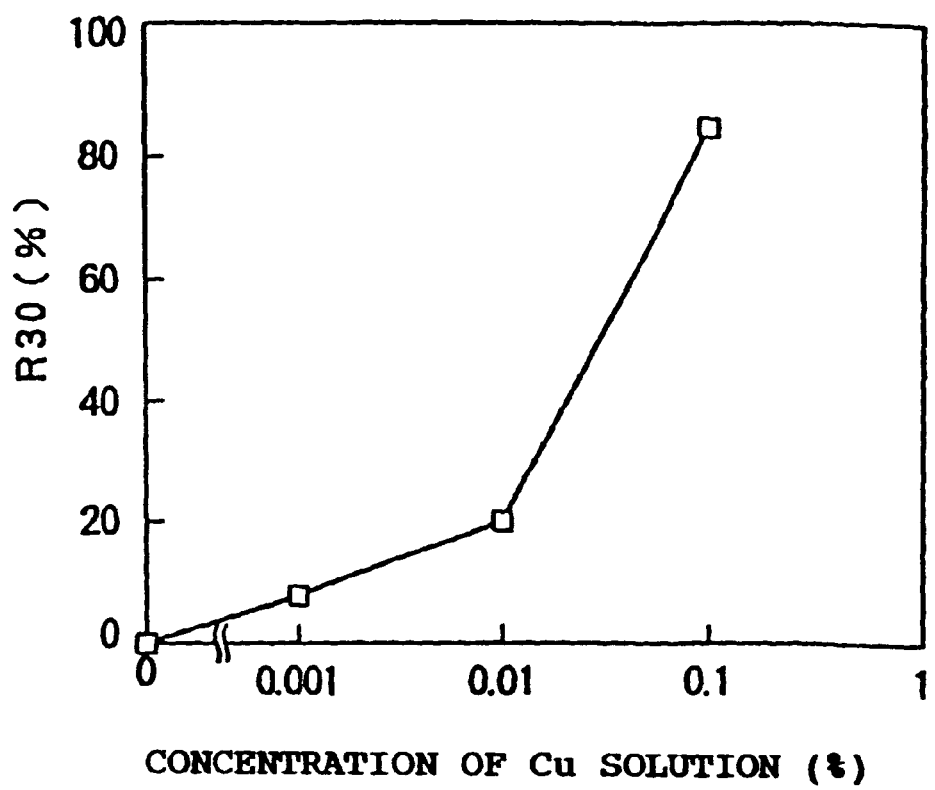
FIG. 53 is a graph showing the relationship between the concentration of a Cu solution and the odor removal ratio $R_{30}$ when the metal carried on a thin film of rutile $TiO_2$ was Cu (the metal ion was reduced after the aqueous solution of a metallic salt was dried)
Figure 54:
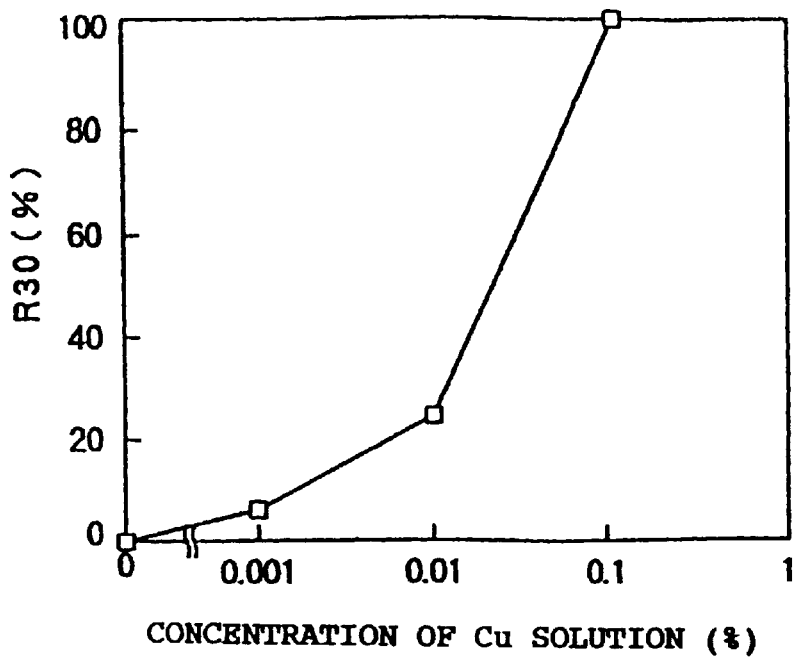
FIG. 54 is a graph showing the relationship between the concentration of a Cu solution and the odor removal ratio $R_{30}$ when a base was a wall tile and the metal carried on a thin film of rutile $TiO_2$ was Cu (the metal ion was reduced after the aqueous solution of a metallic salt was dried)

It can be seen from FIGS. 53 and 54 that insofar as the concentration of the metal component in the solution is of a certain high value, an odorous component can be removed even if the base is a tile, by photoreducing Cu after the aqueous solution of copper acetate is dried.

INVENTIVE EXAMPLE 47

A dispersion in ammonia of $TiO_2$ sol having an average diameter of 0.01 μm was coated on a square tile base with each side 15 cm long by spray coating and then fired at various temperatures, forming thin rutile $TiO_2$ films. Then, an aqueous solution of copper acetate was coated on the thin rutile $TiO_2$ films by spray coating, and thereafter photoreduced by a light source comprising a 20 W BLB lamp for 10 seconds, thus producing specimens. The light source was spaced from the specimens by a distance of 10 cm. The specimens were evaluated for a deodorizing capability $R_{30}$.

Figure 55:
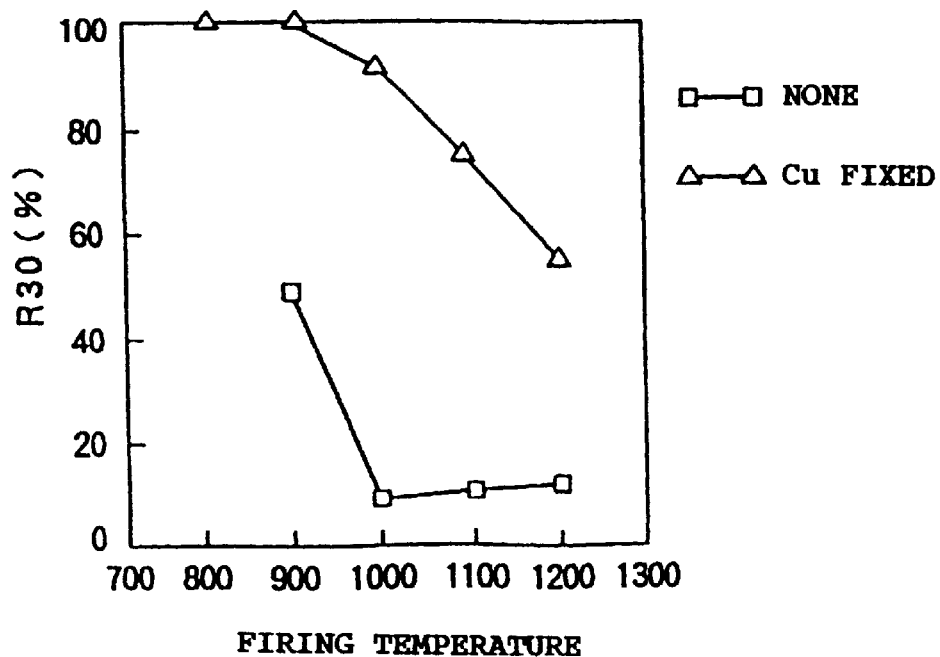
FIG. 55 is a graph showing the relationship between the sintering temperature for producing a thin film of rutile $TiO_2$ and odor removal ratio $R_{30}$ after Cu was fixed.

The results of the evaluation are shown in FIG. 55. The value $R_{30}$ at 900° C. (the percentage of open pores:10%) was better than with a rutile structure which carries no metal. When the temperature increased to 1000° C. (the percentage of open pores:3%), the value $R_{30}$ of the specimen with no metal carried was sharply reduced, and the value $R_{30}$ of the specimen with Cu added was slightly reduced. There are two reasons why the deodorizing capability was reduced at 1000° C. as compared with the deodorizing capability at 900° C. According to one reason, as the percentage of open pores is reduced, the area of the thin rutile $TiO_2$ film of photocatalyst for contact with a gas to be decomposed is reduced. The deodorizing capability of the specimen with no metal carried was reduced primarily for this reason. The other reason is that as the percentage of open pores is reduced, the area in which metal particles separated out by photoreduction can exist is also reduced.

Figure 56:
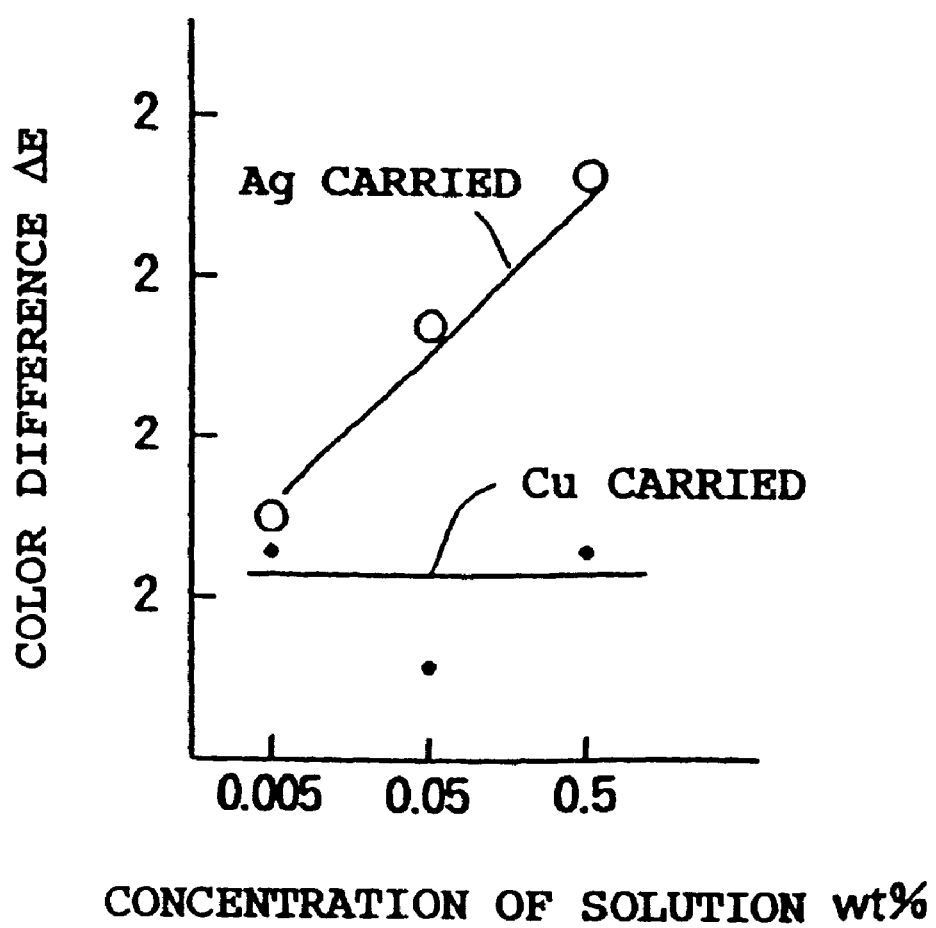
FIG. 56 is a graph showing the relationship between the concentration of an Ag and Cu solution and the color difference.

FIG. 56 shows the relationship between the concentrations of Ag, Cu in the solution and the color difference. It can be seen from FIG. 56 that the concentration of Cu is smaller than the concentration of Ag at any changes in the color difference and brightness, and any coloring is not prominent. Since Cu atoms having a valence of 0 and Cu atoms having a valence of 1 are detected in the system of Cu by an analysis such as ESCA (electron spectroscopy for chemical analysis), the difference in coloring appears to be caused by the Cu having a valence of 1.

INVENTIVE EXAMPLE 48

Figure 57:
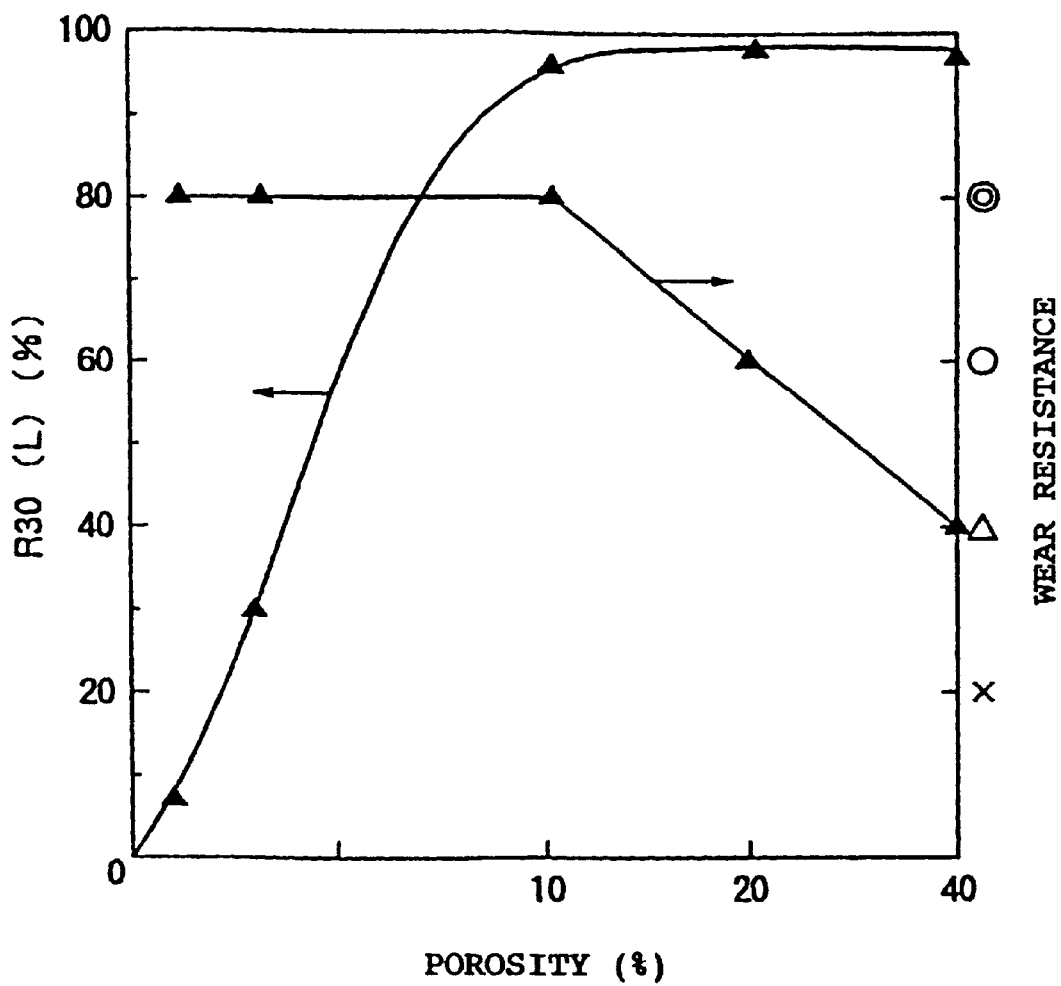
FIG. 57 is a graph showing the relationship between the porosity, the $R_{30}$, and the wear resistance.

A dispersion in ammonia of $TiO_2$ sol having an average diameter of 0.01 μm was coated on a square tile base with each side 15 cm long by spray coating and then fired at various temperatures, forming thin rutile $TiO_2$ films. Then, an aqueous solution of silver nitrate was coated on the thin rutile $TiO_2$ films by spray coating, and thereafter photoreduced by a light source comprising a 20 W BLB lamp for 10 seconds, thus producing specimens. The light source was spaced from the specimens by a distance of 10 cm. The specimens were evaluated for a porosity of the thin rutile $TiO_2$ film, a deodorizing capability $R_{30}$, and a wear resistance. The results of the evaluation are shown in FIG. 57.

The deodorizing capability was increased when the porosity was 10% or higher, and the wear resistance had a value of ○ or better when the porosity was 40% or lower.

The wear resistance was evaluated by rubbing the specimens with a plastic eraser and comparing changes in the appearance of the specimens. Evaluation indications are indicated below.

⊙: Not varied after 40 reciprocating rubbing movements against the specimens.

○: Damage was caused and the titanium oxide film was peeled off by 10 or more and less than 40 rubbing movements against the specimens.

Δ: Damage was caused and the titanium oxide film was peeled off by 5 or more and less than 10 rubbing movements against the specimens.

x: Damage was caused and the titanium oxide film was peeled off by less than 5 rubbing movements against the specimens.

INVENTIVE EXAMPLE 49

A dispersion in ammonia of $TiO_2$ sol having an average diameter of 0.01 μm was coated on a square alumina base with each side 10 cm long having a glazed layer thereon by spray coating and then fired at temperatures of 850° C. or higher and lower than 1000° C., forming thin rutile $TiO_2$ films. Then, an aqueous solution of silver nitrate was coated on the thin rutile $TiO_2$ films by spray coating, and thereafter photoreduced by a light source comprising a 20 W BLB lamp for 10 seconds, thus producing specimens. The light source was spaced from the specimens by a distance of 10 cm.

The specimens were evaluated for antibacterial, wear-resistant, peeling-resistant, stain-resistant, acid-resistant, and alkali-resistant capabilities, and Ag colorability.

With respect to the antibacterial capability, the multi-functional material was tested for its antibacterial ability against escherichia coli, strain: W3110. Specifically, 0.15 ml (1~50000 CFU) of the bacterial solution was dropped onto the outermost surface of the multi-functional material which had been sterilized with 70% ethanol, and a glass sheet (100×100 mm) was placed in intimate contact with this outermost surface of the base, thus preparing a specimen. After the specimen was irradiated with light from a white-light lamp with 3500 luxes for 30 minutes, the bacterial solution on the irradiated specimen and the bacterial solution on a specimen kept under a shielded condition were wiped with a sterile gauze, and collected in 10 ml of physiological saline. The survival rates of the bacteria were determined as indications for evaluation. Evaluation indications +++, ++, +, − are the same as those described above.

The peeling-resistant capability test is a test conducted under conditions stricter than those of the wear-resistant capability test, and uses a typewriter eraser (LION TYPE-WRITER ERASER 502) which applies greater shearing forces, rather than a plastic eraser. Specifically, the surface of each of the specimens was rubbed 20 times under equal forces by a typewriter eraser, and its damaged or scratched condition and a standard sample were visually compared with each other. Evaluation indications are given below.

⊙: Not changed at all.

○: A slight change was confirmed depending on the intensity of light applied to the specimen.

Δ: A slight change was confirmed.

x: A change was confirmed at sight.

The stain-resistant capability test is a test for checking a specimen for its resistance to staining. Specifically, the surface of each of the specimens was stained with an aqueous solution of 0.5% of methylene blue, dried and then cleaned with water, and visually observed for any stain. Evaluation indications are given below.

⊙: Stains were completely eliminated.

○: Stains slightly remained though their color cannot be recognized.

Δ: The light color of stains remained.

x: The dark color of stains remained.

The acid-resistant capability was evaluated by immersing each of the specimens in an aqueous solution of 10% of HCl for 120 hours and visually observing the thin rutile $TiO_2$ film disposed on the surface of the base and carrying Ag for any abnormal condition. Evaluation indications are given below.

⊙: Not varied.

○: Discolored very slightly.

Δ: Discolored slightly.

x: Discolored clearly.

The alkali-resistant capability was evaluated by immersing each of the specimens in an aqueous solution of 5% of NaOH for 120 hours and visually observing the thin rutile $TiO_2$ film disposed on the surface of the base and carrying Ag for any abnormal condition. Evaluation indications are given below.

⊙: Not varied.

○: Discolored very slightly.

Δ: Discolored slightly.

x: Discolored clearly.

The Ag colorability was evaluated by visually comparing each of the specimens with a specimen with no Ag added. Evaluation indications are given below.

⊙: Not colored.

○: Colored very slightly.

Δ: Colored slightly.

x: Colored brown.

The results of the evaluation for the above seven items are given in Table 24 below. The effect which the film thickness and the firing temperature have on the antibacterial capability is shown in Table 25.

TABLE 24

The relationship between the thickness and various characteristics of thin photocatalytic films

| Film thickness (μm) | Anti-bacteria (L) | Wear resistance | Peeling resistance | Stain resistance | Acid resistance | Alkali resistance | Ag colorability |
|---|---|---|---|---|---|---|---|
| 0.1 | +++ | ⊙ | ⊙ | ⊙ | ⊙ | ⊙ | ⊙ |
| 0.2 | +++ | ⊙ | ⊙ | ⊙ | ⊙ | ⊙ | ⊙ |
| 0.3 | +++ | ⊙ | ⊙ | ⊙ | ⊙ | ⊙ | ⊙ |
| 0.4 | +++ | ⊙ | ⊙ | ⊙ | ⊙ | ⊙ | ⊙ |
| 0.5 | +++ | ⊙ | ○ | ○ | ○ | ○ | ○ |
| 0.6 | +++ | ⊙ | ○ | ○ | ○ | ○ | ○ |
| 0.7 | +++ | ⊙ | ○ | ○ | ○ | ○ | ○ |
| 0.8 | +++ | ⊙ | ○ | ○ | ○ | ○ | ○ |
| 0.9 | +++ | ⊙ | ○ | ○ | ○ | ○ | ○ |
| 1.0 | +++ | ⊙ | x | x | ○ | ○ | x |
| No glaze (0.4) | | Δ | | | | | |

TABLE 25

The effect which the film thickness and the firing temperature have on the antibacterial capability of thin photocatalytic films

| Film thickness | Temperature | | | | | |
|---|---|---|---|---|---|---|
| | 800° C. | 900° C. | 920° C. | 940° C. | 960° C. | 980° C. |
| 0.1 μm | | +++ | | ++ | | ++ |
| 0.2 μm | | | | +++ | | ++ |
| 0.3 μm | +++ | +++ | | +++ | ++ | |
| 0.4 μm | | +++ | +++ | | +++ | |
| 0.5 μm | | | +++ | +++ | +++ | ++ |
| 0.6 μm | +++ | | +++ | | +++ | |
| 0.7 μm | +++ | | +++ | +++ | | +++ |
| 0.8 μm | | +++ | | | +++ | +++ |
| 0.9 μm | +++ | | +++ | +++ | | |
| 1.0 μm | | | | +++ | | |

The antibacterial capability of all the specimens had a good value of +++ if the thickness of the thin photocatalytic film was in the range of from 0.1 μm to 1.0 μm insofar as the firing temperature was appropriate. However, as shown in Table 25, as the film thickness was reduced to and below 0.2 μm, the antibacterial capability of the specimens fired at a high temperature of 980° C. had a slightly reduced value of ++. This is because the glazed layer was softened, permitting the thin photocatalytic film to be locally embedded in the glazed layer. Though Ag has an antibacterial capability itself, the tendency of the antibacterial capability to depend on the firing temperature indicates that the antibacterial capability of the composite material produced according to the method of the present invention is related to the characteristics of the thin rutile $TiO_2$ film, other than the antibacterial capability of Ag, because Ag was carried after the assembly was fired.

It is considered that the embedding of the thin photocatalytic film into the glazed layer as it is softened occurs to a certain extent in all the specimens. In this example, however, it was confirmed that the thin photocatalytic film could be maintained on the outermost surface layer of the glazed layer if the thickness of the thin photocatalytic film was at least 0.1 μm insofar as the firing temperature was appropriate.

The wear-resistant capability of all the specimens had a good value of ⊙ if the thickness of the thin photocatalytic film produced according to this example was in the range of from 0.1 μm to 1.0 μm. The wear-resistant capability is much better than that of a specimen produced with no glaze interposed, which had a value of Δ. This is because, with the glaze being interposed, when the assembly was fired, the glaze was softened, and the lower layer of the thin photocatalytic film is allowed to be embedded in the glazed layer.

The peeling-resistant capability had a value of ⊙ when the thickness of the thin photocatalytic film was in the range of from 0.1 μm to 0.4 μm, a value of ○ when the thickness of the thin photocatalytic film was in the range of from 0.5 μm to 0.9 μm, and a value of x when the thickness of the thin photocatalytic film was 1.0 μm. It was observed that the peeling-resistant capability tended to be reduced as the thickness of the thin photocatalytic film increased because the thin photocatalytic film was apt to be peeled off as the ratio of the thickness of the film portion embedded in the glaze to the film thickness increased. Some specimens which did not fail in the wear-resistant capability test failed in the peeling-resistant capability test due to different shearing forces.

The stain-resistant capability had a value of ⊙ when the thickness of the thin photocatalytic film was in the range of from 0.1 μm to 0.4 μm, a value of ○ when the thickness of the thin photocatalytic film was in the range of from 0.5 μm to 0.9 μm, and a value of x when the thickness of the thin photocatalytic film was 1.0 μm. It was observed that the stain-resistant capability tended to be reduced as the thickness of the thin photocatalytic film increased.

The acid-resistant capability of all the specimens had a good value if the thickness of the thin photocatalytic film produced according to this example was in the range of from 0.1 μm to 1.0 μm. However, since acid-resistant capability had a value of ○ when the thickness of the thin photocatalytic film was in the range of from 0.5 μm to 1 μm, and a value of ⊙ when the thickness of the thin photocatalytic film was in the range of from 0.1 μm to 0.4 μm, the acid-resistant capability exhibited a better value as the film thickness is smaller.

The alkali-resistant capability of all the specimens had a good value if the thickness of the thin photocatalytic film produced according to this example was in the range of from 0.1 μm to 1.0 μm. However, since acid-resistant capability had a value of ○ when the thickness of the thin photocatalytic film was in the range of from 0.5 μm to 1 μm, and a value of ⊙ when the thickness of the thin photocatalytic film was in the range of from 0.1 μm to 0.4 μm, the alkali-resistant capability exhibited a better value as the film thickness is smaller.

The Ag colorability had a value of ⊙ when the thickness of the thin photocatalytic film was in the range of from 0.1 μm to 0.4 μm, a value of ○ when the thickness of the thin photocatalytic film was in the range of from 0.5 μm to 0.9 μm, and a value of x when the thickness of the thin photocatalytic film was of 1.0 μm. It was observed that the Ag colorability tended to be reduced as the thickness of the thin photocatalytic film increased. This tendency is the same as the tendency of the stain-resistant capability.

It can be seen from the above tests for the seven items that the thickness of the thin photocatalytic film should be 0.1 μm or greater and 0.9 μm or smaller, more preferably 0.1 μm or greater and 0.4 μm or smaller. It was recognized that the wear-resistant capability increased when the thin photocatalytic film was fixed to the base through the glaze.

Design characteristics vary depending on the film thickness. Specifically, when the film thickness is 0.2 μm or greater and less than 0.4 μm, an iridescent striped pattern is produced due to the interference between visible light and the thin photocatalytic film, giving a special appearance impression. When the film thickness is less than 0.2 μm or 0.4 μm or greater and 0.9 μm or smaller, no iridescent striped pattern is produced, and the appearance resulting from the color of the base or the color and pattern of the glaze, or their combination is utilized as it is.

INVENTIVE EXAMPLE 50

A dispersion in ammonia of $TiO_2$ sol having an average diameter of 0.01 μm was coated on a square tile base with each side 15 cm long by spray coating and then fired at 900° C., forming a thin rutile $TiO_2$ film having a thickness of 0.8 μm. Then, aqueous solutions of copper acetate which had respective solution concentrations of 0.2 weight %, 0.5 weight %, and 1 weight % were coated in varying amounts on the thin rutile $TiO_2$ film by spray coating, and thereafter photoreduced by a light source comprising a 20 W BLB lamp for 30 seconds, thus producing specimens. The light source was spaced from the specimens by a distance of 10 cm. The specimens were evaluated for an antibacterial capability. The amounts of carried Cu were determined by collecting the remaining aqueous solutions after being irradiated and calculating the difference between the initial amounts of copper and the collected amounts of copper.

Figure 58:
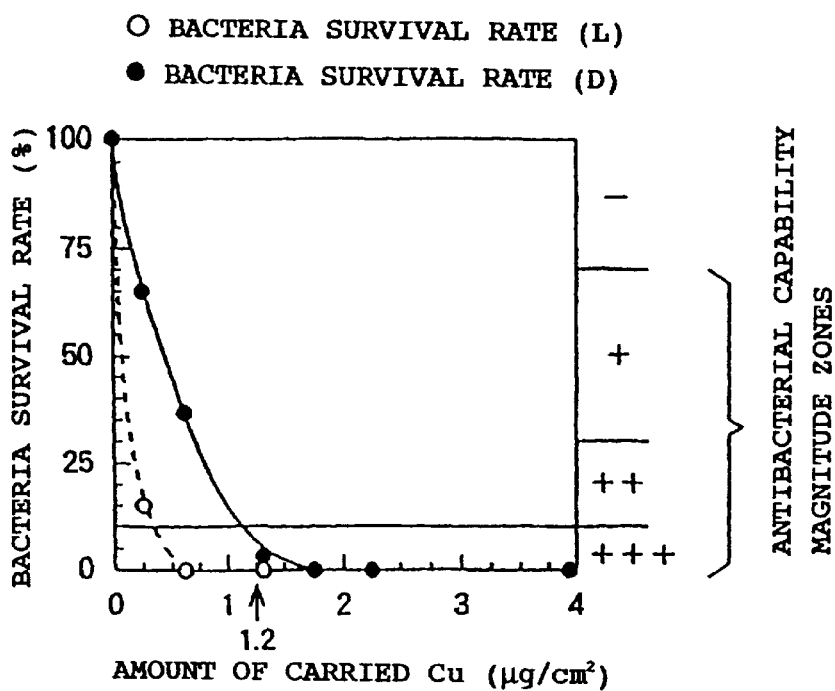
FIG. 58 is a graph showing the relationship between the amount of copper that was carried and the bacteria survival ratios.

FIG. 58 shows the relationship between the amount of carried Cu and the bacteria survival ratios upon irradiation (L) and non-irradiation (D). Study of FIG. 58 reveals the following:

First, the antibacterial capability increased with carried Cu. Next, the antibacterial capability increased with a smaller amount of carried Cu upon irradiation (L) than upon non-irradiation (D). This is because the thin rutile $TiO_2$ film whose photoactivity was recovered by carried Cu performs a photocatalytic action upon irradiation (L). It can be seen from FIG. 58 that the antibacterial capability upon irradiation increased to a value ++ by adding 0.12 $\mu g/cm^2$ or more of Cu, and to a value of +++ by adding 0.3 $\mu g/cm^2$ or more of Cu.

It is known that Cu itself has an antibacterial action. Therefore, even upon non-irradiation, the antibacterial capability increases when the amount of carried Cu is increased. Upon non-irradiation, the antibacterial capability increased to a value of ++ by adding 0.7 $\mu g/cm^2$ or more of Cu, and to a value of +++ by adding 1.2 $\mu g/cm^2$ or more of Cu.

Consequently, the good antibacterial capability upon irradiation (L) with the amount of carried Cu being 0.12 $\mu g/cm^2$ or more and less than 0.7 $\mu g/cm^2$ at the ++ level and being 0.3 $\mu g/cu^2$ or more and less than 1.2 $\mu g/cm^2$ at the +++ level is considered to be a special effect resulting from the combination of Cu and the thin rutile $TiO_2$ film. The presence of the thin rutile $TiO_2$ film is effective to reduce the amount of carried Cu. Being able to reduce the amount of carried Cu is an important nature to be relied upon especially when the composite material is to be used with water. Therefore, when the composite material is used in an environment in which Cu is eluted into water, e.g., when the composite material is used in a basin or a bowl of sanitary ware, the amount of eluted Cu can be reduced.

The same advantages of Cu can be achieved when Cu is incorporated in the form of $Cu_2$, because Cu having a valence of 1 is detected on the surface upon photoreduction by ESCA and a photoactivity recovering effect is observed even though the conversion $Cu_2^+ \rightarrow Cu^+$ is partly carried out.

A good antibacterial capability can be accomplished when the amount of carried Cu is 0.7 $\mu g/cm^2$ or more, and more preferably 1.2 $\mu g/cm^2$ or more, irrespective of whether the assembly is irradiated with light or not.

Figure 59:
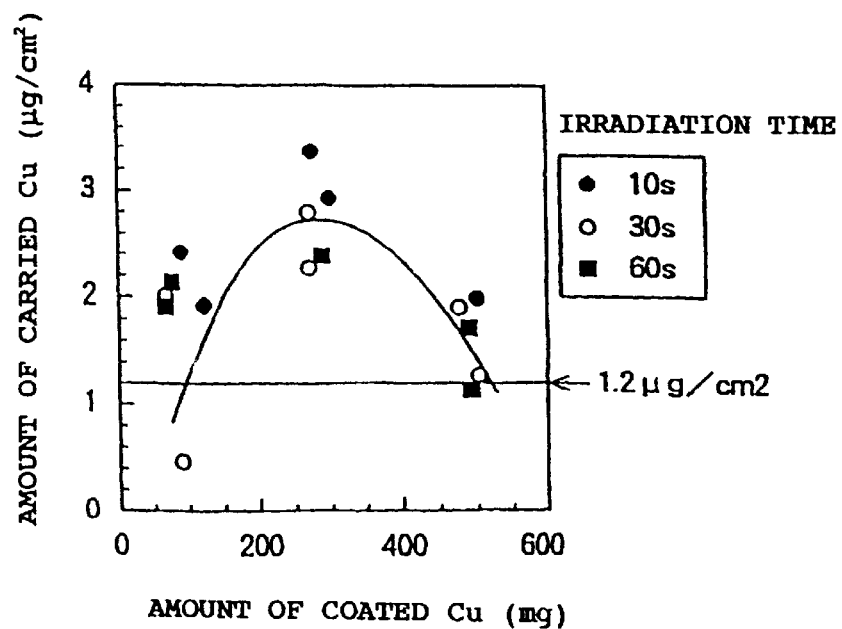
FIG. 59 is a graph showing the relationship between the amount of copper that was coated and the amount of copper that was carried.

FIG. 59 shows the relationship between the amount of Cu that was coated and the amount of Cu that was carried when the concentration of Cu in the solution was 1 wt %. It can be seen from FIG. 59 that the amount of carried Cu did not increase simply by increasing the amount of coated Cu, and the amount of coated Cu may be 0.2 $mg/cm^2$ or more and 2.7 $mg/cm^2$ and less in order to increase the amount of carried Cu to 0.7 $\mu g/cm^2$ or more, and the amount of coated Cu may be 0.3 $mg/cm^2$ or more and 2.4 $mg/cm^2$ and less in order to increase the amount of carried Cu to 1.2 $\mu g/cm^2$ or more.

INVENTIVE EXAMPLE 51

A dispersion in ammonia of $TiO_2$ sol having an average diameter of 0.01 $\mu$m was coated on a square tile base with each side 15 cm long by spray coating and then fired at 900° C., forming a thin rutile $TiO_2$ film having a thickness of 0.8 $\mu$m. Then, aqueous solutions of silver nitrate which had respective solution concentrations of 0.2 weight %, 0.5 weight %, and 1 weight % were coated in varying amounts on the thin rutile $TiO_2$ film by spray coating, and thereafter photoreduced by a light source comprising a 20 W BLB lamp for 30 seconds, thus producing specimens. The light source was spaced from the specimens by a distance of 10 cm. The specimens were evaluated for an antibacterial capability. The amounts of carried Ag were determined by collecting the remaining aqueous solutions after being irradiated and calculating the difference between the initial amounts of silver and the collected amounts of silver.

Figure 60:
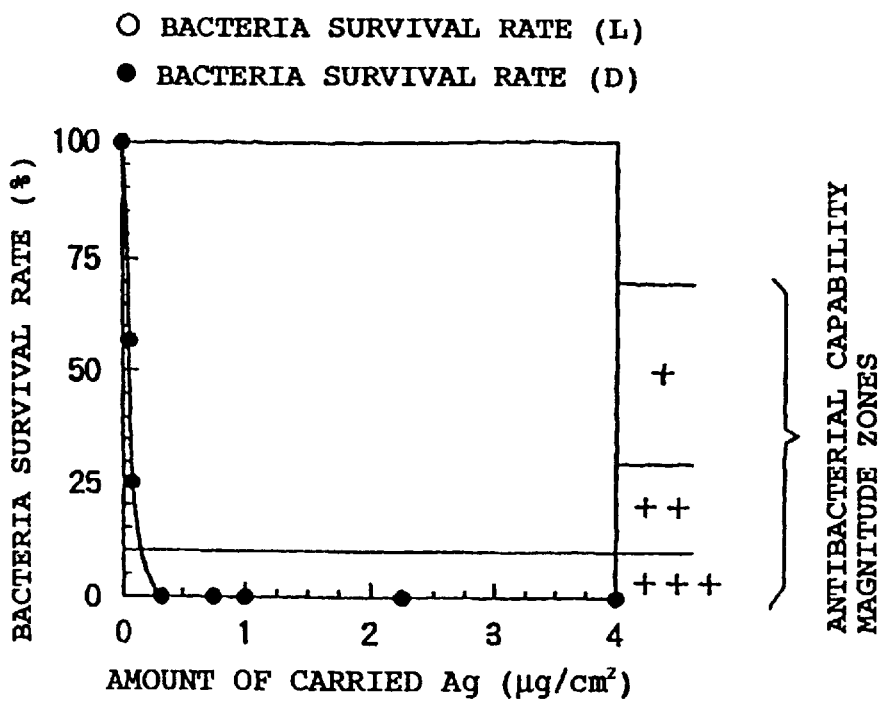
FIG. 60 is a graph showing the relationship between the amount of silver that was carried and the bacteria survival rate.

FIG. 60 shows the relationship between the amount of carried Ag and the bacteria survival ratios upon irradiation (L) and non-irradiation (D). Study of FIG. 60 reveals the following:

Unlike the example using Cu, the curves of the bacteria survival ratios upon irradiation (L) and non-irradiation (D) were superimposed one on the other. This is not because the example using Ag produced results different from those of the example using Cu, but because the antibacterial capability of Ag is much greater than the antibacterial capability of Cu, and is achieved with a very small amount of Ag, with the result that the difference between required amounts of carried Ag upon irradiation (L) and non-irradiation (D) falls in an experimental error range.

It can be seen from FIG. 60 that a good antibacterial capability can be accomplished when the amount of carried Ag is 0.05 $\mu g/cm^2$ or more, and more preferably 0.1 $\mu g/cm^2$ or more, irrespective of whether the assembly is irradiated with light or not.

Figure 61:
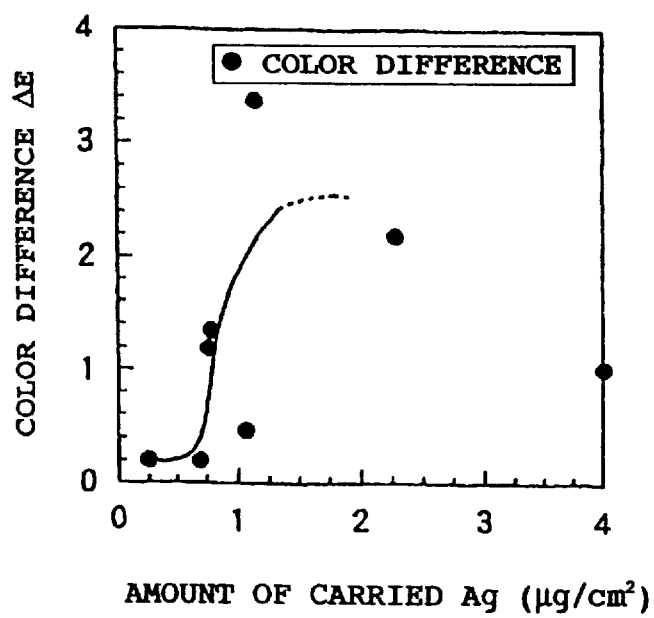
FIG. 61 is a graph showing the relationship between the amount of silver that was carried and the color difference.

FIG. 61 shows the relationship between the amount of carried silver and the color difference with a specimen with no silver carried. When the amount of carried silver exceeded 1 $\mu g/cm^2$, the color difference sharply increased in excess of 2. Generally, the difference between colors stands out when the color difference reaches 2 or more. When silver is attached, the color changes from brown to black, which is not preferable as the appearance becomes unsightly. Therefore, it is preferable to keep the color difference at 2 or less, and to this end, the amount of carried silver may be reduced to 1 $\mu g/cm^2$ or smaller. The color difference was measured by a spectral color difference meter (manufactured by Tokyo Denshoku K. K.).

It has been disclosed in the above example to cover active sites of fine particles having a photocatalytic activity with fine metal particles of silver, copper, platinum, palladium, gold, nickel, iron, cobalt, zinc, or the like in order to prevent the activity from being lowered by a surface-treating agent, high-molecular substances, dust particles which would otherwise cover the active sites of the photocatalyst or to recover the activity. Since these metals are colored metals, if any of these metals were coated in a large amount, a certain color would be applied to the surface of the base, and designs of the base, such as the color, pattern, etc. thereof, would be impaired.

A decolorizing process for preventing designs of the base, such as the color, pattern, etc. thereof, from being impaired while maintaining a high level of photocatalytic activity will be described below.

The decolorizing process is basically composed of two steps, i.e., the step of fixing fine metal particles to photocatalytic particles, and the step of reacting the fine metal particles with an aqueous solution or a gas to produce a colorless or white salt on at least the surfaces of the fine metal particles, for thereby preparing a catalyst containing fine metal particles.

These two steps may be carried out in any order, and either one of the steps may be carried out first. Specifically, after colored fine metal particles are fixed to photocatalytic particles, the fine metal particles may be reacted with an aqueous solution or a gas to produce a colorless or white salt on at least the surfaces of the fine metal particles, or after colored fine metal particles are reacted with an aqueous solution or a gas to produce a colorless or white salt on at least the surfaces of the fine metal particles, the colored fine metal particles may be fixed to photocatalytic particles.

Alternatively, photocatalytic particles and colored fine metal particles may be mixed with each other, after which the mixture may be fixed to a base. This process may be composed, for example, of the successive steps of mixing photocatalytic particles and colored fine metal particles with each other, coating the mixture solution to a base, firing the assembly to fix the mixture to the base, and reacting the assembly with a gas to produce a colorless or white salt on at least the surfaces of the fine metal particles.

The steps of firing the assembly to fix the mixture to the base and reacting the assembly with a gas to produce a colorless or white salt on at least the surfaces of the fine metal particles may be carried out simultaneously.

The colored fine metal particles comprise fine metal particles of a metal which has a small ionizing tendency and tends to be reduced itself, such as silver, copper, platinum, palladium, gold, nickel, iron, cobalt, zinc, or the like.

If a colorless or white salt is produced by reacting the colored fine metal particles with an aqueous solution, or if a catalyst containing fine metal particles is used in a liquid, the produced colorless or white salt should be hardly soluble or insoluble.

If a catalyst containing fine metal particles is fixed to a base for use, then photocatalytic particles may be fixed to the base and then a catalyst containing fine metal particles may be prepared, or a catalyst containing fine metal particles may be prepared and thereafter fixed to the base.

If photocatalytic particles are fixed to a base and then a catalyst containing fine metal particles is prepared, then the process should be composed of the successive steps of forming a photocatalytic particle layer on the base, fixing colored fine metal particles to the photocatalytic particle layer, and producing a colorless or white salt in covering relationship to the colored fine metal particles.

The step of producing a colorless or white salt in covering relationship to the colored fine metal particles may be carried out, for example, by either bringing, into contact with the fine metal particles, a solution which reacts with the colored fine metal particles to produce a colorless or white salt on at least the surfaces of the fine metal particles, or bringing, into contact with the fine metal particles, a reactive gas which reacts with the colored fine metal particles to produce a colorless or white salt on at least the surfaces of the fine metal particles.

The white or colorless salt of the colored fine metal particles should preferably be a hardly soluble or insoluble salt because it can easily be formed on at least the surfaces of the fine metal particles by a reaction with the aqueous solution and can stably be used in water-rich environments.

The white or colorless salt of the colored fine metal particles may be, for example, silver chloride, silver bromide, silver iodide, silver oxalate, silver thiosulfate, silver cyanide, silver rhodanide, cuprous chloride, cuprous bromide, cuprous cyanide, cuprous rhodanide, cuprous oxide, zinc phosphate, zinc oxalate, zinc cyanide, palladium cyanide, zinc sulfide, zinc carbonate, ferrous carbonate, zinc oxide, or the like. The solution capable of producing the salt may be a solution of potassium chloride, a solution of sodium chloride, a solution of ammonium chloride, a solution of ferric chloride, or the like if the salt is silver chloride, or a solution of potassium iodide, a solution of sodium iodide, a solution of ferric iodide, hydrogen peroxide water, ozone water, or the like. However, the solution capable of producing the salt is not limited to any of these solutions, but may be any of various solutions of soluble salt containing various negative salt ions.

The reactive gas capable of producing the salt may be any of various gases containing various negative salt ion elements. For example, if the salt is an oxide such as zinc oxide, cuprous oxide, or the like, then the oxide may be heated in the atmosphere, oxygen, or water vapor or reacted with an oxidizing agent such as $O_3$ or the like thereby to oxidize the surfaces of the fine metal particles to form an oxide layer thereon.

Specific examples will be described below.

INVENTIVE EXAMPLE 52

A sol of titanium oxide having an average diameter of 0.01 μm was coated on the surface of a square tile base with each side 15 cm long, and heated at 900° C., producing a specimen with a thin rutile titanium oxide film. The specimen produced at this stage is referred to as a comparative specimen 1. An aqueous solution of silver nitrate was coated on the comparative specimen 1 by spray coating, and irradiated by a light source comprising a 20 W BLB lamp for 10 minutes, fixing silver to the thin rutile titanium oxide film. The amount of carried silver was 1.2 $\mu g/cm^2$, and the carried silver was colored brown. The specimen produced at this stage is referred to as a comparative specimen 2.

Thereafter, 0.1 mol/liter of an aqueous solution of potassium iodide was coated on the comparative specimen 2 at a rate of 0.1 $cc/cm^2$ and reacted therewith. As a result, the color of the specimen surface changed to yellowish white because of a silver iodide layer formed thereon. The specimen produced at this stage is referred to as an inventive specimen 1.

These specimens were evaluated for color difference, photoactivity, deodorizing and antibacterial capabilities.

Figure 62:
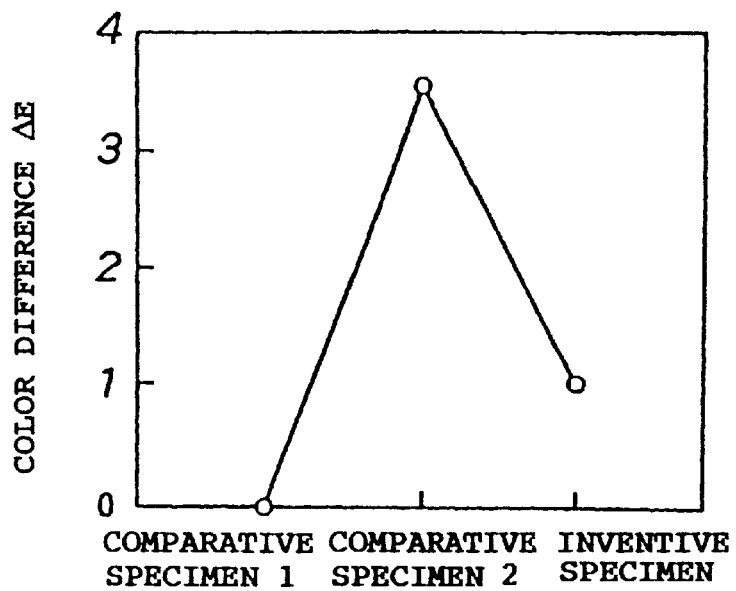
FIG. 62 is a graph showing the effect of a decolorizing process using an aqueous solution of KI.

The color difference was measured by a spectral color difference meter (manufactured by Tokyo Denshoku K. K.) with the comparative specimen 1 used as a standard specimen. The results are shown in FIG. 62. The comparative specimen 2 had a color difference of 3.5, whereas the inventive specimen 1 had a color difference of 1 because it was treated with the aqueous solution of potassium iodide. The degree of coloring of the inventive specimen 1 was thus reduced.

Figure 63:
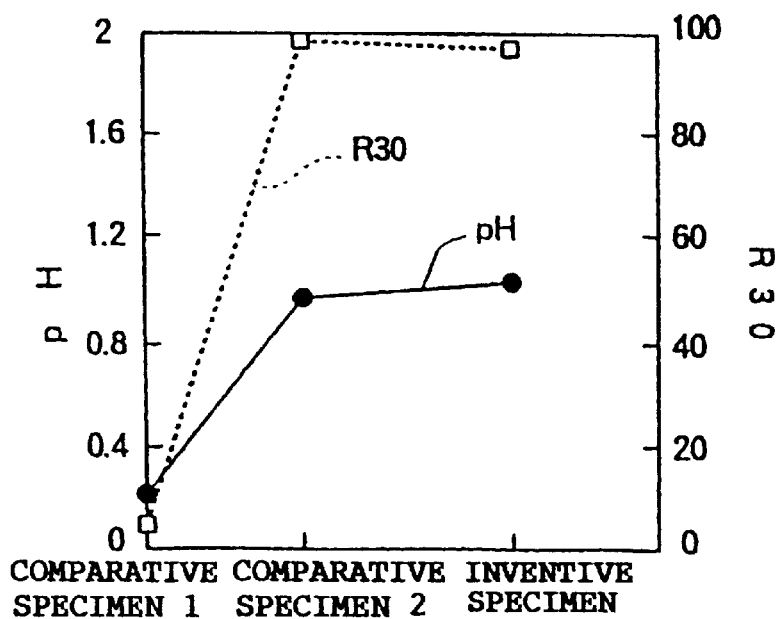
FIG. 63 is a graph showing the relationship between the pH change in the aqueous solution of KI and the change of the odor removal ratio $R_{30}$ after the decolorizing process using the aqueous solution of KI.

The photoactivity was evaluated by a ΔpH test. The results of the evaluation of the photoactivity and the deodorizing capability are shown in FIG. 63. A comparison of the comparative specimens 1, 2 indicates that because silver was carried, the comparative specimen 2 recovered the photoactivity and had good values for ΔpH and $R_{30}$ (L). A comparison of the inventive specimen 1 and the comparative specimen 2 shows that they have substantially the same values for ΔpH and $R_{30}$ (L), their photoactivity remained unchanged even after the decolorizing process and maintained good characteristics.

With respect to the antibacterial capability, each of the specimens was tested for its antibacterial ability against escherichia coli, strain: W3110. Specifically, 0.15 ml ($2\times10^4$ CFU) of the bacterial solution was dropped onto the outermost surface of the specimen which had been sterilized with 70% ethanol, and a glass sheet (100×100 mm) was placed in intimate contact with the outermost surface of the base, thus preparing a specimen. After the specimen was irradiated with light from a white-light lamp with 3500 luxes for a given period of time, the bacterial solution on the irradiated specimen (L) and the bacterial solution on a specimen (D) kept under a shielded condition were wiped with a sterile gauze, and collected in 10 ml of physiological saline. The number of live bacteria was checked for evaluation.

Figure 64:
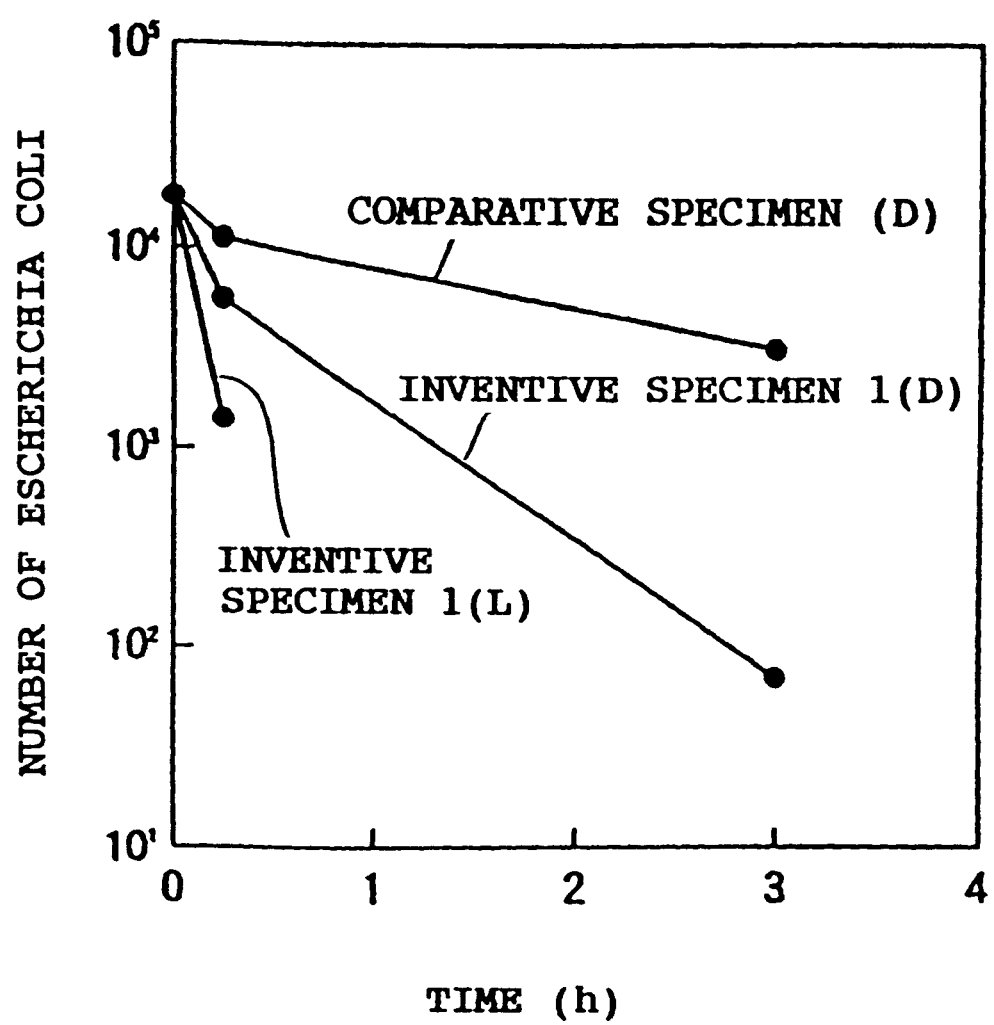
FIG. 64 is a graph showing a comparison of antibacterial capabilities.

The results of the evaluation of the antibacterial capability are shown in FIG. 64. Since the comparative example 1 carried no silver, no antibacterial capability was confirmed upon non-irradiation (D). However, the inventive specimen 1 exhibited an antibacterial capability upon non-irradiation (D) even through the silver surface was changed to a compound by the decolorizing process. Upon irradiation (L), the inventive specimen 1 exhibited a stronger antibacterial capability, indicating the recovery of the photocatalytic activity of the thin rutile titanium oxide film as well as the antibacterial activity of silver.

INVENTIVE EXAMPLE 53

After a glaze was coated on a square blank for forming sanitary ware, with each side 15 cm long, the blank was fired at a temperature ranging from 1100 to 1200° C. Thereafter, a sol of anatase titanium oxide having an average particle diameter of 0.01 μm was coated on the glazed blank, and fired at a temperature ranging from 900 to 1000° C., fixing a thin rutile titanium oxide film on the base of the blank.

Thereafter, an aqueous solution of silver nitrate was coated on the thin rutile titanium oxide film, and irradiated with ultraviolet rays to separate out silver on the thin titanium oxide film. Then, an aqueous solution of ferric chloride was coated on the silver layer, and irradiated with ultraviolet rays, whereupon the specimen was decolorized, with the color difference reduced from 3 to 0.3. The antibacterial capability was tested by bringing both specimens which were treated by irradiation and non-irradiation into contact with bacteria for 30 minutes, and exhibited a good result as it was confirmed that only less than 10% of the original bacteria survived.

INVENTIVE EXAMPLE 54

After a glaze was coated on a square blank for forming sanitary ware, with each side 15 cm long, the blank was fired at a temperature ranging from 1100 to 1200° C. Thereafter, a sol of anatase titanium oxide having an average particle diameter of 0.01 μm was coated on the glazed blank, and fired at a temperature ranging from 900 to 1000° C., fixing a thin rutile titanium oxide film on the base of the blank.

Thereafter, an aqueous solution of silver nitrate was coated on the thin rutile titanium oxide film, and irradiated with ultraviolet rays to separate out silver on the thin titanium oxide film. Then, the specimen was decolorized by being left to stand for about two hours in a desiccator with an ozonizer in which the concentration of ozone was 10 ppm. The antibacterial capability of the specimen exhibited a good result as it was confirmed that only 10% of the original bacteria brought into contact with the specimen survived.

INVENTIVE EXAMPLE 55

After a glaze was coated on a square blank for forming sanitary ware, with each side 15 cm long, the blank was fired at a temperature ranging from 1100 to 1200° C. Thereafter, a mixture of an aqueous solution of silver nitrate and a sol of anatase titanium oxide having an average particle diameter of 0.01 μm and dispersed in an aqueous solution of nitric acid was coated on the glazed blank, and fired, fixing a thin titanium oxide film on the base of the blank. At this time, when the specimen was fired at a temperature less than 700° C., the specimen was colored brown, and when the specimen was fired at a temperature of 700° C. or higher, the specimen was decolorized. This is because the silver surface reacted with a component in the atmosphere. A specimen which was fired at 850° C. to fix a thin anatase titanium oxide film to the base of the blank was measured for its antibacterial capability. The antibacterial capability was tested by bringing both specimens which were treated by irradiation and non-irradiation into contact with bacteria for three hours, and exhibited a good result as it was confirmed that only less than 10% of the original bacteria survived.

INVENTIVE EXAMPLE 56

After a glaze was coated on a square blank for forming sanitary ware, with each side 15 cm long, the blank was fired at a temperature ranging from 1100 to 1200° C. Thereafter, a sol of anatase titanium oxide having an average particle diameter of 0.01 μm was coated on the glazed blank, and fired at a temperature ranging from 900 to 1000° C., fixing a thin rutile titanium oxide film on the base of the blank.

Thereafter, an aqueous solution of silver nitrate was coated on the thin rutile titanium oxide film, and irradiated with ultraviolet rays to separate out silver on the thin titanium oxide film. When hydrogen peroxide water was coated on the silver layer, the specimen was decolorized. The antibacterial capability was tested by bringing both specimens which were treated by irradiation and non-irradiation into contact with bacteria for three hours, and exhibited a good result as it was confirmed that only less than 10% of the original bacteria survived.

A process of mixing rutile $TiO_2$ particles and tin oxide with each other to increase the density and adhesion of a thin photocatalytic film and improve its photoactivity will be described below.

The thin photocatalytic film may be formed by either one of the following two processes:

According to one process, a sol of $TiO_2$ and a sol of tin oxide are mixed with each other, and the mixture is coated on the surface of a base and fired.

The sol of $TiO_2$ and the sol of tin oxide are mixed with each other in a basic aqueous solution because both are well dispersed in an electrochemically alkaline solution. The basic aqueous solution may be ammonia or a hydroxide including a hydroxide of an alkaline metal or an alkaline earth metal. Particularly preferable is ammonia because it will not produce a metal contaminant after being heated. To the dispersion, there may be added a dispersant of organic acid or phosphoric acid, a surface-treating agent, and a surface-active agent.

Processes of coating the mixture of the $TiO_2$ sol and the sol of tin oxide include spray coating, dip coating, rolling coating, spin coating, CVD, electron beam evaporation, and sputtering. The mixture of the $TiO_2$ sol and the sol of tin oxide may be coated by any of these processes or any of other processes. The spray coating, dip coating, and roll coating processes are advantageous as they require no special equipment and can form coatings inexpensively as compared with CVD, electron beam evaporation, sputtering, or the like.

After being coated, the film may be dried before it is fired. The film may be dried at a temperature ranging from room temperature to 110° C.

The film is fired at a temperature high enough to generate a rutile structure under the above condition. The temperature is 830° C. or higher under normal pressure in the presence of tin oxide.

It is not necessary to form a solid solution of $TiO_2$ and tin oxide because formation of a solid solution of $TiO_2$ and tin oxide requires them to be held at a high temperature for a long period of time, resulting in a poor production efficiency.

According to the other process, after a thin rutile $TiO_2$ film is formed, a sol of tin oxide is added thereto and then fired.

In this process, a starting material including Ti is first coated on a base. The starting material may be a $TiO_2$ sol, a Ti alkoxide, a sulfate of Ti, a chloride solution of Ti, or the like. If a $TiO_2$ sol is employed, then since $TiO_2$ has an isoelectric point of pH 6.5 and hence is substantially neutral, it can easily be coated uniformly on the base in the form of an aqueous solution in which it is dispersed by an acid or alkali. If the base is of metal, then an alkaline dispersion is preferable from the standpoint of erosion resistance. If the base is of pottery, tile, ceramic, or the like, then either an acid dispersion or an alkaline dispersion may be employed. The acid may be a nitric acid, a sulfuric acid, a hydrochloric acid, an acetic acid, a phosphoric acid, an organic acid, or the like. The alkaline aqueous solution may be ammonia or a hydroxide including a hydroxide of an alkaline metal or an alkaline earth metal. Particularly preferable is ammonia as it will not produce a metal contaminant after being heated. To the dispersion, there may be added a dispersant of organic acid or phosphoric acid, a surface-treating agent, and a surface-active agent. The average particle diameter of the $TiO_2$ sol of the starting material should be 0.05 μm or smaller, and preferably be 0.01 μm or smaller. Since smaller particle diameters allow an initial sintering phase to occur at a lower temperature, a thin photocatalytic film having an excellent peel strength at a low temperature can be produced. Processes of coating the starting material include spray coating, dip coating, rolling coating, spin coating, CVD, electron beam evaporation, and sputtering. The starting material may be coated by any of these processes or any of other processes. The spray coating, dip coating, and roll coating processes are advantageous as they require no special equipment and can form coatings inexpensively as compared with CVD, electron beam evaporation, sputtering, or the like.

After being coated, the film may be dried before it is fired. The film may be dried at a temperature ranging from room temperature to 110° C.

Then, the coated composite material is fired at a temperature high enough to generate a rutile structure. The temperature is 900° C. or higher under normal pressure.

Thereafter, a starting material serving as a source of Sn is coated on the composite material which has been cooled and solidified, and then fired. The starting material as a source of Sn may be a sol of tin oxide. The sol of tin oxide may be in a basic aqueous solution because the sol of tin oxide is stable in an electrochemically alkaline solution. The basic aqueous solution may be ammonia or a hydroxide including a hydroxide of an alkaline metal or an alkaline earth metal. Particularly preferable is ammonia because it will not produce a metal contaminant after being heated. To the dispersion, there may be added a dispersant of organic acid or phosphoric acid, a surface-treating agent, and a surface-active agent. Processes of coating the starting material include spray coating, dip coating, rolling coating, spin coating, CVD, electron beam evaporation, and sputtering. The starting material may be coated by any of these processes or any of other processes. The spray coating, dip coating, and roll coating processes are advantageous as they require no special equipment and can form coatings inexpensively as compared with CVD, electron beam evaporation, sputtering, or the like. After being coated, the film may be dried before it is fired. The film may be dried at a temperature ranging from room temperature to 110° C. The film is fired at a temperature high enough to vaporize an added organic component from tin oxide. The temperature is 300° C. or higher under normal pressure. It is not necessary to form a solid solution of $TiO_2$ and tin oxide because formation of a solid solution of $TiO_2$ and tin oxide requires them to be held at a high temperature for a long period of time, resulting in a poor production efficiency.

A thin film composed of a mixture of rutile $TiO_2$ and tin oxide having a crystal diameter of less than 0.01 $\mu$m may be formed on the surface of the base, and at least one metal of Cu, Ag, Pt, Fe, Co, Ni, Pd, and $Cu_2O$ may be fixed to the thin layer.

These metals have an electron-capturing effect to increase the photocatalytic activity of the thin film composed of a mixture of rutile $TiO_2$ and tin oxide having a crystal diameter of less than 0.01 $\mu$m.

Since the metals of Cu, Ag are antibacterial themselves and can be given a non-irradiated activity with respect to an antibacterial capability, it is possible to make the composite material antibacterial even if not irradiated with light. At least one metal of Cu, Ag, Pt, Fe, Co, Ni, Pd, and $Cu_2O$ is fixed by coating an aqueous solution of salt of one of the metals and then photoreducing or heating the coated salt.

The aqueous solution of metal salt may basically contain the metal as positive ions, and may specifically be an aqueous solution of copper acetate, silver nitrate, copper carbonate, copper sulfate, cuprous chloride, cupric chloride, chloroplatinic acid, palladium chloride, nickel chloride; cobalt chloride, ferrous chloride, or ferric chloride.

The aqueous solution of metal salt may be coated by spray coating or dip coating. However, the spray coating process is preferable because the amount of solution used is small, the aqueous solution can be coated uniformly, the film thickness can easily be controlled, and it is possible not to coat the reverse side of the base.

If photoreduction is relied on, the coated aqueous solution of metal salt is irradiated with light containing ultraviolet rays to reduce metal ions for thereby fixing at least one metal of Cu, Ag, Pt, Fe, Co, Ni, Pd, and $Cu_2O$ to the thin film composed of a mixture of rutile $TiO_2$ and tin oxide having a crystal diameter of less than 0.01 $\mu$m.

The light source for radiating light containing ultraviolet rays may be any light source which is capable of radiating light containing ultraviolet rays, and may specifically be an ultraviolet lamp, a BLB lamp, a xenon lamp, a mercury lamp, or a fluorescent lamp. It is preferable to position the specimen such that the light containing ultraviolet rays will perpendicularly be applied to the surface to be irradiated because the irradiation efficiency is the greatest. The specimen should preferably be spaced from the light source by a distance ranging from 1 cm to 30 cm. If the distance between the specimen and the light source were too small, then light would not be applied with uniform illuminance to the entire surface of the specimen, and the metal would irregularly be attached. If the distance between the specimen and the light source were too large, then since the illuminance of the applied light is in inverse proportion to the square of the distance, the metal would not firmly be attached.

If the heating process is relied on, then the coated salt is heated to a temperature high enough to fix the metal. The temperature should be 100° C. or higher. However, if the coated salt is heated at a temperature of 800° C. or higher, then the metal will be oxidized. Therefore, metals that can be used are limited to those which will not lose an electron-capturing effect or an antibacterial capability when oxidized, i.e., to Ag and Cu. Since Ag and Cu do not lose their electron-capturing effect or antibacterial capability when fired at high temperatures, it is possible to employ a manufacturing process composed of the steps of mixing a sol of $TiO_2$ and a sol of tin oxide with each other, coating the mixture on the surface of a base, then coating an aqueous solution of metal salt, and firing the coated metal salt. According to this process, since only one firing step is involved, the productivity is increased and the manufacturing cost is reduced.

Specific examples will be described below.

INVENTIVE EXAMPLE 57

4~6 weight % of a sol of $TiO_2$ having a crystal diameter of 0.01 $\mu$m was added to an aqueous solution of ammonia which had been adjusted to a pH of 11, thus producing a suspension A in a container. 10 weight % of a sol of tin oxide having a crystal diameter of 0.0035 $\mu$m was added to an aqueous solution of ammonia which had been adjusted to a pH of 11, thus producing a suspension B in another container. The suspensions A, B were mixed with each other at a given ratio, and the mixture was coated on the surface of a square tile base with each side 15 cm long by spray coating. Then, the coated mixture was dried and thereafter fired at 850° C. for two hours, forming a specimen. The crystalline type of $TiO_2$ in the produced specimen was of a rutile structure. When the lattice constant of $TiO_2$ was measured by powder X-ray diffraction, no solid solution of tin oxide in the $TiO_2$ lattice was recognized. The specimen was evaluated for its photoactivity and wear resistance.

The photoactivity was evaluated by dropping an aqueous solution of potassium iodide onto the surface of the specimen, irradiating the dropped aqueous solution of potassium iodide with ultraviolet rays for 30 minutes, and determining the difference between the pH of the aqueous solution of potassium iodide before it was irradiated and the pH of the aqueous solution of potassium iodide after it was irradiated. If the photoactivity of the specimen surface is higher, then the following oxidizing and reducing reactions are accelerated at a higher rate, and the pH of the aqueous solution after it is irradiated is higher than the pH of the aqueous solution before it is irradiated.

Oxidizing reaction: $2I+2H^+=I_2+H_2$ Reducing reaction: $O_2+2H_2O+4e^-=4OH^-$

The wear resistance was evaluated by rubbing the specimen with a plastic eraser, and comparing any change in the appearance thereof. Evaluation indications ⊙, ○, Δ, x used were the same as those described above.

Figure 65:
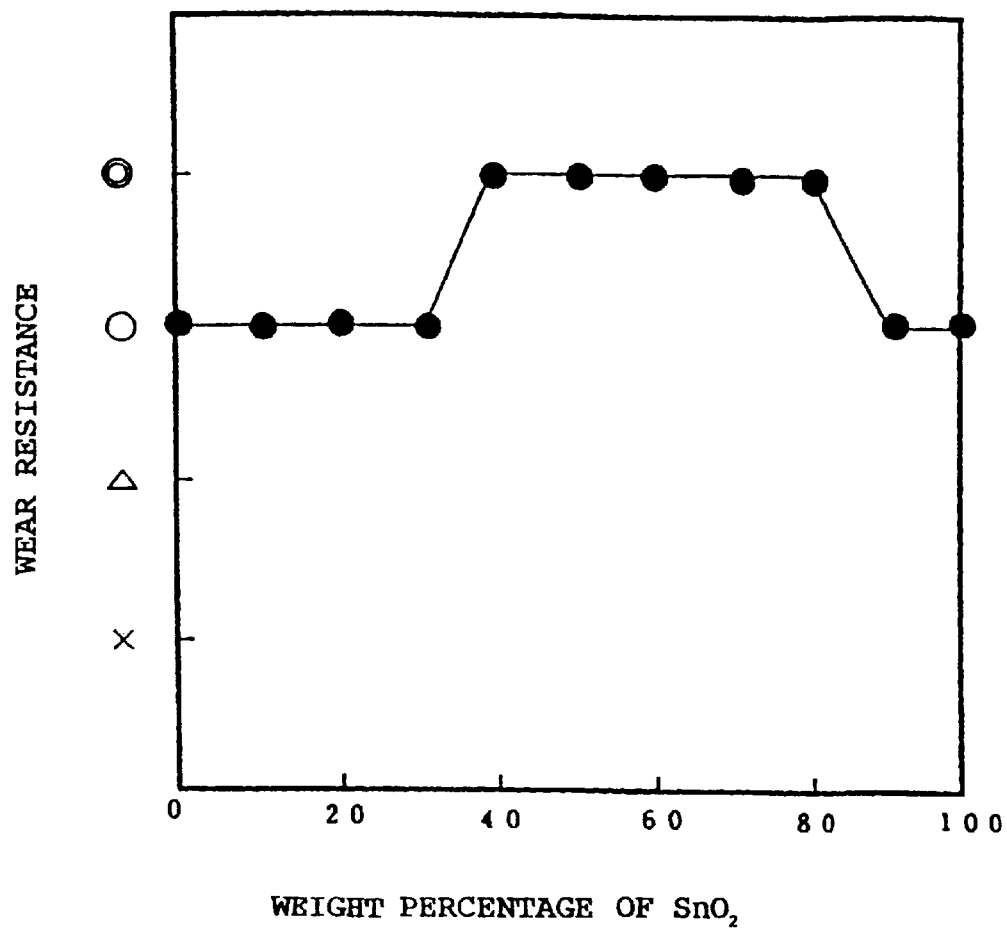
FIG. 65 is a graph showing the wear resistance depending on the weight percentage of a tin oxide in a thin film.

FIG. 65 shows how the wear resistance changed with respect to the weight ratio of tin oxide in the thin film. The wear resistance had good results of ⊙, ○ irrespective of whether tin oxide existed or not This is because the heat treatment at the high temperature of 850° C. brought about sintering, firmly bonding particles to each other in the film.

The wear resistance had a value of ⊙ when the proportion of tin oxide exceeded 30%. Since the ratio between the particle diameters of the sol of $TiO_2$ (whose crystal diameter was 0.01 μm) and the sol of tin oxide (whose crystal diameter was of 0.0035 μm) was more than 2, the fine particles of tin oxide filled interstices between the particles of $TiO_2$, with the result that the filling capability of the film increased and the film was made more dense.

Figure 66:
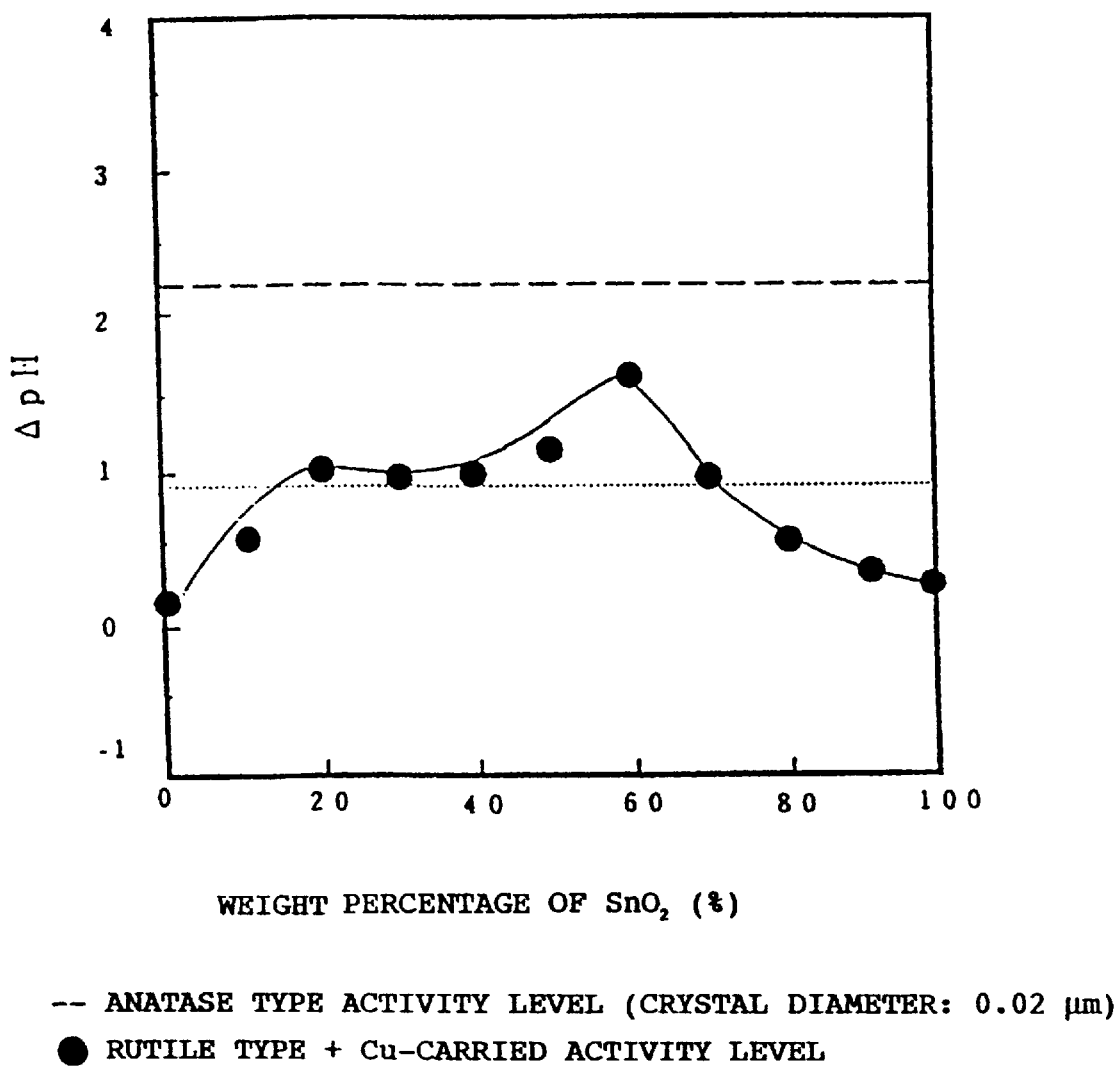
FIG. 66 is a graph showing the photoactivity depending on the weight percentage of a tin oxide in a thin film.

FIG. 66 illustrates how the photoactivity ΔpH changed with respect to the weight ratio of tin oxide in the thin film. For comparison, FIG. 66 also shows ΔpH of a specimen in which Cu was carried by rutile $TiO_2$ and which exhibited good antibacterial and deodorizing capabilities (60% in terms of $R_{30}$) and ΔpH of a specimen composed of anatase $TiO_2$ which exhibited very good antibacterial and deodorizing capabilities (95% in terms of $R_{30}$). While the ΔpH of the rutile $TiO_2$ specimen with tin oxide added was lower than the ΔpH of the anatase $TiO_2$ specimen, the ΔpH of the rutile $TiO_2$ specimen with tin oxide added was greater than the ΔpH of the specimen with Cu carried by rutile $TiO_2$ if the weight ratio of added tin oxide was in excess of 10% and less than 80%, preferably 20% or more and 70% or less. Therefore, the rutile $TiO_2$ specimen with tin oxide added exhibited a good photoactivity.

The photocatalytic activity was not increased even by adding tin oxide having an average particle diameter of 0.01 μm or more because the particles of tin oxide had no band gap sufficient to generate active oxygen since any upward shift of the position of the conduction band due to conversion of tin oxide into fine particles was not sufficient. No sufficient photoactivity was created unless the weight ratio of tin oxide exceeded 10% because the weight ratio of particles of tin oxide was not enough. The photoactivity was reduced when the weight ratio of tin oxide reached 80% or more presumably for the reason that since the probability that particles of tin oxide in the photocatalytic layer existed adjacent to each other was high, they grew highly frequently into particles whose average diameter was 0.01 μm or more when heated.

COMPARATIVE EXAMPLE 58

4~6 weight % of a sol of $TiO_2$ having a crystal diameter of 0.01 μm was added to an aqueous solution of ammonia which had been adjusted to a pH of 11, thus producing a suspension A in a container. 10 weight % of a sol of tin oxide having a crystal diameter of 0.01 μm was added to an aqueous solution of ammonia which had been adjusted to a pH of 11, thus producing a suspension B in another container. The suspensions A, B were mixed with each other at a given ratio, and the mixture was coated on the surface of a square tile base with each side 15 cm long by spray coating. Then, the coated mixture was dried and thereafter fired at 850° C. for two hours, forming a specimen. The crystalline type of $TiO_2$ in the produced specimen was of a rutile structure. When the lattice constant of $TiO_2$ was measured by powder X-ray diffraction, no solid solution of tin oxide in the $TiO_2$ lattice was recognized. The specimen was evaluated for its photoactivity and wear resistance.

Figure 67:
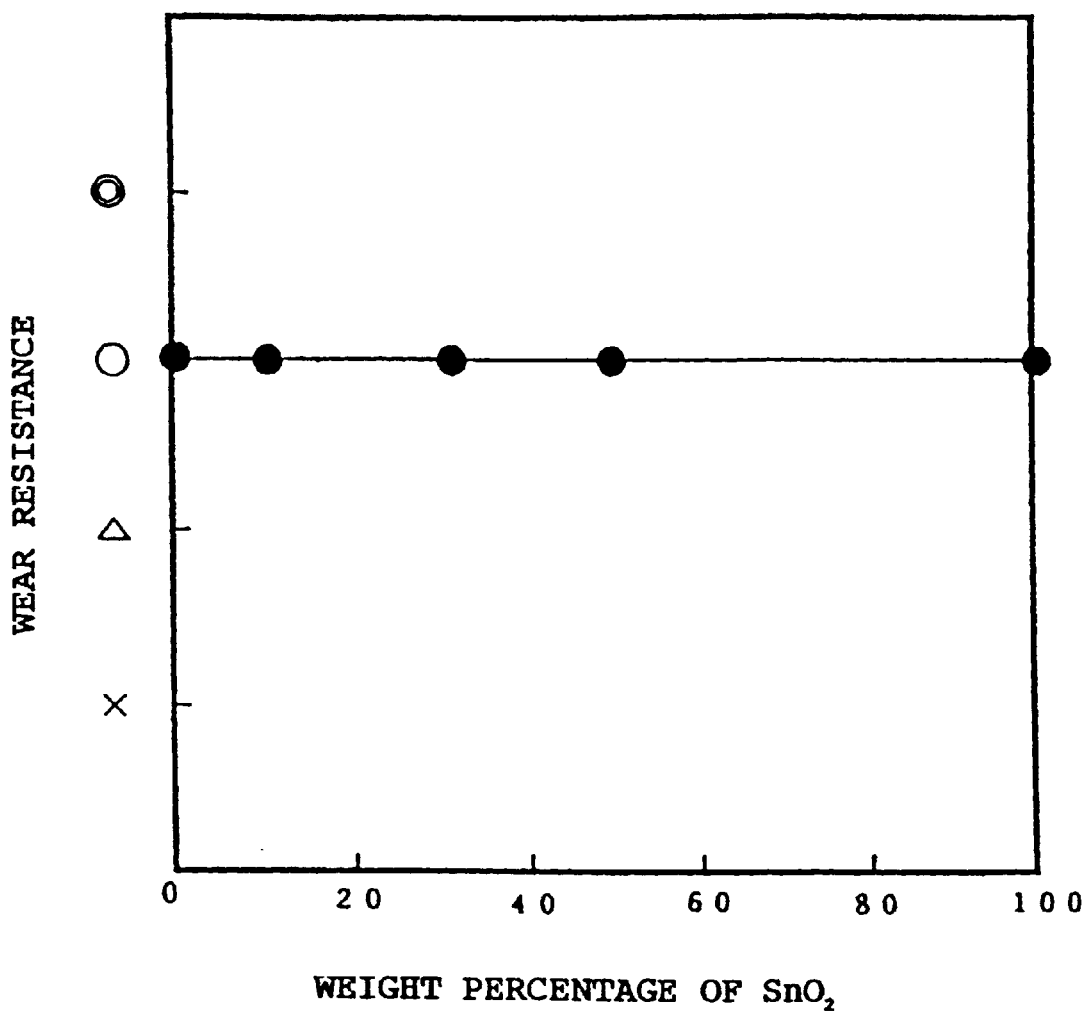
FIG. 67 is a graph showing the wear resistance depending on the weight percentage of a tin oxide in a thin film in an Inventive Example.

FIG. 67 shows how the wear resistance changed with respect to the weight ratio of tin oxide in the thin film. The wear resistance had a good result of ○ irrespective of whether tin oxide existed or not. This is because the heat treatment at the high temperature of 850° C. brought about sintering, firmly bonding particles to each other in the film. However, the wear resistance was not increased further when the amount of added tin oxide was increased. This is because the particle diameters of the sol of $TiO_2$ (whose crystal diameter was 0.01 μm) and the sol of tin oxide (whose crystal diameter was 0.01 μm) were substantially equal to each other.

Figure 68:
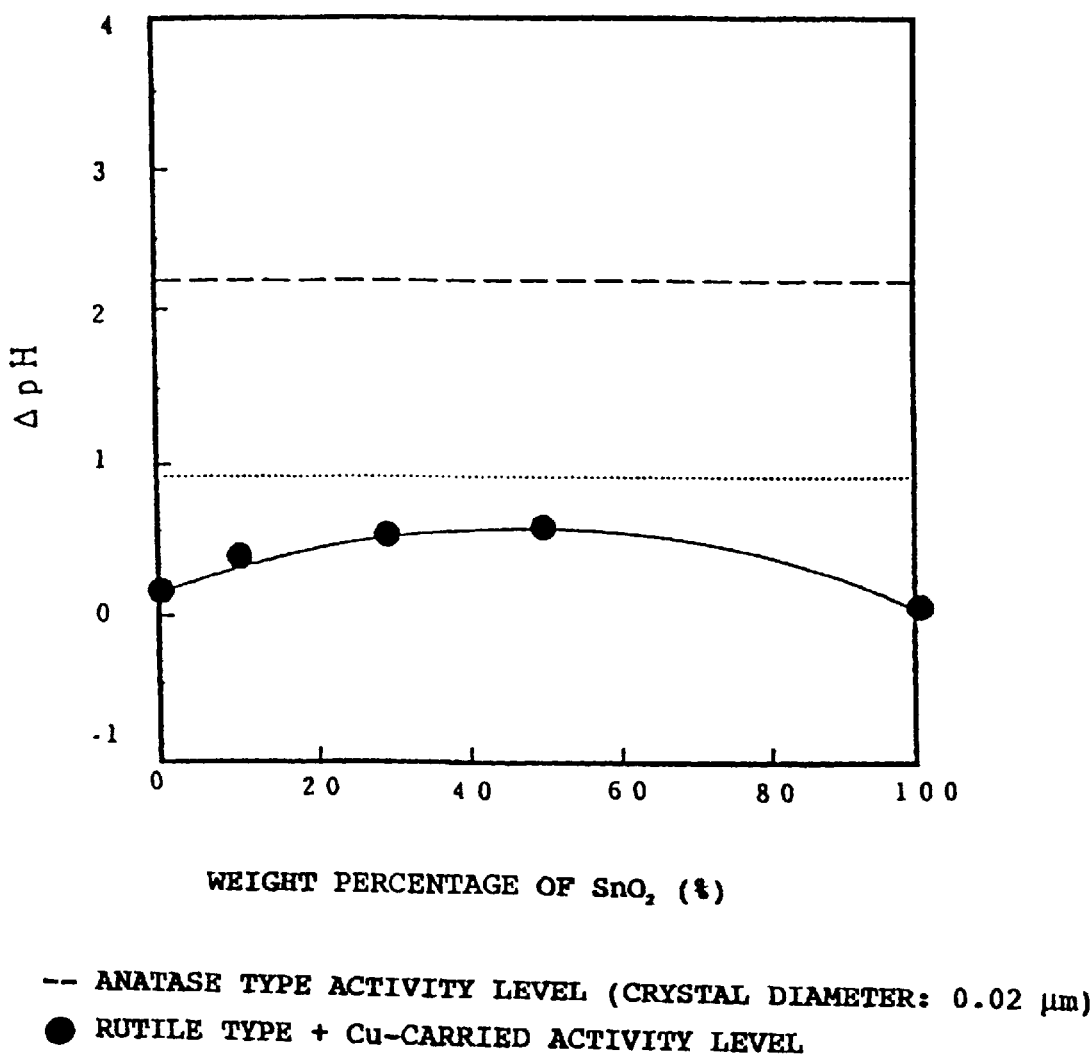
FIG. 68 is a graph showing the photoactivity depending on the weight percentage of a tin oxide in a thin film in an Inventive Example.

FIG. 68 illustrates how the photoactivity (indicated by ΔpH) changed with respect to the weight ratio of tin oxide in the thin film. For comparison, FIG. 68 also shows ΔpH of a specimen in which Cu was carried by rutile $TiO_2$ and which exhibited good antibacterial and deodorizing capabilities and ΔpH of a specimen composed of anatase $TiO_2$ which exhibited very good antibacterial and deodorizing capabilities). The ΔpH of the rutile $TiO_2$ specimen with tin oxide added was much lower than the ΔpH of the anatase $TiO_2$ specimen and the ΔpH of the specimen with Cu carried by rutile $TiO_2$.

INVENTIVE EXAMPLE 59

4~6 weight % of a sol of $TiO_2$ having a crystal diameter of 0.01 μm was added to an aqueous solution of ammonia which had been adjusted to a pH of 11, thus producing a suspension A in a container. 10 weight % of a sol of tin oxide having a crystal diameter of 0.0035 μm was added to an aqueous solution of ammonia which had been adjusted to a pH of 11, thus producing a suspension B in another container. The suspensions A, B were mixed with each other at a given ratio, and the mixture was coated on the surface of a square tile base with each side 15 cm long by spray coating. Then, the coated mixture was dried and thereafter fired at 850° C. for two hours, forming a composite material. The crystalline type of $TiO_2$ in the produced composite material was of a rutile structure. The weight ratio of tin oxide in the thin film was 60%. When the lattice constant of $TiO_2$ was measured by powder X-ray diffraction, no solid solution of tin oxide in the $TiO_2$ lattice was recognized. Then, an aqueous solution of 5 weight % of copper acetate was coated on the composite material by spray coating, dried, and thereafter photoreduced by a light source comprising a 20 W BLB lamp for one minute, thus producing a specimen. The light source was spaced from the specimen by a distance of 10 cm. The specimen was evaluated for its deodorizing capability $R_{30}$.

The deodorizing capability $R_{30}$ was determined by the following test. A gas to be decomposed was methyl mercaptan, and the specimen was placed in a cylindrical container having a diameter of 26 cm and a height of 21 cm and in which an initial concentration of methyl mercaptan was adjusted to 2 ppm. A deodorizing capability $R_{30}$ (L) upon irradiation was determined by placing the specimen at a distance of 8 cm from a 4 W BLB fluorescent lamp, irradiating the specimen with light from the 4 W BLB fluorescent lamp for 30 minutes, and then calculating a rate at which the concentration of methyl mercaptan was reduced. A deodorizing capability $R_{30}$ (D) upon non-irradiation was determined by leaving the specimen non-irradiated with light for 30 minutes, and then calculating a rate at which the concentration of methyl mercaptan was reduced. The determined deodorizing capabilities are given in Table 26 below. For comparison, the specimens (in which the weight ratio of tin oxide was 60%) prepared in Inventive Example 57 and Comparative Example 58 were also tested. It can be seen from Table 26 that the specimen according to this example exhibits effects described below by the addition of Cu.

TABLE 26

| Specimen | $R_{30}$ (L) | $R_{30}$ (D) |
| --- | --- | --- |
| Inventive Example 1 | 82 | 0 |
| Inventive Example 2 | 97 | 92 |
| Comparative Example | 32 | 0 |

It can be understood from Table 26 that the deodorizing capability $R_{30}$ (L) was slightly better than that of the specimen according to Inventive Example 57. It is considered that the deodorizing capability $R_{30}$ (L) was improved by the electron-capturing effect of Cu. The deodorizing capability $R_{30}$ (D) was much better than those of the specimens according to Inventive Example 57 and Comparative Example 58. It is considered that this increase in the activity upon non-irradiation was caused by the catalytic effect of copper.

As described above, when a material with a thin photocatalytic film formed on the surface of a base is processed at a firing temperature high enough to convert a $TiO_2$ component in the thin photocatalytic film into a rutile structure, a $Tio_2$ film is rendered sufficiently dense and strong. If the thin photocatalytic film contains tin oxide having a crystal diameter of less than 0.01 μm other than the rutile $TiO_2$, then the photocatalytic activity of the thin photocatalytic film is increased.

The photocatalytic activity can further be increased by an electron-capturing action when at least one metal of Cu, Ag, Pt, Fe, Co, Ni, and Pd is fixed to the thin photocatalytic film.

INDUSTRIAL APPLICABILITY

As described above, a multi-functional material having an antibacterial capability, a stain-resistant capability, deodorizing capability, and a photocatalytic capability for decomposing harmful substances such as NOx can suitably be used as a wall material, a tile, glass, mirror, a stone-like material which can be used as a stepstone around an artificial fall or a fountain equipped with a circulatory filter device, e.g., a water circulation system, or sanitary ware such as a water closet bowl, a basin, or the like, a hospital equipment material for preventing bacterial infections such as MRSA or the like in hospitals, a home service equipment material, a mold-resistant material, a virus-resistant material, or the like.

Although there have been described what are at present considered to be the preferred embodiments of the invention, it will be understood that modifications and variations may be made thereto without departing from the gist, spirit or essence of the invention. The scope of the invention is indicated by the appended claims rather than by the foregoing description of the presently preferred embodiments.

We claim:

1. A multi-functional material with a photocatalytic function, comprising:

a base;

a photocatalytic layer having a photocatalytic function and disposed on a surface of said base, said photocatalytic layer including at least a surface layer exposed outwardly, said surface layer being composed of fine photocatalytic particles joined together with interstices defined therebetween at a predetermined porosity and electron-capturing particles fixed to surfaces of the photocatalytic particles;

an amorphous binder layer interposed between the surface of the base and the photocatalytic layer;

said photocatalytic layer further including a lower layer embedded in said binder layer; and an intermediate layer interposed between the binder layer and said photocatalytic layer, said intermediate layer including components of said photocatalytic layer and said binder layer, and concentrations of said components varying continuously in said intermediate layer.

2. A multi-functional material according to claim 1, wherein said intermediate layer has a thickness which is at least ⅓ of the thickness of said photocatalytic layer.

3. A multi-functional material according to claim 1, wherein said electron-capturing particles are made of at least one of Cu, Ag, Zn, Fe, Co, Ni, Pd, $Cu_2O$, and Pt.

4. A multi-functional material according to claim 1, wherein said binder layer is made of glaze, inorganic glass, thermoplastic resin, or thermoplastic material of solder.

5. A multi-functional material according to claim 1, further including small particles filled in said interstices between said photocatalytic particles.

6. A multi-functional material according to claim 5, wherein said particles filled in the interstices between said photocatalytic particles have a diameter of less than 0.01 μm.

7. A multi-functional material according to claim 5, wherein said particles filled in the interstices defined between said photocatalytic particles include at least one of Ag, $Ag_2O$, Cu, $Cu_2O$, Zn, Fe, Pt, Co, Pd, and Ni.

8. A multi-functional material according to claim 5, wherein said particles filled in the interstices defined between said photocatalytic particles have a photocatalytic activity.

9. A multi-functional material according to claim 5, wherein said small particles are filled in said interstices by coating at least one of a metal alkoxide and an organic metal salt on said surface layer, and then drying and heating same.

10. A multi-functional material according to claim 5, wherein said small particles are filled in said interstices by coating a Ti alkoxide on said surface layer in an amount ranging from 10 g/cm² to 100 g/cm² in terms of the amount of $TiO_2$.

11. A multi-functional material according to claim 5, wherein said small particles are filled in said interstices by coating a solution containing Ti alkoxide on said surface layer, said solution also contains hydrochloric acid in an amount ranging from 1–10 weight % with respect to the amount of $TiO_2$.

12. A method of manufacturing a multi-functional material with a photocatalytic function of claim 1, comprising the steps of:

forming a binder layer on a surface of a base by coating a solution containing photocatalytic particles onto said binder layer, and firing the solution and the binder layer at an elevated temperature such that the binder layer is softened and the lower surface of the photocatalytic layer becomes embedded in said binder layer forming an intermediate layer between the photocatalytic layer and the binder layer;

forming a photocatalytic layer having a surface layer exposed from said binder layer and a lower layer embedded in said binder layer;

thereafter coating an aqueous solution of metal ions of at least one of Ni, Pd, and Pt, and photoreducing the coated solution to separate out and fix metal particles to surfaces of said photocatalytic particles.

13. A method according to claim 12, wherein said binder layer is made of glaze, inorganic glass, thermoplastic resin, or thermoplastic material of solder.

14. A method according to claim 12, wherein said intermediate layer has a thickness which is at least ⅓ of the thickness of said photocatalytic layer.

15. A method according to claim 12, further including the steps of coating a metal alkoxide or an organic metal salt on a surface of said photocatalytic layer, then drying and heating the coated metal alkoxide or organic metal salt to fill interstices defined between photocatalytic particles with particles smaller than the interstices.

16. A method according to claim 15, wherein said metal alkoxide coated on the surface of said photocatalytic layer comprises a Ti alkoxide, said Ti alkoxide being coated in an amount of 10 g/cm$^2$ or greater and 100 g/cm$^2$ or smaller in terms of the amount of $TiO_2$.

17. A method according to claim 15, wherein said metal alkoxide coated on the surface of said photocatalytic layer comprises a Ti alkoxide, said Ti alkoxide being heated at a temperature of 400° C. or higher and 800° C. or lower.

18. A method according to claim 15, wherein said metal alkoxide coated on the surface of said photocatalytic layer comprises a Ti alkoxide, said Ti alkoxide being contained in a coating solution which also contains hydrochloric acid in an amount of 1 weight % or more and 10 weight % or less with respect to the Ti alkoxide.

19. A method according to claim 12, wherein said step of forming the photocatalytic layer occurs after the step of forming the binder layer on the surface of the base.

* * * * *

UNITED STATES PATENT AND TRADEMARK OFFICE
CERTIFICATE OF CORRECTION

PATENT NO. : 6,210,779 B1
DATED : April 3, 2001
INVENTOR(S) : Toshiya Watanabe et al.

It is certified that error appears in the above-identified patent and that said Letters Patent is hereby corrected as shown below:

Title page,
Item [63], "Related U.S. Application Data", before the period insert -- , which is a 371 of PCT/JP94/02077, Dec. 9, 1994 --.

Column 2,
Line 4, change ":in" to -- in --.

Column 4,
Line 34, delete the comma.

Column 8,
Line 58, after "photocatalytic" delete the hyphen.

Column 10,
Line 33, change "br" to -- by --.
Line 65, change "oil" to -- on --.

Column 12:
Line 65, change "the fill" to -- that fill --.

Column 14,
Line 34, change "$\leqq$" to -- < --.
Line 41, change "neck-between" to -- neck between --.

Column 17,
Line 13, change "Kl" to -- KI --.
Line 14, change "Agl" to -- AgI --.

Column 20,
Line 36, change "Pbo" to -- PbO --.

Column 21,
Line 37, change "Bao" to -- BaO -- .
Line 63, change "net" to -- not --.

UNITED STATES PATENT AND TRADEMARK OFFICE
CERTIFICATE OF CORRECTION

PATENT NO.    : 6,210,779 B1
DATED         : April 3, 2001
INVENTOR(S)   : Toshiya Watanabe et al.

It is certified that error appears in the above-identified patent and that said Letters Patent is hereby corrected as shown below:

Column 25,
Line 46, change "0.0038" to -- 0.008 -- .
Line 59, change "addled" to -- added --.

Column 26,
Line 28, delete "750°C./110°C.".

Column 27,
Line 66, change "EL" to -- a --.

Column 29,
Line 5, delete the period.

Column 32,
Line 39, in "TABLE 10", change the "Firing temperature" for Specimen No. 5 from "100" to -- 1000 -- .

Column 33,
Line 8, change "firinc" to -- firing --.
Line 41, change "1 and 5" to -- 4 and 5 --.

Column 34,
Line 10, change " 15 t" to -- 15 % --.

Column 35,
Line 61, change "No, 12" to -- No. 12 --.

Column 36,
Line 3, after "but" delete the comma.

Column 37,
Line 9, after "μm" insert a comma.
Line 67, change "NH3" to -- $NH_3$ --.

UNITED STATES PATENT AND TRADEMARK OFFICE
CERTIFICATE OF CORRECTION

PATENT NO. : 6,210,779 B1
DATED : April 3, 2001
INVENTOR(S) : Toshiya Watanabe et al.

It is certified that error appears in the above-identified patent and that said Letters Patent is hereby corrected as shown below:

Column 38,
Line 34, after "value was" insert -- . --; begin a new paragraph with "Therefore,".

Column 39,
Line 66, delete the colon.

Column 40,
Line 36, after "film" delete the comma.

Column 41,
Line 22, after "by" delete the comma.

Column 42,
Line 32, change "(region A')" to -- (region A or A') --.
Line 40, change "region C." to -- region C --.
Line 54, change "region C." to -- region C --.

Column 44,
Line 1, delete "and".

Column 47,
Line 5, change "$40H^-$" to -- $4OH^-$ --.
Line 29, change "cf" to -- of --.
Line 67, after "10" insert -- % --.

Column 48,
Line 27, delete "of".

Column 49,
Line 35, change "A Damage" to -- Damage --.

Column 51,
Line 57, change "pares" to -- pores --.

UNITED STATES PATENT AND TRADEMARK OFFICE
CERTIFICATE OF CORRECTION

PATENT NO. : 6,210,779 B1
DATED : April 3, 2001
INVENTOR(S) : Toshiya Watanabe et al.

It is certified that error appears in the above-identified patent and that said Letters Patent is hereby corrected as shown below:

Column 52,
Line 52, change "The" to -- the --.
Line 60, change "where" to -- were --.

Column 54,
Line 58, change "a thin $TiO_2$ films" to -- thin $TiO_2$ films --.
Line 61, change "resistant" to -- resistance --.

Column 56,
Line 24, change "oil" to -- on --.
Line 58, change "(1 ~50000 CFU)" to -- (1 ~ 5 x $10^4$ CFU) --.

Column 57,
Line 67, change "(1 ~50000" to -- (1 ~ 5 x $10^4$ --.

Column 58,
Line numbered between 38 and 39, change "bacterial" to -- bacteria --.

Column 60,
Line 13, change "(1 ~ 50000 CFU)" to -- (1 ~ 5 x $10^4$ CFU) -- .

Column 65,
In the column headings for "TABLE 22", change "$W/cm^2$" to -- $mW/cm^2$ --.

Column 66,
In the column headings for "TABLE 23", change "$W/cm^2$" to -- $mW/cm^2$ --.
Line 32, change "Intensity" to -- intensity --.

Column 75,
Line 2, change "(1 ~ 50000 CFU)" to -- (1 ~ 5 x $10^4$ CFU) -- .
Line 5, change "this" to -- the --.

UNITED STATES PATENT AND TRADEMARK OFFICE
CERTIFICATE OF CORRECTION

PATENT NO. : 6,210,779 B1
DATED : April 3, 2001
INVENTOR(S) : Toshiya Watanabe et al.

It is certified that error appears in the above-identified patent and that said Letters Patent is hereby corrected as shown below:

Column 77,
Line 56, delete "of".

Column 78,
Line 50, change "0.3 $\mu g/cu^2$" to -- 0.3 $\mu g/cm^2$ --.
Line 62, change "$Cu_2$" to -- $Cu_2O$ --.

Column 87,
Line 5, change "2I" to -- $2I^-$ --.
Line 21, change "of 0.0035" to -- 0.0035 --.

Signed and Sealed this

Twenty-fourth Day of September, 2002

Attest:

JAMES E. ROGAN
Attesting Officer   Director of the United States Patent and Trademark Office